US005526254A

United States Patent [19]
Sato et al.

[11] Patent Number: 5,526,254
[45] Date of Patent: Jun. 11, 1996

[54] SIMULATION METHOD AND APPARATUS FOR MANIPULATOR APPARATUS, SIMULATION AND CONTROL METHOD AND APPARATUS FOR MANIPULATOR APPARATUS, AND CONTROL METHOD AND APPARATUS FOR MANIPULATOR APPARATUS

[75] Inventors: Yuichi Sato; Mitsunori Hirata; Tsugito Maruyama; Takashi Uchiyama; Fumio Nagashima, all of Kawasaki, Japan

[73] Assignee: Fujitsu Limited, Kanagawa, Japan

[21] Appl. No.: 193,076

[22] PCT Filed: Jun. 3, 1993

[86] PCT No.: PCT/JP93/00751

§ 371 Date: Feb. 4, 1994

§ 102(e) Date: Feb. 4, 1994

[87] PCT Pub. No.: WO93/25355

PCT Pub. Date: Dec. 23, 1993

[30] Foreign Application Priority Data

Jun. 5, 1992 [JP] Japan ................................ 4-145981
Jun. 5, 1992 [JP] Japan ................................ 4-145982

[51] Int. Cl.$^6$ ...................................... G05B 19/18
[52] U.S. Cl. .............................. 364/167.01; 364/578
[58] Field of Search ..................... 364/167.01, 424.02, 364/578; 318/560–568.25; 901/1, 2, 3, 8, 9, 14–26; 395/80–99

[56] References Cited

U.S. PATENT DOCUMENTS 4,956,790  9/1990  Tsuchihashi et al. ............... 395/99
5,046,022  9/1991  Conway et al. ...................... 395/85
5,231,693  7/1993  Backer et al. ....................... 395/99
5,303,384  4/1994  Rodriguez et al. .................. 395/99
5,459,659 10/1995  Takenaka ...................... 364/424.02

FOREIGN PATENT DOCUMENTS

| 61-79589 | 4/1986 | Japan . |
| 61-239309 | 10/1986 | Japan . |
| 62-199385 | 9/1987 | Japan . |
| 63-66611 | 3/1988 | Japan . |
| 63-95508 | 4/1988 | Japan . |
| 63-196388 | 8/1988 | Japan . |
| 1259401 | 10/1989 | Japan . |
| 1289683 | 11/1989 | Japan . |
| 2116494 | 5/1990 | Japan . |
| 2176906 | 7/1990 | Japan . |
| 2274484 | 11/1990 | Japan . |
| 386484 | 4/1991 | Japan . |
| 4129688 | 4/1992 | Japan . |
| 4141388 | 5/1992 | Japan . |
| 4269185 | 9/1992 | Japan . |

*Primary Examiner*—James P. Trammell

[57] ABSTRACT

The present invention relates to a simulation or control method and apparatus for a manipulator apparatus and makes it possible to calculate three-dimensional dynamics of the entire manipulator apparatus on the real time basis using the laws of conservation of momentum/angular momentum of the entire system, reverse dynamics or normal dynamics of a wheel system to display motion of the manipulator apparatus by simulation display on a display (2) and control the manipulator apparatus.

44 Claims, 48 Drawing Sheets

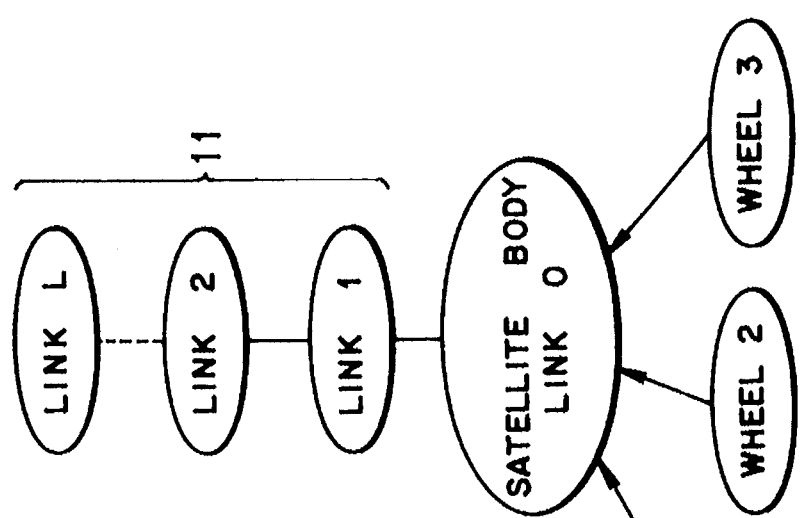
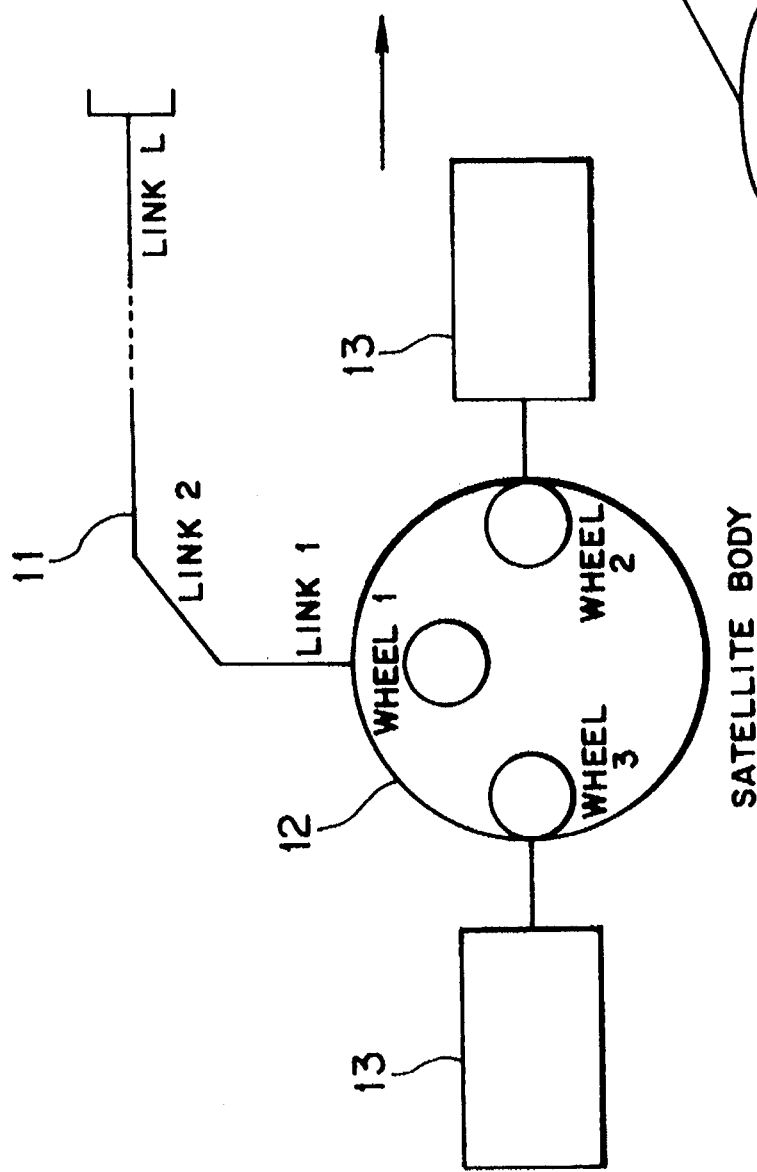

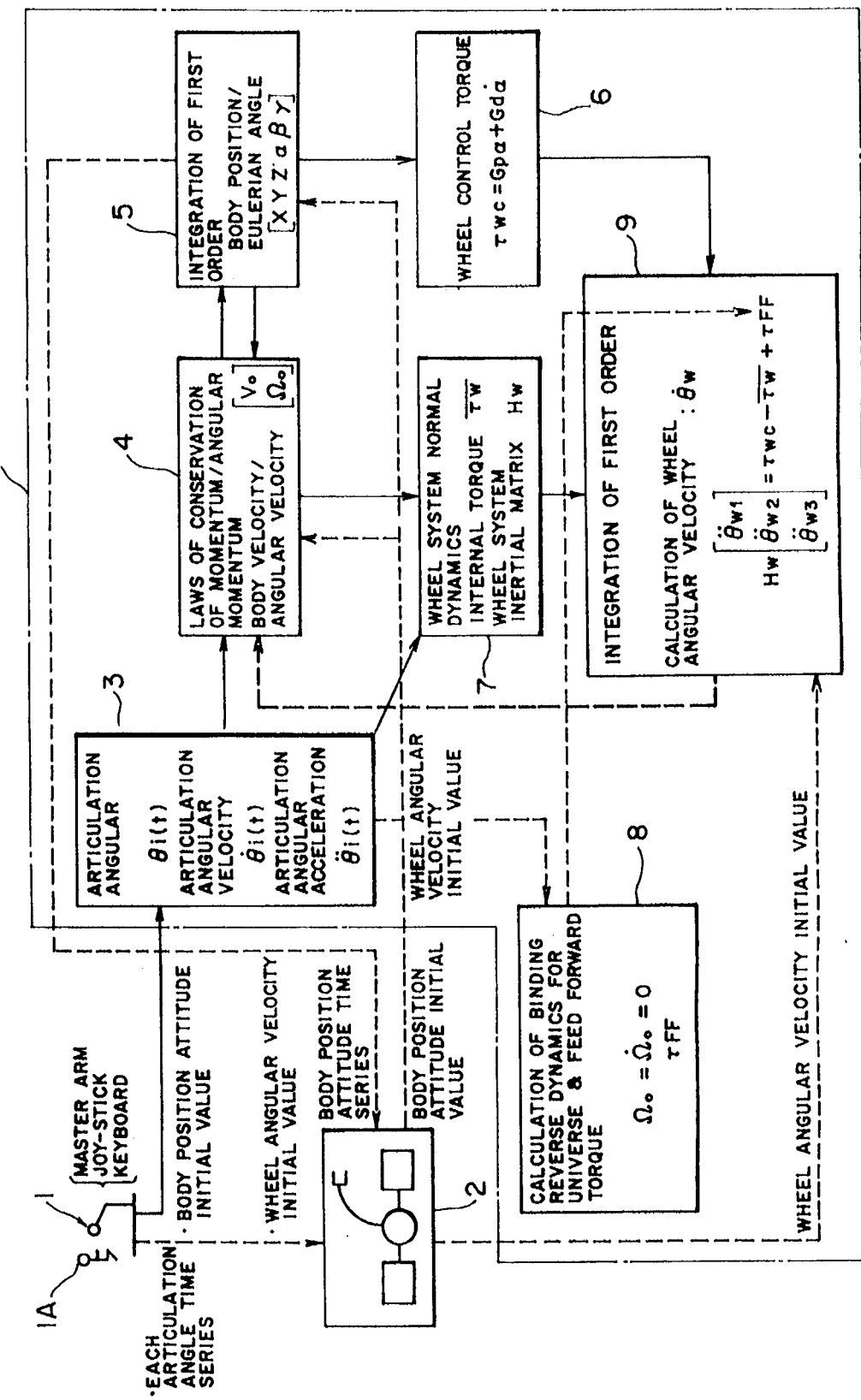

o CONSTRAINT (ANGULAR VELOCITY): $^A\Omega_0 = {^{AC}}\Omega_0$ (CONSTANT)
(ANGULAR ACCELERATION): $\dot{\Omega}_0 = 0$

○ CONSTRAINT $\dot{\Omega}$ (ANGULAR ACCELERATION) = 0

○ CONSTRAINT $\Omega_0$ (ANGULAR VELOCITY) =
$\dot{\Omega}_0$ (ANGULAR ACCELERATION = 0

○ CONSTRAINT (ANGULAR VELOCITY): $^A\Omega_0 = {}^{AC}\Omega_0$ (CONSTANT)

(ANGULAR ACCELERATION): $\dot{\Omega}_0 = 0$

○ CONSTRAINT $^A\dot{\Omega}_0$ (ANGULAR ACCELERATION) = $^A U(t)$ (ARBITRARY FUNCTION OF TIME)

○ CONSTRAINT $^A\Omega_0$ (ANGULAR VELOCITY) = $^A\psi(t)$
(ARBITRARY FUNCTION OF TIME)

$^A\dot{\Omega}_0$ (ANGULAR ACCELERATION) = $^A\dot{\psi}(t)$
(DIFFERENTIATION OF ARBITRARY FUNCTION OF TIME)

SIMULATION METHOD AND APPARATUS FOR MANIPULATOR APPARATUS, SIMULATION AND CONTROL METHOD AND APPARATUS FOR MANIPULATOR APPARATUS, AND CONTROL METHOD AND APPARATUS FOR MANIPULATOR APPARATUS

This application is a 371 of PCT/JP93/00751 filed Jun. 3, 1993.

BACKGROUND OF THE INVENTION

This invention relates to a simulation method and apparatus for performing simulation, a method and apparatus for performing simulation and control, and a method and apparatus for performing control of a manipulator apparatus for use with a spacecraft such as an artificial satellite or a space robot having a manipulator for working on an orbit around the earth or in the space or a robot for hazardous environments having a manipulator for working on the bottom of the sea or in an underground passage or a tunnel.

Investigations for spacecrafts (space robots, artificial satellites and so forth) having a manipulator which performs various operations by an astronaut outside the spacecraft in place of the astronaut actively in order to perform various operations on an orbit, which are forecast in construction and application of a space infrastructure such as a space station or a platform, are proceeded efficiently with safety.

In this instance, it is convenient if an emulation apparatus in the process of development of on-board software (OBS) or an operator supporting apparatus in the process of application of a spacecraft is available.

This similarly applies to the case wherein a manipulator which has a dynamic distance from an operator such as on the bottom of the sea or in an underground passage or a tunnel is operated by programmed operation or remote control.

Conventionally, one of very popular techniques of performing a design analysis or simulation regarding, for example, an attitude control system for an artificial satellite is to construct a dynamic model of an artificial satellite on a computer and perform necessary calculations off-line. In such off-line simulation, simulation proceeds by way of the steps of preparations of input data, dynamics calculation and display of output data (graphic display, time series graph display). And, in this instance, in the off-line simulation, the steps are performed separately one by one.

Further, since a conventional space robot, artificial satellite or the like does not include such a large attitude disturbance source as a manipulator, naturally a cooperative control system between an attitude control system and a manipulator control system or the like is not developed as yet. Consequently, for an attitude control system of the body of a space robot, an artificial satellite or the like, only control systems separate for different axes for rolling, pitching and yawing are designed and applied.

For example, where a manipulator is installed on a space shuttle, such a special system as a system for suppressing a disturbance originating from the manipulator to the attitude control system of the space shuttle is not adopted, and a variation in attitude of the spacecraft involved in driving of the manipulator is ignored.

In a conventional spacecraft having such a manipulator as described above, where the spacecraft does not include means for controlling a disturbance arising from the manipulator, there is a subject in that, when the manipulator is operated, control against an attitude disturbance which arises each time the manipulator is driven cannot be taken into consideration and consequently the variation in attitude of the body of the spacecraft cannot be regulated.

Further, in the development and application of a spacecraft, an emulation apparatus (for simulating the dynamics of a spacecraft) in the process of development and an operator supporting apparatus (for driving a manipulator of the spacecraft efficiently with safety) in the process of application are required essentially. However, the following subjects to be solved are involved in application of a conventional off-line simulator to an emulation apparatus or an operator supporting apparatus.

First, an off-line simulator does not have a real time performance which is required for an emulation apparatus or an operator supporting apparatus. In particular, it cannot sequentially repeat the three steps (refer to FIG. 56) wherein preparations for input data are performed at step CA1 and then dynamics calculation is performed at step CA2, whereafter display of output data (graphic display, time series graph display) is performed at step CA3.

Further, the off-line simulator has another subject in that results of calculation cannot be displayed on the real time basis in the form of graphics or a time series graph, which significantly degrades the efficiency of the development procedure or the supporting faculty for an operator.

Further, in such a system wherein there is a spatial distance between an operator and a manipulator as described above, it is difficult for the operator to work while directly observing the manipulator near by. Consequently, the operator sometimes delivers an excessive position moving instruction or force instruction to the manipulator, and there is the possibility that the manipulator or the body on which the manipulator is mounted may be damaged.

Furthermore, in a system wherein there is a dynamic distance between an operator and a manipulator such as a robot for hazardous environments, if an operator continues to work based only on vital feelings of the operator itself, it sometimes occurs that the operator develops an excessive position moving instruction OF force instruction, and there is the possibility that the manipulator or the body on which the manipulator is mounted may be damaged.

Conventionally, a countermeasure for the possibility that the manipulator or the body on which the manipulator is mounted may be damaged relies entirely upon a delicate operation technique of an operator based on a learning effect or practice of the operator on the knack of operation.

Accordingly, there is a subject to improve the operability of a manipulator by an operator to eliminate the possibility that the body on which the manipulator is mounted may be damaged.

The present invention has been made in view of the subjects described above, and it is a first object of the present invention to provide a simulation method and apparatus for a manipulator apparatus for a spacecraft, a robot for hazardous environments or a like apparatus with a manipulator wherein three-dimensional dynamics of the manipulator apparatus can be calculated on the real time basis and a result of the calculation can be outputted on the real time basis on a display.

It is a second object of the present invention to provide a control method and apparatus for a manipulator apparatus wherein a disturbance provided, upon driving of a manipulator, from the manipulator to a control system for a manipulator body on which the manipulator is supported can be suppressed and the controlling performance of the manipulator apparatus can be kept high and also to provide a simulation and control apparatus for a manipulator apparatus wherein three-dimensional dynamics of the manipulator apparatus can be calculated on the real time basis and a result of the calculation can be outputted on the real time basis on a display and besides, a disturbance provided, upon driving of a manipulator, from the manipulator to a control system for a manipulator body on which the manipulator is supported can be suppressed and the controlling performance of the manipulator apparatus can be kept high.

Further, it is a third object of the present invention to provide a simulation method and apparatus for a manipulator apparatus, a simulation and control method and apparatus for a manipulator apparatus, and a control method and apparatus for a manipulator apparatus wherein a work can be performed efficiently with safety when a manipulator which has a spatial distance or a dynamic distance from an operator therefor is operated by programmed operation or remote control.

DISCLOSURE OF THE INVENTION

Thus, in order to attain the first object described above, according to the present invention as set forth in claim 1, a simulation method for a manipulator apparatus which includes a manipulator and a manipulator body for supporting the manipulator thereon and whose attitude can be controlled by rotation of wheels is characterized in that information of an articulation angle, an articulation angular velocity and an articulation angular acceleration of the manipulator is inputted, and three-dimensional dynamics of the entire manipulator apparatus including an attitude control system is calculated on the real time basis based on the information using the laws of conservation of momentum/angular momentum of the entire system, reverse dynamics or normal dynamics of the wheel system to display motion of the manipulator apparatus by simulation display on a display.

Accordingly, there is an advantage in that three-dimensional dynamics of the manipulator apparatus with a manipulator can be calculated on the real time basis and a result of the calculation can be outputted on the real time basis on the graphic display.

Further, in order to attain the first object described above, according to the present invention as set forth in claim 2, a simulation apparatus for a manipulator apparatus which includes a manipulator and a manipulator body for supporting the manipulator thereon and whose attitude can be controlled by rotation of wheels is characterized in that it comprises a manipulator articulation information inputting section for inputting information of an articulation angle, an articulation angular velocity and an articulation angular acceleration of the manipulator, and a display for displaying motion of the manipulator apparatus by simulation display thereon, and that it further comprises a three-dimensional dynamics real time simulation section for receiving information from the manipulator articulation information inputting section and calculating three-dimensional dynamics of the entire manipulator apparatus including an attitude control system on the real time basis using the laws of conservation of momentum/angular momentum of the entire system, reverse dynamics or normal dynamics of the wheel system to cause the display to display motion of the manipulator apparatus by simulation display.

Meanwhile, according to the present invention as set forth in claim 3, a simulation apparatus for a manipulator apparatus is characterized in that the three-dimensional dynamics real time simulation section includes a manipulator apparatus velocity and angular velocity calculation section for inputting position attitude information and wheel angular velocity information of the manipulator apparatus and manipulator articulation angle and articulation angular velocity information from the manipulator articulation information inputting section and calculating velocity and angular velocity information of the manipulator apparatus using the laws of conservation of momentum/angular momentum of the entire system, a manipulator apparatus position information calculation section for inputting the position information of the manipulator apparatus and velocity and angular velocity information obtained by the manipulator apparatus velocity and angular velocity calculation section at two certain points of time, performing integration of first order for the input information to obtain position information of the manipulator apparatus at a next point of time and outputting the position information to the display, a wheel feedback control torque calculation section for receiving the manipulator apparatus position information from the manipulator apparatus position information calculation section and calculating a wheel feedback control torque, an internal torque and wheel system inertia information calculation section for inputting the manipulator articulation angle and articulation angular velocity information and calculating an internal torque and wheel system inertia information using the normal dynamics of the wheel system, a wheel feed forward torque calculation section for inputting the manipulator articulation angle and articulation angular velocity information and calculating a wheel feed forward torque using binding reverse dynamics, and a wheel dynamics integration section for inputting the wheel rotational angles, wheel angular velocity information, feedback control torque information, internal torque information, wheel system inertia information and feed forward torque information at two points of time and outputting wheel rotational angle and wheel angular velocity information at a next point of time.

Meanwhile, according to the present invention as set forth in claim 4, a simulation apparatus for a manipulator apparatus according to the present invention as set forth in claim 3 is characterized in that the wheel dynamics integration section is constructed as a first order integration section such that, when it is to numerically solve an equation of motion of the entire system, it performs only numerical integration of first order for the wheels from the rotational symmetry of the wheels while it does not require rotational angle information of the wheels.

Further, according to the present invention as set forth in claim 5, a simulation apparatus for a manipulator apparatus is characterized in that the wheel dynamics integration section is constructed as a second order integration section such that wheel angular velocity information is obtained by calculation of integration of first order and then wheel rotational angle information is obtained by calculation of integration of second order.

Meanwhile, according to the present invention as set forth in claim 6, a simulation apparatus for a manipulator apparatus according to the present invention as set forth in claim 5 is characterized in that, when an equation of motion of the entire system is to be solved, from the rotational symmetry of the wheels, the step sizes in numerical integration of first order and numerical integration of second order of the wheels are made different from each other such that the numerical integration of second order is processed by rougher calculation than the numerical integration of first order.

Further, according to the present invention as set forth in claim 7, a simulation apparatus for a manipulator apparatus according to the present invention as set forth in claim 5 is characterized in that, when an equation of motion of the entire system is to be solved, from the rotational symmetry of the wheels, the integration degree numbers in numerical integration of first order and numerical integration of second order of the wheels are made different from each other such that the numerical integration of second order is processed by rougher calculation than the numerical integration of first order.

Meanwhile, according to the present invention as set forth in claim 8, a simulation apparatus for a manipulator apparatus according to the present invention as set forth in claim 5 is characterized in that, when an equation of motion of the entire system is to be solved, from the rotational symmetry of the wheels, the step sizes and the integration degree numbers in numerical integration of first order and numerical integration of second order of the wheels are made different from each other such that the numerical integration of second order is processed by rougher calculation than the numerical integration of first order.

Further, according to the present invention as set forth in claim 9, a simulation apparatus for a manipulator apparatus according to the present invention as set forth in claim 3 is characterized in that, in order to calculate a rotational angle of the wheels at a high speed with a high degree of accuracy, inertial moments of all of the wheels are proportionally multiplied.

Further, according to the present invention as set forth in claim 10, a simulation apparatus for a manipulator apparatus is characterized in that, when rotation of the wheels is to be displayed on the display, an angular velocity of the wheels is displayed in the form wherein it is proportionally multiplied immediately before it is displayed.

Accordingly, by inputting information of an articulation angle, an articulation angular velocity and an articulation angular acceleration of the manipulator of the manipulator apparatus which includes the manipulator and the manipulator body for supporting the manipulator thereon and whose attitude can be controlled by rotation of wheels and calculating three-dimensional dynamics of the entire manipulator apparatus including the attitude control system on the real time basis based on the information using the laws of conservation of momentum/angular momentum of the entire system, reverse dynamics or normal dynamics of the wheel system, motion of the manipulator apparatus can be displayed by simulation display on the display. Consequently, there is an advantage in that three-dimensional dynamics of the entire manipulator apparatus including the control system can be calculated on the real time basis and a result of the calculation can be outputted on the real time basis on the display.

Further, an equation of motion of the entire system can be solved at a high speed and with a high degree of accuracy, and consequently, there is another advantage in that real time calculation of three-dimensional dynamics of the entire manipulator apparatus can be realized readily.

Meanwhile, in order to attain the second object described above, according to the present invention as set forth in claim 11, a simulation and control method for a manipulator apparatus which includes a manipulator and a manipulator body for supporting the manipulator thereon is characterized in that the manipulator apparatus inputs information of an articulation angle, an articulation angular velocity and an articulation angular acceleration of the manipulator and calculates three-dimensional dynamics of the entire manipulator apparatus including an attitude control system on the real time basis based on the information using the laws of conservation of momentum/angular momentum of the entire system, reverse dynamics or normal dynamics of the wheel system to display motion of the manipulator apparatus by simulation display on a display, and the manipulator apparatus includes an attitude control system for controlling an attitude of the manipulator apparatus using the wheels, a manipulator control system for inputting information of an articulation angle, an articulation angular velocity and an articulation angular acceleration of the manipulator and controlling the manipulator, and a cooperative control system for calculating a disturbance originating from the manipulator based on information from the manipulator control system using a required algorithm and supplying the disturbance as a feed forward signal to the attitude control system, and that the cooperative control system takes, in order to compensate for the disturbance originating from the manipulator, an angular momentum or a wheel angular velocity obtained by dividing the angular momentum by a mass of each of the wheels or a torque as a feed forward amount to be delivered to the wheel control system of the attitude control system and calculates an aimed angular momentum or an aimed angular velocity of the wheels from the laws of conservation of momentum/angular momentum or reverse dynamics for the universe to control the wheels.

Further, according to the present invention as set forth in claim 12, a simulation and control method for a manipulator apparatus according to the present invention as set forth in claim 11 is characterized in that, upon application of the laws of conservation of momentum/angular momentum, a constraint that the angular velocity of a manipulator body is 0 is applied to the angular velocity of the manipulator body.

Meanwhile, according to the present invention as set forth in claim 13, a simulation and control method for a manipulator apparatus according to the present invention as set forth in claim 11 is characterized in that, upon application of the laws of conservation of momentum/angular momentum, a constraint that the angular velocity of a manipulator body is a constant is applied to the angular velocity of the manipulator body.

Further, according to the present invention as set forth in claim 14, a simulation and control method for a manipulator apparatus according to the present invention as set forth in claim 11 is characterized in that, upon application of the laws of conservation of momentum/angular momentum, a constraint that the angular velocity of a manipulator body is an arbitrary function of the time is applied to the angular velocity of the manipulator body.

Meanwhile, according to the present invention as set forth in claim 15, a simulation and control method for a manipulator apparatus according to the present invention as set forth in claim 11 is characterized in that, upon application of the reverse dynamics for the universe, a constraint that the angular acceleration of a manipulator body is 0 is applied to the angular acceleration of the manipulator body.

Further, according to the present invention as set forth in claim 16, a simulation and control method for a manipulator apparatus according to the present invention as set forth in claim 11 is characterized in that, upon application of the reverse dynamics for the universe, a constraint that the angular velocity and the angular acceleration of a manipulator body are both 0 is applied to the angular velocity and the angular acceleration of the manipulator body.

Meanwhile, according to the present invention as set forth in claim 17, a simulation and control method for a manipulator apparatus is characterized in that, upon application of the reverse dynamics for the universe, a constraint that the angular velocity of a manipulator body is a constant and the angular acceleration of the manipulator body is 0 is applied to the angular velocity and the angular acceleration of the manipulator body.

Further, according to the present invention as set forth in claim 18, a simulation and control method for a manipulator apparatus according to the present invention as set forth in claim 11 is characterized in that, upon application of the reverse dynamics for the universe, a constraint that the angular acceleration of a manipulator body is an arbitrary function of the time is applied to the angular acceleration of the manipulator body.

Meanwhile, according to the present invention as set forth in claim 19, a simulation and control method for a manipulator apparatus is characterized in that, upon application of the reverse dynamics for the universe, a constraint that the angular velocity and the angular acceleration of a manipulator body are both arbitrary functions of the time is applied to the angular velocity and the angular acceleration of the manipulator body.

Further, according to the present invention as set forth in claim 20, a simulation and control method for a manipulator apparatus according to the present invention as set forth in claim 11 is characterized in that the degree of freedom of the entire system is set to a sum L+6 of the number L of articulations of the manipulator and the degree of freedom of 6 of the position and attitude of the manipulator body.

Meanwhile, according to the present invention as set forth in 21, a simulation and control method for a manipulator apparatus according to the present invention as set forth in claim 11 is characterized in that the attitude control system performs PD feedback control based on an attitude angle of the manipulator apparatus and differentiation of the attitude angle in order to compensate for a disturbance originating from the manipulator.

Further, according to the present invention as set forth in claim 22, a simulation and control method for a manipulator apparatus is characterized in that the attitude control system performs PID feedback control based on an attitude angle of the manipulator apparatus, integration of the attitude angle and differentiation of the attitude angle in order to compensate for a disturbance originating from the manipulator.

Accordingly, there is an advantage in that three-dimensional dynamics of the entire manipulator apparatus can be calculated on the real time basis and a result of the calculation can be outputted on the real time basis on the graphic display and besides a disturbance provided to the control system of the manipulator body upon driving of the manipulator can be suppressed to keep the controlling performance of the manipulator apparatus high.

Meanwhile, in order to attain the second object described above, according to the present invention as set forth in claim 23, a simulation and control apparatus for a manipulator apparatus which includes a manipulator and a manipulator body for supporting the manipulator thereon and whose attitude can be controlled by rotation of wheels is characterized in that it comprises a manipulator articulation information inputting section for inputting information of an articulation angle, an articulation angular velocity and an articulation angular acceleration of the manipulator, a display for displaying motion of the manipulator apparatus by simulation display thereon, and a three-dimensional dynamics real time simulation section for receiving information from the manipulator articulation information inputting section and calculating three-dimensional dynamics of the entire manipulator apparatus including an attitude control system on the real time basis using the laws of conservation of momentum/angular momentum of the entire system, reverse dynamics or normal dynamics of the wheel system to cause the display to display motion of the manipulator apparatus by simulation display, and it further comprises an attitude control system for controlling an attitude of the manipulator apparatus using the wheels, a manipulator control system for inputting information of an articulation angle, an articulation angular velocity and an articulation angular acceleration of the manipulator and controlling the manipulator, and a cooperative control system for calculating a disturbance originating from the manipulator based on the information from the manipulator control system using a required algorithm and supplying the disturbance as a feed forward signal to the attitude control system, and that the cooperative control system takes, in order to compensate for the disturbance originating from the manipulator, an angular momentum or a wheel angular velocity obtained by dividing the angular momentum by a mass of each of the wheels or a torque as a feed forward amount to be delivered to the wheel control system of the attitude control system and calculates an aimed angular momentum or an aimed angular velocity of the wheels from the laws of conservation of momentum/angular momentum or reverse dynamics for the universe to control the wheels.

Further, according to the present invention as set forth in claim 24, a simulation and control apparatus for a manipulator apparatus according to the present invention as set forth in claim 23 is characterized in that the three-dimensional dynamics real time simulation section includes a manipulator apparatus velocity and angular velocity calculation section for inputting position attitude information and wheel angular velocity information of the manipulator apparatus and manipulator articulation angle and articulation angular velocity information from the manipulator articulation information inputting section and calculating velocity and angular velocity information of the manipulator apparatus using the laws of conservation of momentum/angular momentum of the entire system, a manipulator apparatus position information calculation section for inputting the position information of the manipulator apparatus and velocity and angular velocity information obtained by the manipulator apparatus velocity and angular velocity calculation section at two certain points of time, performing integration of first order for the input information to obtain position information of the manipulator apparatus at a next point of time and outputting the position information to the display, a wheel feedback control torque calculation section for receiving the manipulator apparatus position information from the manipulator apparatus position information calculation section and calculating a wheel feedback control torque, an internal torque and wheel system inertia information calculation section for inputting the manipulator articulation angle and articulation angular velocity information and calculating an internal torque and wheel system inertia information using the normal dynamics of the wheel system, a wheel feed forward torque calculation section for inputting the manipulator articulation angle and articulation angular velocity information and calculating a wheel feed forward torque using binding reverse dynamics for the universe, and a wheel dynamics integration section for inputting the wheel rotational angles, wheel angular velocity information, feedback control torque information, internal torque information, wheel system inertia information and feed forward torque information at two points of time and outputting wheel rotational angle and wheel angular velocity information at a next point of time.

Accordingly, there is an advantage in that three-dimensional dynamics of the entire spacecraft including the attitude control system can be calculated on the real time basis and a result of the calculation can be outputted on the real time basis on the graphic display and besides a disturbance provided to the attitude control system of the spacecraft body upon driving of the manipulator can be suppressed to keep the attitude controlling performance of the spacecraft high.

Meanwhile, in order to attain the second object described above, according to the present invention as set forth in claim 25, a control method for a manipulator apparatus which includes a manipulator and a manipulator body for supporting the manipulator thereon and whose attitude can be controlled by rotation of wheels is characterized in that the manipulator apparatus comprises an attitude control system for controlling an attitude of the manipulator apparatus using the wheels, a manipulator control system for controlling the manipulator provided on the manipulator apparatus, and further comprises a cooperative control system for calculating a disturbance originating from the manipulator based on information from the manipulator control system using a required algorithm and supplying the disturbance as a feed forward signal to the attitude control system, and that the cooperative control system takes, in order to compensate for the disturbance originating from the manipulator, an angular momentum or a wheel angular velocity obtained by dividing the angular momentum by a mass of each of the wheels as a feed forward amount to be delivered to the wheel control system of the attitude control system and calculates an aimed angular momentum or an aimed angular velocity of the wheels from the laws of conservation of momentum/angular momentum to control the wheels.

Further, in order to attain the second object described above, according to the present invention as set forth in claim 26, a control method for a manipulator apparatus which includes a manipulator and a manipulator body for supporting the manipulator thereon and whose attitude can be controlled by rotation of wheels is characterized in that the manipulator apparatus comprises an attitude control system for controlling an attitude of the manipulator apparatus using the wheels, a manipulator control system for controlling the manipulator provided on the manipulator apparatus, and further comprises a cooperative control system for calculating a disturbance originating from the manipulator based on information from the manipulator control system using a required algorithm and supplying the disturbance as a feed forward signal to the attitude control system, and that the cooperative control system takes, in order to compensate for the disturbance originating from the manipulator, a torque as a feed forward amount to be delivered to the wheel control system of the attitude control system and calculates a value of the torque from reverse dynamics for the universe to control the wheels.

Accordingly, there is an advantage in that a disturbance provided to the attitude control system of the spacecraft body upon driving of the manipulator can be suppressed and the attitude controlling performance of the spacecraft can be kept high.

Meanwhile, in order to attain the second object described above, according to the present invention as set forth in claim 27, a control method for a manipulator apparatus which includes a manipulator and a manipulator body for supporting the manipulator thereon and whose attitude can be controlled by rotation of wheels is characterized in that the manipulator apparatus comprises an attitude control system for controlling an attitude of the manipulator apparatus using the wheels, a manipulator control system for controlling the manipulator provided on the manipulator apparatus, and further comprises a cooperative control system for calculating a disturbance originating from the manipulator based on information from the manipulator control system using a required algorithm and supplying the disturbance as a feed forward signal to the attitude control system, and that the cooperative control system takes, in order to compensate for the disturbance originating from the manipulator, an angular momentum or a wheel angular velocity obtained by dividing the angular momentum by a mass of each of the wheels or a torque as a feed forward amount to be delivered to the wheel control system of the attitude control system and calculates an aimed angular momentum or an aimed angular velocity of the wheels from the laws of conservation of momentum/angular momentum or reverse dynamics for the universe to control the wheels.

Accordingly, there is an advantage in that a disturbance provided to the control system of the manipulator body upon driving of the manipulator can be suppressed and the controlling performance of the manipulator apparatus can be kept high.

Further, in order to attain the third object described above, according to the present invention as set forth in claim 28, a simulation method for a manipulator apparatus which includes a manipulator and, a manipulator body for supporting the manipulator thereon is characterized in that route instruction value information of the manipulator is inputted as an initial instruction value and information of a disturbance which is produced when the manipulator operates in accordance with the initial instruction value is forecast on the real time basis as an excessive instruction value control index based on a dynamic model regarding the manipulator, and scale conversion is performed for the initial instruction value based on the excessive instruction value control index to obtain an intermediate instruction value, and thereafter, motion of the manipulator is displayed by simulation display in accordance with the intermediate instruction value obtained by the scale conversion.

Meanwhile, according to the present invention as set forth in claim 29, a simulation method for a manipulator apparatus is characterized in that a momentum/angular momentum are forecast on the real time basis as the excessive instruction value control index using the laws of conservation of momentum/angular momentum.

Further, according to the present invention as set forth in claim 30, a simulation method for a manipulator apparatus according to the present invention as set forth in claim 28 is characterized in that a torque/force are forecast on the real time basis as the excessive instruction, value control index using reverse dynamics.

Meanwhile, according to the present invention as set forth in claim 31, a simulation method for a manipulator apparatus according to the present invention as set forth in claim 28 is characterized in that a momentum/angular momentum and a torque/force are forecast on the real time basis as the excessive instruction value control indices using the laws of conservation of momentum/angular momentum and reverse dynamics.

Further, according to the present invention as set forth in claim 32, a simulation method for a manipulator apparatus according to the present invention as set forth in claim 28 is characterized in that, as differentiation information of the initial instruction value which is to be used upon calculation of the excessive instruction value control index, a differential value of the initial instruction value is used after it is processed by averaging processing.

Meanwhile, according to the present invention as set forth in claim 33, a simulation method for a manipulator apparatus is characterized in that exponential conversion calculation is performed when the scale conversion is to be performed.

Further, according to the present invention as set forth in claim 34, a simulation method for a manipulator apparatus is characterized in that the scale conversion processing and spline interpolation calculation processing are combined with each other to produce an aimed route for the manipulator.

Meanwhile, according to the present invention as set forth in claim 35, a simulation method for a manipulator apparatus according to the present invention as set forth in claim 34 is characterized in that spline interpolation calculation processing continuous to differentiation of first order is used as the spline interpolation calculation processing.

Further, according to the present invention as set forth in claim 36, a simulation method for a manipulator apparatus according to the present invention as set forth in claim 34 is characterized in that spline interpolation calculation processing continuous to differentiation of second order is used as the spline interpolation calculation processing.

Accordingly, there is an advantage in that, when the manipulator which has a spatial distance or a dynamic distance from the operator therefor is to be operated by programmed operation or remote control, the present invention can be helpful to operation training of the operator which is performed in order to allow the operator to work efficiently with safety.

Meanwhile, in order to attain the third object described above, according to the present invention as set forth in claim 37, a simulation apparatus for a manipulator apparatus which includes a manipulator and a manipulator body for supporting the manipulator thereon is characterized in that it comprises initial instruction value inputting means for inputting route instruction value information of the manipulator as an initial instruction value, excessive instruction value control index forecasting means for receiving the initial instruction value from the initial instruction value inputting means and forecasting information of a disturbance, which is produced when the manipulator operates in accordance with the initial instruction value, on the real time basis as an excessive instruction value control index based on a dynamic model regarding the manipulator, scale conversion means for performing scale conversion for the initial instruction value based on the excessive instruction value control index forecast by the excessive instruction value control index forecasting means to obtain an intermediate instruction value, and display means for displaying motion of the manipulator by simulation display in accordance with the intermediate instruction value obtained by the conversion of the scale conversion means.

Accordingly, there is an advantage in that, when the manipulator which has a spatial distance or a dynamic distance from the operator therefor is to be operated by programmed operation or remote control, the present invention can be helpful to operation training of the operator which is performed in order to allow the operator to work efficiently with safety.

Further, in order to attain the third object described above, according to the present invention as set forth in claim 38, a simulation and control method for a manipulator apparatus which includes a manipulator and a manipulator body for supporting the manipulator thereon is characterized in that route instruction value information of the manipulator is inputted as an initial instruction value and information of a disturbance, which is produced when the manipulator operates in accordance with the initial instruction value, is forecast on the real time basis as an excessive instruction value control index based on a dynamic model regarding the manipulator, and scale conversion is performed for the initial instruction value based on the excessive instruction value control index to obtain an intermediate instruction value, and then motion of the manipulator is displayed by simulation display and the manipulator is controlled in accordance with the intermediate instruction value obtained by the scale conversion.

Meanwhile, according to the present invention as set forth in claim 39, a simulation and control method for a manipulator apparatus according to the present invention as set forth in claim 38 is characterized in that, in order to control the manipulator, controlling processing is performed for a first intermediate instruction value obtained by the scale conversion of the initial instruction value based on an actual disturbance of the manipulator system to obtain a second intermediate instruction value, and then the manipulator is controlled in accordance with the second stage intermediate instruction value.

Further, according to the present invention as set forth in claim 40, a simulation and control method for a manipulator apparatus according to the present invention as set forth in claim 38 is characterized in that, in addition to motion of the manipulator based on the intermediate instruction value, motion of the manipulator based on the initial instruction value and a reached value representative of a current position of the manipulator is displayed by simulation display.

Meanwhile, according to the present invention as set forth in claim 41, a simulation and control method for a manipulator apparatus according to the present invention as set forth in claim 40 is characterized in that, if a difference greater than a predetermined value is produced among the initial instruction value, the intermediate instruction value and the reached value, the initial instruction value and the intermediate instruction values later than the current reached point of the manipulator are reset and the initial instruction value of the manipulator is re-set to the current reached point.

Accordingly, there is an advantage in that, when the manipulator which has a spatial distance or a dynamic distance from the operator therefor is to be operated by programmed operation or remote control, a work can be performed efficiently with safety and a disturbance provided to the control system of the manipulator body upon driving of the manipulator can be suppressed to keep the controlling performance of the manipulator apparatus high.

Further, in order to attain the third object described above, according to the present invention as set forth in claim 42, a simulation and control apparatus for a manipulator apparatus which includes a manipulator and a manipulator body for supporting the manipulator thereon is characterized in that it comprises initial instruction value inputting means for inputting route instruction value information of the manipulator as an initial instruction value, excessive instruction value control index forecasting means for receiving the initial instruction value from the initial instruction value inputting means and forecasting information of a disturbance, which is produced when the manipulator operates in accordance with the initial instruction value, on the real time basis as an excessive instruction value control index based on a dynamic model regarding the manipulator, scale conversion means for performing scale conversion for the route instruction value information based on the excessive instruction value control index forecast by the excessive instruction value control index forecasting means to obtain an intermediate instruction value, display means for displaying motion of the manipulator by simulation display in accordance with the intermediate instruction value obtained by the conversion of the scale conversion means, and control means for controlling the manipulator in accordance with the intermediate instruction value obtained by the conversion of the scale conversion means.

Accordingly, there is an advantage in that, when the manipulator which has a spatial distance or a dynamic distance from the operator therefor is to be operated by programmed operation or remote control, a work can be performed efficiently with safety and a disturbance provided to the control system of the manipulator body upon driving of the manipulator can be suppressed to keep the controlling performance of the manipulator apparatus high.

Meanwhile, in order to attain the third object described above, according to the present invention as set forth in claim 43, a simulation and control method for a manipulator apparatus which includes a manipulator and a manipulator body for supporting the manipulator thereon is characterized in that route instruction value information of the manipulator is inputted as an initial instruction value and information of a disturbance, which is produced when the manipulator operates in accordance with the initial instruction value, is forecast on the real time basis as an excessive instruction value control index based on a dynamic model regarding the manipulator, and scale conversion is performed for the initial instruction value based on the excessive instruction value control index to obtain an intermediate instruction value, and then the manipulator is controlled in accordance with the intermediate instruction value obtained by the scale conversion.

Accordingly, there is an advantage in that, when the manipulator which has a spatial distance or a dynamic distance from the operator therefor is to be operated by programmed operation or remote control, a work can be performed efficiently with safety.

Further, in order to attain the third object described above, according to the present invention as set forth in claim 44, a simulation and control apparatus for a manipulator apparatus which includes a manipulator and a manipulator body for supporting the manipulator thereon is characterized in that it comprises initial instruction value inputting means for inputting route instruction value information of the manipulator as an initial instruction value, excessive instruction value control index forecasting means for receiving the initial instruction value from the initial instruction value inputting means and forecasting information of a disturbance, which is produced when the manipulator operates in accordance with the initial instruction value, on the real time basis as an excessive instruction value control index based on a dynamic model regarding the manipulator, scale conversion means for performing scale conversion for the route instruction value information based on the excessive instruction value control index forecast by the excessive instruction value control index forecasting means to obtain an intermediate instruction value, and control means for controlling the manipulator in accordance with the intermediate instruction value obtained by the conversion of the scale conversion means.

Accordingly, there is an advantage in that, when the manipulator which has a spatial distance or a dynamic distance from the operator therefor is to be operated by programmed operation or remote control, a work can be performed efficiently with safety.

BRIEF DESCRIPTION OF THE DRAWINGS

FIGS. 10(a) and 10(b) are diagrammatic views illustrating that wheels are treated as branching links from a satellite body; FIG. 11 is a block diagram showing another embodiment of the present invention.

BEST FORMS IN EMBODYING THE INVENTION

In the following, embodiments of the present invention will be described with reference to the drawings.

(a) Description of the First Embodiment

Figure 2:
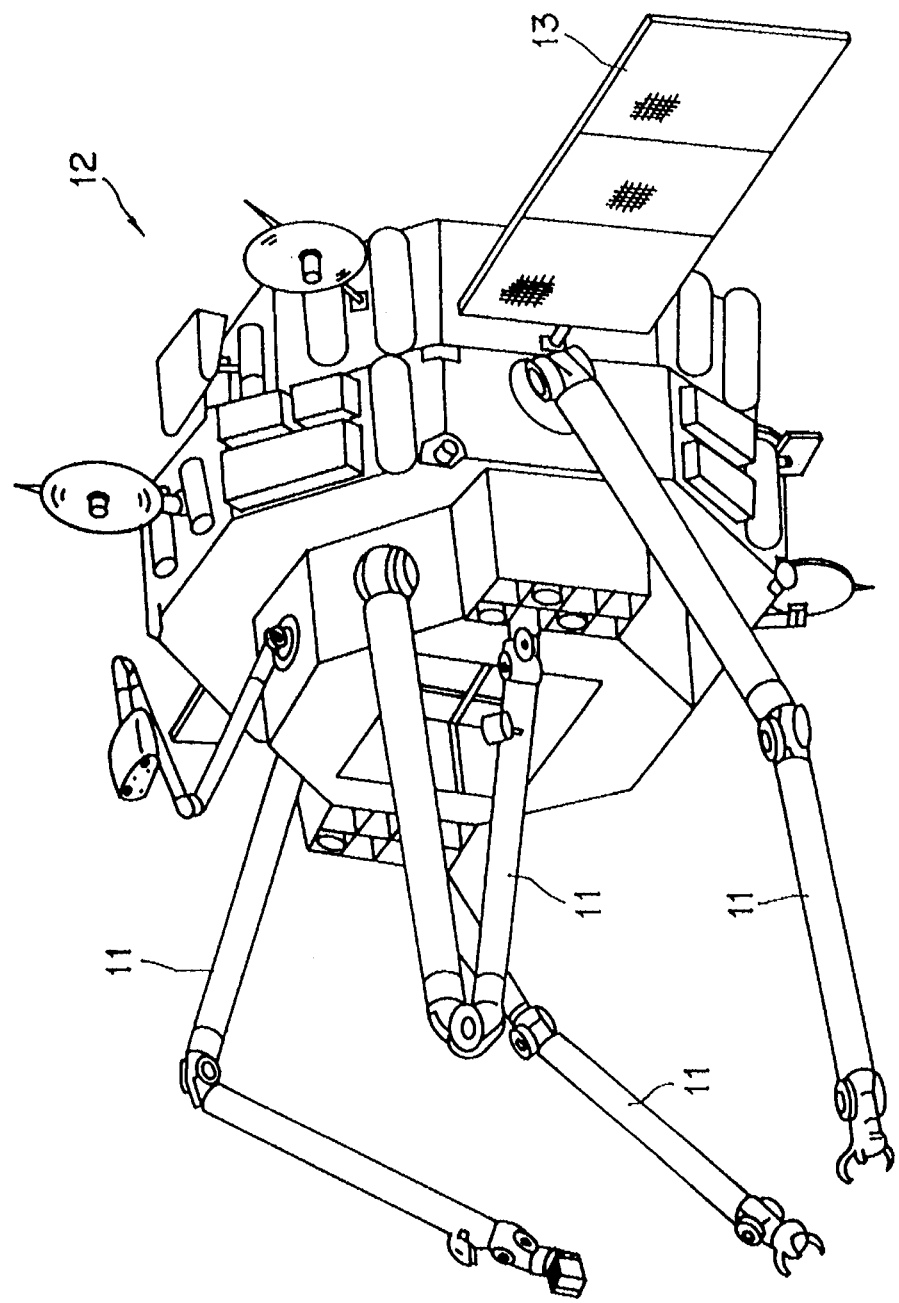
FIG. 2 is a perspective view showing a spacecraft having a manipulator.

Now, the present embodiment is directed to a three-dimensional dynamics real time simulation system for an attitude control system for a spacecraft 12 such as a space robot or an artificial satellite having such manipulators 11 as shown in FIG. 2. It is to be noted that, in FIG. 2, reference numeral 13 denotes a paddle.

Figure 1:
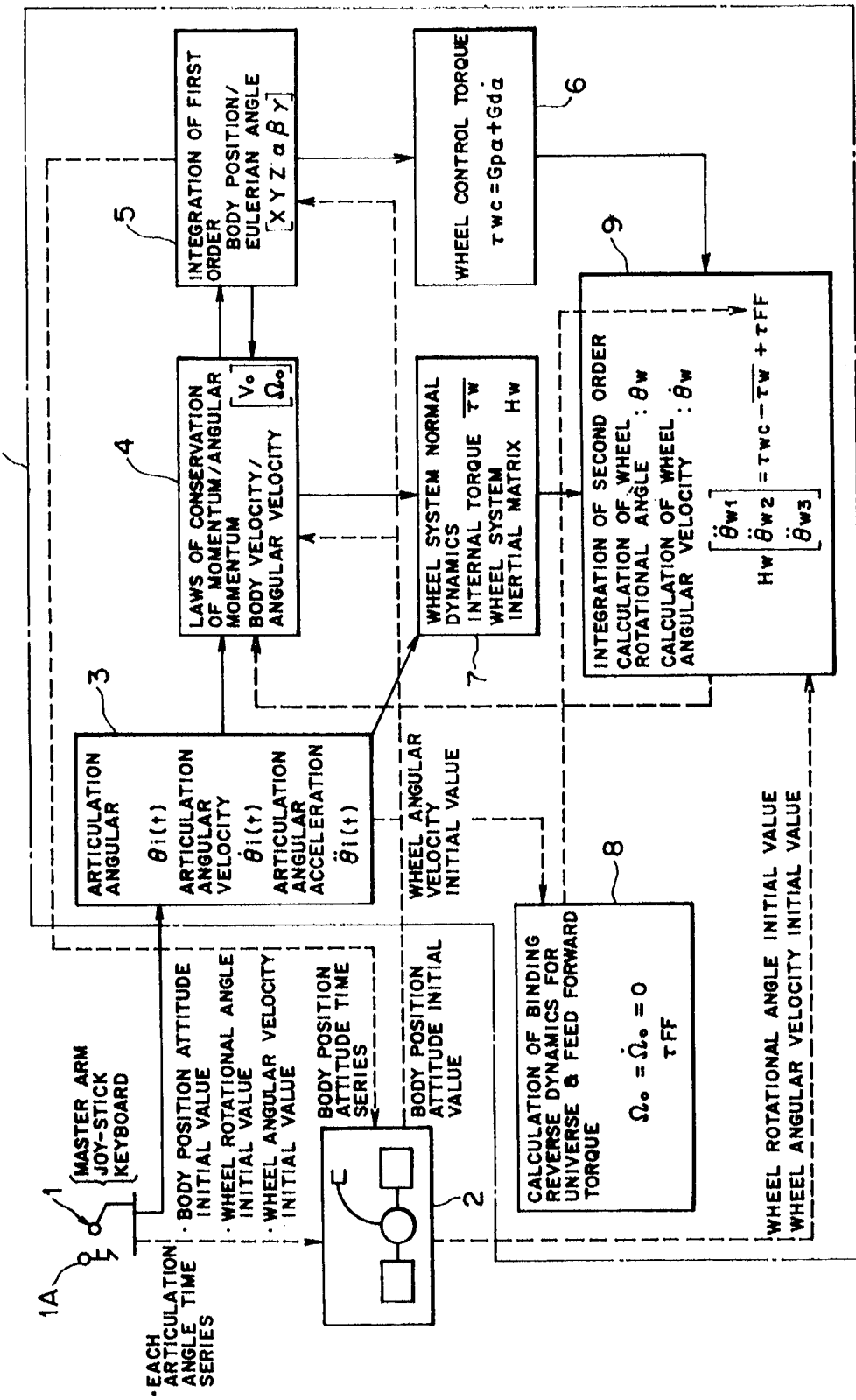
FIG. 1 is a block diagram showing a first embodiment of the present invention.

By the way, while FIG. 1 is a block diagram showing the present embodiment, the three-dimensional dynamics real time simulation system for a satellite having a serial link manipulator of an l degree (the character 1 is el of the small character) of freedom shown in FIG. 1 is constructed including a manipulator articulation information inputting section 1, a graphic display 2, and a three-dimensional dynamics real time simulation section 10.

First, with the manipulator articulation information inputting section 1, an operator 1A will input initial values of an articulation angle, an articulation angular velocity, an articulation angular acceleration and a position attitude of the body of the satellite (spacecraft) of each of the manipulators 11 (refer to FIG. 2) and an initial value of a wheel angular velocity by way of a master arm, a joy-stick, a keyboard or a like inputting apparatus while observing the graphic display 2.

It is to be noted that only an articulation angle $\theta1$ (t) (i=1 to n) of each of the manipulators 11 (refer to FIG. 2) is delivered to the graphic display 2.

Further, the graphic display 2 supports the operability of the operator 1A, and on the graphic display 2, a satellite in the graphics starts to move from a start point defined by an initial value of the position and attitude of the satellite body and an initial value of the wheel angular velocity designated by the operator 1A. In particular, on the graphic display 2, motion of the spacecraft can be displayed by simulation display.

The three-dimensional dynamics real time simulation section 10 receives information from the manipulator articulation information inputting section 1 and calculates, on the real time basis, three dimensional dynamics of the entire spacecraft including an attitude control system using the laws of conservation of momentum/angular momentum of the entire system, reverse dynamics for the universe and normal dynamics of the wheel system so that motion of the spacecraft may be displayed by simulation display on the graphic display 2. To this end, the three-dimensional dynamics real time simulation section 10 includes a manipulator articulation information reception section 3, a spacecraft velocity and angular velocity calculation section 4, a spacecraft position information calculation section 5, a wheel feedback control torque calculation section 6, an internal torque and wheel system inertia information calculation section 7, a wheel feed forward torque calculation section 8 and a wheel dynamics integration section 9.

Here, the manipulator articulation information reception section 3 receives articulation angles ($\theta_i(t)$), articulation angular velocities (obtained by differentiation of first order of the articulation angles) and articulation angular accelerations (obtained by differentiation of second order of the articulation angles) of each of the manipulators 11 which are inputted for each step of dynamics calculation.

The spacecraft velocity and angular velocity calculation section 4 performs calculation using the laws of conservation of momentum/angular momentum of the entire system. The routine at the spacecraft velocity and angular velocity calculation section 4 receives, as inputs, body position attitude values ($X(t), Y(t), Z(t), \alpha(t), \beta(t), \gamma(t)$) at the point of time t, wheel rotational angles ($\theta_{wj}$ (t): j=1 to m), wheel angular velocities (obtained by differentiation of first order of wheel rotational angles), manipulator articulation angles ($\Theta_i(t)$: i=1 to n) and articulation angular velocities (obtained by differentiation of first order of the manipulator articulation angles) and outputs a velocity and an angular velocity ($V_0$ (t), $\Omega_0$ (t)) of the satellite body at the point of time t.

The spacecraft position information calculation section 5 performs differentiation of first order. In particular, the spacecraft position information calculation section 5 receives, as inputs, the positions of the satellite body at the the points of time t and t–$\Delta$t, transformation matrices ($R_0$ (t), $^A A_0$ (t)) and ($R_0$ (t–$\Delta$t), $^A A_0$ (t–$\Delta$t)) and the velocities and angular velocities ($V_0$ (t), $\Omega_0$ (t)) and ($V_0$ (t–$\Delta$t), $\Omega_0$ (t–$\Delta$t)) and outputs a position transformation matrix ($R_0$ (t+$\Delta$t), $^A A_0$ (t+$\Delta$t)) of the satellite body at the point of time t+$\Delta$t. It is to be noted that, as for an attitude variation, Eulerian angles ($\alpha$(t), $\beta$(t), $\gamma$(t)) may be used in place of the transformation matrices.

The wheel feedback control torque calculation section 6 receives, as inputs, Eulerian angles ($\alpha$(t+$\Delta$t), $\beta$(t+$\Delta$t), $\gamma$(t+$\Delta$t)) and the angular velocity $\Omega_0$ (t+$\Delta$t) of the satellite body at the point of time t+$\Delta$t and calculates a wheel feedback control torque (wheel control torque) $\tau_{WC}$ (t+$\Delta$t) at the point of time t+$\Delta$t.

The internal torque and wheel system inertia information calculation section 7 receives, as inputs, a manipulator articulation angle ($\Theta$i(t+$\Delta$t)) and a manipulator articulation angular velocity (obtained by differentiation of first order of $\Theta$i(t+$\Delta$t)) at the point of time t+$\Delta$t and calculates an internal torque ($\tau_W$ (t+$\Delta$t)) and a wheel system inertia matrix ($H_W$ (t+$\Delta$t)) at the point of time t+$\Delta$t using the wheel system normal dynamics.

The wheel feed forward torque calculation section 8 receives, as inputs, a manipulator articulation angle ($\Theta_l$ (t+$\Delta$t)) and a manipulator articulation angular velocity (obtained by differentiation of first order of $\Theta_l$ (t+$\Delta$t)) at the point of time t+$\Delta$t and calculates a wheel feed forward torque ($\tau_{FF}$ (t+$\Delta$t)) at the point of time t+$\Delta$t using binding reverse dynamics for the universe.

The wheel dynamics integration section 9 receives, as inputs, wheel rotational angles ($\theta_{wj}$ (t): j=1 to m), wheel angular velocities (obtained by differentiation of first order of $\theta_{wj}$(t)), feedback control torques $\tau_{WC}$, internal torques $\tau_W$, a wheel system inertia matrix $H_W$ and feed forward torque $\tau_{FF}$ at the points of time t and t+$\Delta$t and outputs a wheel rotational angle ($\theta_{wj}$ (t+2 $\Delta$t): j=1 to m) and a wheel angular velocity (obtained by differentiation of first order of $\theta_{wj}$ (t+2 $\Delta$t)) at the point of time t+2 $\Delta$t. Accordingly, the wheel dynamics integration section 9 determines wheel angular velocity information by differentiation of first order and then determines wheel rotational angle information by differentiation calculation of second order.

Further, while details of the blocks (refer to the portions of the reference numerals 4 to 9 of FIG. 1) described above are such as described hereinbelow, notations which will be referred to hereinbelow are taken in the following manner before description of the details is given. It is to be noted that each capital letter denotes a vector as viewed from the inertial coordinate system $\Sigma_A$ while each small letter denotes a vector as viewed from the base fixed coordinate system $\Sigma_0$.

$V_i$: velocity of the origin of the coordinate system $\Sigma_i$ relative to the inertial coordinate system $\Sigma_A$ $\dot{V}_i$: acceleration of the origin of the coordinate system $\Sigma_i$ relative to the inertial coordinate system $\Sigma_A$ $\hat{V}_i$: velocity of the center of gravity of the link i relative to the inertial coordinate system $\Sigma_A$ $\hat{\dot{V}}_i$: acceleration of the center of gravity of the link i relative to the inertial coordinate system $\Sigma_A$ $\Omega_i$: angular velocity of the link i relative to the inertial coordinate system $\Sigma_A$ $\dot{\Omega}_i$: angular acceleration of the link i relative to the inertial coordinate system $\Sigma_A$ $v_i$: time differentiation of the vector $p_i$ with respect to the base fixed coordinate system $\Sigma_0$ $v_i = d_0\, p_i / dt = p_i'$ $v_i'$: time differentiation of the vector $v_i$ with respect to the base fixed coordinate system $\Sigma_0$ $v_i' = d_0\, v_i / dt = p_i''$ $\hat{v}$: time differentiation of the vector $\hat{r}$ with respect to the base fixed coordinate system $\Sigma_0$ $\hat{v} = d_0\, \hat{r}/dt = \hat{r}''$ $\hat{v}'$: time differentiation of the vector $\hat{v}$ with respect to the base fixed coordinate system $\Sigma_0$ $\hat{v}' = d_0\, \hat{v}/dt = \hat{r}''$ $\omega_i$: angular velocity of the link i with respect to the base fixed coordinate system $\Sigma_0$ $\omega_i'$: time differentiation of $\omega_i$ with respect to the base fixed coordinate system $\Sigma_0$ $\omega_i' = d_0\, \omega_i/dt$ Note 1) The time differentiation with respect to the inertial coordinate system $\Sigma_A$ and the time differentiation with respect to the base fixed coordinate system $\Sigma_0$ are distinguished definitely from each other.

For a vector $X$ time differentiation with respect to $\Sigma_A$:

$\dot{X} = dX/dt$ time differentiation with respect to $\Sigma_0$:

$X' = d_0\, X/dt$

The relationship between $\dot{X}$ and $X'$ is given by the following equation:

$\dot{X} = X' + \Omega_0 \times X$

Figure 3:
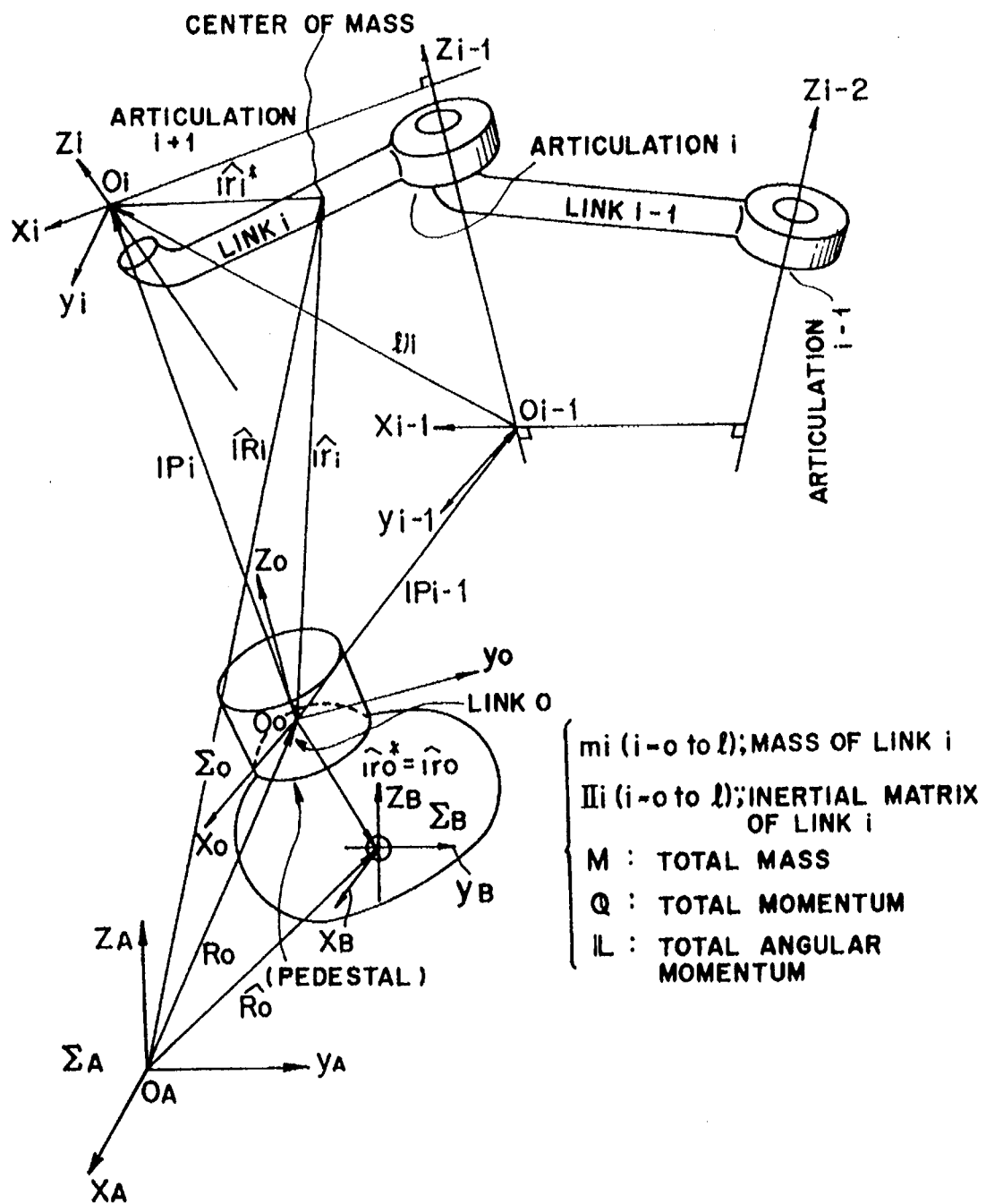
FIG. 3 is a diagrammatic view illustrating a coordinate system of the spacecraft having a manipulator.

Meanwhile, as a coordinate system for the entire system, such a Denavit-Hartenberg coordinate system as shown in FIG. 3 is adopted.

Figure 4:
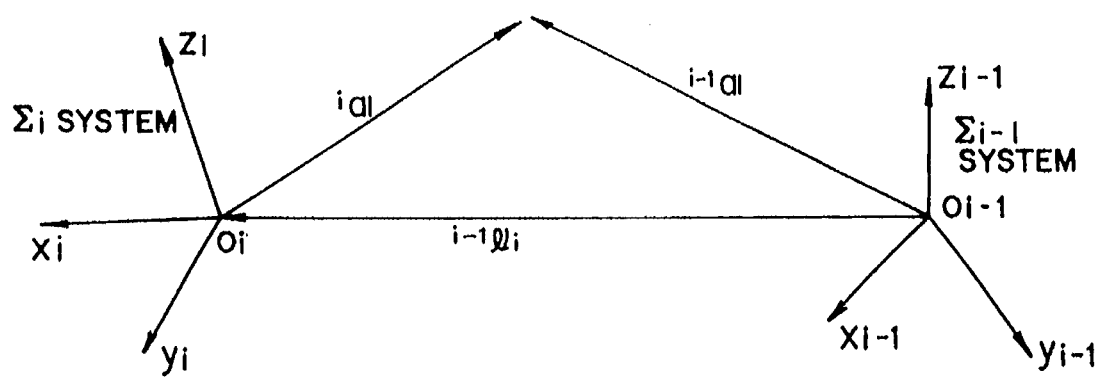
FIG. 4 is a diagrammatic view illustrating the coordinate system of the spacecraft having a manipulator.

Here, when vectors represented in the coordinate systems $\Sigma_l$ and $\Sigma_{l-1}$ of FIG. 3 are defined as $^l a$ and $^{l-1} a$ (while $^l a$ and $^{l-1} a$ should actually be represented in vector representation, they are represented in scalar representation for the convenience of representation. In the following description, a vector amount, which should be represented in vector representation, is sometimes represented in scalar representation for the convenience of representation), respectively, $^l a$ and $^{l-1} a$ have a relationship given by the following equation (refer to FIG. 4). (The character 1 in a representation is sometimes represented in a writing style.)

$^{l-1}a = {}^{l-1}A_l\, {}^l a + {}^{l-1}l_l$

Here, $^{l-1}A_l$ is an orthogonal matrix representative of rotation between different coordinate systems, and $^{l-1}l_l$ (vector) is a representation of a vector from the coordinate origin $O_{l-1}$ to $O_l$ in the $\Sigma_{l-1}$ system.

It is to be noted that $^{l-1}A_l$ and $^{l-1}l_l$ (vectors) are represented in the following manner when standard parameters are used on the Denavit-Hartenberg coordinate system representation:

$$^{i-1}A_i \equiv \begin{bmatrix} \cos\theta_i & -\sin\theta_i \cos\alpha_i & \sin\theta_i \sin\alpha_i \\ \sin\theta_i & \cos\theta_i \cos\alpha_i & -\cos\theta_i \sin\alpha_i \\ 0 & \sin\alpha_i & \cos\alpha_i \end{bmatrix} \quad (i=1\sim l)$$

$$^{i-1}\mathbb{l}_i \equiv \begin{bmatrix} bi\cos\theta_i \\ bi\sin\theta_i \\ di \end{bmatrix} \quad (i=1\sim l)$$

Figure 5:
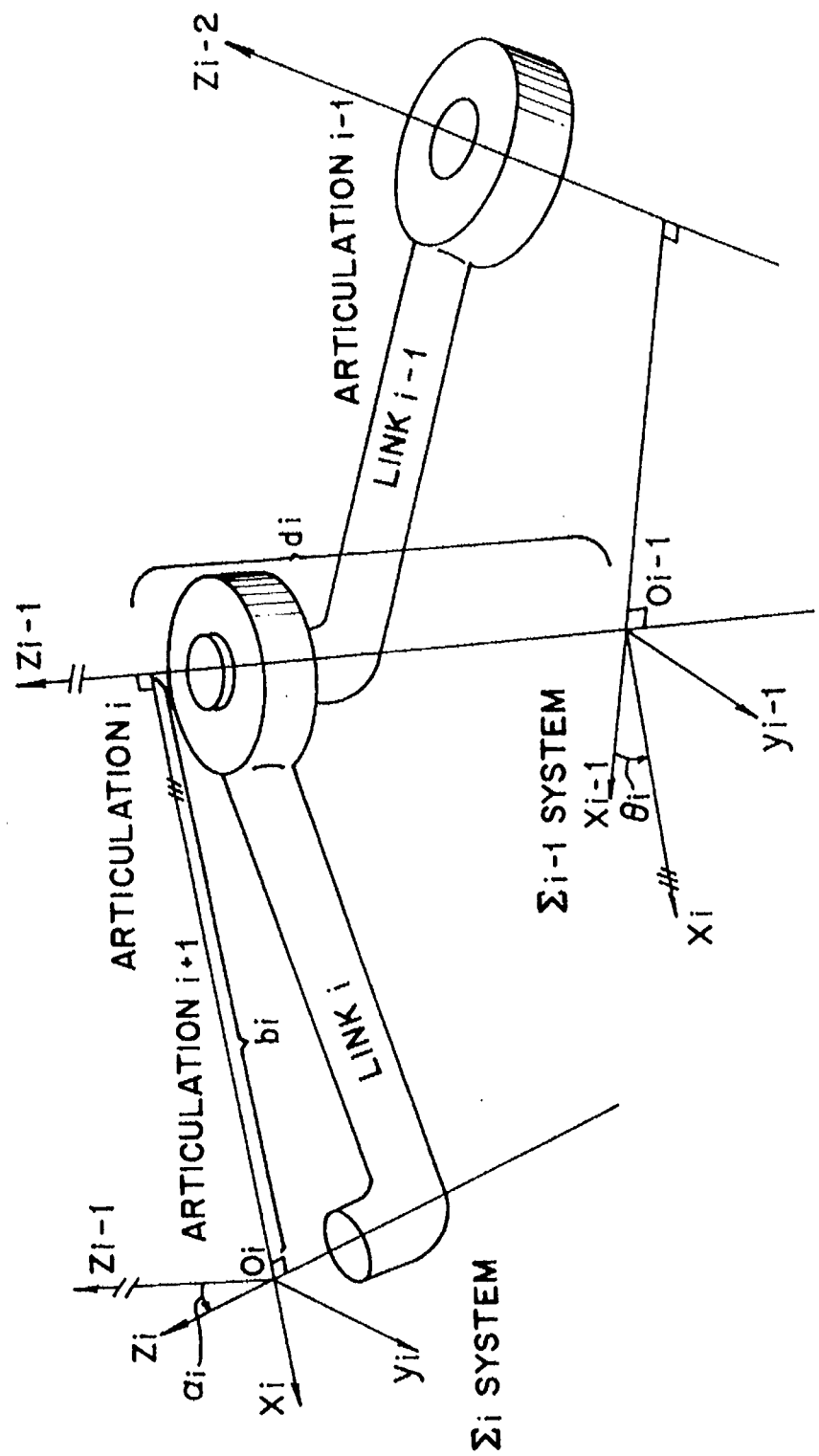
FIG. 5 is a diagrammatic view illustrating the coordinate system of the spacecraft having a manipulator.

Meanwhile, definitions of parameters of the Denavit-Hartenberg coordinate system are such as illustrated in FIG. 5, and this coordinate system is set in accordance with the following criteria:

$z_i$ axis: axis of the articulation $_{i+1}$ $x_i$ axis: common perpendicular line from $z_{i-1}$ toward $z_i$ $y_i$: constructed so as to make a right-hand coordinate system $b_i$: length of the common perpendicular line to $z_i$ and $z_{i-1}$ $d_i$: length between $x_i$ and $x_{i-1}$ ($z_{i-1}$ coordinate value)

αi: angle between $z_i$ and $z_{i-1}$ (the $z_{i-1}$ direction coincides with the $z_i$ direction when it is rotated by $\alpha_i$ around the $x_i$ axis)

$\theta_i$: angle between $x_i$ and $x_{i-1}$ (the $x_{i-1}$ direction coincides with the $x_i$ direction when it is rotated by $\theta_1$ around the $z_{i-1}$ axis)

Further, when i=−1, $^i a$ represents an inertia system representation. Accordingly, the following equations are obtained.

$$^i\mathbb{a}|_{i=-1} = {}^A\mathbb{a}, \quad {}^i\mathbb{A}|_{i=-1} = {}^A\mathbb{A}$$

In this instance, the prefix A on the left top denotes the initial letter of Absolute coordinate, and particularly, the equation below represents a transformation matrix between the inertia system and base reference coordinate system.

$$^{i-i}\mathbb{A}_i|_{i=0} = {}^A\mathbb{A}_0$$

Now, the spacecraft velocity and angular velocity calculation section 4 which performs calculation using the laws of conservation of momentum/angular momentum of the entire system will be described in more detail.

In this instance, the laws of conservation of momentum and angular momentum of the entire system are given by the following equations:

$$\sum_{i=0}^{l} m_i \hat{\mathbb{V}}_i = Q \text{ (constant)}$$

law of conservation of momentum (1)

$$\sum_{i=0}^{l} (m_i \hat{\mathbb{R}}_i \times \hat{\mathbb{V}}_i + \mathbb{I}_i \Omega_i) = \mathbb{L} \text{ (constant)}$$

law of conservation of angular momentum (2)

Here, the suffix i runs following all of the links (also each of the wheels and the body is regarded as a link).

And, the velocity of the center of gravity of the link i with respect to the inertial coordinate system $\Sigma_A$ and the angular velocity of the link i with respect to the inertial coordinate system $\Sigma_A$ are given by the following equations:

$$\begin{cases} \hat{\mathbb{V}}_i = \mathbb{V}_0 + \hat{\mathbb{v}}_i + \Omega_0 \times \hat{\mathbb{r}}_i \\ \Omega_i = \Omega_0 + \omega_i \end{cases} \quad (3), (4)$$

Accordingly, the equations (1) and (2) can be rewritten in the following manner with regard to the velocity and the angular velocity ($V_0$ and $\Omega_0$) of the satellite body:

$$\begin{bmatrix} V_0 \\ \Omega_0 \end{bmatrix} = \mathbb{S}^{-1} \mathbb{H} \quad (5)$$

$$\mathbb{S} = \begin{bmatrix} S_{11} & S_{12} \\ S_{21} & S_{22} \end{bmatrix}; 6 \times 6 \text{ MATRIX} \quad (6)$$

$$S_{11} = \begin{bmatrix} M & 0 & 0 \\ 0 & M & 0 \\ 0 & 0 & M \end{bmatrix}, M = \sum_{i=0}^{l} m_i \text{ (TOTAL MASS)} \quad (7)$$

$$S_{12} = \sum_{i=0}^{l} m_i \begin{bmatrix} 0 & \hat{r}_{zi} & -\hat{r}_{yi} \\ -\hat{r}_{zi} & 0 & \hat{r}_{xi} \\ \hat{r}_{yi} & -\hat{r}_{xi} & 0 \end{bmatrix} \quad (8)$$

$$S_{21} = -\sum_{i=0}^{l} m_i \begin{bmatrix} 0 & \hat{R}_{zi} & -\hat{R}_{yi} \\ -\hat{R}_{zi} & 0 & \hat{R}_{xi} \\ \hat{R}_{yi} & -\hat{R}_{xi} & 0 \end{bmatrix} \quad (9)$$

$$S_{22} = \sum_{i=0}^{l} \left\{ \mathbb{I}_i + m_i \begin{bmatrix} \hat{R}_{zi}\hat{r}_{zi} + \hat{R}_{yi}\hat{r}_{yi} & -\hat{R}_{yi}\hat{r}_{xi} & -\hat{R}_{zi}\hat{r}_{xi} \\ -\hat{R}_{xi}\hat{r}_{yi} & \hat{R}_{zi}\hat{r}_{zi} + \hat{R}_{xi}\hat{r}_{xi} & -\hat{R}_{zi}\hat{r}_{yi} \\ -\hat{R}_{xi}\hat{r}_{zi} & -\hat{R}_{yi}\hat{r}_{zi} & \hat{R}_{yi}\hat{r}_{yi} + \hat{R}_{xi}\hat{r}_{xi} \end{bmatrix} \right\} = \sum_{i=0}^{l} \{ \mathbb{I}_i - m_i \hat{\mathbb{R}}_i \hat{\mathbb{r}}_i \} \quad (10)$$

$$\mathbb{a} \times \mathbb{b} = \mathbb{b} \times \mathbb{a} \to \begin{bmatrix} a_x \\ a_y \\ a_z \end{bmatrix} \times \begin{bmatrix} b_x \\ b_y \\ b_z \end{bmatrix} = \begin{bmatrix} a_y b_z - a_z b_y \\ a_z b_x - a_x b_z \\ a_x b_y - a_y b_x \end{bmatrix}$$

$$= \begin{bmatrix} 0 & b_z & -b_y \\ -b_z & 0 & b_x \\ b_y & -b_x & 0 \end{bmatrix} \begin{bmatrix} a_x \\ a_y \\ a_z \end{bmatrix}$$

$$\mathbb{H} = \begin{bmatrix} \mathbb{h}_v \\ \mathbb{h}_w \end{bmatrix}; 6 \times 1 \text{ MATRIX} \quad (11)$$

$$\mathbb{h}_v = Q - \sum_{i=0}^{l} m_i \hat{\mathbb{v}}_i \quad (12)$$

$$\mathbb{h}_w = \mathbb{L} - \sum_{i=0}^{l} (m_i \hat{\mathbb{R}}_i \times \hat{\mathbb{v}}_i + \mathbb{I}_i \omega_i) \quad (13)$$

$$\hat{\mathbb{v}}_i = \mathbb{v}_i + \omega_i \times \hat{\mathbb{r}}_i^* \quad (14)$$

And, from the equation (5), the velocity and the angular velocity ($V_0$ and $\Omega_0$) of the satellite body can be determined.

Figure 6:
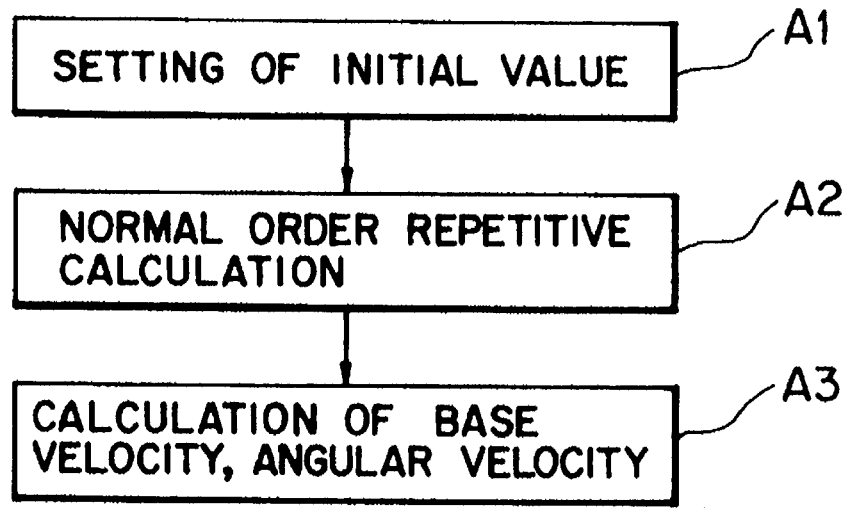
FIG. 6 is a flow chart for calculation of the velocity and the angular velocity of a satellite body by a spacecraft velocity and angular velocity calculation section.

It is to be noted that a detailed flow is such as illustrated in FIG. 6. In particular, at step A1, initial value setting processing is performed, and at step A2, normal order repetitive calculation processing is performed. Then at step A3, base velocity and angular velocity processing is performed.

Here, the procedure of the processing (initial value setting processing) at step A1 of FIG. 6 is such as follows:

$$^A\hat{\mathbb{R}}_0|_{i=0} = \text{const}$$

$$\theta_i|_{t=0} = \text{const} \quad (i=1\sim l)$$

$$\omega_0 = \omega_0' = 0, \quad \mathbb{K}_0 = \hat{\mathbb{v}}_0' = 0, \quad \mathbb{V}_0 = \mathbb{V}_0' = 0$$

-continued $^{i-1}Z_{i-1} = (0, 0, 1)^T$ $^AA_0$; const

Meanwhile, the procedure of the processing (normal order repetitive calculation processing) at step A2 of FIG. 6 is such as follows:

① $^i\omega_i = \begin{cases} ^iA_{i-1}(^{i-1}\omega_{i-1} + \dot{\theta}_i {}^{i-1}Z_{i-1}) & \text{for } R \\ ^iA_{i-1}{}^{i-1}\omega_{i-1} & \text{for } T \end{cases}$ ② $^i\dot\omega_i = \begin{cases} ^iA_{i-1}(^{i-1}\dot\omega_{i-1} + \ddot{\theta}_i{}^{i-1}Z_{i-1} + \dot{\theta}_i{}^{i-1}\omega_{i-1} \times {}^{i-1}Z_{i-1}) & \text{for } R \\ ^iA_{i-1}{}^{i-1}\dot\omega_{i-1} & \text{for } T \end{cases}$ ③ $^iv_i = \begin{cases} ^i\omega_i \times {}^iI_i + {}^iA_{i-1}{}^{i-1}v_{i-1} & \text{for } R \\ ^i\omega_i \times {}^iI_i + {}^iA_{i-1}(\dot{d}_i{}^{i-1}Z_{i-1} + {}^{i-1}v_{i-1}) & \text{for } T \end{cases}$ ④ $^iv_i' = {}^iv_i + {}^i\omega_i \times {}^i\hat{r}_i^*$ ⑤ $^i\dot v_i = \begin{cases} ^i\dot\omega_i \times {}^iI_i + {}^i\omega_i \times ({}^i\omega_i \times {}^iI_i) + {}^iA_{i-1}{}^{i-1}\dot v_{i-1}' & \text{for } R \\ ^iA_{i-1}(\ddot{d}_i{}^{i-1}Z_{i-1} + {}^{i-1}\dot v_{i-1}') + {}^i\dot\omega_i \times {}^iI_i + 2\dot{d}_i{}^i\omega_i \times ({}^iA_{i-1}{}^{i-1}Z_{i-1}) + {}^i\omega_i \times ({}^i\omega_i \times {}^iI_i) & \text{for } T \end{cases}$ ⑥ $^i\hat{\dot v}_i = {}^i\dot v_i' + {}^i\dot\omega_i \times {}^i\hat{r}_i^* + {}^i\omega_i \times ({}^i\omega_i \times {}^i\hat{r}_i^*)$ ⑦ $^i\hat{r}_i = {}^i\hat{r}_i^* + {}^iI_i - {}^iA_{i-1}{}^{i-1}\hat{r}_{i-1}^* + {}^iA_{i-1}{}^{i-1}\hat{r}_{i-1}$ ⑧ $^A\hat{r}_i = {}^AA_i{}^i\hat{r}_i$ ⑨ $^A\hat{R}_i = {}^A\hat{r}_i + ({}^A\hat{R}_0 - {}^A\hat{r}_0)$ ⑩ $^A\hat{\dot v}_i = {}^AA_i{}^i\hat{\dot v}_i$ ⑪ $^iA_A = {}^iA_{i-1}{}^{i-1}A_A$ (calculated next to ⑦)

Here. i=1, 2, . . . l, $w_1$, $w_2$, and $w_3$.

Further, the procedure of the processing (base velocity and angular velocity processing) at step A3 of FIG. 6 is such as follows ① $^AS_{12}$: inertia system ② $^AS_{21}$: inertia system ③ $^AI_i = {}^AA_i{}^iI_i{}^iA_A$ ④ $^AS_{22}$: inertia system ⑤ $^Ah_v = {}^AQ - \sum_{i=0}^{l} m_i{}^A\hat{v}_i$ ⑥ $^Ah_w = {}^AL - \sum_{i=0}^{l}(m_i{}^A\hat{R}_i \times {}^A\hat{v}_i + {}^AA_i{}^iI_i{}^i\omega_i)$ ⑦ $\begin{bmatrix} ^A V_0 \\ ^A \Omega_0 \end{bmatrix} = \begin{bmatrix} S_{11} & ^AS_{12} \\ ^AS_{21} & ^AS_{22} \end{bmatrix}^{-1} \begin{bmatrix} ^Ah_v \\ ^Ah_w \end{bmatrix}$ $^AS_{22} = \sum_{i=0}^{l} {}^AA_i{}^iI_i{}^iA_A - m_i{}^A\hat{R}_i{}^A\hat{r}_i\}$ Further, the spacecraft position information calculation section 5 for performing calculation of integration of first order of the laws of conservation of quantum/angular quantum of the entire system will be described in more detail below.

In particular, in this instance, the position and the attitude of the satellite body are calculated by integration of first order of the equation (5) given hereinabove. However, the integration method may be any integration method in principle, and the Euler's method, the Adams-Bashforth method, the Runge-Kutta method and so forth may be used.

Here, while the Adams-Bashforth method of second order is taken as an example, the equation which makes a base for integration then is such as follows:

$$f(t+\delta t) \doteq f(t) + \{3\dot f(t) - \dot f(t-\delta t)\}\delta t/2 + O(\delta t^3) \quad (15)$$

Figure 7:
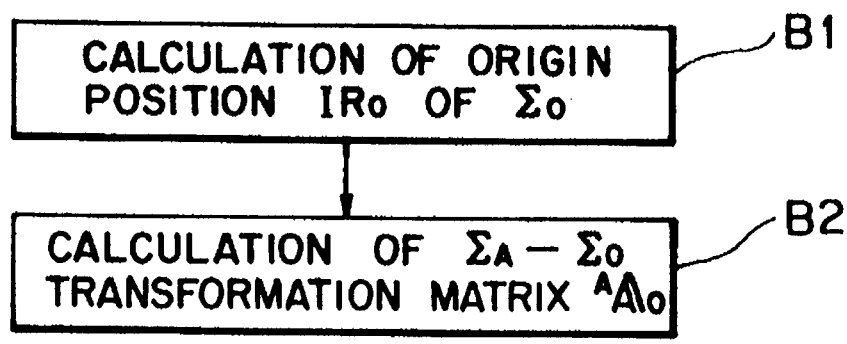
FIG. 7 is a flow chart illustrating a processing procedure by a spacecraft position information calculation section.

And, the calculation flow in this instance is such as illustrated in FIG. 7. In particular, at step B1, processing of calculating the position of the origin of $\Sigma_0$ is performed, and at step B2, processing of calculating a $\Sigma_0$ to $\Sigma_A$ transformation matrix is performed.

Here, the processing (processing of calculating the position of the origin of $\Sigma_0$) at step B1 of FIG. 7 is given by the following equation:

$^AR_0(t+\delta t) \doteq {}^AR_0(t) + \{3{}^AV_0(t) - {}^AV_0(t-\delta t)\}\delta t/2$ Meanwhile, the processing (processing of calculating a $\Sigma_0$ to $\Sigma_A$ transformation matrix) at step B2 in FIG. 7 is such as shown below:

$$^AA_0 = [^Ae_{0x}\ {}^Ae_{0y}\ {}^Ae_{0z}] \quad (16)$$

$^A\dot e_{0x} = {}^A\Omega_0 \times {}^Ae_{0x}$

-continued $$^A \dot{e}_{0y} = {^A}\Omega_0 \times {^A}e_{0y}$$

$$^A \dot{e}_{0z} = {^A}\Omega_0 \times {^A}e_{0z}$$

$$^A e_{0x}(t+\delta t) = {^A}e_{0x}(t) + \{3 \, {^A}\dot{e}_{0x}(t) - {^A}\dot{e}_{0x}(t-\delta t)\} \times \delta t/2$$

$$^A e_{0y}(t+\delta t) = {^A}e_{0y}(t) + \{3 \, {^A}\dot{e}_{0y}(t) - {^A}\dot{e}_{0y}(t-\delta t)\} \times \delta t/2 \quad (17)$$

$$^A e_{0z}(t+\delta t) = {^A}e_{0z}(t) + \{3 \, {^A}\dot{e}_{0z}(t) - {^A}\dot{e}_{0z}(t-\delta t)\} \times \delta t/2$$

$$^A\mathbb{A}_0(t+\delta t) = [{^A}e_{0x}(t+\delta t) \; {^A}e_{0y}(t+\delta t) \; {^A}e_{0z}(t+\delta t)]$$

Further, detailed description of the calculation of a wheel control torque is such as follows.

First, a conversion matrix represented in the following equation is calculated from the equation (17).

$$^A\mathbb{A}_0(t+\delta t) = [{^A}e_{0x}(t+\delta t) \; {^A}e_{0y}(t+\delta t) \; {^A}e_{0z}(t+\delta t)]$$

And, from this value, the Eulerian angle of X-Y-Z (or an arbitrary array of X, Y and Z) is calculated.

For example, if $E_x(\alpha) \, E_y(\beta) \, E_z(\gamma)$ (turned by $\alpha$ around the x-axis, by $\beta$ around the y-axis and by $\gamma$ around the z-axis) is taken as the definition of the Eulerian angle, then it is given by the following equation:

$$^A A_0 = \begin{bmatrix} a_{11} & a_{12} & a_{13} \\ a_{21} & a_{22} & a_{23} \\ a_{31} & a_{32} & a_{33} \end{bmatrix} = E_X(\alpha)E_Y(\beta)E_Z(\gamma)$$

$$\begin{bmatrix} \cos\beta\cos\gamma & -\cos\beta\sin\gamma & \sin\beta \\ \sin\alpha\sin\beta\cos\gamma + \cos\alpha\sin\gamma & -\sin\alpha\sin\beta\sin\gamma + \cos\alpha\cos\gamma & -\sin\alpha\cos\beta \\ -\cos\alpha\sin\beta\cos\gamma + \sin\alpha\sin\gamma & \cos\alpha\sin\beta\sin\gamma & \cos\alpha\cos\beta \end{bmatrix}$$

Accordingly, in the present case, the Eulerian angles are calculated in accordance with the following equations:

$$\beta = A\tan2\left(a_{18}, \sqrt{a_{23}^2 + a_{33}^2}\right) \quad (18)$$

$$\alpha = A\tan2(-a_{23}/\cos\beta, a_{33}/\cos\beta)$$

$$\gamma = A\tan2(-a_{12}/\cos\beta, a_{11}/\cos\beta)$$

$$^A\Omega_0(t+\delta t) = \begin{bmatrix} \Omega_{0x}(t+\delta t) \\ \Omega_{0y}(t+\delta t) \\ \Omega_{0z}(t+\delta t) \end{bmatrix} \quad (19)$$

When the Eulerian angles are given as above, feedback control torques for maintaining the axes are given as follows:

$$\tau_{WCX}(t+\delta t) = G_{PX} \cdot \alpha(t+\delta t) + G_{DX} \cdot \Omega_{0X}(t+\delta t) \quad (20)$$

$$\tau_{WCY}(t+\delta t) = G_{PY} \cdot \beta(t+\delta t) + G_{DY} \cdot \Omega_{0Y}(t+\delta t)$$

$$\tau_{WCZ}(t+\delta t) = G_{PZ} \cdot \gamma(t+\delta t) + G_{DZ} \cdot \Omega_{0Z}(t+\delta t)$$

Further, detailed description of the internal torque and wheel system inertia information calculation section 7 in which the wheel system normal dynamics are employed will be given below.

(a) Motion Equation of the Wheel System

Here, assuming that the number of wheels is three for simplification, the following definition is assumed.

$$q = \begin{bmatrix} \Theta_m \\ \Theta_w \end{bmatrix}, \begin{cases} \Theta_m = [\theta_1, \theta_2, \ldots, \theta_l]^\tau \\ \Theta_w = [\theta_{w1}, \theta_{w2}, \theta_{w3}]^\tau \end{cases}$$

With such definition, the motion equation which describes the entire system is given as follows:

$$\mathbb{H}(q)\ddot{q} + \mathbb{C}(\tau_q, \dot{q})\dot{q} = \tau \quad (21)$$

Here, each of H and C (both vectors) appearing above is a $(l+3) \times (l+3)$ matrix called inertia matrix and centrifugal force+Corioli's force matrix, respectively.

$$\mathbb{H}(q) = \begin{bmatrix} \mathbb{H}_\Theta(q) & \mathbb{H}_{\Theta w}(q) \\ \mathbb{H}_{w\Theta}(q) & \mathbb{H}_w(q) \end{bmatrix}, \quad (22)$$

$$\mathbb{C}(q, \dot{q}) = \begin{bmatrix} \mathbb{C}_\Theta(q, H) & \mathbb{C}_{\Theta w}(q, \dot{q}) \\ \mathbb{C}_{w\Theta}(q, \dot{q}) & \mathbb{C}_w(q, \dot{q}) \end{bmatrix}$$

Consequently, the following motion equation for the wheel system is obtained from the equation (21):

$$\mathbb{H}_{w\Theta}(q)\ddot{\Theta}_m + \mathbb{H}_w(q)\ddot{\Theta}_w + \mathbb{C}_{w\Theta}(q, \dot{q})\dot{\Theta}_m + \mathbb{C}_w(q, \dot{q})\dot{\Theta}_w = \tau_w \quad (23)$$

Now, the following equation is defined:

$$\overline{\tau_w} \equiv \mathbb{H}_{w\Theta}(q)_m \mathbb{C}_{w\Theta}(q, \dot{q})\dot{\Theta}_m + \mathbb{C}_w(q, \dot{q})\dot{\Theta}_w$$

Then, the following equation is obtained:

$$\tau_{*w}(q)\ddot{\Theta}_w = \tau_w - \overline{\tau_w} \quad (24)$$

Then, values of individual components of $\tau_w$ and $H_w$ (q) in the equation (24) are calculated based on the reverse dynamics for the universe described below.

(b) Reverse Dynamics for the Universe (b-1) Body Acceleration and Angular Acceleration In order to determine the individual components of $\tau_w$ and $H_w$ (q) in the equation (24) above, a system of reverse dynamics which inputs q(t), differentiation of first order of q(t) and differentiation of second order of q(t) and outputs $\tau_q$(t).

Here, the equations which makes a base are the following equations representative of sum totals of internal forces and internal torques obtained by time differentiation of the laws of conservation of momentum/angular momentum [equations (1) and (2)]:

$$\sum_{i=0}^{l} m_i \dot{\hat{V}}_i = 0 \quad \text{(sum total of the internal forces is zero)} \quad (25)$$

-continued $$\sum_{i=0}^{l} (m_i \hat{R}_i \times \hat{V}_i + d\,\mathbb{I}_i \Omega_i/dt) = 0 \qquad (26)$$

(sum total of the internal torques is zero)

$$\hat{V}_i = \hat{V}_0 + \dot{\Omega}_0 \times \hat{r}_i + 2\Omega_0 \times \hat{V}_i + \qquad (27)$$

$$\Omega_0 \times (\Omega_0 \times \hat{r}_i) + \hat{V}_i$$

$$\dot{\Omega}_i = \dot{\Omega}_0 + \dot{\omega}_i = \dot{\Omega}_0 + \omega_i + \Omega_0 \times \omega_i \qquad (28)$$

By arranging the equations (25) and (26) using the equations given above, the following equations are obtained:

$$\begin{bmatrix} \dot{V}_0 \\ \dot{\Omega}_0 \end{bmatrix} = S^{-1} G \qquad (29)$$

$$G = \begin{bmatrix} g_f \\ g_\tau \end{bmatrix} ; 6 \times 1 \text{ MATRIX} \qquad (30)$$

$$g_f = \sum_{i=0}^{l} \mathscr{F}_i \qquad (31)$$

$$g_\tau = -\sum_{i=0}^{l} (\hat{R}_i \times \mathscr{F}_i + \mathscr{N}_i)$$

$$\left.\begin{array}{l} \mathscr{F}_i = m_i(2\Omega_0 \times \hat{V}_i + \Omega_0 \times (\Omega_0 \times \hat{r}_i) + \hat{V}_i) \\ \mathscr{N}_i = \mathbb{I}_i \omega_i + \mathbb{I}_i \Omega_0 \times \omega_i + \Omega_i \times (\mathbb{I}_i \Omega_i) \end{array}\right\} \qquad (32)$$

$$\left.\begin{array}{l} F_i = m_i(\hat{V}_0 + \dot{\Omega}_0 \times \hat{r}_i) + \mathscr{F}_i \\ {}_i = \mathbb{I}_i \dot{\Omega}_0 + \mathscr{N}_i \end{array}\right\} \qquad (33)$$

(b-2) Torque Calculation

Figure 8:
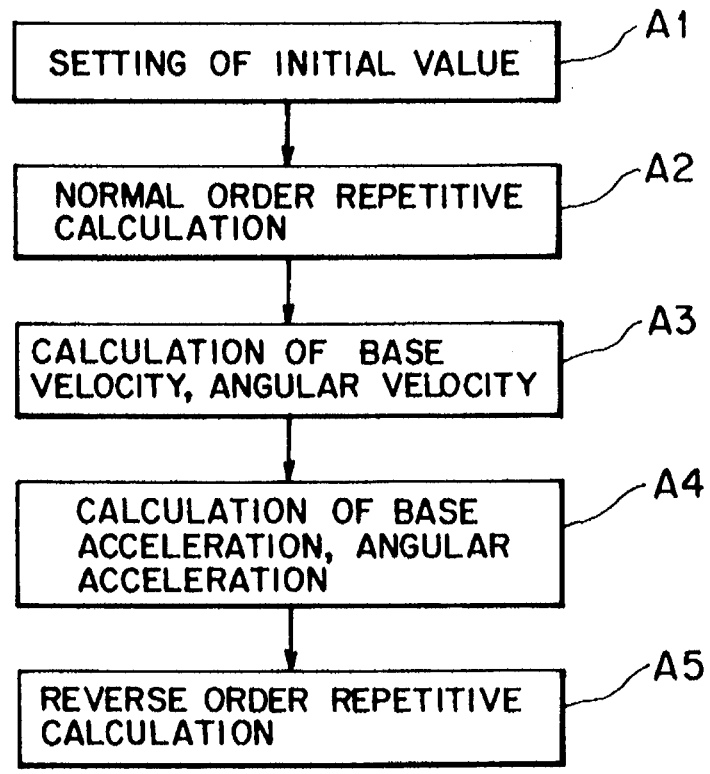
FIG. 8 is a flow chart illustrating a technique based on reverse dynamics for the universe.

First, the calculation algorithm for an acceleration and an angular acceleration of the body is such as illustrated in FIG. 8, and in this instance, the calculation algorithm is calculation subsequent to step A3 of the laws of conservation of momentum/angular momentum. In particular, subsequently to step A3 described above, calculation processing for an acceleration and angular acceleration of the base is performed at step A4, and then at step A5, reverse order repetitive calculation processing is performed.

Here, the processing (calculation processing for an acceleration and an angular acceleration of the base) at step A4 of FIG. 8 described above is such as given below:

① $^A\hat{v}_i{}' = {}^A\!A_i{}^i \hat{v}_i$

② $^A\mathscr{F}_i = m_i(2\,{}^A\Omega_0 \times^A \hat{v}_i + {}^A\Omega_0 \times ({}^A\Omega_0 \times^A \hat{r}_i) + {}^A\hat{v}_i)$ ③ $^i\Omega_0 = {}^iA_A{}^A\Omega_0$ ④ $^i\Omega_i = {}^i\Omega_0 + {}^i\omega_i$ ⑤ $^A\hat{V}_i = {}^A\!A_i \mathbb{I}_i{}^i \omega_i + {}^A\!A_i \mathbb{I}_i{}^i\Omega \times^i\omega_i + {}^A\!A_i{}^i\Omega_i \times{}^i(\mathbb{I}_i{}^i\Omega_i)$ ⑥ $-\sum_{i=0}^{l} {}^A\mathscr{F}_i = {}^A g_f$ ⑦ $-\sum_{i=0}^{l} ({}^A\hat{R}_i \times^A \mathscr{F}_i +^A \mathscr{N}_i) = {}^A g_\tau$ ⑧ $\begin{bmatrix} ^A\dot{V}_0 \\ ^A\dot{\Omega}_0 \end{bmatrix} = \begin{bmatrix} ^AS_{11} & ^AS_{12} \\ ^AS_{21} & ^AS_{22} \end{bmatrix}^{-1} \begin{bmatrix} ^A g_f \\ ^A g_\tau \end{bmatrix}$ Meanwhile, the processing (reverse order repetitive calculation processing) at step A5 of FIG. 8 is such as given below:

① $^{i+1}f_{i+1}$ = external force applied to the finger. $^{i+1}f_{i+1}$ = 0 (in the case of the external force = 0)

② $^{i+1}n_{i+1}$ = external torque applied to the finger. $^{i+1}n_{i+1}$ = 0 (in the case of the external torque = 0)

③ $^iF_i = m_i{}^iA_A{}^A\hat{V}_0 + {}^iA_A{}^A\dot{\Omega}_0 \times^i \hat{r}_{D_i} + {}^iA_A{}^A \mathscr{F}_i$ ④ $^iN_i = {}^i\mathbb{I}_i{}^iA_A{}^A\dot{\Omega}_0 + {}^iA_A{}^A\mathscr{N}_i$ ⑤ $^if_i = {}^i{}_{i+1}{}^{i+1}f_{i+1} + {}^iF_i$ ⑥ $^in_i = {}^i{}_{i+1}{}^{i+1}n_{i+1} + {}^i\mathbb{I}_i \times ({}^i{}_{i+1}{}^{i+1}f_{i+1}) + {}^i\hat{r}_{D_i} \times^i F_i + {}^iN_i$ ⑦ $\tau_i = \begin{cases} ({}^iA_i^{i-1}\mathbb{Z}_{i-1})^T \cdot^i n_i + \gamma i \dot{\Theta}_i \text{ for } R \\ ({}^iA_i^{i-1}\mathbb{Z}_{i-1})^T \cdot^i f_i + \gamma i \dot{\Theta}_i \text{ for } T \\ (i = l_n - 1, \ldots, 1, w_1, w_2, w_3) \end{cases}$ (c) Component Calculation of $\bar{\tau}W$ and $H_W$ The algorithm for calculating components of $\bar{\tau}W$ and $H_W$ described above using the algorithm of the reverse dynamics is such as described below.

In particular, the routine for calculating $\tau_q$ based on the algorithm in the section (b) above is represented by the following equation:

$$\text{SUB 1 }(\Theta_m, \Theta_w, \dot{\Theta}_m, \dot{\Theta}_w, \ddot{\Theta}_m, \ddot{\Theta}_w, \tau_q) \qquad (34)$$

Meanwhile, the routine wherein those terms of the algorithm of (b) which increase In proportion to the velocity (time differentiation of $\Theta_m$ and time differentiation of $\Theta_w$) and the acceleration (time differentiation of second order of $\Theta_m$) are omitted from the beginning is represented by the following equation:

$$\text{SUB 2 }(\Theta_m, \Theta_w, \dot{\Theta}_w, \tau_q) \qquad (35)$$

(c-1) Calculation of $\bar{\tau}W$

Current values are used for $\Theta_m$, differentiation of first order of $\Theta_m$, differentiation of second order of $\Theta_m$, $\Theta_W$ and differentiation of first order of $\Theta_W$ in the equation (34) given above and the following equation is used:

$$\ddot{\Theta}_w \equiv 0$$

(c-2) Calculation of $H_W$

Current values are used for $\Theta_m$ and $\Theta_W$ in the equation (35) given above, and the following equation is used:

$$\dot{\Theta}_w = e_i \text{ (i = 1 to 3), ei denotes a unit vector)}$$

It is to be noted that $\tau_W$ is the sum of a feedback torque $\tau_{WC}$ and a feed forward torque $\tau_{FF}$. In other words, $\tau_W$ is given by the following equation:

$$\tau_w = \tau_{wc} + \tau_{FF} \qquad (36)$$

Subsequently, the wheel feed forward torque calculation section 8 in which the binding reverse dynamics for the universe will be described.

First, the feed forward torque $\tau_{FF}$ to be calculated here is used to always keep the attitude of the satellite body fixed, and the present feed forward torque $\tau_{FF}$ is calculated in the following manner using the reverse dynamics for the universe.

In the present case, the following equation is adopted as a constraint:

$$\Omega_0 = \dot{\Omega}_0 = 0 \tag{37}$$

In this instance, the acceleration of the body is given by the following equation from the equation of the sum total of the internal forces=0:

$$\left. \begin{array}{l} \dot{V}_0 = (-1/M) \times \sum_{i=0}^{l} \mathscr{F}_i \\ \mathscr{F}_i = m_i \hat{v}_i \end{array} \right\} \tag{38}$$

Meanwhile, the internal force and the internal torque $F_i$ and $N_i$ are given by the following equations:

$$\left. \begin{array}{l} F_i = \mathscr{F}_i \\ N_i = \mathbb{I}_i \; {}^{\omega}{}_i + \Omega_i \times (\mathbb{I}_i \; \Omega_i) \end{array} \right\} \tag{39}$$

Figure 9:
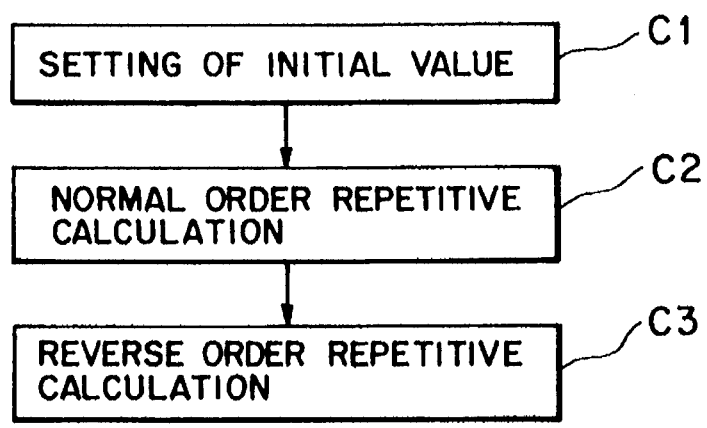
FIG. 9 is a flow chart illustrating a calculation technique for a feed forward torque.

Accordingly, the feed forward torque in a binding condition in the equation (37) can be arranged into such an algorithm as illustrated in FIG. 9. In particular, setting of initial values is performed at step C1, and forward repetitive calculation is performed at step C2, whereafter reverse repetitive calculation is performed at step C3.

And, the processing (setting processing of initial values) at step C1 in FIG. 9 is performed in the following manner:

$${}^A \hat{R}|_{t=0} = 0 \quad v_0 = v_0' = 0, \quad \omega_0 = \omega_0' = 0,$$

$$\hat{V}_0 = \hat{V}_0' = 0$$

$${}^{i-1}Z_{i-1} = (0, 0, 1)^T,$$

$${}^i A_{i-I} \; (i = w_1, w_2, w_3, 0, 1, \ldots, l)$$

Meanwhile, the processing (forward order repetitive calculation processing) at step C2 in FIG. 9 is performed in the following manner:

① $ {}^i\omega_i = \begin{cases} {}^iA_{i-1}({}^{i-1}\omega_{i-1} + \dot{\theta}_i \; {}^{i-1}Z_{i-1}) & \text{for } R \\ {}^iA_{i-1}\; {}^{i-1}\omega_{i-1} & \text{for } T \end{cases} $ ② $ {}^i\dot{\omega}_i = \begin{cases} {}^iA_{i-1}[{}^{i-1}\omega_{i-1}' + \ddot{\theta}_i \; {}^{i-1}Z_{i-1} + \\ \dot{\theta}_i \; {}^{i-1}\omega_{i-1} \times {}^{i-1}Z_{i-1}] & \text{for } R \\ {}^iA_{i-1}\; {}^{i-1}\omega_{i-1}' & \text{for } T \end{cases} $ ③ $ {}^iv_i = \begin{cases} {}^i\omega_i \times {}^i\mathbb{l}_i + {}^iA_{i-1}\; {}^{i-1}v_{i-1} & \text{for } R \\ {}^i\omega_i \times {}^i\mathbb{l}_i + \\ {}^iA_{i-1}(\dot{d}_i \; {}^{i-1}Z_{i-1} + {}^{i-1}v_{i-1}) & \text{for } T \end{cases} $ ④ $ {}^i\hat{v}_i = {}^iv_i + {}^i\omega_i \times {}^i\hat{r}_i^* $ ⑤ $ {}^iv_i' = \begin{cases} {}^i\omega_i' \times {}^i\mathbb{l}_i + {}^i\omega_i \times ({}^i\omega_i \times {}^i\mathbb{l}_i) + \\ \quad {}^iA_{i-1}\; {}^{i-1}v_{i-1}' & \text{for } R \\ {}^iA_{i-1}(\ddot{d}_i \; {}^{i-1}Z_{i-1} + {}^{i-1}v_{i-1}') + \\ {}^i\omega_i' \times {}^i\mathbb{l}_i + \\ 2\dot{d}_i \; {}^i\omega_i \times ({}^iA_{i-1}\; {}^{i-1}Z_{i-1}) + \\ {}^i\omega_i \times ({}^i\omega_i \times {}^i\mathbb{l}_i) & \text{for } T \end{cases} $ ⑥ $ {}^i\hat{v}_i' = {}^iv_i' + {}^i\omega_i' \times {}^i\hat{r}_i^* + {}^i\omega_i \times ({}^i\omega_i \times {}^i\hat{r}_i^*) $ ⑦ $ {}^iA_A = {}^iA_{i-I} \cdot {}^{i-1}A_A $ ⑧ $ {}^A\hat{v}_i' = {}^AA_i \; {}^i\hat{v}_i' $ Here. i=1, 2, ... l, $w_1, w_2, w_3$.

Further, the processing (reverse order repetitive calculation processing) at step C3 in FIG. 9 is performed in the following manner:

① ${}^{l+1}f_{l+1} =$ external force applied to the finger,
(in the case of the ${}^{l+1}f_{l+1}$ and the external force = 0)

② ${}^{l+1}n_{l+1} =$ external torque applied to the finger,
(in the case of the ${}^{l+1}n_{l+1}$ and the external torque = 0)

③ ${}^A\dot{V}_0 = (-1/M) \times \sum_{i=0}^{l} m_i \; {}^A\hat{v}_i'$

④ ${}^iF_i = m_i \; {}^iA_A \; {}^A\dot{V}_0 + m_i \; {}^i\hat{v}_i'$

⑤ ${}^iN_i = {}^i\mathbb{I}_i \; {}^i\omega_i' + {}^i\Omega_i \times ({}^i\mathbb{I}_i \; {}^i\Omega_i)$ ⑥ ${}^if_i = {}^iA_{i+1}\; {}^{i+1}f_{i+1} + {}^iF_i$ ⑦ ${}^in_i = {}^iA_{i+1}\; {}^{i+1}n_{i+1} + {}^i\mathbb{l}_i \times ({}^iA_{i+1}\; {}^{i+1}f_{i+1}) + $
$({}^i\mathbb{l}_i + {}^i\hat{r}_i^*) \times {}^iF_i + {}^iN_i$ ⑧ $ \tau_i = \begin{cases} ({}^iA_{i-1}\; {}^{i-1}Z_{i-1})^T \cdot {}^in_i + \gamma_i \dot{\theta}_i & \text{for } R \\ ({}^iA_{i-1}\; {}^{i-1}Z_{i-1})^T \cdot {}^if_i + \gamma_i \dot{\theta}_i & \text{for } T \end{cases} $ Here, i=1, l–1, ..., 0, and w=$w_1$ to $w_3$.

Subsequently, the wheel dynamics integration section 9 which performs differentiation of second order of the wheel dynamics will be described in detail.

First, the equation describing the wheel dynamics is given, from the equations (24) and (36), as follows:

$$\mathbb{h}_w \Theta_w = \tau_{wc} - \overline{\tau}_\tau + \tau_{FF} \tag{40}$$

Accordingly, the following equation is obtained:

$$\ddot{\Theta}_w = \mathbb{H}_w^{-1} (\tau_{wc} - \overline{\tau}_\tau + \tau_{FF}) \tag{41}$$

Now, if the Adams-Bashforth method of second order is employed as the integration method, then the integration of first order of the equation (40) is given by the following equation:

$$\dot{\Theta}_w (t+2 \delta t) = \dot{\Theta}_w (t+\delta t) + \{3 \ddot{\Theta}_w (t+\delta t) - \ddot{\Theta}(t) \} \delta t/2 \tag{42}$$

Accordingly, the integration of second order of the equation (40) is given by the following equation:

$$\Theta_w (t+2 \delta t) = \Theta_w (t+\delta t) + \{3 \dot{\Theta}_w (t+\delta t) - \dot{\Theta}_w (t) \} \delta t/2 \tag{43}$$

Accordingly, the wheel angular velocity and the wheel rotational angle can be calculated in accordance with the equations (42) and (43).

It is to be noted that each wheel is treated as a branching link from the body of the satellite 12 as shown in FIGS. 10(a) and 10(b). Accordingly, in a recursive formulation which appears in the reverse dynamics and the normal dynamics, calculation proceeds in such a form that the wheel system is adjacent to the body.

Further, in the present program, the equations of the entire system are described by the reverse dynamics having the degree of freedom of (the number of links of a manipulator+ the number of wheels) and the normal dynamics having the degree of freedom of (the number of wheels). Accordingly, as can be read from the article "Efficient Calculation Method of the Kinetics and Dynamics of a Manipulator for the Universe" (Lecture No. 2, 104, the Eight Lecture Meeting of the Robot Engineering Society of Japan"), the number of product sums of the present program increases in proportion to (the number of links of the manipulator).

Subsequently, a method wherein, when the motion equation of the entire system is to be solved numerically based on the method which is based on integration of first order in the wheel normal dynamics, that is, the method described in detail already, taking notice of the rotational symmetry of a wheel, only numerical integration of first order is used for a wheel and the rotational angle of the wheel is not calculated positively.

Since a wheel is symmetrical with respect to a rotational axis thereof, the inertia matrix H(q) and the centrifugal force+Corioli's force matrix C have no dependency upon the rotational angle of the wheel.

Accordingly, the wheel dynamics integration section 9 is required to perform only integration of first order of differentiation of second order of $\Theta_W$ as illustrated in FIG. 11.

In particular, the following equation is considered:

$$\Theta_w = H^{-1} ( \overline{T}_{wc} - \overline{T}_* + \overline{T}_{FF}) \quad (44)$$

And, if the Adams-Bashforth method of second order is adopted as the integration method for the equation (44) above, differentiation of first order of $\Theta_W$ is calculated in accordance with the following equation:

$$\Theta_w (t+2\ \delta t) = \dot{\Theta}_w (t+\delta t) + \{3\Theta_w (t+\delta t) - \dot{\Theta} (t)\} \delta t/2 \quad (45)$$

It is to be noted that the other portion in FIG. 11 is substantially same as that of FIG. 1.

Subsequently, a method of displaying a result of calculation of the dynamics of the spacecraft on the real time basis in graphics and a time sequential graph will be described.

First, the object of it is as follows. It is to monitor, on the real time basis, angular velocities ω (i=1 to 3) of the satellite wheels, Eulerian angles α, β and γ of the satellite body, disturbance torques τ, (i=1 to 3) acting on the satellite body and so forth.

Figure 12:
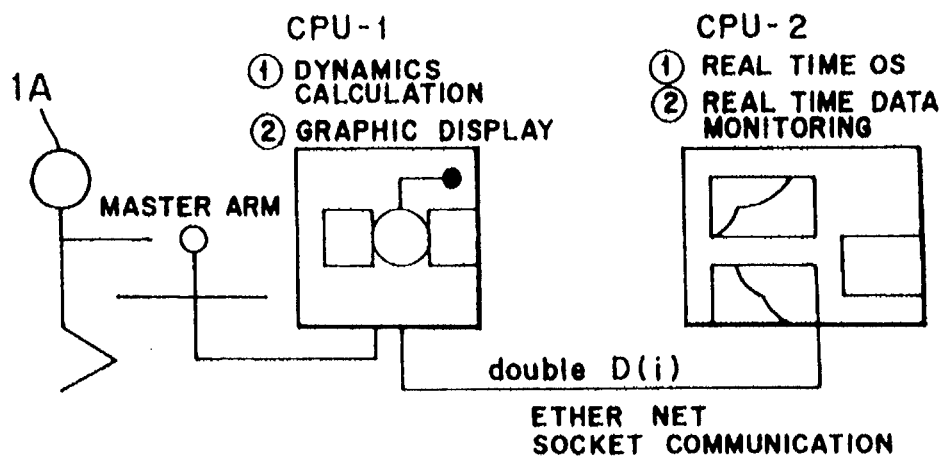
FIG. 12 is a diagrammatic view illustrating a real time data monitoring system.
Figure 13:
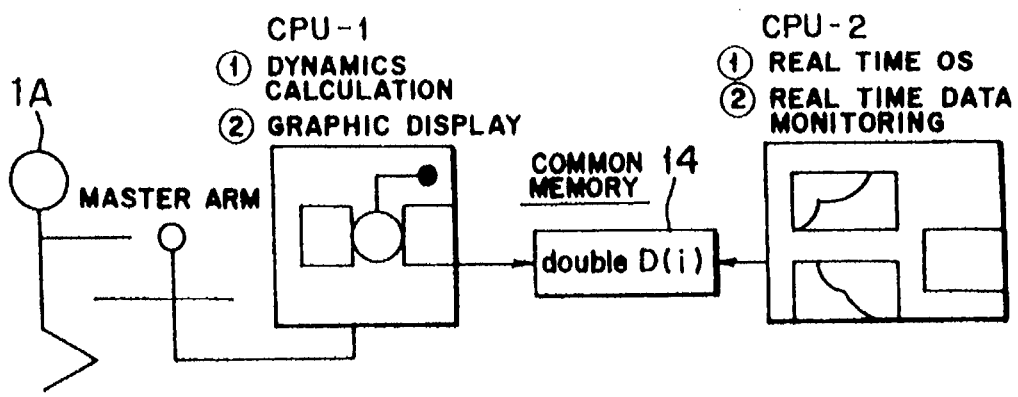
FIG. 13 is a diagrammatic view illustrating the real time data monitoring system.

And, as a system construction in this instance, a system wherein data are communicated between CPUs CPU-1 and CPU-2 by way of an ETHER NET or the like as shown in FIG. 12, another system wherein data are communicated between CPUs CPU-1 and CPU-2 by way of a common memory 141 as shown in FIG. 13 and some other system may be available.

Subsequently, a method wherein integration of second order in the wheel normal dynamics is performed by very simple numerical integration in order to display rotation of the wheels graphically will be described.

First, a method will be described wherein, in order to numerically solve the motion equation of the entire system based on the method described in detail already, taking notice of the rotational symmetry of a wheel, the step size of numerical integration of first order and numerical integration of second order for a wheel is varied such that numerical integration of second order is processed by rougher calculation than numerical integration of first order.

In this instance, since a wheel is symmetrical with respect to an axis of rotation thereof, the inertia matrix H(q) and the centrifugal force+Corioli's force matrix C have no dependency upon the rotational angle of the wheel.

Accordingly, in the dynamics, the necessity for calculation of a rotational angle of a wheel system is low.

However, it is very effective to graphically display rotation of a wheel in order for an operator of the real time simulator to determine the degree of operation of the control system.

In this instance, it is required that it can be visually discriminated whether the wheel is rotating (control ON) or at rest (control OFF), and dynamically severe accuracy is not required for the rotational angle.

Based on the investigations described so far, in the present method, the integration step size of numerical integration of second order of a wheel is set rougher than that of numerical integration of first order so that numerical integration of second order is processed by calculation rougher than that for numerical integration of first order.

In the following, description will be given taking the Adams-Bashforth method as an example.

In this instance, the ordinary differential equation which makes the base is such as given below:

$$\Theta_w = H_w^{-1} ( \overline{T}_{wc} - \overline{T}_* + \overline{T}_{FF}) \quad (46)$$

Further, by integration of first order of the equation above adopting the Adams-Bashforth method of second order, the following equation is obtained:

$$\Theta_w (t+2\ \delta t) - \Theta_w (t+\delta t) + \{3\dot{\Theta}_w (t+\delta t) - \dot{\Theta} (t)\} \delta t/2 \quad (47)$$

And, when the rotational angle $\Theta_W$ of a wheel is to be calculated based on the present equation (47), the integration step size is made rougher than that of the equation (47). In particular, it is given by the following equation:

$$\Theta_w (t+2\ S\delta t) - \Theta_w (t+S\delta t) + \{3\ \dot{\Theta}_w (t+S\delta t) - \dot{\Theta}_w (t)\} S\delta t/2 \quad (48)$$

Here, s is an arbitrary integral number equal to or greater than 2.

Figure 14:
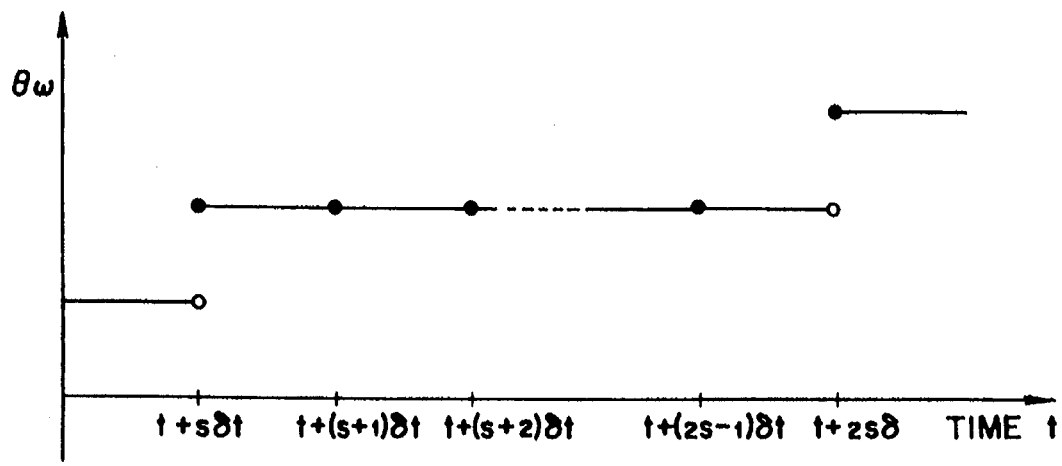
FIG. 14 is a diagram illustrating an interpolation technique for $\Theta_w$.

Further, for t+(s+1)δt, t+(s+2)δt, . . . , and t+(2s−1)δt between (t+sδt and t+2sδt), the value of $\Theta_w$ (t+sδt) is used as it is as shown in FIG. 14.

Subsequently, in order to graphically display rotation of a wheel similarly, as another method wherein integration of second order in the wheel normal dynamics is performed by very simple numerical integration, a method wherein, when a motion equation of the entire system is to be solved numerically, taking notice of the rotational symmetry of a wheel, the integration degree number is varied between numerical integration of first order and numerical integration of second order for a wheel such that numerical integration of second order is processed by rougher calculation than numerical integration of first order.

Also in this instance, numerical integration of second order of a wheel is processed by rougher calculation than that of numerical integration of first order because of a similar reason to that of the case described above.

It is to be noted that, as a method of the rough calculation, a method wherein the integration degree number of numerical integration of second order is made lower than that of numerical integration of first order is adopted.

Now, description is given taking the Adams-Bashforth method as an example.

In this instance, the ordinary differential equation which makes the base is given as the following equation:

$$\Theta_w = H_w^{-1} ( \overline{T}_{wc} - \overline{T}_* + \overline{T}_{FF}) \quad (49\text{-}1)$$

Further, when integration of second order is performed based on the Adams-Bashforth method of second order, it is given by the following equation:

$$\Theta_w (t+2\ \delta t) - \Theta_w (t+\delta t) + \{3[l\$]\$ \ddot{g} \dot{V}_w (t+\delta t) - \Theta_w (t)\} \delta t/2 \quad (49\text{-}2)$$

Meanwhile, integration of first order is performed based on the Adams-Bashforth method (same as in the Euler's method) of first order:

$$\Theta_w(t+3\delta t) = \Theta_w(t+2\delta t) + \dot{\Theta}_w(t+2\delta t) \cdot \delta t \quad (50)$$

Generally, when integration of second order is performed based on the Adams-Bashforth method of sth order, integration of first order may be performed based on the Adams-Bashforth method of degree of (s−1)th or less.

It is to be noted that the integration method is not limited to the Adams-Bashforth method but may be any arbitrary method such as the Runge-Kutta method. However, integration of first order which is higher in speed than the integration of second order should be adopted for the integration of first order.

Further, in order to graphically display rotation of a wheel, as a method wherein integration of second order in the wheel normal dynamics is performed by very simple numerical integration, a method wherein the step size and the integration degree number are varied between numerical integration of first order and numerical integration of second order of a wheel such that integration of second order is processed by rougher calculation than that for integration of first order will be described.

Also in this instance, numerical integration of second order of a wheel is processed by rougher calculation than that for numerical integration of first order because of a similar reason to that of the case described above.

It is to be noted that, as a method of the rough calculation, a method wherein the integration step size of numerical integration of second order is made lower than that of numerical integration of first order to make the integration degree number of the numerical integration of second order lower than that of the numerical integration of first order is adopted.

Now, if description is given taking the Adams-Bashforth method as an example, then the ordinary differential equation which makes the base is given as the following equation:

$$\dot{\Theta}_w = \mathbb{H}_w^{-1}(\boldsymbol{T}_{wc} - \overline{\boldsymbol{T}_*} + \boldsymbol{T}_{FF}) \quad (51)$$

Further, by integration of first order of the equation above adopting the Adams-Bashforth method of second order, the following equation is obtained:

$$\Theta_w(t+2\delta t) = \Theta_w(t+\delta t) + \{3\dot{\Theta}_w(t+\delta t) - \dot{\Theta}_w(t)\}\delta t/2 \quad (52)$$

And, when the rotational angle $\Theta_W$ of a wheel is to be calculated based on the present equation (52), the integration step size is set rougher than that of the case of the equation (52) and besides the integration degree number is lowered. In particular, the following equation is employed:

$$\Theta_w(t+2S\delta t) = \Theta_w(t+S\delta t) + \dot{\Theta}_w(t+S\delta t)\delta t \quad (53)$$

Here, s is an arbitrary integral number equal to or greater than 2.

Meanwhile, for t+(s+1)δt, t+(s+2)δt, . . . , and t+(2s−1)δt between (t+sδt and t+2sδt), the value of $\Theta_W(t+s\delta t)$ is used as it is (refer to FIG. 14).

Subsequently, a method wherein inertia moments of all of the wheels are multiplied proportionally in order to calculate the rotational angles of the wheels as high in speed and accuracy as possible.

Generally, when a motion equation of a dynamic system is numerically integrated, the accuracy of the integration depends significantly upon the step size of integration.

And, while the step size of integration must necessarily be set fine in order to raise the accuracy, if the step size is excessively fine, then the time required for calculation becomes long.

In the present method, in order to maintain both of the calculation accuracy and the calculation speed at appropriate values, notice is taken of a part in the entire system which rotates very fast and the inertia moments there are all multiplied proportionally (for example, by 1,000 time) to lower the speed of rotation of that part to the order of the speed of the other part to raise the calculation accuracy without decreasing the step size of integration.

It is to be noted that the step size of integration is set with reference to a portion which is moving at a most high speed in the entire system. Accordingly, in the case of dynamics of a satellite, according to an ordinary numerical integration method, the step size of integration is determined in conformity with the wheels.

Meanwhile, the present method is applied only to a component which is axis-symmetrical around an axis of rotation such as a wheel.

If the dynamics of a satellite having wheels is taken as an example, since a portion which rotates at a most high speed in the entire system is the wheels, all of inertial moments of the wheels are multiplied by s (for example, s=1,000.0). In this instance, while the angular velocity of the wheels is reduced to 1/s, little influence is had on the other portion, and no variation is involved as the dynamics.

The proof of this will be given below.

First, an investigation is made for a manipulator in a stopping condition. And, if notice is taken of the satellite body portion (satellite body+paddle+manipulators) and the wheels to establish an Euler's equation of the satellite body portion in the form wherein the satellite body portion takes in reactions undergoing from the wheels, the following equation is obtained:

$$\mathbb{I}\dot{\Omega}_B + \Omega_B \times \mathbb{I}\Omega_B = T_{external\ torque} + \sum_{i=1}^{m}(\tau_{wi}Z_{wi} + I_{wi}\dot{\Omega}_B \cdot Z_{wi}Z_{wi} + I_{wi}\dot{\theta}_{wi}\Omega_B \times Z_{wi}) \quad (54)$$

Here, $\mathbb{I}_B$: inertia matrix of the satellite body portion $\mathbb{I}_{wi}$: inertia matrix of the wheels, represented in wheel coordinates $(j_{wi}, j_{wi}, I_{wi})$ $\Omega_B$: angular velocity of the body portion $Z_{wi}$: unit vector in the direction of the axis of rotation of the wheel represented in wheel coordinates $(0, 0, 1)^T$ $I_{wi}$: inertia moment around the axis of rotation of the wheel $\tau_{wi}$: wheel driving torque Accordingly, when the inertial mass of the satellite body portion is sufficiently great comparing with that of the wheels and the angular velocity $\Omega_B$ of the satellite body portion is sufficiently small through the entire motion, the equation (54) is converted into the equation given below:

$$\mathbb{I}\dot{\Omega}_B + \Omega_B \times \mathbb{I}\dot{\Omega}_B = T_{external\ torque} - \sum_{i=1}^{m}(\tau_{wi}Z_{wi} + L_{wi}\Omega_B \times Z_{wi}) \quad (55)$$

Here, $$L_{wi} \equiv I_{wi}\dot{\theta}_{wi} \quad (56)$$

And, from the equation (55), it can be seen that only the angular momentum $L_{wi}$ of each wheel relies upon the dynamics which describes the satellite body portion, but the value of the moment of inertia of each wheel does not rely directly upon the dynamics. Accordingly, if the value of the moment of inertia of each wheel in the equation (55) is multiplied by s, then the angular velocity is reduced to a 1/s time, and it is possible to reduce the angular velocity of each wheel to an appropriate value (an angular velocity similar to that of the other links) by suitably selecting the value of s.

Further, a graphic display will be described below.

In particular, if the motion of a wheel whose angular velocity is reduced to a 1/s time is graphically displayed as it is, then since the motion is slow, it is difficult to discriminate the degree of rotation. Therefore, when integration of second order in an equation of motion of a wheel system is to be performed, the angular velocity of each wheel is multiplied by s. Consequently, the motion of the wheel becomes faster relatively comparing with the other portions of the satellite, and the graphic display effect is not deteriorated.

In particular, the equation (43) given hereinabove is modified as given by the following equation:

$$\Theta_w (t+2\,\delta t)=\Theta_w (t+\delta t)+\{3\,s\dot\Theta_w (t+\delta t) - s\,\dot\Theta_w (t)\}\,\delta t/2 \quad (57)$$

Figure 15:
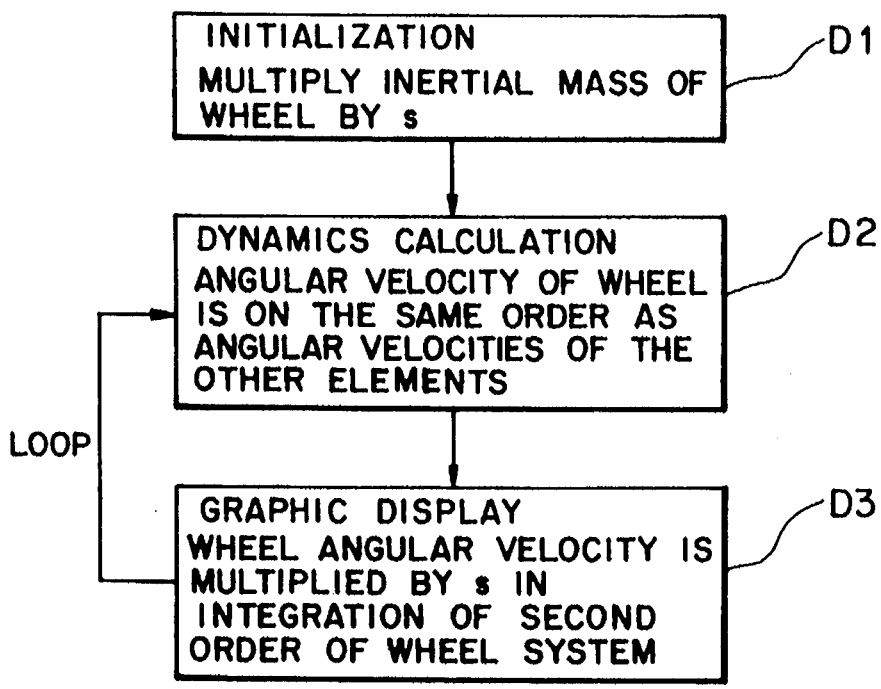
FIG. 15 is a flow chart illustrating an efficiency enhancing method based on an inertial moment proportional multiplication method.

A flow of the processing described in the present section so far is illustrated in FIG. 15. In particular, after initialization is performed at step D1, dynamics calculation is performed at step D2, and then at step D3, graphic display is performed.

Subsequently, in order to graphically display rotation of a wheel, as a method wherein integration of second order in the wheel normal dynamics is performed by very simple numerical integration, a method, in the method wherein the step sizes of numerical integration of first order and numerical integration of second order of a wheel are varied such that the numerical integration of second order is processed by rougher calculation than that for numerical integration of first order, wherein the moments of inertia of all of the wheels are multiplied proportionally in order to calculate the rotational angles of the wheels as high in speed and accuracy as possible will be described.

Figure 16:
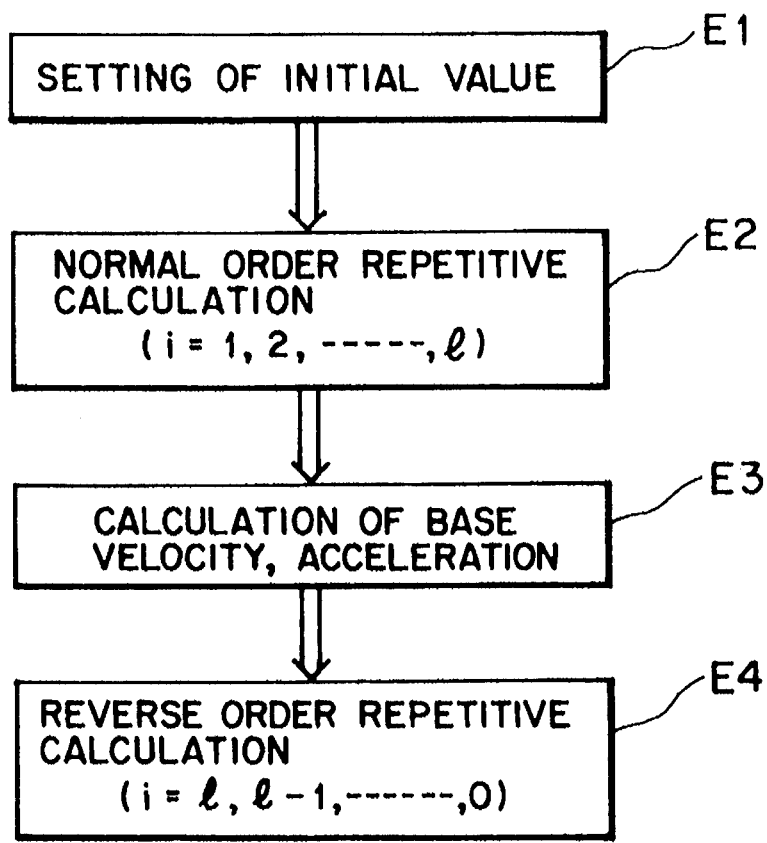
FIG. 16 is a flow chart illustrating the efficiency enhancing method based on the inertial moment proportional multiplication method.

In this instance, similarly as described hereinabove, for the algorithm of the method wherein the step sizes of numerical integration of first order and numerical integration of second order of each wheel are varied such that the numerical integration of second order is processed by rougher calculation than that for the numerical integration of first order, such processing as illustrated in FIG. 16 is performed. In particular, after initialization is performed at step E1, dynamics calculation is performed at step E2, and then integration processing of second order of the wheel system is performed at step E3. It is to be noted that, at the present step E3, the equation (48) given hereinabove is modified as given by the following equation to effect calculation:

$$\Theta_w (t+2\,S\delta t)=\Theta_w (t+S\delta t)+\{3U\dot\Theta_w (t+S\delta t) - U\dot\Theta_w (t)\}\times S\delta t/2 \quad (58)$$

Subsequently, in order to graphically display rotation of a wheel, as a method wherein integration of second order in the wheel normal dynamics is performed by very simple numerical integration, a method, in the method wherein the integration degree numbers of numerical integration of first order and numerical integration of second order of a wheel are varied such that the numerical integration of second order is processed by rougher calculation than that for the numerical integration of first order, wherein the moments of inertia of all of the wheels are multiplied proportionally in order to calculate the rotational angles of the wheels as high in speed and accuracy as possible will be described.

Figure 17:
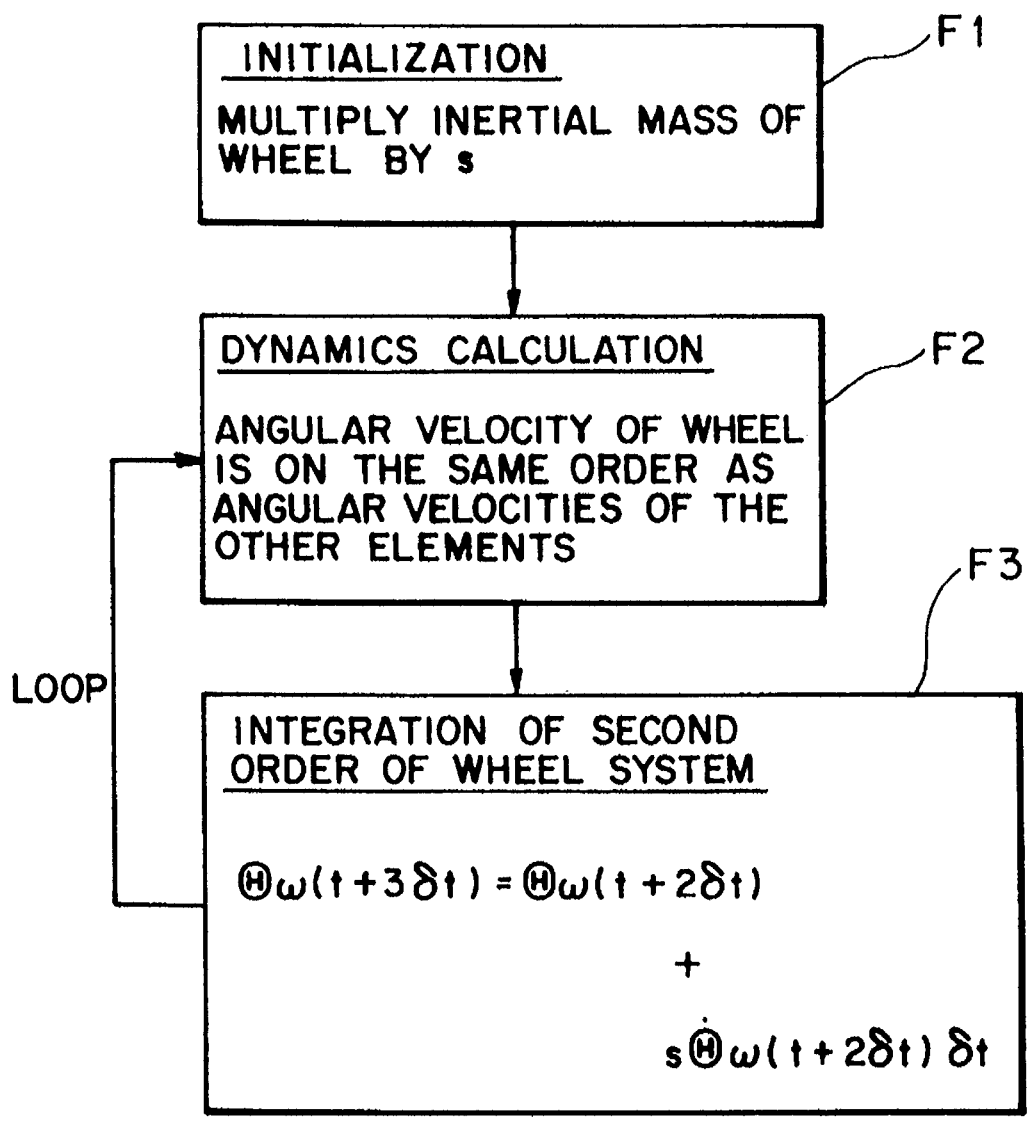
FIG. 17 is a flow chart illustrating the efficiency enhancing method based on the inertial moment proportional multiplication method.

In this instance, similarly as described hereinabove, for the algorithm of the method wherein the integration degree numbers of numerical integration of first order and numerical integration of second order of each wheel are varied such that the numerical integration of second order is processed by rougher calculation than that for the numerical integration of first order, such processing as illustrated in FIG. 17 is performed. In particular, after initialization is performed at step F1, dynamics calculation is performed at step F2, and then integration processing of second order of the wheel system is performed at step F3. It is to be noted that, at the present step F3, the following equation is calculated:

$$\Theta_w (t+3\,\delta t)\;\Theta_w (t+2\,\delta t)+S\dot\Theta_w (t+2\,\delta t)\,\delta t \quad (59)$$

Subsequently, in order to graphically display rotation of a wheel, as a method wherein integration of second order in the wheel normal dynamics is performed by very simple numerical integration, a method, in the method wherein the step sizes and the integration degree numbers of numerical integration of first order and numerical integration of second order of a wheel are varied such that the numerical integration of second order is processed by rougher calculation than that for the numerical integration of first order, wherein the moments of inertia of all of the wheels are multiplied proportionally in order to calculate the rotational angles of the wheels as high in speed and accuracy as possible will be described.

Figure 18:
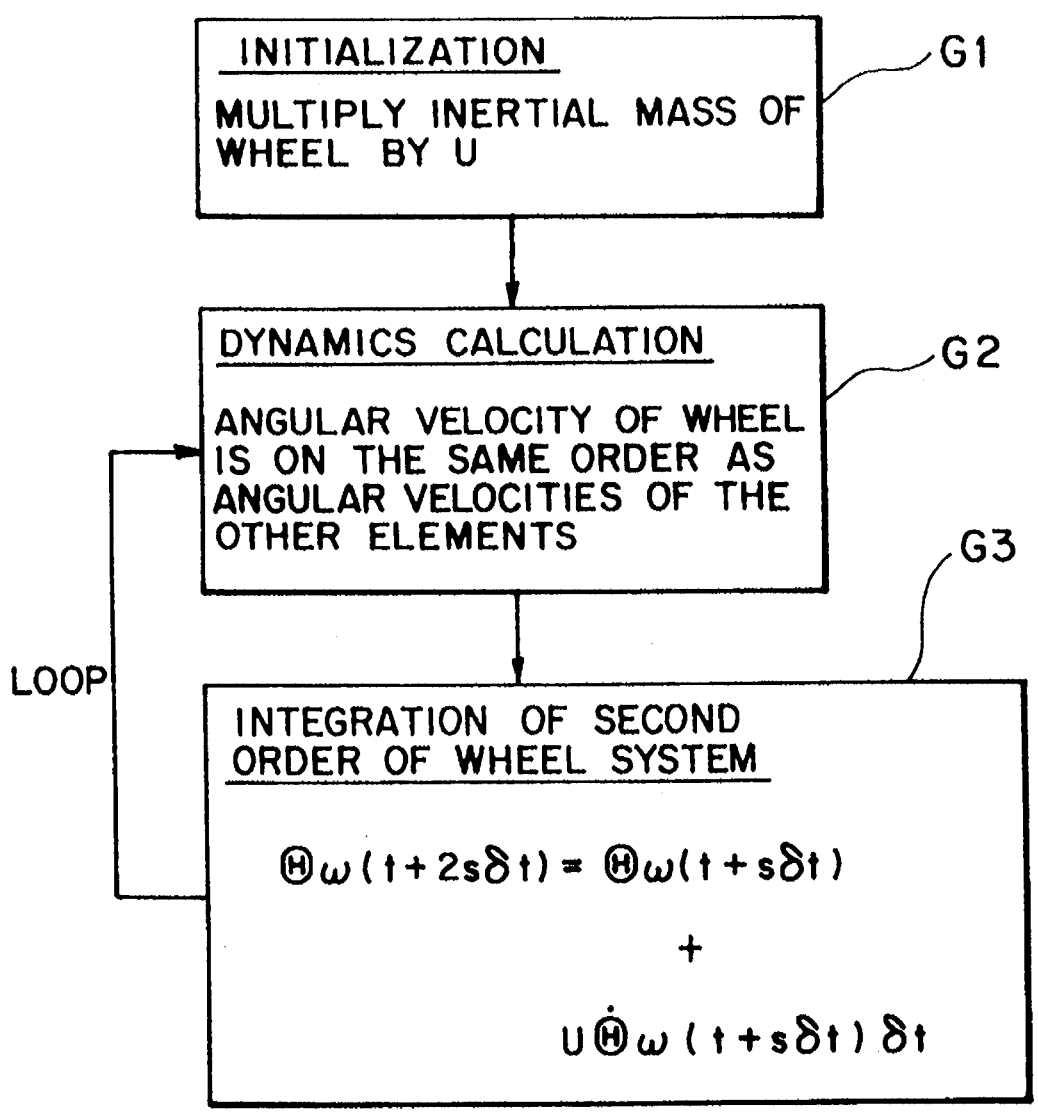
FIG. 18 is a flow chart illustrating the efficiency enhancing method based on the inertial moment proportional multiplication method.

In this instance, similarly as described hereinabove, for the algorithm of the method wherein the step numbers and the integration degree numbers of numerical integration of first order and numerical integration of second order of each wheel are varied such that the numerical integration of second order is processed by rougher calculation than that for the numerical integration of first order, such processing as illustrated in FIG. 18 is performed. In particular, after initialization is performed at step G1, dynamics calculation is performed at step G2, and then integration processing of second order of the wheel system is performed at step G3. It is to be noted that, at the present step G3, the following equation is calculated:

$$\Theta_w (t+2\,S\delta t)\;\Theta_w (t+S\delta t)+U\dot\Theta_w (t+S\delta t)\,\delta t \quad (60)$$

In this manner, in the present embodiment, the dynamics including the attitude control system of the satellite or space robot having a manipulator can be calculated at a high speed, that is, the three-dimensional dynamics of the entire spacecraft including the attitude control system can be calculated on the real time basis, and a result of the calculation can be outputted on the real time bases on the display.

Further, the equation of motion of the entire system can be solved at a high speed and with a high degree of accuracy, and consequently, real time calculation of the three-dimensional dynamics of the entire spacecraft can be realized readily.

(2) Description of the Second Embodiment

Figure 19:
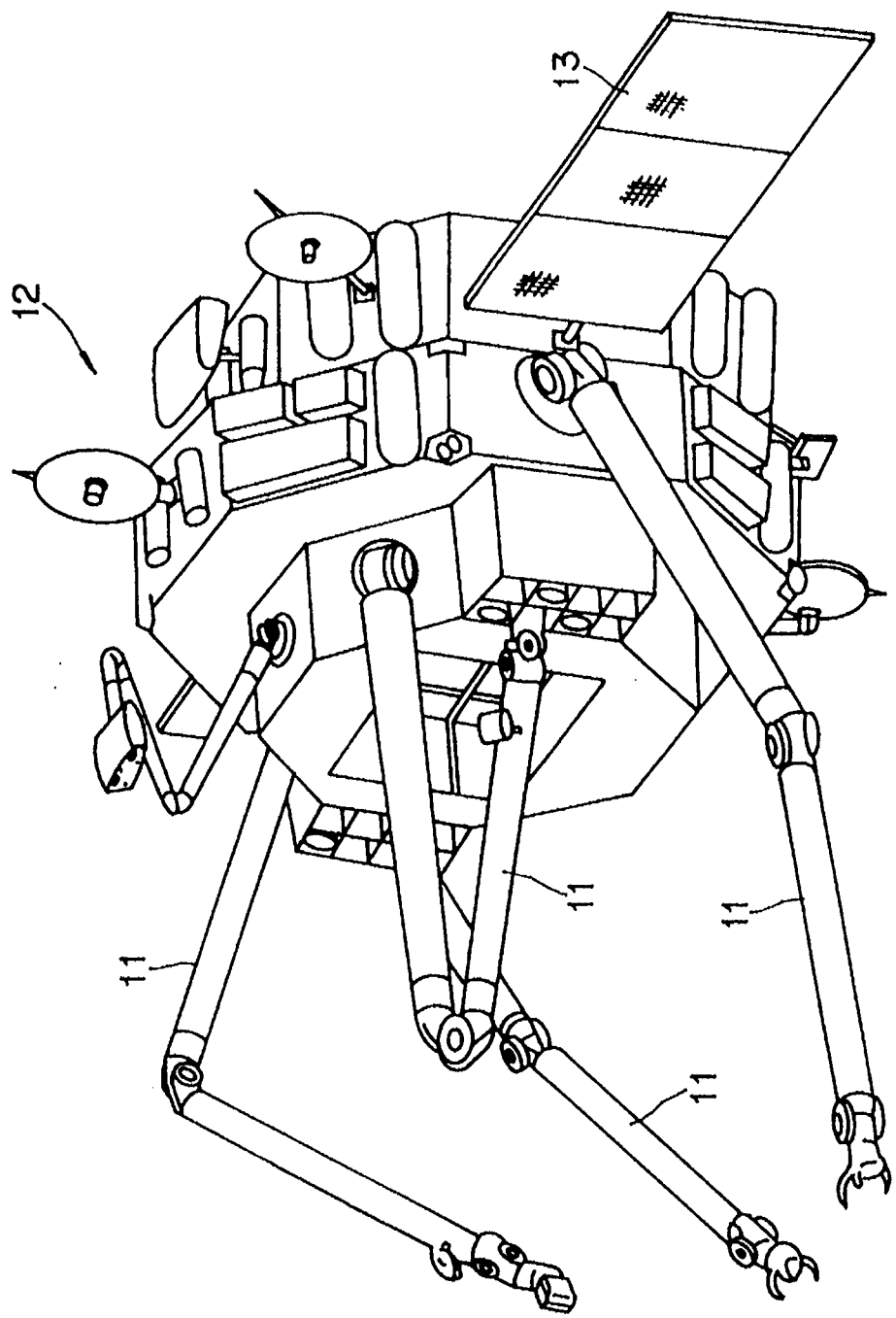
FIG. 19 is a perspective view showing another spacecraft having a manipulator.

Subsequently, a second embodiment of the present invention will be described. In the present embodiment, three-dimensional dynamics real time simulation of an attitude control system of a spacecraft 12 such as a space robot or an artificial satellite having such manipulators 11 as shown in FIG. 19 or attitude control by wheels is performed. It is to be noted that reference numeral 13 in FIG. 19 denotes a paddle.

Figure 20:
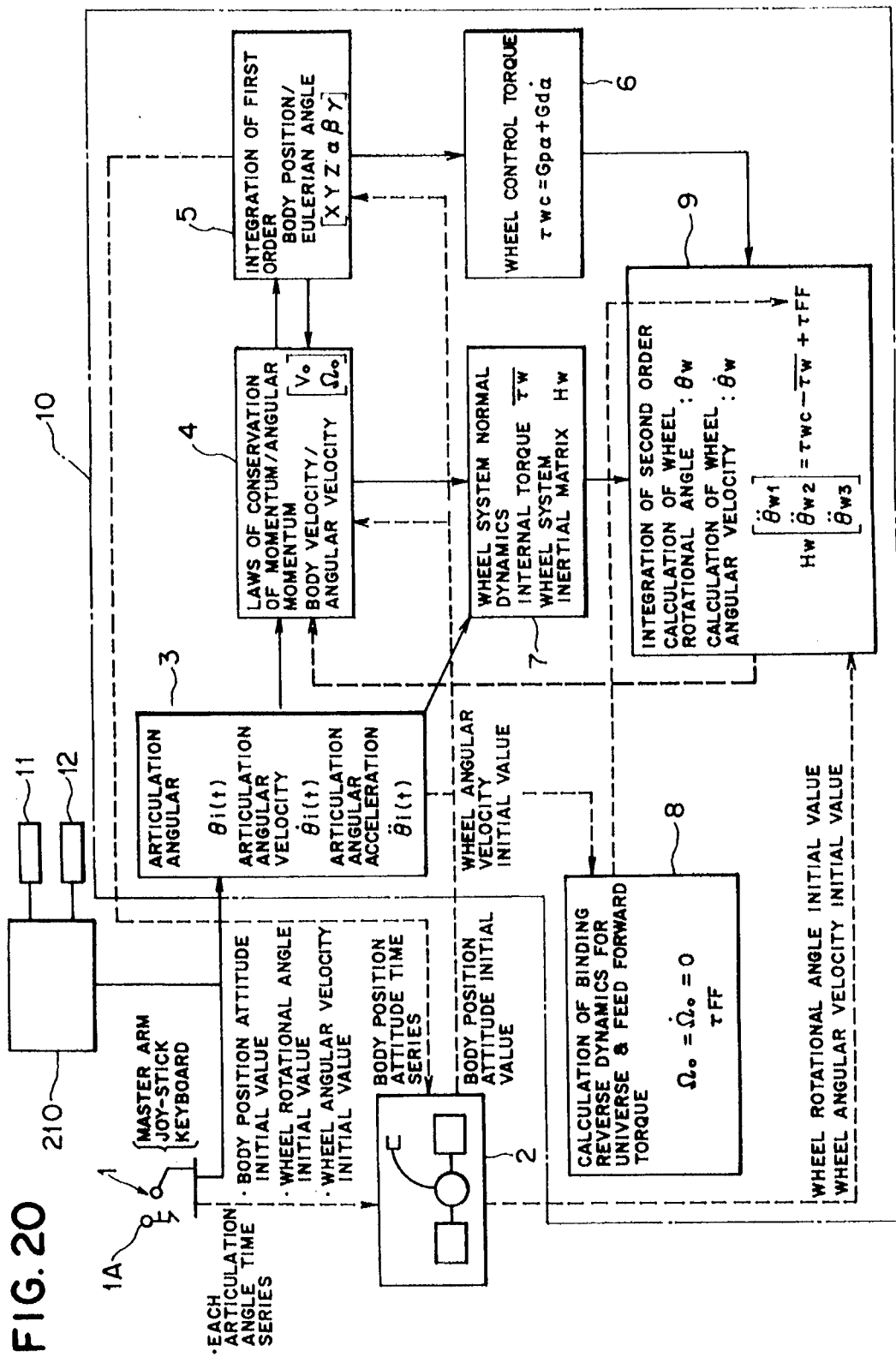
FIG. 20 is a block diagram showing a second embodiment of the present invention.
Figure 21:
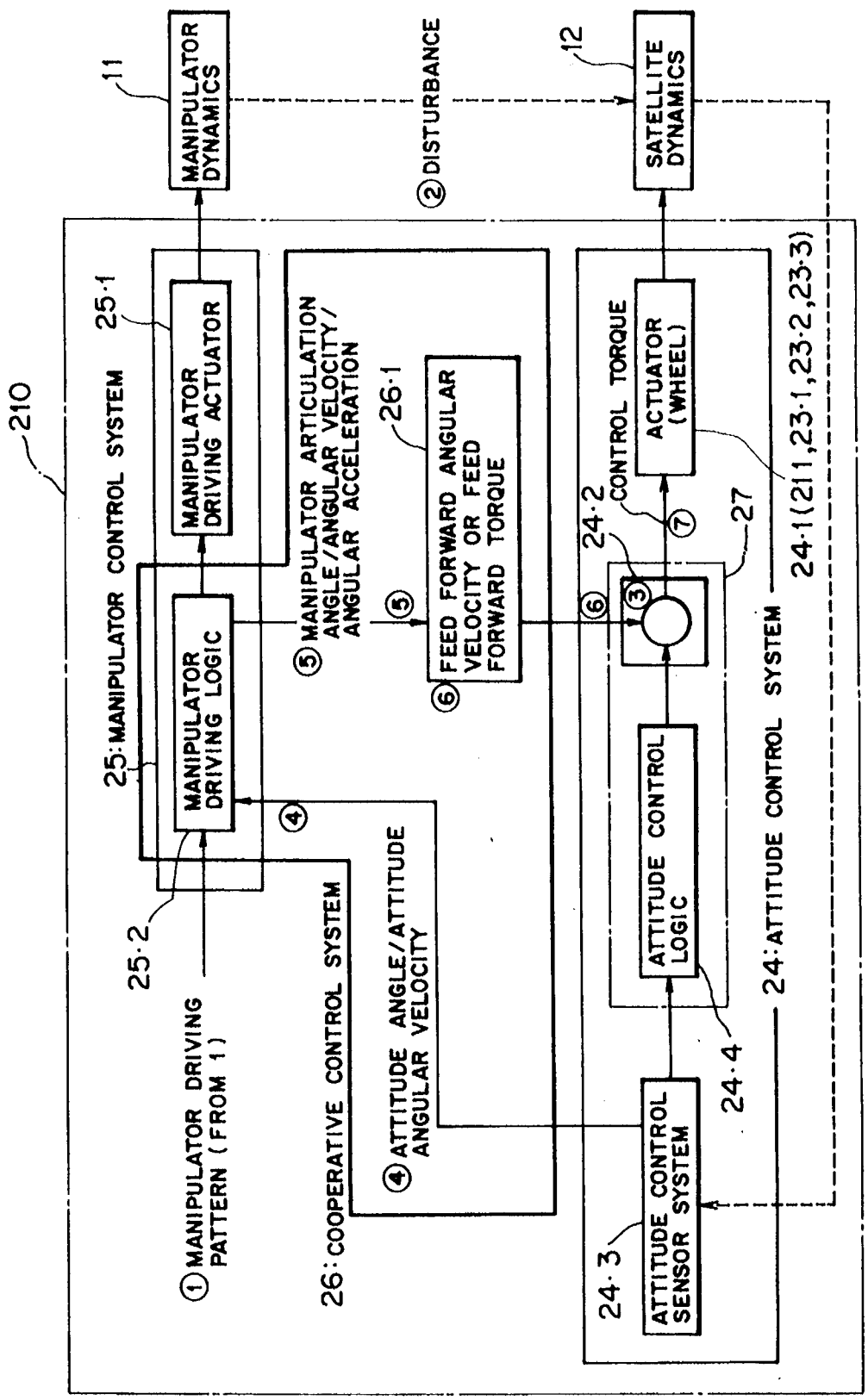
FIG. 21 is a block diagram showing several control systems of the spacecraft in the second embodiment of the present invention.

The present apparatus includes, as shown in FIGS. 20 and 21, a three-dimensional dynamics real time simulation system for a satellite having serial link manipulators having a degree of freedom 1 (the 1 is the el of a small letter) and includes a control system 210 necessary for the operation.

It is to be noted that the three-dimensional dynamics real time simulation system shown in FIG. 20 includes a manipulator articulation information inputting section 1, a graphic display 2 and a three-dimensional dynamics real time simulation section 10 which are similar to those of the first embodiment described above, and accordingly, can perform simulation similar to that of the first embodiment.

Meanwhile, the control system 210 in FIG. 21 roughly includes three parts including an attitude control system 24, a manipulator control system 25 and a cooperative control system 26.

Here, the manipulator control system 25 is a part which receives articulation angle time series data from the manipulator articulation information inputting section. 1 (refer to FIG. 20) (① in FIG. 3) and effects servoing control of the manipulators 11 provided on the spacecraft 12 so that they operate along routes of the articulation angle time series data.

To this end, the manipulator control system 25 includes a manipulator driving actuator 25·1 and further includes, commonly with the cooperative control system 26, a manipulator driving logic calculation section 25·2.

The manipulator driving logic calculation section 25·2 calculates, based on articulation angle time series data from the manipulator articulation information inputting section 1 (① in FIG. 3) and an attitude angle and an attitude angular velocity received from the attitude control system 24 by way of the cooperative control system 26, an articulation angle, an angular velocity and an angular acceleration of each of the manipulators necessary to drive the manipulators 1 and converts them into and outputs voltage signals.

The manipulator driving actuator 25·1 drives the manipulators 11 so that they may move along aimed routes (articulation angles, angular velocities and angular accelerations of the manipulators) indicated by voltage signals from the manipulator driving logic calculation section 25·2.

Then, here, before the cooperative control system 26 and the attitude control system 24 are described, symbols used in various equations used to describe the constructions of the individual apparatus and a coordinate system will be described.

In particular, notations will be hereinafter taken as follows:

$V_i$: velocity of the origin of the coordinate system $\Sigma_i$ relative to the inertial coordinate system $\Sigma_A$ $\dot{V}_i$: acceleration of the origin of the coordinate system $\Sigma_i$ relative to the inertial coordinate system $\Sigma_A$ $\hat{V}$: velocity of the center of gravity of the link i relative to the inertial coordinate system $\Sigma_A$ $\hat{\dot{V}}$: acceleration of the center of gravity of the link i relative to the inertial coordinate system $\Sigma_A$ $\Omega_i$: angular velocity of the link i relative to the inertial coordinate system $\Sigma_A$ $\dot{\Omega}_i$: angular acceleration of the link i relative to the inertial coordinate system $\Sigma_A$ $v_i$: time differentiation of the vector $p_i$ with respect to the base fixed coordinate system $\Sigma_0$ $$v_i \equiv d_0 \ p_i/dt = p_i'$$

$v_i'$: time differentiation of the vector $v_i$ with respect to the base fixed coordinate system $\Sigma_0$ $$v_i' \equiv d_0 \ v_i/dt = p_i''$$

$\hat{v}$: time differentiation of the vector $r_i$ with respect to the base fixed coordinate system $\Sigma_0$ $$\hat{v}_i \equiv d_0 \ \hat{r}_i/dt = \hat{r}_i'$$

$\hat{v}_i'$: time differentiation of the vector $v_i$ with respect to the base fixed coordinate system $\Sigma_0$ $$\hat{v}_i' \equiv d_0 \ \hat{v}_i/dt = \hat{r}_i''$$

$\omega_i$: angular velocity of the link i with respect to the base fixed coordinate system $\Sigma_0$ $\omega_i'$: time differentiation of $\omega i$ with respect to the base fixed coordinate system $\Sigma_0$ $$\omega_i' \equiv d_0 \ \omega_i/dt$$

Capital letter: vector as viewed from the inertial coordinate system $\Sigma_A$

Small letter: vector as viewed from the base fixed coordinate system $\Sigma_0$

Note 1) The time differentiation with respect to the inertial coordinate system $\Sigma_A$ and the time differentiation with respect to the base fixed coordinate system $\Sigma_0$ are distinguished definitely from each other.

For a vector $X$,
time differentiation with respect to $\Sigma_A$:

$$\dot{X} \equiv dX/dt$$

Time differentiation with respect to $\Sigma_0$:

$$X' \equiv d_0 \ X/dt$$

The relationship between $X$ and $X'$ is given by the following equation:

$$\dot{X} = X' + \Omega_0 \times X$$

Figure 28:
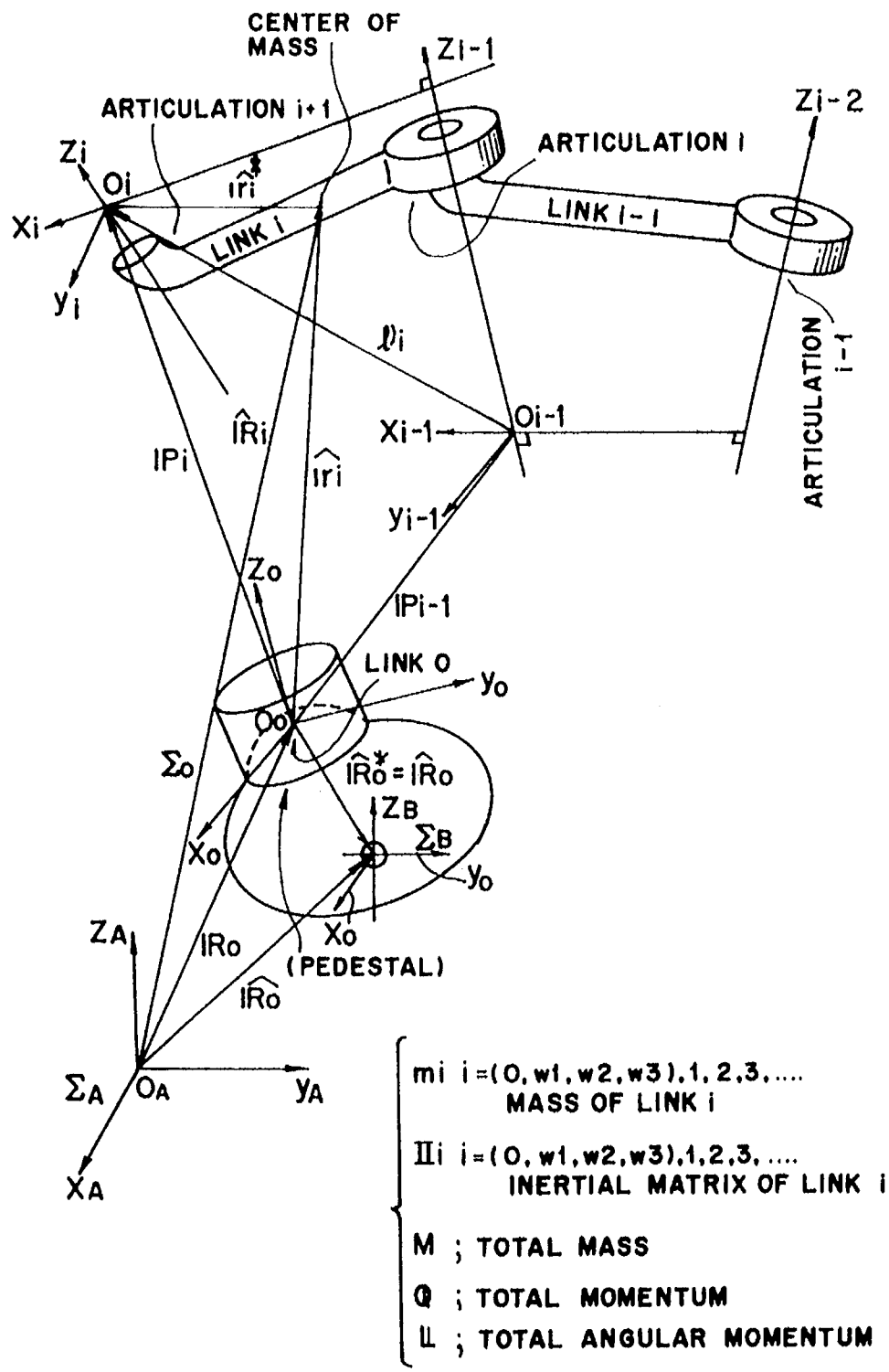
FIG. 28 is a diagrammatic view illustrating a coordinate system of a spacecraft having a manipulator.

Meanwhile, FIG. 28 shows a Denavit-Hartenberg coordinate system. And, as can be recognized from FIG. 29, when vectors represented in the coordinate systems $\Sigma_i$ and $\Sigma_{i-1}$ of FIG. 28 are defined as $^i a$ and $^{i-1}a$ (the character a is represented in scalar representation for the convenience of representation and actually represents a vector. In the following description, in such a case, a scalar representation sometimes indicates a vector), respectively, $^i a$ and $^{i-1}a$ have a relationship given by the following equation (A1). (The character l in a representation is represented in a writing style.)

$$^{i-1}a = {}^{i-1}A; \ ^i a + {}^{i-1}1_i \tag{A1}$$

Here, $^{i-1}A_i$ in the equation (A1) is an orthogonal matrix representative of rotation between different coordinate systems, and $^{i-1}1_i$ (also this l is represented in scalar representation for the convenience of representation and is handled similarly as in the case of a) is a representation of a vector from the coordinate origin $O_{i-1}$ to $O_i$ in the $\Sigma_{i-1}$ system representation.

Those $^{i-1}A_i$ and $^{i-1}1_i$ are represented in such a manner as given by the following equations (A2) and (A3) when standard parameters are used on the Denavit-Hartenberg coordinate system representation:

$$^{i-1}A_i \equiv \begin{bmatrix} \cos\theta_i & -\sin\theta_i \cos\alpha_i & \sin\theta_i \sin\alpha_i \\ \sin\theta_i & \cos\theta_i \cos\alpha_i & -\cos\theta_i \sin\alpha_i \\ 0 & \sin\alpha_i & \cos\alpha_i \end{bmatrix} \quad (A2)$$

$$(i = 1 \sim l)$$

$$^{i-1}\phi_i \equiv \begin{bmatrix} b_i \cos\theta_i \\ b_i \sin\theta_i \\ d_i \end{bmatrix} \quad (i = 1 \sim l) \quad (A3)$$

Figure 29:
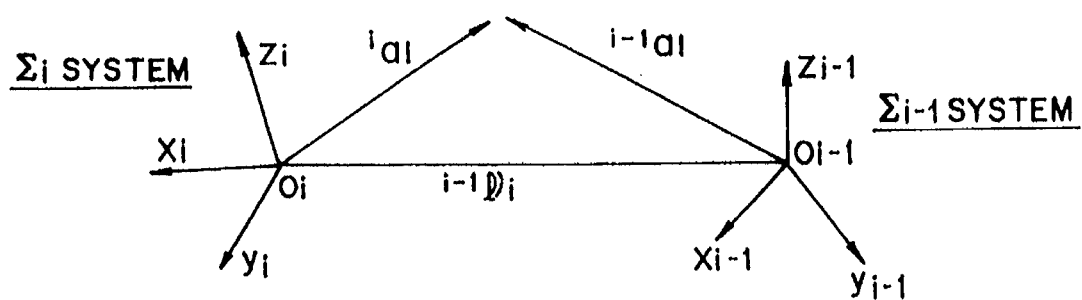
FIG. 29 is a diagrammatic view illustrating the coordinate system of the spacecraft having a manipulator.
Figure 30:
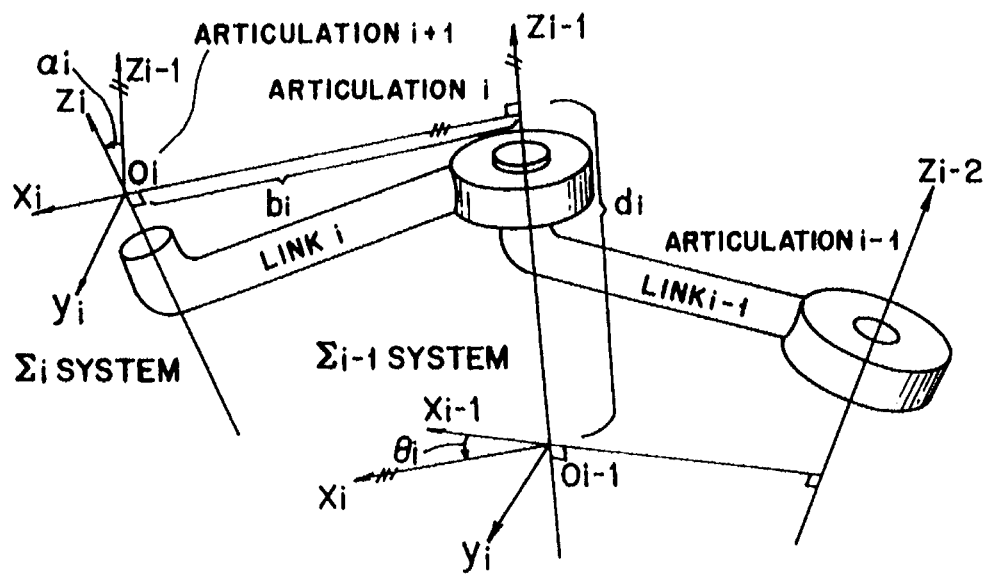
FIG. 30 is a diagrammatic view illustrating the coordinate system of the spacecraft having a manipulator.

And, definitions of parameters on the Denavit-Hartenberg coordinate system of FIG. 29 are illustrated in FIG. 30.

The present coordinate system is set in accordance with the following standards:

$z_i$ axis: axis of the articulation i+1

$x_i$ axis: common perpendicular line from $z_{i-1}$ toward $z_i$ $y_i$ axis: constructed so as to make a right-hand coordinate system $b_i$: length of the common perpendicular line to $z_i$ and $z_{i-1}$ $d_i$: length between $x_i$ and $x_{i-1}$ ($z_{i-1}$ coordinate value)

$\alpha_i$: angle between $z_i$ and $z_{i-1}$ (the $z_{i-1}$ direction coincides with the zi direction when it is rotated by $\alpha_i$ around the $x_i$ axis)

$\Theta_i$: angle between $x_i$ and $x_{i-1}$ (the $x_{i-1}$ direction coincides with the $x_i$ direction when it is rotated by $\Theta_i$ around the $z_{i-1}$ axis)

Further, when i=-1 in $^i a$, $^i a$ represents an inertia system representation. Accordingly, the following equations (A4) and (A5) are obtained.

$$^i a|_{i=-1} = {^A a} \quad (A4)$$

$$^i A|_{i=-1} = {^A A} \quad (A5)$$

The prefix A at the left shoulder denotes the initial letter of Absolute coordinate. Particularly, the equation (A5) represents a conversion matrix between the inertia system and the base reference coordinate system.

It is to be noted that, when differentiation of first and second orders of time is to be indicated in any other portion than the expressions and the figures of the present embodiment, d/dt and $d^2/dt^2$ are used.

Now, description of the cooperative control system 26 and the attitude control system 24 is started here.

The cooperative control system 26 establishes cooperation between the manipulator control system 25 and the attitude control system 24 to keep the attitude controlling performance of the satellite good and is constructed such that it includes the manipulator driving logic calculation section 25·2 described hereinabove commonly with the manipulator control system 25 and it further includes a feed forward amount calculation section 26·1.

The feed forward amount calculation section 26·1 calculates and outputs a feed forward amount to be delivered to the wheel control system 27 of the attitude control system 24 in order to compensate for a disturbance originating from the manipulators 11 based on the output of the manipulator driving logic calculation section 25·2 described hereinabove.

In particular, the feed forward amount calculation section 26·1 calculates a disturbance originating from each of the manipulators 11 based on a particular calculation algorithm (such algorithm will be hereinafter described in detail) for each case and delivers a value of the disturbance as a feed forward term to the attitude control system 24.

And, the feed forward amount calculation section 26·1 takes, as such feed forward amount, an angular momentum or a wheel angular velocity obtained by dividing the angular momentum by the mass of momentum wheels 23·1 to 23·3 (wheels 3) and calculates an aimed angular momentum or an aimed angular velocity of the momentum wheels 23·1 to 23·3 based on the laws of conservation of momentum/angular momentum.

Further, the feed forward amount calculation section 26·1 applies, upon application of the laws of conservation of momentum/angular momentum described above, to the angular velocity of the body of the satellite 12, one of a constraint that the angular velocity of the body of the spacecraft 12 is equal to 0, another constraint that the angular velocity of the body of the spacecraft 12 is a constant, and a further constraint that the angular velocity of the body of the spacecraft 12 is an arbitrary function of the time. It is to be noted that all of the constraints are vectors.

And, the laws of conservation of momentum/angular momentum., that is, the two equations, are given by the following expressions (A6) and (A7):

$$\sum_{i=0}^{l} m_i \hat{V}_i = Q \text{ (given constant)} \quad (A6)$$

law of conservation of momentum $$\sum_{i=0}^{l} (m_i \hat{R}_i \times \hat{V}_i + \mathbb{I}_i \Omega_i) = \mathbb{L} \text{ (given constant)} \quad (A7)$$

law of conservation of angular momentum

Accordingly, the following definition is set for the manipulator articulation angle and the wheel articulation angle (in the present embodiment, the number of the momentum wheels 23·1 to 23·3 is set to 3 for simplified description).

$$q = \begin{bmatrix} \Theta_m \\ \Theta_w \end{bmatrix},$$

$\Theta_m = [\theta_1, \theta_2, \ldots, \theta_l]^T$ manipulator articulation angle $\Theta_w = [\theta_{w1}, \theta_{w2}, \theta_{w3}]^T$ wheel articulation angle In this instance, the equations (A6) and (A7) can be replaced as given by the following equation (A7-1):

$$\begin{bmatrix} V_0 \\ \Omega_0 \end{bmatrix} = S^{-1} \begin{bmatrix} h_v \\ h_w \end{bmatrix}, \quad (A7-1)$$

$$\begin{Bmatrix} h_v = Q - \sum_{i \neq (0,w_1,w_2,w_3)}^{l} m_i \hat{V}_i \\ h_w = \mathbb{L} - \sum_{i \neq (0,w_1,w_2,w_3)}^{l} (m_i \hat{R}_i \times \hat{V}_i + \mathbb{I}_i \omega_i) \end{Bmatrix}$$

$V_0$: velocity of satellite body $\Omega_0$: angular velocity of satellite body It is to be noted that the definition of the character S (also this character S is represented in scalar representation for the convenience of representation and should be treated similarly to the character a described hereinabove) in this equation is such as given below:

$$S = \begin{bmatrix} s_{11} & s_{12} \\ s_{21} & s_{22} \end{bmatrix}$$

-continued $$S_{11} = \begin{bmatrix} M & 0 & 0 \\ 0 & M & 0 \\ 0 & 0 & M \end{bmatrix}, M = \sum_{i=(0,w_1,w_2,w_3)}^{l} m_i \text{ (entire mass)}$$

Note) $i=(0, w_1, w_2, w_3)$ signifies that summation is performed for the satellite body and the wheel 1, the wheel 2 and the wheel 3 when $i=0$.

$$S_{12} = \sum_{i=(0,w_1,w_2,w_3)}^{l} m_i \begin{bmatrix} 0 & \hat{r}_{zi} & -\hat{r}_{yi} \\ -\hat{r}_{zi} & 0 & \hat{r}_{xi} \\ \hat{r}_{yi} & -\hat{r}_{xi} & 0 \end{bmatrix}$$

$$S_{21} = \sum_{i=(0,w_1,w_2,w_3)}^{l} m_i \begin{bmatrix} 0 & \hat{R}_{zi} & -\hat{R}_{yi} \\ -\hat{R}_{zi} & 0 & \hat{R}_{xi} \\ \hat{R}_{yi} & -\hat{R}_{xi} & 0 \end{bmatrix}$$

$$S_{22} = \sum_{i=(0,w_1,w_2,w_3)}^{l} \left\{ \mathbb{I}_i + m_i \begin{bmatrix} \hat{R}_{zi}\hat{r}_{zi} + \hat{R}_{yi}\hat{r}_{yi} & -\hat{R}_{yi}\hat{r}_{xi} & -\hat{R}_{zi}\hat{r}_{xi} \\ -\hat{R}_{xi}\hat{r}_{yi} & \hat{R}_{zi}\hat{r}_{zi} + \hat{R}_{xi}\hat{r}_{xi} & -\hat{R}_{zi}\hat{r}_{yi} \\ -\hat{R}_{xi}\hat{r}_{zi} & -\hat{R}_{yi}\hat{r}_{zi} & \hat{R}_{yi}\hat{r}_{yi} + \hat{R}_{xi}\hat{r}_{xi} \end{bmatrix} \right\}$$

And, this equation (A7-1) can be transformed, in the form, into the following equation (A8) using differentiation of each articulation angle:

$$\begin{bmatrix} \mathbb{V}_0 \\ \Omega_0 \end{bmatrix} = S^{-1} \begin{bmatrix} Q \\ L \end{bmatrix} + H_w^3 \dot{\Theta}_w + H_m^l \dot{\Theta}_m \quad (A8)$$

Further, a condition based on the following description is provided to the equation (A8):
If $\Theta_m$=a current value and $\Theta_w=0$, then $$\begin{bmatrix} \mathbb{V}_0 \\ \Omega_0 \end{bmatrix} = \begin{bmatrix} \mathbb{V}_{00} \\ \Omega_{00} \end{bmatrix}$$

Then, from the equation (A8) above, the following equation (A9) is obtained:

$$\begin{bmatrix} \mathbb{V}_{00} \\ \Omega_{00} \end{bmatrix} = S^{-1} \begin{bmatrix} Q \\ L \end{bmatrix} + H_m^l \dot{\Theta}_m \quad (A9)$$

Accordingly, the following equation (A10) is obtained from the equation (A9) above:

$$H_w^3 \dot{\Theta}_w = \begin{bmatrix} \mathbb{V}_0 \\ \Omega_0 \end{bmatrix} - \begin{bmatrix} \mathbb{V}_{00} \\ \Omega_{00} \end{bmatrix} \quad (A10)$$

Further, the following definition is provided:
If $$\begin{bmatrix} Q \\ L \end{bmatrix} = 0, \dot{\Theta}_m = 0, \dot{\Theta}_w = e_i \, (i=1,2,3)$$

then $$\begin{bmatrix} \mathbb{V}_0 \\ \Omega_0 \end{bmatrix} = \begin{bmatrix} \mathbb{V}_{0i} \\ \Omega_{0i} \end{bmatrix}$$

Consequently, from the equation (A8) given hereinabove, the following equation (A11) is obtained:

$$H_w^3 = \begin{bmatrix} \mathbb{V}_{01} & \mathbb{V}_{02} & \mathbb{V}_{03} \\ \Omega_{01} & \Omega_{02} & \Omega_{03} \end{bmatrix} \quad (A11)$$

As a result, from the equations (A10) and (A11) given above, a generalized equation (A12) given below of a feed forward angular velocity to be delivered to each of the momentum wheels 23-1 to 23-3 is obtained:

$$\dot{\Theta}_w [ \Omega_{01} \; \Omega_{02} \; \Omega_{03} ]^{-1} ( \Omega_0 - \Omega_{00} ) \quad (A12)$$

Figure 31:
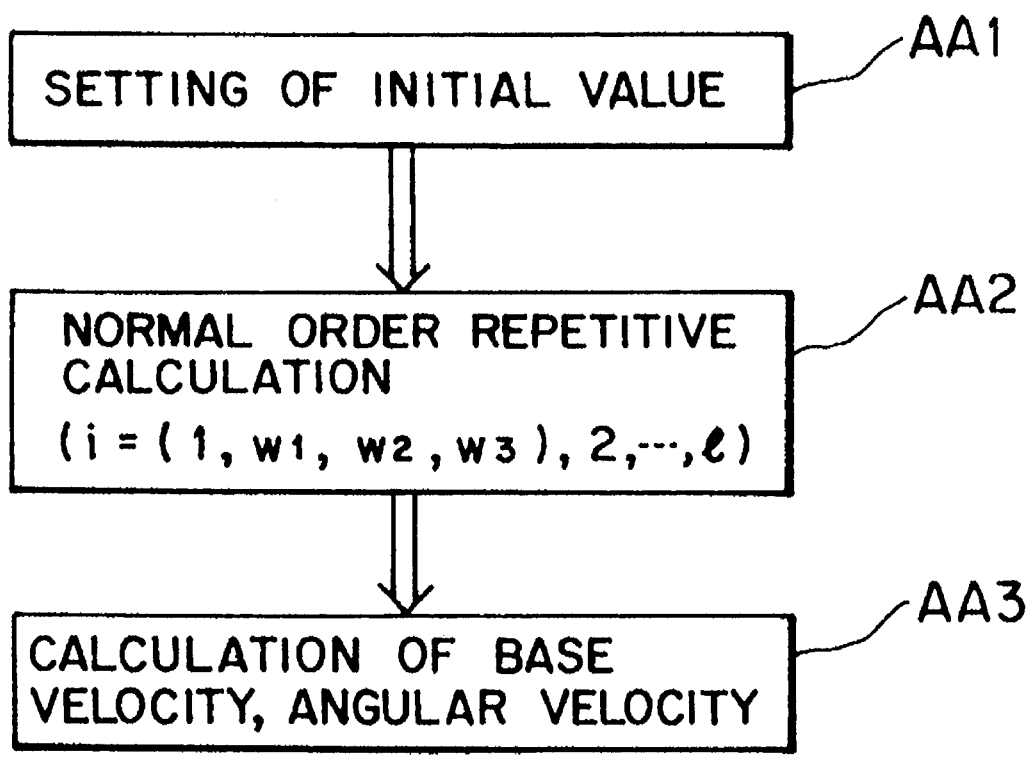
FIG. 31 is a view illustrating an algorithm AA in the second embodiment of the present invention.

And, an algorithm AA in this instance is an algorithm for calculating the velocity and the angular velocity of the satellite body based on the equation (A8) as shown in FIG. 31, and after initial value setting (step AA1) is performed, normal order repetitive calculation (step AA2) is performed, whereafter calculation of the base velocity and angular velocity (step AA3) is performed.

Here, the calculations shown in FIG. 31 have the following constructions:

In particular, the initial value setting (step AA1) is constructed from the following calculations:

$\hat{\hat{R}}_0|_{t=0}$: given $\Theta_i|_{t=0}$: given $(i=1 \sim l)$ $\omega_0 = \omega_0' = 0, \; \hat{v}_0 = \hat{v}_0' = 0, \; \hat{\dot{v}}_0 = \hat{\dot{v}}_0' = 0$ ${}^{i-1}Z_{i-1} = (0, 0, 1)^T$ $\hat{A}_0$: given Meanwhile, the normal order repetitive calculation (step AA2) is constructed from the following calculations:

① ${}^i\omega_i = \begin{cases} {}^iA_{i-1}({}^{i-1}\omega_{i-1} + \dot{\Theta}_i {}^{i-1}Z_{i-1}) & \text{for } R \\ {}^iA_{i-1} {}^{i-1}\omega_{i-1} & \text{for } T \end{cases}$ ② ${}^i\dot{\omega}_i = \begin{cases} {}^iA_{i-1}({}^{i-1}\dot{\omega}_{i-1} + \ddot{\Theta}_i {}^{i-1}Z_{i-1} + \dot{\Theta}_i {}^{i-1}\omega_{i-1} \times {}^{i-1}Z_{i-1}) & \text{for } R \\ {}^iA_{i-1} {}^{i-1}\dot{\omega}_{i-1} & \text{for } T \end{cases}$ ③ ${}^i v_i = \begin{cases} {}^i\omega_i \times {}^i l_i + {}^iA_{i-1} {}^{i-1}v_{i-1} & \text{for } R \\ {}^i\omega_i \times {}^i l_i + {}^iA_{i-1}(\dot{d}_i {}^{i-1}Z_{i-1} + {}^{i-1}v_{i-1}) & \text{for } T \end{cases}$ ④ ${}^i\hat{v}_i = {}^i v_i + {}^i\omega_i \times {}^i\hat{r}_i^*$ ⑤ ${}^i\dot{v}_i = \begin{cases} {}^i\dot{\omega}_i \times {}^i l_i + {}^i\omega_i \times ({}^i\omega_i \times {}^i l_i) + {}^iA_{i-1} {}^{i-1}\dot{v}_{i-1} & \text{for } R \\ {}^iA_{i-1}(\ddot{d}_i {}^{i-1}Z_{i-1} + {}^{i-1}\dot{v}_{i-1}) + {}^i\dot{\omega}_i \times {}^i l_i + 2\dot{d}_i {}^i\omega_i \times ({}^iA_{i-1} {}^{i-1}Z_{i-1}) + {}^i\omega_i \times ({}^i\omega_i \times {}^i l_i) & \text{for } T \end{cases}$ ⑥ ${}^i\hat{\dot{v}}_i = {}^i\dot{v}_i + {}^i\dot{\omega}_i \times {}^i\hat{r}_i^* + {}^i\omega_i \times ({}^i\omega_i \times {}^i\hat{r}_i^*)$ ⑦ ${}^i\hat{r}_i = {}^i\hat{r}_i' + {}^i l_i - {}^iA_{i-1} {}^{i-1}\hat{r}_{i-1}^* + {}^iA_{i-1} {}^{i-1}\hat{r}_{i-1}$ ⑧ ${}^A A_i = {}^A A_{i-1} {}^{i-1}A_i$ ⑨ ${}^A\hat{r}_i = {}^A A_i {}^i\hat{r}_i$ ⑩ ${}^A\hat{R}_i = {}^A\hat{r}_i - (1/M) \times \sum_{i=(l,w_1,w_2,w_3)}^{l} {}^A\hat{r}_i + ({}^A Q_t + C)/M$ Further, the calculation of the base velocity and angular velocity (steps AA3) is constructed from the following calculations:

① Calculation of ${}^AS_{12}$
② Calculation of ${}^AS_{21}$
③ ${}^A\mathbb{I}_i = {}^AA_i \, {}^i\mathbb{I}_i \, {}^iA_A$ ④ $\hat{S}_{22} = \sum_{i=(o,w_1,w_2,w_3)} \{ {}^AA_i \, {}^i\mathbb{I}_i \, {}^iA_A - m_i {}^A\hat{R}_i {}^A\hat{r}_i \}$ -continued $$\text{⑤ } \hat{h}_v = \hat{Q} \cdot \sum_{i=(o,w_1,w_2,w_3)}^{l} m_i {}^A V_i$$

$$\text{⑥ } {}^A h_\omega = \hat{L} \cdot \sum_{i=(o,w_1,w_2,w_3)}^{l} (m_i {}^A \hat{R}_i \times {}^A V_i + {}^A A_i {}^i I_i {}^i \omega_i)$$

$$\text{⑦ } \begin{bmatrix} {}^A V_0 \\ {}^A \Omega_0 \end{bmatrix} = \begin{bmatrix} {}^A S_{11} & {}^A S_{12} \\ {}^A S_{21} & {}^A S_{22} \end{bmatrix}^{-1} \begin{bmatrix} {}^A h_v \\ {}^A h_\omega \end{bmatrix}$$

It is to be noted that the following definitions are applied to the calculations of the algorithm AA:

Definition of ${}^A R_{i\ i}{}^r{}_i$

Generally, vector $a \times b = b_a$ $$\begin{bmatrix} a_x \\ a_y \\ a_z \end{bmatrix} \times \begin{bmatrix} b_x \\ b_y \\ b_z \end{bmatrix} = \begin{bmatrix} a_y b_z - a_z b_y \\ a_z b_x - a_x b_z \\ a_x b_y - a_y b_x \end{bmatrix}$$

$$= \begin{bmatrix} 0 & b_z & -b_y \\ -b_z & 0 & b_x \\ b_y & -b_x & 0 \end{bmatrix} \begin{bmatrix} a_x \\ a_y \\ a_z \end{bmatrix}$$

Therefore, $$b \equiv \begin{bmatrix} 0 & b_z & -b_y \\ -b_z & 0 & b_x \\ b_y & -b_x & 0 \end{bmatrix}$$

In short, the feed forward amount calculation section 26·1 repeats, when the constraint described above is applicable, the algorithm AA for calculation of the velocity and the angular velocity of the satellite body by four times based on the equation (A8), and finally takes the inverse of a 3×3 matrix based on an equation obtained by putting the constraint into the equation (A12) to calculate a feed forward angular velocity under this constraint.

In the following, in what manner the feed forward amount calculation section 26·1 actually calculates a feed forward angular velocity (a feed forward value to be delivered to each of the momentum wheels 23·1 to 23·3 in order to keep the attitude of the satellite body at a fixed value) for each of the constraints described above when the wheel angular velocity is taken as a feed forward amount will be described successively.

[1]. First, the case wherein the feed forward amount calculation section 26·1 applies, upon application of the laws of conservation of momentum/angular momentum described above, the constraint of 0 to the angular velocity of the body of the spacecraft 12 will be described (in other words, the case wherein the constraint is $\Omega_0 = 0$. It is to be noted that also those $\Omega_0$ and 0 are represented in scalar representation for the convenience of representation but should be treated similarly to the case of the vector a described hereinabove).

In this instance, the feed forward amount calculation section 26·1 substitutes the constraint 0 into the angular velocity $\Omega_0$ of the satellite body included in the right side of the generalized equation (A12) of the feed forward angular velocity described above to calculate the following equation (A13) representative of the feed forward angular velocity under this constraint:

$$\Theta_w = -[\Omega_{01} \ \Omega_{02} \ \Omega_{03}]^{-1} \Omega_{00} \tag{A13}$$

And, the feed forward amount calculation section 26·1 repeats the algorithm AA for calculation of the velocity and the angular velocity of the satellite body described above four times based on the equation (A8), and finally takes the inverse of a 3×3 matrix based on the equation (A13) to calculate a value of the left side of the equation (A13), in short, a feed forward angular velocity under this constraint.

[2]. Subsequently, the case wherein the feed forward amount calculation section 26·1 applies, upon application of the laws of conservation of momentum/angular momentum described above, to the angular velocity of the body of the spacecraft 12 the constraint that the angular velocity of the body of the spacecraft 12 is a constant (that is, the case wherein the constraint is $\Omega_0 = C$ (given constant). It is to be noted that also this C is represented in scalar representation for the convenience of representation but should treated similarly to the case of the vector a described hereinabove).

In this instance, the feed forward amount calculation section 26·1 substitutes the constant C as the constraint into the angular velocity $\Omega_0$ of the satellite body on the right side of the equation (A12) to calculate the following equation (A14) which represents a feed forward angular velocity under this constraint:

$$\Theta_w = [\Omega_{01} \ \Omega_{02} \ \Omega_{03}]^{-1} (C - \Omega_{00}) \tag{A14}$$

And, the feed forward amount calculation section 26·1 calculates the value of the left side of the equation (A14), that is, a feed forward angular velocity under this constraint in a similar manner as described hereinabove using the equation (A14) and the equation (A8) as well as the algorithm A for calculation of the velocity and the angular velocity of the satellite body.

[3]. Further, the case wherein the feed forward amount calculation section 26·1 applies, upon application of the laws of conservation of momentum/angular momentum described above, to the angular velocity of the body of the spacecraft 12 the constraint that the angular velocity of the body of the spacecraft 12 is an arbitrary function of the time t (that is, the case wherein the constraint is $\Omega_0 = u(t)$ (u: given function of t). In this instance, also this u is represented in scalar representation for the convenience of representation but should be treated similarly to the case of the vector a described hereinabove).

In this instance, the feed forward amount calculation section 26·1 substitutes the arbitrary function u(t) of the time as the constraint into the angular velocity $\Omega_0$ of the satellite body on the right side of the equation (A12) to calculate the following equation (A15) which represents a feed forward angular velocity under this constraint:

$$\Theta_w = [\Omega_{01} \ \Omega_{02} \ \Omega_{03}]^{-1} (u(t) - \Omega_{00}) \tag{A15}$$

And, the feed forward amount calculation section 26·1 calculates the value of the left side of the equation (A15), that is, the feed forward angular velocity under this constraint in a similar manner as in the case wherein the constraint is that the angular velocity of the body of the spacecraft 12 is 0 again using the equation (A15) and the equation (A8) as well as the algorithm AA for calculation of the velocity and the angular velocity of the satellite body.

The foregoing describes the technique of calculating a feed forward angular velocity for each constraint by the feed forward amount calculation section 26·1 when a wheel angular velocity is taken as a feed forward amount.

Meanwhile, the feed forward amount calculation section 26·1 multiplies, when an angular momentum is taken as a feed forward amount, a feed forward angular velocity calculated for each of the constraints described above by the mass of the momentum wheels 23·1 to 23·3 and outputs the product as a feed forward angular momentum.

By the way, the feed forward amount calculation section 26·1 further can take a torque in place of an angular momentum or a wheel angular velocity as a feed forward amount to be delivered to the wheel control system 27 of the attitude control system 24 in order to compensate for a disturbance originating from the manipulators 11 and calculate the value of the torque based on the reverse dynamics for the universe to control the attitude control system actuator 24·1.

In particular, the feed forward amount calculation section 26·1 calculates, when a torque is taken in this manner, a disturbance originating from the manipulators 1 based on a particular calculation algorithm AB (the algorithm will be hereinafter described in detail) and delivers the value of the disturbance as a feed forward term to the attitude control system 24.

And, in this instance, the feed forward amount calculation section 26·1 applies, upon application of the reverse dynamics for the universe described above, to the angular acceleration of the body of the spacecraft 12 either one of the constraint that the angular acceleration of the body of the spacecraft 12 is 0 or the constraint that the angular acceleration of the body of the spacecraft 12 is an arbitrary function of the time.

Or else, the feed forward amount calculation section 26·1 applies, upon application of the reverse dynamics for the universe described above, one of the following constraints to the angular velocity and the angular acceleration of the body of the spacecraft 12.

In short, the constraints include a constraint that the angular velocity and the angular acceleration of the body of the spacecraft 12 are both equal to 0, another constraint that the angular velocity of the body of the spacecraft 12 is a constant and the angular acceleration of the body of the spacecraft 12 is 0, and a further constraint that each of the angular velocity and the angular acceleration of the body of the spacecraft 12 is an arbitrary function of the time. It is to be noted that those constraints are all vectors.

And, the equations which make the base of the reverse dynamics for the universe in the case wherein a wheel torque is taken as a feed forward amount are differentiation of the laws of conservation of momentum/angular momentum described above and indicated by the equations (A6) and (A7) given hereinabove, that is, the expression of the sum total of the internal forces and the internal torques=zero [the following equations (A16) and (A17)].

$$\sum_{i=(o,w_1,w_2,w_3)}^{l} m_i \hat{\dot{V}}_i = 0 \quad (A16)$$

$$\sum_{i=(o,w_1,w_2,w_3)}^{l} (m_i \hat{R}_i \times \hat{\dot{V}}_i + d(\mathbb{I}_i \Omega_i)/dt) = 0 \quad (A17)$$

Further, those equations (A16) and (A17) can be rewritten into the following equations (A18) and (A19):

$$\sum_{i=(o,w_1,w_2,w_3)}^{l} \mathbb{F}_i = 0 \quad (A18)$$

$$\sum_{i=(o,w_1,w_2,w_3)}^{l} (\hat{R}_i \times \mathbb{F}_i + \mathbb{N}_i) = 0 \quad (A19)$$

Further, the equations (A18) and (A19) can be rewritten into the following equations (A20) and (A21):

$$\dot{\Omega}_i = \dot{\Omega}_0 + \dot{\omega}_i = \dot{\Omega}_0 + \omega_i + \Omega_0 \times \omega_i \quad (A20)$$

$$\hat{\dot{V}}_i = \dot{V}_0 + \dot{\Omega}_0 \times \hat{r}_i + 2\Omega_0 \times \hat{v}_i + \Omega_0 \times (\Omega_0 \times \hat{r}_i) + \hat{\ddot{v}}_i \quad (A21)$$

And, if the equations (A16) and (A17) above are transformed using those equations (A20) and (A21), then the following equations (A22), (A23) and (A24) are obtained:

$$\begin{bmatrix} \dot{V}_0 \\ \dot{\Omega}_0 \end{bmatrix} = \quad (A22)$$

$$S^{-1} \begin{bmatrix} -\sum_{i=(o,w_1,w_2,w_3)}^{l} \mathscr{F}_i \\ -\sum_{i=(o,w_1,w_2,w_3)}^{l} (\hat{\mathbb{R}}_i \mathscr{F}_i + \mathscr{N}_i) \end{bmatrix} + S^{-1} \begin{bmatrix} \mathbb{F}_{OUT} \\ \mathbb{N}_{OUT} \end{bmatrix}$$

$$\begin{cases} \mathscr{F}_i = m_i(2\Omega_0 \times \hat{v}_i + \Omega_0 \times (\Omega_0 \times \hat{r}_i) + \hat{\ddot{v}}_i) & (A23) \\ \mathscr{N}_i = \mathbb{I}_i \dot{\omega}_i + \mathbb{I}_i \Omega_0 \times \omega_i + \Omega_i \times (\mathbb{I}_i \Omega_i) & (A24) \end{cases}$$

$\mathbb{F}_{out}$: sum total of external forces $\mathbb{N}_{out}$: sum total of external torques Furthermore, from the present equation (A22), a feed forward torque to be delivered to the wheels is calculated in the following manner. In particular, by transforming the equation (A22) into a form similar to that of the equation (A8), the following equation (A25) is obtained:

$$\begin{bmatrix} \dot{V}_0 \\ \dot{\Omega}_0 \end{bmatrix} = \quad (A25)$$

$$S^{-1} \begin{bmatrix} \mathbb{F}_{OUT} \\ \mathbb{N}_{OUT} \end{bmatrix} + \mathbb{G}_w^3 \Theta_w + \mathbb{K}_w^3 \Theta_w + \mathbb{G}_m^l \Theta_m + \mathbb{K}_m^l \Theta_m$$

The following definitions are used in the equation (A25):
If $\Theta_w$=current value $\Theta_m$=current value $\Theta_m$=current value $\Theta_w = 0$ then $$\begin{bmatrix} \dot{V}_0 \\ \dot{\Omega}_0 \end{bmatrix} = \begin{bmatrix} \dot{V}_{00} \\ \dot{\Omega}_{00} \end{bmatrix}$$

$\dot{V}_0$: acceleration of the satellite body $\dot{\Omega}_0$: angular acceleration of the satellite body As a result, the following equation (A26) is obtained:

$$\begin{bmatrix} \dot{V}_{00} \\ \dot{\Omega}_{00} \end{bmatrix} = S^{-1} \begin{bmatrix} \mathbb{F}_{OUT} \\ \mathbb{N}_{OUT} \end{bmatrix} + \mathbb{K}_w^3 \Theta_w + G_m^l \Theta_m + \mathbb{K}_m^l \Theta_m \quad (A26)$$

Accordingly, the following equation (A27) is obtained:

$$G_w^3 \ddot{\Theta}_w = \begin{bmatrix} \ddot{V}_0 \\ \dot{\Omega}_0 \end{bmatrix} - \begin{bmatrix} \dot{V}_{00} \\ \dot{\Omega}_{00} \end{bmatrix} \quad (A27)$$

And, the following definition is used in the equation (A25) given hereinabove:

If $$\begin{bmatrix} \mathbb{F}_{OUT} \\ \mathbb{N}_{OUT} \end{bmatrix} = 0, \dot{\Theta}_w = 0, \ddot{\Theta}_m = \dot{\Theta}_m = 0, \ddot{\Theta}_w = e \ ;$$

$(i = 1, 2, 3)$ then $$\begin{bmatrix} \dot{V}_0 \\ \dot{\Omega}_0 \end{bmatrix} = \begin{bmatrix} \dot{V}_{0i} \\ \dot{\Omega}_{0i} \end{bmatrix}$$

Consequently, the following equation (A28) is obtained:

$$G_w^3 = \begin{bmatrix} \dot{V}_{01} & \dot{V}_{02} & \dot{V}_{03} \\ \dot{\Omega}_{01} & \dot{\Omega}_{02} & \dot{\Omega}_{03} \end{bmatrix} \quad (A28)$$

From such equations (A27) and (A28), the equation (A29) given below is obtained:

$${}^A\hat{R}_0\vert_{t=0}: \text{given}$$

Meanwhile, the normal order repetitive calculation (step AB2) is constructed from the following calculations:

① ${}^i\omega_i = \begin{cases} {}^iA_{i-1}({}^{i-1}\omega_{i-1} + \dot{\theta}_i^{i-1}Z_{i-1}) & \text{for } R \\ {}^iA_{i-1}{}^{i-1}\omega_{i-1} & \text{for } T \end{cases}$ ② ${}^i\dot{\omega}_i = \begin{cases} {}^iA_{i-1}({}^{i-1}\dot{\omega}_{i-1} + \ddot{\theta}_i^{i-1}Z_{i-1} + \dot{\theta}_i^{i-1}\omega_{i-1} \times {}^{i-1}Z_{i-1}) & \text{for } R \\ {}^iA_{i-1}{}^{i-1}\dot{\omega}_{i-1} & \text{for } T \end{cases}$ ③ ${}^iV_i = \begin{cases} {}^i\omega_i \times {}^il_i + {}^iA_{i-1}{}^{i-1}V_{i-1} & \text{for } R \\ {}^i\omega_i \times {}^il_i + {}^iA_{i-1}(\dot{d}_i{}^{i-1}Z_{i-1} + {}^{i-1}V_{i-1}) & \text{for } T \end{cases}$ ④ ${}^i\hat{v}_i = {}^iV_i + {}^i\omega_i \times {}^i\hat{r}_i^*$ ⑤ ${}^i\dot{v}_i = \begin{cases} {}^i\dot{\omega}_i \times {}^il_i + {}^i\omega_i \times ({}^i\omega_i \times {}^il_i) + {}^iA_{i-1}{}^{i-1} \times {}^{i-1}V_{i-1} & \text{for } R \\ {}^iA_{i-1}(\ddot{d}_i{}^{i-1}Z_{i-1} + {}^{i-1}\dot{V}_{i-1}) + {}^i\dot{\omega}_i \times {}^il_i + 2\dot{d}_i{}^i\omega_i \times ({}^iA_{i-1}{}^{i-1}Z_{i-1}) + {}^i\omega_i \times ({}^i\omega_i \times {}^il_i) & \text{for } T \end{cases}$ ⑥ ${}^i\dot{\hat{v}}_i = {}^i\dot{V}_i + {}^i\dot{\omega}_i \times {}^i\hat{r}_i^* + {}^i\omega_i \times ({}^i\omega_i \times {}^i\hat{r}_i^*)$ ⑦ ${}^i\hat{r}_i = {}^i\hat{r}_i^* + {}^il_i - {}^iA_{i-1}{}^{i-1}\hat{r}_{i-1}^* + {}^iA_{i-1}{}^{i-1}\hat{r}_{i-1}$ ⑧ ${}^A\mathbb{A}_i = {}^A\mathbb{A}_{i-1}{}^i\mathbb{A}_i$ ⑨ ${}^A\hat{r}_i = {}^A\mathbb{A}_i{}^i\hat{r}_i$ ⑩ ${}^A\hat{R}_i = {}^A\hat{r}_i - (1/M) \times \sum_{i=(1,w_1,w_2,w_3)}^{l} m_i{}^A\hat{r}_i + ({}^A\mathbb{Q}_i + \mathbb{C})/M$ $$\Theta_w = \{\dot{\Omega}_{01}\ \dot{\Omega}_{02}\ \dot{\Omega}_{03}\}^{-1}(\dot{\Omega}_0 - \dot{\Omega}_{00}) \quad (A29)$$

Figure 32:
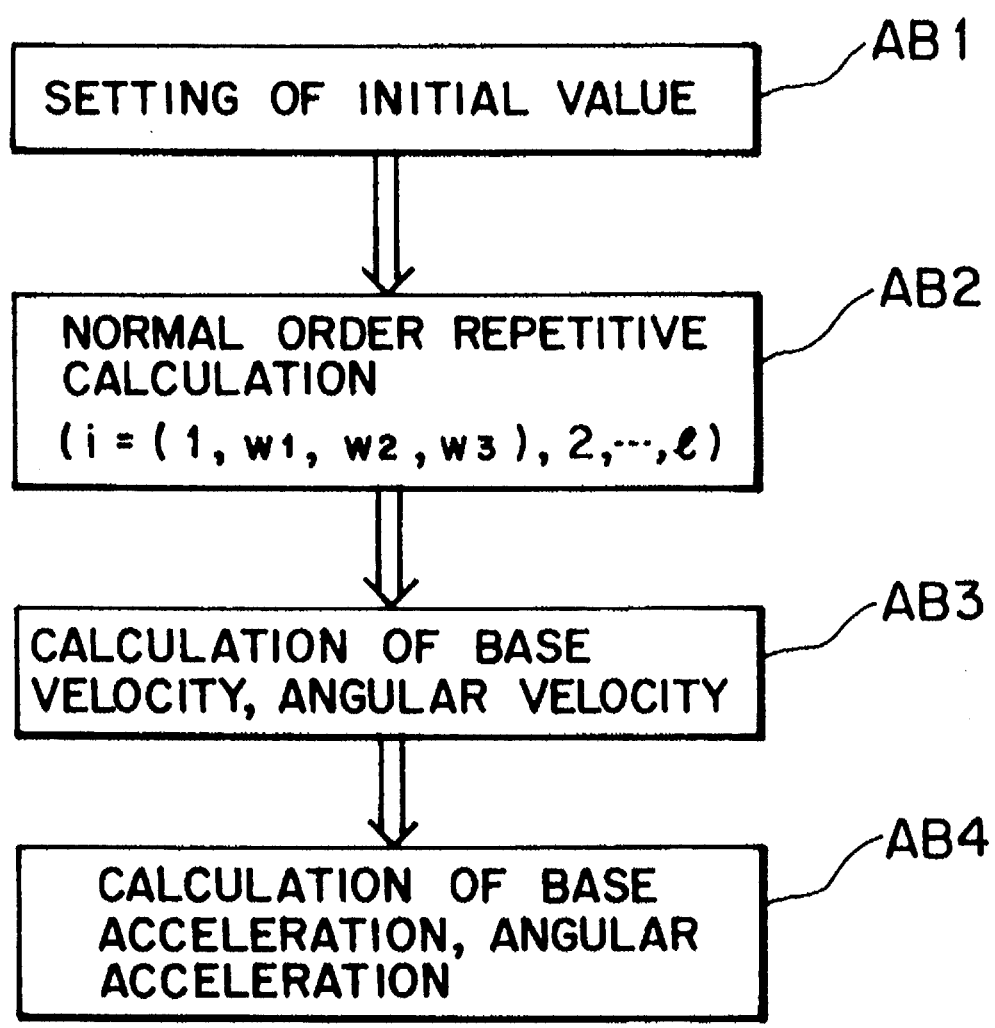
FIG. 32 is a view illustrating an algorithm AB in the second embodiment of the present invention.

And, the algorithm AB for calculation of the acceleration and the angular acceleration of the satellite body illustrated in FIG. 32 and based on the equation (A22) is constructed such that the velocity and the angular velocity of the satellite body are calculated from the laws of conservation of momentum/angular momentum of the algorithm AA for the case wherein a wheel angular velocity is taken as a feed forward amount described above and then the values of them are applied to the equation (A22).

In short, the algorithm AB is constructed such that, after initial value setting (step AB1) is performed, forward normal repetitive calculation (step AB2) is performed, and then calculation of the base velocity and angular velocity (step AB3) is performed, whereafter calculation of the base acceleration and angular acceleration (step AB4) is performed.

Here, the calculations illustrated in FIG. 32 have such constructions as described below.

In particular, the initial value setting (step AB1) is constructed from the following calculations:

${}^A\hat{R}_0\vert_{t=0}$; given $\theta_i\vert_{t=0}$; given $(i=1\sim l)$ ${}^0\omega_0 = {}^0\omega_0' = 0,\ {}^0\hat{v}_0 = {}^0\hat{v}_0' = 0,\ {}^0V_0 = {}^0V_0' = 0$ ${}^{i-1}Z_{i-1} = (0, 0, 1)^T$ Further, the calculation of the base velocity and angular velocity (step AB3) is constructed from the following equations:

① Calculation of ${}^AS_{12}$
② Calculation of ${}^AS_{21}$
③ ${}^A\mathbb{I}_i = {}^A\mathbb{A}_i{}^i\mathbb{I}_i{}^i\mathbb{A}_A$ ④ ${}^AS_{22} = \sum_{i=(o,w_1,w_2,w_3)}^{l} \{{}^A\mathbb{A}_i{}^i\mathbb{I}_i{}^i\mathbb{A}_A - m_i{}^A\hat{R}_i{}^A\hat{r}_i\}$ ⑤ ${}^A\hat{h}_v = {}^A\mathbb{Q} - \sum_{i=(o,w_1,w_2,w_3)}^{l} m_i{}^A\hat{v}_i$ ⑥ ${}^A\hat{h}_\omega = {}^A\mathbb{L} - \sum_{i=(o,w_1,w_2,w_3)}^{l} (m_i{}^A\hat{R}_i \times {}^A\hat{v}_i + {}^A\mathbb{A}_i{}^i\mathbb{I}_i{}^i\omega_i)$ ⑦ $\begin{bmatrix} {}^AV_0 \\ {}^A\Omega_0 \end{bmatrix} = \begin{bmatrix} {}^AS_{11} & {}^AS_{12} \\ {}^AS_{21} & {}^AS_{22} \end{bmatrix}^{-1} \begin{bmatrix} {}^A\hat{h}_v \\ {}^A\hat{h}_\omega \end{bmatrix}$ And, the calculation of the base acceleration and angular acceleration (step AB4) is constructed from the following calculations:

① ${}^A\hat{v}_i = {}^A\mathbb{A}_i{}^i\hat{v}_i$

② ${}^A\mathcal{F}_i = m_i(2{}^A\Omega_0 \times {}^A\hat{v}_i + {}^A\Omega_0 \times ({}^A\Omega_0 \times {}^A\hat{r}_i) + {}^A\hat{v}_i)$ ③ ${}^i\Omega_0 = {}^iA_A{}^A\Omega_0$ -continued ④ $^i\Omega_i = {^i\Omega_0} + {^i\omega_i}$ ⑤ $^A\mathscr{N}_i = {^AA_i}{^i}\mathbb{I}_i{^i\dot{\omega}_i} + {^AA_i}{^i}\mathbb{I}_i{^i\Omega_0} \times {^i\omega_i} + {^AA_i}{^i\Omega_i} \times ({^i}\mathbb{I}_i{^i\Omega_i})$ ⑥ $-\sum_{i=(0,w_1,w_2,w_3)}^{l} {^A\mathscr{F}_i} \equiv {^A\mathbb{W}_f}$ ⑦ $-\sum_{i=(0,w_1,w_2,w_3)}^{l} ({^A\hat{R}_i} \times {^A\mathscr{F}_i} + {^A\mathscr{N}_i}) \equiv {^A\mathbb{W}_n}$ ⑧ $\begin{bmatrix} {^A\dot{V}_0} \\ {^A\dot{\Omega}_0} \end{bmatrix} = \begin{bmatrix} {^AS_{11}} & {^AS_{12}} \\ {^AS_{21}} & {^AS_{22}} \end{bmatrix}^{-1} \begin{bmatrix} {^A\mathbb{W}_f} \\ {^A\mathbb{W}_n} \end{bmatrix}$ In particular, the feed forward amount calculation section 26·1 calculates, when a wheel torque is taken as a feed forward amount, a feed forward torque, which is an aimed angular velocity, making use of the equations (A22) and (A29) given hereinabove and the algorithm AB.

In the following, in what procedure the feed forward amount calculation section 26·1 actually calculates a feed forward torque for each of the constraints described above when the wheel torque is taken as a feed forward amount (a feed forward value to be delivered to each of the momentum wheels 23·1 to 23·3 in order to keep the attitude of the satellite body at a fixed value) will be described successively.

[4]. First, the case wherein the feed forward amount calculation section 26·1 applies, upon application of the reverse dynamics for the universe described above, the constraint of 0 to the angular acceleration of the body of the spacecraft 12 will be described (in other words, the case wherein the constraint is $d\Omega_0/dt=0$).

In this instance, the feed forward amount calculation section 26·1 substitutes the constraint 0 into the angular acceleration $d\Omega_0/dt$ of the satellite body included in the right side of the generalized equation (A29) of the feed forward torque described above to calculate the following equation (A30):

$$\Theta_w = -[\dot{\Omega}_{01} \ \dot{\Omega}_{02} \ \dot{\Omega}_{03}]^{-1} \dot{\Omega}_{00} \quad (A30)$$

Further, the feed forward amount calculation section 26·1 multiplies this equation (A30) by an inertia $I_{3wi}$ in the direction of the axis of rotation of each wheel to obtain the following equation (A31) representative of a feed forward torque to be delivered to each wheel.

The feed forward torque $$\tau_w = \begin{bmatrix} I_{3w1} \ddot{\theta}_{w1} \\ I_{3w2} \ddot{\theta}_{w2} \\ I_{3w3} \ddot{\theta}_{w3} \end{bmatrix} \quad (A31)$$

inertia in the direction of the axis of rotation: $I_{3wi}$

And, the feed forward amount calculation section 26·1 repeats, after the processing described above, the algorithm AB for calculation of the acceleration and the angular acceleration of the satellite body four times based on the equation (A22), takes the inverse of a 3×3 matrix based on the equation (A30) and multiplies it by the inertia in the equation (A31) to calculate a feed forward torque under this constraint indicated by the equation (A31).

Or, the feed forward amount calculation section 26·1 places the constraint into the equation obtained by multiplying the equation (A30) by the inertia $I_{3wi}$ in advance to calculate a feed forward torque then.

[5]. Subsequently, the case wherein the feed forward amount calculation section 26·1 applies, upon application of the reverse dynamics for the universe described above, to the angular velocity of the body of the spacecraft 12 the constraint that the angular velocity and the angular acceleration of the body of the spacecraft 12 are both equal to 0 (that is, the case wherein the constraint is $\Omega_0=0$ and $d\Omega_0/dt=0$).

By the way, in this instance, the feed forward amount calculation section 26·1 substitutes 0 as a constraint into the angular velocity $\Omega_0$ of the satellite body on the right side of the equation (A12) described above to calculate the following equation (A32) which represents an angular velocity of each of the wheels under this constraint. It is to be noted that the present equation (A32) is similar to the equation (A13) given hereinabove.

$$\Theta_w = -[\Omega_{01} \ \Omega_{02} \ \Omega_{03}]^{-1} \Omega_{00} \quad (A32)$$

Further, using the equation (A25), the following equation (A33) is obtained from the equation (A32):

$$\begin{bmatrix} \dot{V}_0 \\ \dot{\Omega}_0 \end{bmatrix} = S^{-1} \begin{bmatrix} \mathbb{F}_{OUT} \\ \mathbb{N}_{OUT} \end{bmatrix} + \mathbb{G}_w^3 \ddot{\Theta}_w + \mathbb{K}_w^3 \dot{\Theta}_w + \mathbb{G}_m^l \ddot{\Theta}_m + \mathbb{K}_m^l \dot{\Theta}_m \quad (A33)$$

And, the following definition is used in the present equation (A33):

If $\Theta_m$=current value $\dot{\Theta}_m$=current value $$\Theta_w = -[\Omega_{01} \ \Omega_{02} \ \Omega_{03}]^{-1} \Omega_{00} \quad (A32)$$

then $$\begin{bmatrix} \dot{V}_0 \\ \dot{\Omega}_0 \end{bmatrix} = \begin{bmatrix} \dot{V}_{00} \\ \dot{\Omega}_{00} \end{bmatrix}$$

as a result, the equation (A33) is transformed into the equation (A34) given below:

$$\begin{bmatrix} \dot{V}_{00} \\ \dot{\Omega}_{00} \end{bmatrix} = S^{-1} \begin{bmatrix} \mathbb{F}_{OUT} \\ \mathbb{N}_{OUT} \end{bmatrix} + \mathbb{K}_w^3 \dot{\Theta}_w + \mathbb{G}_m^l \ddot{\Theta}_m + \mathbb{K}_m^l \dot{\Theta}_m \quad (A34)$$

Accordingly, the following equation (A35) is obtained.

$$\mathbb{G}_w^3 \ddot{\Theta}_w = \begin{bmatrix} \dot{V}_0 \\ \dot{\Omega}_0 \end{bmatrix} - \begin{bmatrix} \dot{V}_{00} \\ \dot{\Omega}_{00} \end{bmatrix} \quad (A35)$$

And, in order to calculate a component of $\mathbb{G}_w^3$ of the equation (A35), the following definition is used in the equation (A33). It is to be noted that also this G is merely represented in scalar representation for the convenience of illustration but should be treated similarly as in the case of the vector a described hereinabove.

If $$\begin{bmatrix} \mathbb{F}_{OUT} \\ \mathbb{N}_{OUT} \end{bmatrix} = 0, \dot{\Theta}_w = 0, \ddot{\Theta}_m = \dot{\Theta}_m = 0, \ddot{\Theta}_w = e_i$$

$(i = 1, 2, 3)$ then $$\begin{bmatrix} \dot{V}_0 \\ \dot{\Omega}_0 \end{bmatrix} = \begin{bmatrix} \dot{V}_{0i} \\ \dot{\Omega}_{0i} \end{bmatrix}$$

Then, the following equation (A36) is obtained:

$$\mathbb{G}_w^3 = \begin{bmatrix} \dot{V}_{01} & \dot{V}_{02} & \dot{V}_{03} \\ \dot{\Omega}_{01} & \dot{\Omega}_{02} & \dot{\Omega}_{03} \end{bmatrix} \quad (A36)$$

From such equations (A35) and (A36) as given hereinabove, the following equation (A37) is obtained:

$$\Theta_w = [\dot{\Omega}_{01} \ \dot{\Omega}_{02} \ \dot{\Omega}_{03}]^{-1} (\dot{\Omega}_0 - \dot{\Omega}_{00}) \quad (A37)$$

Here, if another constraint of the angular acceleration of the satellite body $d\Omega_0/dt=0$ is applied, then the equation (A37) can be rewritten into the following equation (A38):

$$\ddot{\Theta}_w = -[\dot{\Omega}_{01} \ \dot{\Omega}_{02} \ \dot{\Omega}_{03}]^{-1} \dot{\Omega}_{00} \quad (A38)$$

In particular, a value obtained by multiplying the present equation (A38) by the inertia $I_{3wi}$ in the direction of the axis of rotation of each wheel is a feed forward torque to be delivered to each wheel. This is given by the following equation (A39):

Feed forward torque $$\mathbf{T}_w = \begin{bmatrix} I_{3w1} \ \ddot{\theta}_{w1} \\ I_{3w2} \ \ddot{\theta}_{w2} \\ I_{3w3} \ \ddot{\theta}_{w3} \end{bmatrix} \quad (A39)$$

In particular, the feed forward amount calculation section 26·1 repeats, when the angular velocity $\Omega_0$ and the angular acceleration $d\Omega_0/dt$ of the constraint are both equal to zero, the algorithm AA for calculation of the velocity and the angular velocity four times based on the equation (A8) to calculate a feed forward torque, and calculates the left side of the equation (A32) using the equation (A13).

And further, the feed forward amount calculation section 26·1 repeats the algorithm AB for calculation of the acceleration and the angular acceleration four times based on the equation (A22) using a value obtained based on the equation (A32), takes an inverse 3×3 matrix based on the equation (A38) and multiplies the equation (A39) by the inertia to calculate a feed forward torque.

[6]. Meanwhile, the case wherein the feed forward amount calculation section 26·1 applies, upon application of the reverse dynamics for the universe described above, to the angular velocity of the body of the spacecraft 12 the constraint that the angular velocity of the body of the spacecraft 12 is a constant and the angular acceleration is 0 (that is, the case wherein the constraint is $\Omega_0 = C$ (constant) and $d\Omega_0/dt = 0$).

In this instance, a feed forward torque can be calculated in a similar manner as in the case of [5] described above (the constraint is $\Omega_0 = 0$ and $d\Omega_0/dt = 0$) only by changing the constraint, but for an angular velocity of a wheel, the equation (A14) of [2] above is used in place of the equation (A32).

In particular, the feed forward amount calculation section 26·1 calculates, in the case of the constraint that the angular velocity is equal to the constant C and the angular acceleration is 0, a feed forward torque in a similar manner as in the case of [5] using the equations given hereinabove.

[7]. Subsequently, the case wherein the feed forward amount calculation section 26·1 applies, upon application of the reverse dynamics for the universe described above, to the angular velocity of the body of the spacecraft 12 the constraint that the angular acceleration of the body of the spacecraft 12 is an arbitrary function of the time t (that is, the case wherein the constraint is $d\Omega_0/dt = du(t)/dt$ (u: given of t).

In this instance, the feed forward amount calculation section 26·1 calculates a feed forward torque using the following equation (A40) which is obtained by applying u(t) as a constraint to the angular acceleration of the satellite body in the equation (A29) used in the case of [4] described above.

$$\Theta_w = [\dot{\Omega}_{01} \ \dot{\Omega}_{02} \ \dot{\Omega}_{03}]^{-1} (\dot{u}(t) - \dot{\Omega}_{00}) \quad (40)$$

In particular, the feed forward amount calculation section 26·1 calculates, in the case of the constraint that the angular acceleration is an arbitrary function of the time, a feed forward torque in a similar manner as in the case of [4] except only that the equation (A40) is used in place of the equation (A30) of [4] described above.

[8] And then, the case wherein the feed forward amount calculation section 26·1 applies, upon application of the reverse dynamics for the universe described above, to the angular velocity of the body of the spacecraft 12 the constraint that the acceleration and the angular acceleration of the body of the spacecraft 12 are individually arbitrary functions of the time will be described (that is, the case wherein the constraint is $\Omega_0 = u(t)$ and $d\Omega_0/dt = du(t)/dt$).

In this instance, several equations for calculation of a feed forward torque are obtained based on a similar principle to that of the case of [5] described above. However, due to the constraint of ([8]) then, the equation (A15) of [3] described hereinabove is adopted for an angular velocity of a wheel in place of the equation (A32) of [5].

Further, together with this, the following equation (A41) is adopted in place of the equation (A38) in the equation (A37) of [5].

$$\Theta_w = [\dot{\Omega}_{01} \ \dot{\Omega}_{02} \ \dot{\Omega}_{03}]^{-1} (\dot{u}(t) - \dot{\Omega}_{00}) \quad (41)$$

In particular, the feed forward amount calculation section 26·1 performs similar processing as in the case of [5] using the equations obtained based on the principle described above to calculate a feed forward torque.

The foregoing describes the technique of calculating a feed forward torque for each constraint by the feed forward amount calculation section 26·1 when a wheel torque is taken as a feed forward amount.

By the way, the feed forward amount calculation section 26·1 further can truncate (truncate), when it is to calculate a feed forward angular velocity or a feed forward torque, in order to reduce the number of calculations, the degree of freedom of a wheel to set the degree of freedom of the entire system to a sum of the articulation number L of the manipulators 11 and the 6 degree of freedom of the position and posture of the body of the spacecraft 12, that is, to the L+6 degree of freedom.

[9] In the following, details of a calculation method for a feed forward term when the degree of freedom of a wheel is truncated in [1] to [8] will be described successively for the individual conditions [refer to 1) to 6) below].

1) Description of the case wherein a wheel angular velocity is adopted as a feed forward term (corresponding to [1], [2] and [3] described hereinabove).

In this instance, since the degree of freedom of a wheel is truncated, the laws of conservation of momentum/angular momentum are given by the following equation (A42) in place of the equation (A8):

$$\begin{bmatrix} V_0 \\ \Omega_0 \end{bmatrix} = S^{-1} \begin{bmatrix} Q \\ L \end{bmatrix} + H_m{}' \dot{\Theta}_m \quad (A42)$$

Meanwhile, the sum total (Summation) regarding the satellite body and the momentum wheels 23·1, 23·2 and 23·3 in the case of i=0 in the definition of S described hereinabove is only provided from the body while the momentum wheel portions are omitted.

And, from the present equation (A42), the angular momentum $L_B$ (also this L is represented in scalar representation for the convenience of representation and should be treated similarly as in the case of a described above) flowing to the body is given by the following equation (A43):

$$\mathbb{L}_B = \mathbb{I}_0 \, \Omega_0 \equiv \begin{bmatrix} L_{B1} \\ L_{B2} \\ L_{B3} \end{bmatrix} \quad (A43)$$

The angular momentum a wheel should have [refer to the following equation (A44)] is made coincide with the equation (A43). When the wheel arrangement is particularly set to the three-axis perpendicular type, the following equation (A45) is obtained.

$$(\text{angular momentum}) = \sum_{i=1}^{3} \mathbb{I}_{wi} \, \omega_{wi} \quad (A44)$$

$$\begin{cases} I_{w1}\theta_{w1} = L_{B1} \\ I_{w1}\theta_{w2} = L_{B2} \\ I_{w1}\theta_{w3} = L_{B3} \end{cases} \quad (A45)$$

As a result, an aimed angular velocity of each wheel given by the following equation is determined from the equation (A45) above.

(aimed angular velocity of wheel)=$\Theta_{w\,ref}$.

Figure 33:
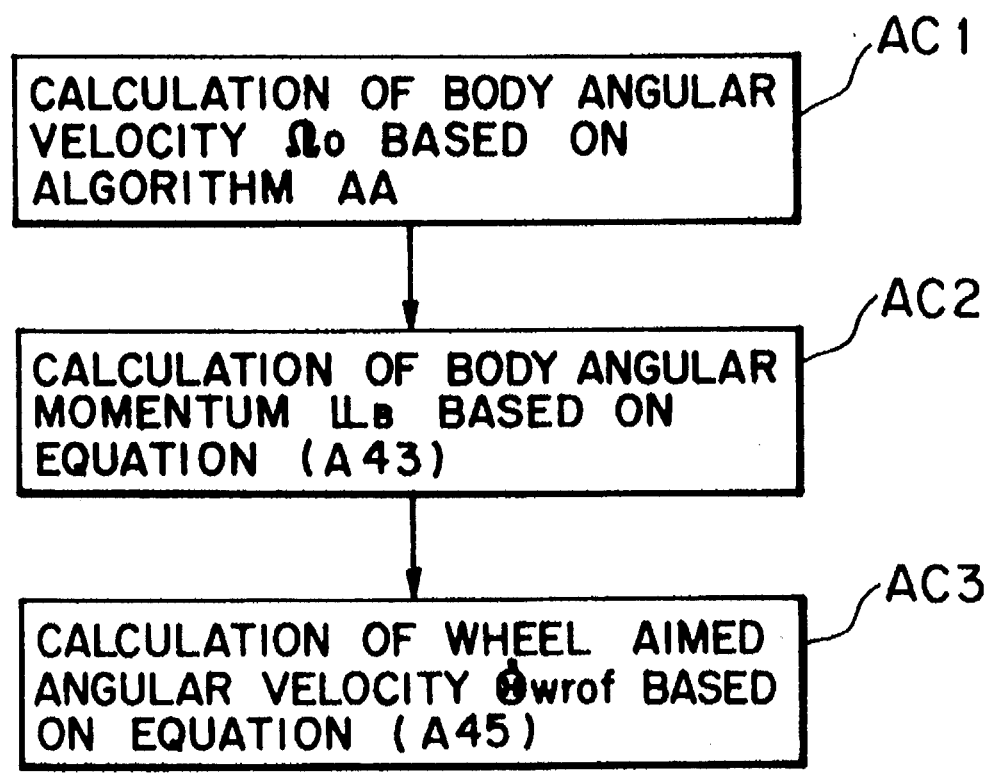
FIG. 33 is a view illustrating an algorithm AC in the second embodiment of the present invention.

From the foregoing, an algorithm AC for calculation of a feed forward wheel angular velocity when the degree of freedom of a wheel is truncated is arranged in such a manner as illustrated in FIG. 33.

In particular, the present algorithm AC is constructed such that calculation of the angular velocity of the body based on the algorithm AA is performed (step AC1) and then calculation of the angular momentum of the body based on the equation (A43) is performed (step AC2), whereafter calculation of an aimed angular velocity of the wheel based on the equation (A45) is performed (step AC3).

2)-1. Description of the case wherein a wheel torque is adopted as a feed forward term and the constraint that the angular acceleration of the body is zero is applied (corresponding to [4] above).

When the degree of freedom of a wheel is truncated, a disturbance force and a disturbance torque acting upon the satellite body are calculated in the following manner.

Figure 23:
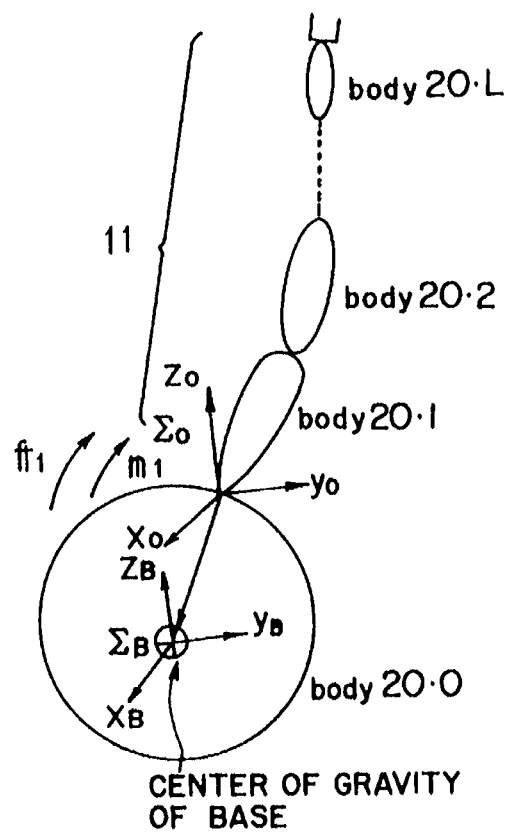
FIG. 23 is a diagrammatic view illustrating a disturbance provided to a base in the second embodiment of the present invention.

In particular, where a manipulator 1 and a base 13 are defined as illustrated in FIG. 23, if the manipulator 1 is driven, the following internal force $f_1$ and internal torque $n_1$ act from the base upon the manipulator 1, and as reactions to them, the following internal force $-f_1$ and internal torque $-n_1$ act from the manipulator 1 upon the base 13 (also those f and n are represented in scalar representation for the convenience of representation but should be treated similarly as in the case of a described hereinabove).

If the internal force $-f_1$ and the internal torque $-n_1$ are converted around the center of gravity of the base, then the disturbance force $f_D$ and the disturbance torque $\tau_D$ applied to the base are given by the following equations (A46) and (A47) (also this $\tau$ is represented in scalar representation but should be treated similarly as in the case of the vector a described hereinabove).

$$\begin{cases} \mathbf{f}_D = -\mathbf{f}_i \\ \boldsymbol{\tau}_D = -\mathbf{n}_i + \mathbf{r}_0 \times \mathbf{f}_i \end{cases} \quad (A46) \\ (A47)$$

From the foregoing discussion, in order to calculate a disturbance torque (the value is set as a feed forward torque of a wheel), the internal torque $n_i$ to act upon each articulation should be calculated. A most popular technique of calculating the internal torque $n_1$ is general purpose reverse dynamics for the universe illustrated in FIG. 34.

The general purpose reverse dynamics for the universe is constructed such that, after initial value setting (step Aa1) is performed first, normal order repetitive calculation (step Aa2) is performed, and then calculation of the base velocity and angular velocity (step Aa3), calculation of the base acceleration and angular acceleration (step Aa4) and reverse order repetitive calculation (step Aa5) are performed.

Figure 34:
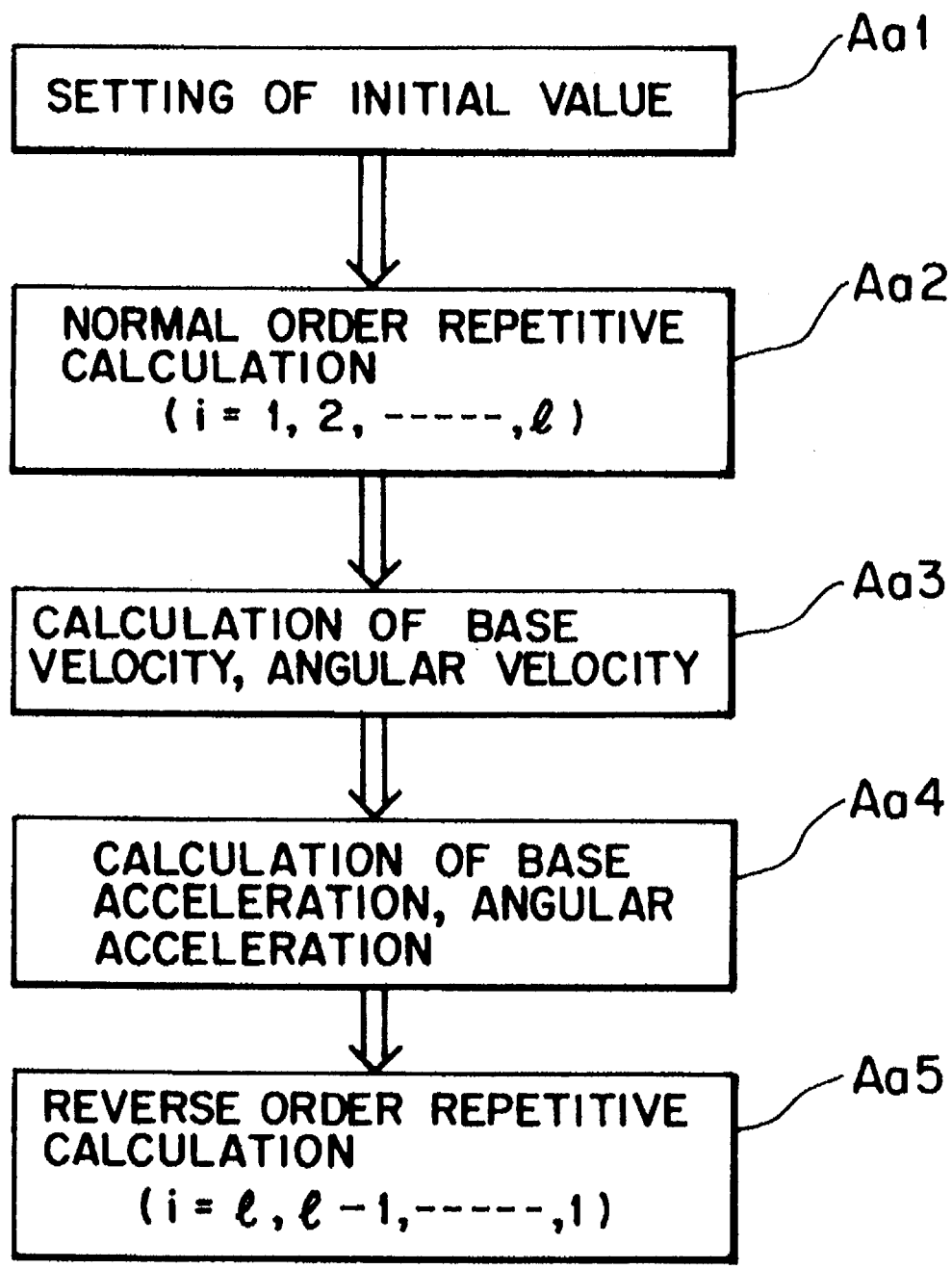
FIG. 34 is a view illustrating general-purpose reverse dynamics for the universe of the second embodiment of the present invention.

Here, description of construction of each calculation illustrated in FIG. 34 will be provided.

In particular, the initial value setting (step Aa1) is constructed from the following calculations:

$I_{t=0}$; given $\theta$; $I_{t=0}$; given ($i = 1 \sim l$)

$\omega_0 = \omega_0' = 0$, $\ \omega_0 = \omega_0' = 0$, $\ \omega_0 = \omega_0' = 0$ $^{i-1}\hat{r}_{i-1} = (0, 0, 1)^T$ ; given, calculation of ((A6))
calculation of ((A7))

Meanwhile, the normal order repetitive calculation (step Aa2) is constructed from the following calculations:

① $^i\omega_i = \begin{cases} ^iA_{i-1}(^{i-1}\omega_{i-1} + \dot{\theta}_i\,^{i-1}Z_{i-1}) & \text{for } R \\ ^iA_{i-1}\,^{i-1}\omega_{i-1} & \text{for } T \end{cases}$ ② $^i\dot{\omega}_i = \begin{cases} ^iA_{i-1}(^{i-1}\dot{\omega}_{i-1}' + \ddot{\theta}_i\,^{i-1}Z_{i-1} + \\ \quad \dot{\theta}_i\,^{i-1}\omega_{i-1} \times\,^{i-1}Z_{i-1}) & \text{for } R \\ ^iA_{i-1}\,^{i-1}\dot{\omega}_{i-1}' & \text{for } T \end{cases}$ ③ $^iv_i = \begin{cases} ^i\omega_i \times\,^i l_i +\,^iA_{i-1}\,^{i-1}v_{i-1} & \text{for } R \\ ^i\omega_i \times\,^i l_i +\,^iA_{i-1}(\dot{d}_i\,^{i-1}Z_{i-1} +\,^{i-1}v_{i-1}) & \text{for } T \end{cases}$ ④ $^iv_i' =\,^iv_i +\,^i\omega_i \times\,^i\hat{r}_i{}^*$ ⑤ $^i\dot{v}_i = \begin{cases} ^i\dot{\omega}_i \times\,^i l_i +\,^i\omega_i \times (^i\omega_i \times\,^i l_i) +\,^iA_{i-1}\,^{i-1}\dot{v}_{i-1}' & \text{for } R \\ ^iA_{i-1}(\ddot{d}_i\,^{i-1}Z_{i-1} +\,^{i-1}\dot{v}_{i-1}') +\,^i\dot{\omega}_i \times\,^i l_i + \\ \quad 2\dot{d}_i\,^i\omega_i \times (^iA_{i-1}\,^{i-1}Z_{i-1}) +\,^i\omega_i \times (^i\omega_i \times\,^i l_i) & \text{for } T \end{cases}$ ⑥ $^i\dot{v}_i' =\,^i\dot{v}_i +\,^i\dot{\omega}_i \times\,^i\hat{r}_i{}^* +\,^i\omega_i \times (^i\omega_i \times\,^i\hat{r}_i{}^*)$ ⑦ $^i\hat{r}_i =\,^i\hat{r}_i{}^* +\,^i l_i -\,^iA_{i-1}\,^{i-1}\hat{r}_{i-1}{}^* +\,^iA_{i-1}\,^{i-1}\hat{r}_{i-1}$ ⑧ $^A\mathbb{A}_i =\,^A\mathbb{A}_{i-1}\,^{i-1}A_i$ ⑨ $^A\hat{r}_i =\,^A\mathbb{A}_i\,^i\hat{r}_i$ ⑩ $^A\hat{R}_i =\,^A\hat{r}_i - (1/M) \times \sum_{i=0}^{l} m_i\,^A\hat{r}_i + (^A\mathbb{Q}_i + \mathbb{C})/M$ Further, the calculation of the base velocity and angular velocity (step Aa3) is constructed from the following calculations:

① Calculation of $^AS_{12}$

② Calculation of $^AS_{21}$

③ $^A\mathbb{I}_i =\,^A\mathbb{A}_i\,^i\mathbb{I}_i\,^iA_A$

④ $^AS_{22} = \sum_{i=0}^{l} \{^A\mathbb{A}_i\,^i\mathbb{I}_i\,^iA_A - m_i\,^A\hat{R}_i\,^A\hat{r}_i\}$ -continued ⑤ $^A\mathbb{h}_v = {^A}\mathbb{Q} - \sum_{i=0}^{l} m_i {^A}\hat{\mathbf{v}}_i$ ⑥ $^A\mathbb{h}_w = {^A}\mathbb{L} - \sum_{i=0}^{l}(m_i {^A}\hat{\mathbb{R}}_i \times {^A}\hat{\mathbf{v}}_i + {^A}A_i {^i}\mathbb{I}_i {^{i}}\omega_i)$ ⑦ $\begin{bmatrix} {^A}\mathbb{V}_0 \\ {^A}\mathbb{Q}_0 \end{bmatrix} = \begin{bmatrix} {^A}S_{11} & {^A}S_{12} \\ {^A}S_{21} & {^A}S_{22} \end{bmatrix}^{-1} \begin{bmatrix} {^A}\mathbb{h}_v \\ {^A}\mathbb{h}_w \end{bmatrix}$ And, the calculation of the base acceleration and angular acceleration (step Aa4) is constructed from the following calculations:

① ${^A}\hat{\mathbf{v}}_i = {^A}A_i {^i}\hat{\mathbf{v}}_i$

Figure 35:
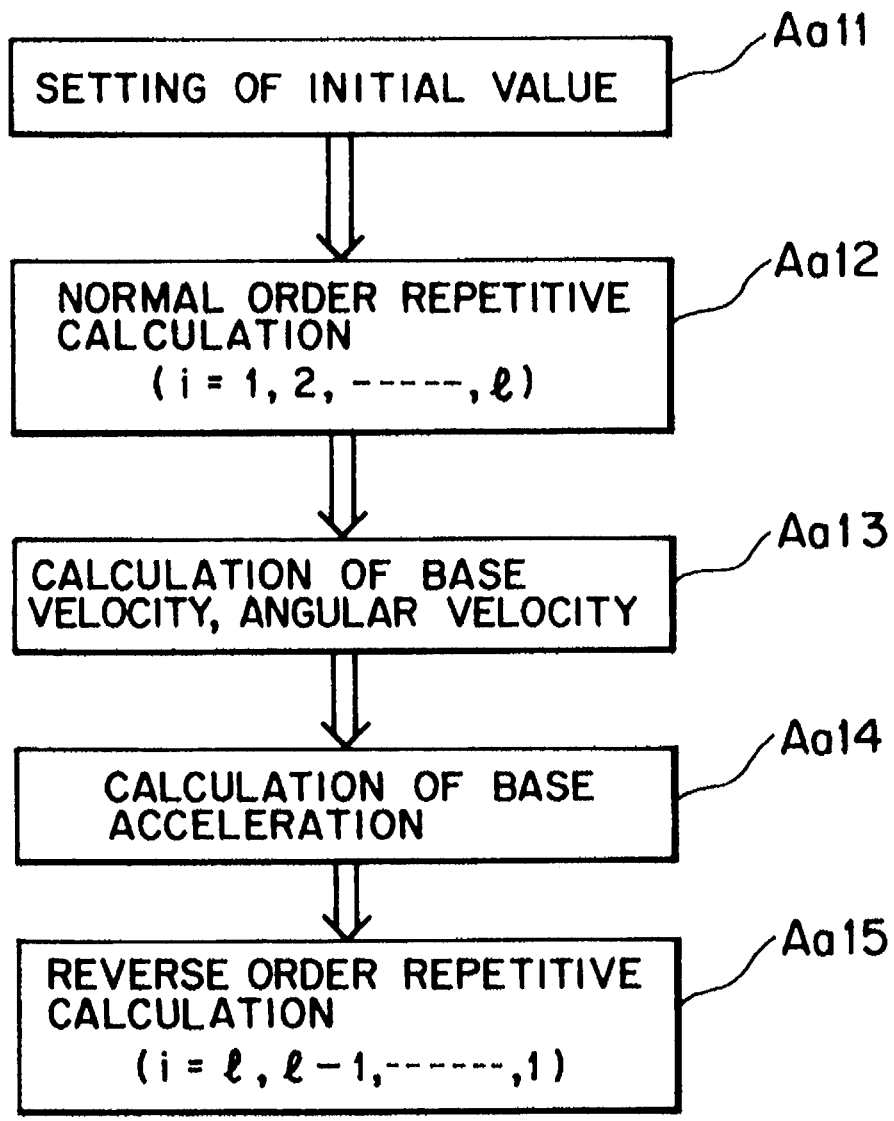
FIG. 35 is a view illustrating binding reverse dynamics for the universe of the second embodiment of the present invention.

② ${^A}\mathscr{F}_i = m_i(2 {^A}\Omega_0 \times {^A}\hat{\mathbf{v}}_i + {^A}\Omega_0 \times ({^A}\Omega_0 \times {^A}\hat{\mathbf{r}}_i) + {^A}\hat{\mathbf{v}}_i)$ ③ ${^i}\Omega_0 = {^i}A_A {^A}\Omega_0$ ④ ${^i}\Omega_i = {^i}\Omega_0 + {^i}\omega_i$ ⑤ ${^A}\mathscr{N}_i = {^A}A_i {^i}\mathbb{I}_i {^i}\dot{\omega}_i + {^A}A_i {^i}\mathbb{I}_i {^i}\Omega_0 \times {^i}\omega_i + {^A}A_i {^i}\Omega_i \times ({^i}\mathbb{I}_i {^i}\Omega_i)$ ⑥ $-\sum_{i=0}^{l} {^A}\mathscr{F}_i = {^A}\mathbb{W}_f$ ⑦ $-\sum_{i=0}^{l} ({^A}\hat{\mathbb{R}}_i \times {^A}\mathscr{F}_i + {^A}\mathscr{N}_i) = {^A}\mathbb{W}_n$ ⑧ $\begin{bmatrix} {^A}\dot{\mathbb{V}}_0 \\ {^A}\dot{\Omega}_0 \end{bmatrix} = \begin{bmatrix} {^A}S_{11} & {^A}S_{12} \\ {^A}S_{21} & {^A}S_{22} \end{bmatrix}^{-1} \begin{bmatrix} {^A}\mathbb{W}_f \\ {^A}\mathbb{W}_n \end{bmatrix}$ Furthermore, the reverse order repetitive calculation (step Aa5) is constructed from the following calculations:

① ${^{i+1}}\mathbf{f}_{i+1} = \mathbf{F}_{OUT}$: external force applied to the fingers ② ${^{i+1}}\mathbf{n}_{i+1} = \mathbf{N}_{OUT}$: external torque applied to the fingers ③ ${^i}\mathbf{F}_i = m_i({^i}A_A {^A}\dot{\mathbb{V}}_0 + {^i}A_A {^A}\dot{\Omega}_0 \times {^i}\hat{\mathbf{r}}_i) + {^i}A_A {^A}\mathscr{F}_i$ ④ ${^i}\mathbf{N}_i = {^i}\mathbb{I}_i {^i}A_A {^A}\dot{\Omega}_0 + {^i}A_A {^A}\mathscr{N}_i$ ⑤ ${^i}\mathbf{f}_i = {^i}A_{i+1} {^{i+1}}\mathbf{f}_{i+1} + {^i}\mathbf{F}_i$ ⑥ ${^i}\mathbf{n}_i = {^i}A_{i+1} {^{i+1}}\mathbf{n}_{i+1} + {^i}\mathbb{I}_i \times ({^i}A_{i+1} {^{i+1}}\mathbf{f}_{i+1}) + ({^i}\mathbb{I}_i + {^i}\hat{\mathbf{r}}_i{^*}) \times {^i}\mathbf{F}_i + {^i}\mathbf{N}_i$ ⑦ $\tau_i = \begin{cases} ({^i}A_{i-1} {^{i-1}}\mathbb{Z}_{i-1})^T \cdot {^i}\mathbf{n}_i + \gamma_i \dot{\theta}_i & \text{for } R \\ ({^i}A_{i-1} {^{i-1}}\mathbb{Z}_{i-1})^T \cdot {^i}\mathbf{f}_i + \gamma_i \dot{d}_i & \text{for } T \end{cases}$ It is to be noted that the following definitions are employed in the calculations of the general purpose reverse dynamics for the universe:

$A_{i+1} = \begin{bmatrix} \cos\theta_{i+1} & -\sin\theta_{i+1}\cos\alpha_{i+1} & \sin\theta_{i+1}\sin\alpha_{i+1} \\ \sin\theta_{i+1} & \cos\theta_{i+1}\cos\alpha_{i+1} & -\cos\theta_{i+1}\sin\alpha_{i+1} \\ 0 & \sin\alpha_{i+1} & \cos\alpha_{i+1} \end{bmatrix}$ ${^i}A_{i-1} = \begin{bmatrix} \cos\theta_i & \sin\theta_i & 0 \\ -\sin\theta_i\cos\alpha_i & \cos\theta_i\cos\alpha_i & \sin\alpha_i \\ \sin\theta_i\sin\alpha_i & -\cos\theta_i\sin\alpha_i & \cos\alpha_i \end{bmatrix}$ ${^i}\mathbb{I}_i = \begin{bmatrix} b_i \\ d_i \sin\alpha_i \\ d_i \cos\alpha_i \end{bmatrix}$ And, when 0 is applied as the constraint of [4], that is, as the angular acceleration of the body as in the present example, such binding reverse dynamics for the universe based on the angular acceleration $d\Omega_0/dt=0$ as illustrated in FIG. 35 is employed.

The binding reverse dynamics for the universe based on the angular acceleration $d\Omega_0/dt=0$ is constructed from setting of an initial value (step Aa1'), normal order repetitive calculation (step Aa2'), calculation of the base velocity and angular velocity (step Aa3'), calculation of the base acceleration (step Aa4') and reverse order repetitive calculation (step Aa5').

And, in the binding reverse dynamics for the universe based on the angular acceleration $d\Omega_0/dt=0$, the calculation (step Aa4) of the base acceleration and angular acceleration in the general purpose reverse dynamics for the universe is replaced by the calculation (step Aa4') of the base acceleration, and the other steps Aa1', a2', a3' and a5' are similar to them.

Here, the calculation of the base acceleration (step Aa4') illustrated in FIG. 35 has such constructions as given below.

① ${^A}\hat{\mathbf{v}}_i = {^A}A_i {^i}\hat{\mathbf{v}}_i$

② ${^A}\mathscr{F}_i = m_i(2 {^A}\Omega_0 \times {^A}\hat{\mathbf{v}}_i + {^A}\Omega_0 \times ({^A}\Omega_0 \times {^A}\hat{\mathbf{r}}_i) + {^A}\hat{\mathbf{v}}_i)$ ③ ${^A}\dot{\mathbb{V}}_0 = -(1/M)\sum_{i=0}^{l} {^A}\mathscr{F}_i$ ④ $\dot{\Omega}_0 = 0$ In summary, the feed forward amount calculation section 26·1 truncates the degree of freedom of a wheel, calculates, when a wheel torque is adopted for a feed forward term and 0 is applied as an angular acceleration of the body as in [4], the internal force $f_1$ and the internal torque m using the binding reverse dynamics for the universe based on the angular acceleration $d\Omega_0/dt=0$, and calculates a wheel feed forward torque based on the equation (A47).

3)-2. Description of the case wherein a wheel torque is adopted for a feed forward term and 0 is applied to the angular velocity and angular acceleration of the body as a constraint (corresponding to [5]).

In this instance, since the angular velocity and the angular acceleration of the body are both equal to zero as a constraint, the general purpose reverse dynamics for the universe is simplified very much. In particular, the velocity of the body is given by the following equation (A48) from the law of conservation of momentum:

$$\mathbb{V}_0 = (1/M)\left[\mathbb{Q} - \sum_{i=0}^{l} m_i \hat{\mathbf{v}}_i\right] \quad (A48)$$

Consequently, by differentiating the equation (A48), the following equation (A49) is obtained for the acceleration of the body:

$$\dot{\mathbb{V}}_0 = -(1/M) \sum_{i=0}^{l} m_i \, \hat{\ddot{v}}_i \, ' \tag{A49}$$

Figure 36:
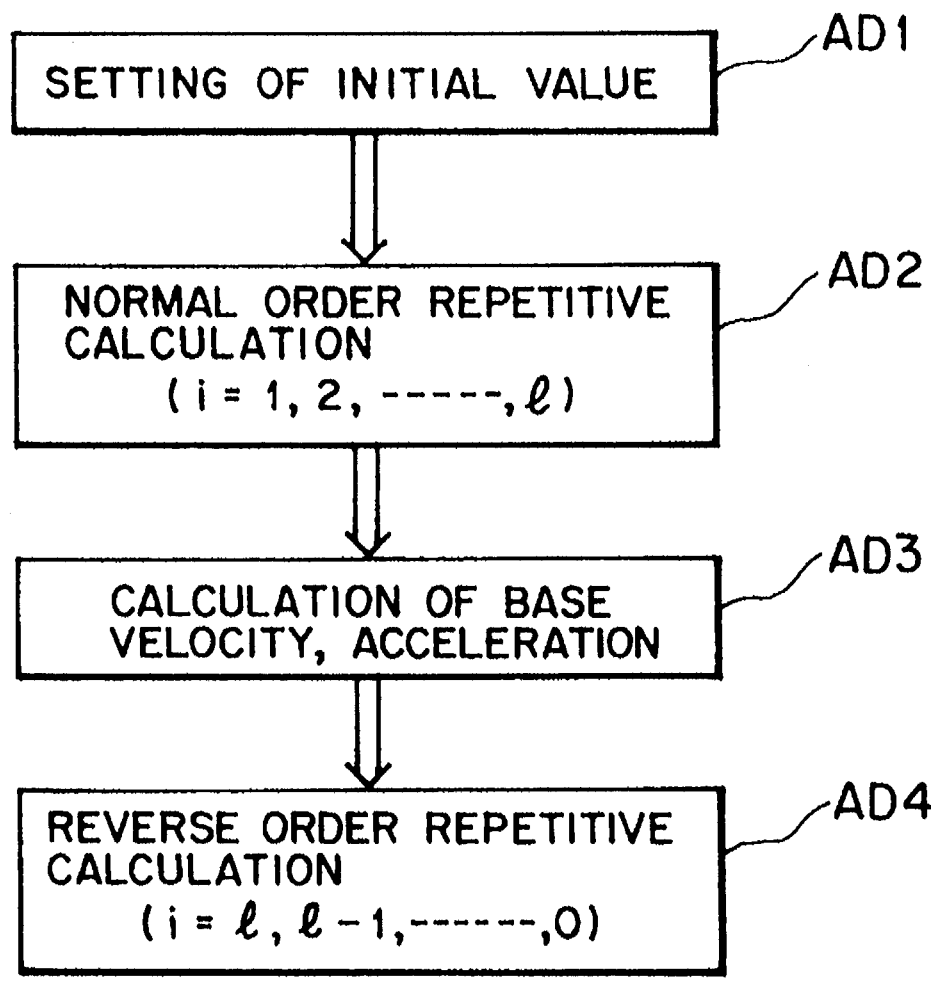
FIG. 36 is a view illustrating the binding reverse dynamics for the universe of the second embodiment of the present invention.

And, the algorithm A for calculation of an external force (the algorithm will be hereinafter referred to as algorithm AD) omits, as shown in FIG. 36, the calculation (step Aa3) of the base velocity and angular velocity of the general purpose reverse dynamics for the universe and the calculation (step Aa4) of the base acceleration and angular acceleration.

In short, the algorithm AD in this instance is constructed such that, after initial value setting (step AD1) is performed similarly as in the case of the general purpose reverse dynamics for the universe, normal order repetitive calculation (step AD2) is performed.

Thereafter, the present algorithm AD performs calculation (step AD3) of the base velocity and acceleration and then performs reverse order repetitive calculation (step AD4).

Here, the calculations illustrated in FIG. 36 have such constructions as described below.

In particular, the initial value setting (step AD1) is constructed from the following calculations:

$l_{t=0}$; given $\theta; l_{t=0}$; given ($i = 1 \sim l$)

$\omega_0 = \omega_0' = 0, \quad \dot{\omega}_0 = \dot{\omega}_0' = 0, \quad v_0 = v_0' = 0$ $^{i-1}z_{i-1} = (0, 0, 1)^T$ ; given, calculation of ((A6))
calculation of ((A7))

Meanwhile, the normal order repetitive calculation (step AD2) is constructed from the following calculations:

① $^i\omega_i = \begin{cases} ^iA_{i-1}(^{i-1}\omega_{i-1} + \dot{\theta}_i \, ^{i-1}Z_{i-1}) & \text{for } R \\ ^iA_{i-1} \, ^{i-1}\omega_{i-1} & \text{for } T \end{cases}$ ② $^i\dot{\omega}_i = \begin{cases} ^iA_{i-1}(^{i-1}\dot{\omega}_{i-1} + \ddot{\theta}_i \, ^{i-1}Z_{i-1} + \\ \dot{\theta}_i \, ^{i-1}\omega_{i-1} \times ^{i-1}Z_{i-1}) & \text{for } R \\ ^iA_{i-1} \, ^{i-1}\dot{\omega}_{i-1} \, ' & \text{for } T \end{cases}$ ③ $^iv_i = \begin{cases} ^i\omega_i \times ^il_i + ^iA_{i-1} \, ^{i-1}v_{i-1} & \text{for } R \\ ^i\omega_i \times ^il_i + ^iA_{i-1}(\dot{d}_i \, ^{i-1}Z_{i-1} + ^{i-1}v_{i-1}) & \text{for } T \end{cases}$ ④ $^i\hat{v}_i = ^iv_i + ^i\omega_i \times ^i\hat{r}_i^*$ ⑤ $^i\dot{v}_i = \begin{cases} ^i\omega_i \times ^il_i + ^i\omega_i \times (^i\omega_i \times ^il_i) + ^iA_{i-1} \, ^{i-1}\dot{v}_{i-1}\,' & \text{for } R \\ ^iA_{i-1}(\ddot{d}_i \, ^{i-1}Z_{i-1} + ^{i-1}\dot{v}_{i-1}\,') + ^i\dot{\omega}_i \times ^il_i + \\ 2\dot{d}_i \, ^i\omega_i \times (^iA_{i-1} \, ^{i-1}Z_{i-1}) + ^i\omega_i \times (^i\omega_i \times ^il_i) & \text{for } T \end{cases}$ ⑥ $^i\hat{\dot{v}}_i = ^i\dot{v}_i + ^i\omega_i \times ^i\hat{r}_i^* + ^i\omega_i \times (^i\omega_i \times ^i\hat{r}_i^*)$ ⑦ $^i\hat{r}_i = ^i\hat{r}_i + ^il_i - ^iA_{i-1} \, ^{i-1}l_{i-1}^* + ^iA_{i-1} \, ^{i-1}\hat{r}_{i-1}$ ⑧ $^AA_i = ^AA_{i-1} \, ^{i-1}A_i$ ⑨ $^A\hat{r}_i = ^AA_i \, ^i\hat{r}_i$ ⑩ $^A\hat{R}_i = ^A\hat{r}_i - (1/M) \times \sum_{i=(l,w_1,w_2,w_3)}^{l} ^A\hat{r}_i + (^AQ_l + C)/M$ Further, the calculation of the base velocity and acceleration (step AD3) is constructed from the following calculations:

① $^A\mathbb{V}_0 = (1/M) \left[ ^AQ - \sum_{i=0}^{l} m_i \, ^A\hat{\ddot{v}}_i \right]$ ② $^A\mathcal{F}_i = m_i \, ^A\hat{\ddot{v}}_i \, '$ ③ $^A\dot{\mathbb{V}}_0 = -(1/M) \sum_{i=0}^{l} \, ^A\mathcal{F}_i$ And, the reverse order repetitive calculation (step AD4) is constructed from the following calculations:

① $^{l+1}f_{l+1} = F_{OUT}$ : external force applied to the fingers

② $^{l+1}n_{l+1} = N_{OUT}$ : external torque applied to the fingers

③ $^iF_i = m_i \, ^iA_A \, ^A\dot{\mathbb{V}}_0 + ^iA_A \, ^A\mathcal{F}_i$

④ $^iN_i = ^iI_i \, ^i\dot{\omega}_i + ^i\Omega_i \times (^iI_i \, ^i\Omega_i)$

⑤ $^if_i = ^iA_{i+1} \, ^{i+1}f_{i+1} + ^iF_i$

⑥ $^in_i = ^iA_{i+1} \, ^{i+1}n_{i+1} + ^il_i \times (^iA_{i+1} \, ^{i+1}f_{i+1}) + (^il_i + ^i\hat{r}_i^*) \times ^iF_i + ^iN_i$ ⑦ $\tau_i = \begin{cases} (^iA_{i-1} \, ^{i-1}Z_{i-1})^T \cdot ^in_i + \gamma_i \dot{\theta}_i \text{ for } R \\ (^iA_{i-1} \, ^{i-1}Z_{i-1})^T \cdot ^if_i + \gamma_i \dot{d}_i \text{ for } T \end{cases}$ In particular, this is the binding reverse dynamics for the universe when the angular velocity and the angular acceleration are both equal to 0.

In summary, the feed forward amount calculation section 26-1 truncates the degree of freedom of a wheel, calculates, when a wheel torque is adopted for a feed forward term as in [5] and 0 is applied both to the angular velocity and the angular acceleration of the body, the internal force $f_1$ and the internal torque $n_1$ based on the binding reverse dynamics for the universe based on the angular velocity and the angular acceleration which are both equal to 0, and calculates the disturbance torque $\tau_D$ based on the equation (A47).

4)-3. Description of the case −3 wherein a wheel torque is adopted for a feed forward term and the constraint is applied such that the angular velocity of the body is a constant and the angular acceleration of the body is 0 (corresponding to [6] above).

In this instance, since the constraint is that the angular velocity of the body is a constant [$^AC$ (given constant)] and the angular acceleration of the body is 0, the general purpose reverse dynamics for the universe is simplified significantly. In particular, the velocity of the body is given by the following equation (A50) from the law of conservation of momentum:

$$\mathbb{V}_0 = (1/M) \left[ Q - \sum_{i=0}^{l} m_i \, \hat{v}_i - \left( \sum_{i=0}^{l} m_i \, \hat{r}_i \right) \Omega_0 \right] = \tag{A50}$$

$$(1/M) \left[ Q - \sum_{i=0}^{l} m_i \, \hat{v}_i - \left( \sum_{i=0}^{l} m_i \, \hat{r}_i \right) C_{\Omega_0} \right]$$

From this equation (A50) and the equation of the sum total of the internal forces=0, the acceleration of the body is given by the following equations (A51) and (A52):

$$\dot{V}_0 = -(1/M) \sum_{i=0}^{l} \mathscr{F}_i \quad (A51)$$

$$\begin{aligned}\mathscr{F}_i &= m_i(2\Omega_0 \times \hat{v}_i + \Omega_0 \times (\Omega_0 \times \hat{r}_i) + \hat{v}_i')  \\ &= m_i(2\mathbb{C}_{\Omega_0} \times \hat{v}_i + \mathbb{C}_{\Omega_0} \times (\mathbb{C}_{\Omega_0} \times \hat{r}_i) + \hat{v}_i')\end{aligned} \quad (A52)$$

Figure 37:
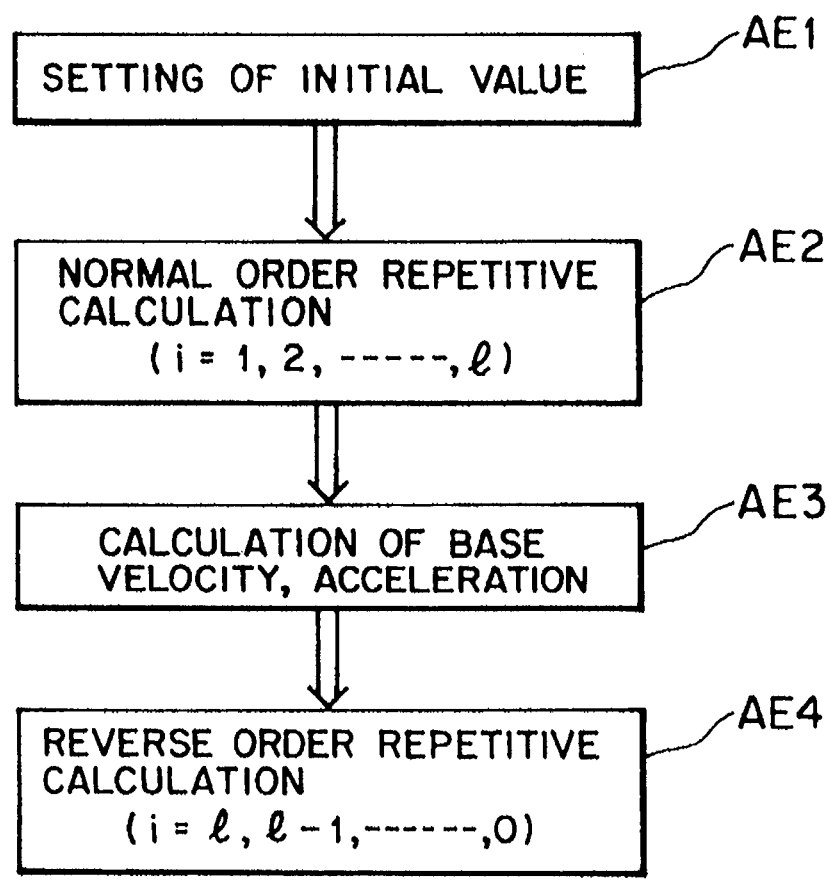
FIG. 37 is a view illustrating the binding reverse dynamics for the universe of the second embodiment of the present invention.

And, an external force in this instance can be calculated based on an algorithm AE. The algorithm AE is constructed from, as illustrated in FIG. 37, setting of an initial value (step AE1), normal order repetitive calculation (step AE2), calculation of the base velocity and acceleration (step AE3') and reverse order repetitive calculation (step AE4).

They are the steps of, in short, the algorithm AD described hereinabove, that is, the algorithm A modified such that the calculation (step AD3) of the base velocity and acceleration in the binding reverse dynamics for the universe when the angular velocity and the angular acceleration are both equal to 0 is replaced by calculation (step AE3) of the base speed and acceleration given below, and the other steps AE1, AE2 and AE4 are similar to those of the algorithm A.

① $^A V_0 = (1/M) \left[ {}^A Q - \sum_{i=0}^{l} m_i {}^A \hat{v}_i - \left( \sum_{i=0}^{l} m_i {}^A \hat{r}_i \right) {}^A \mathbb{C}_{\Omega_0} \right]$ ② $^A \mathscr{F}_i = m_i [2 {}^A \mathbb{C}_{\Omega_0} \times {}^A \hat{v}_i + {}^A \mathbb{C}_{\Omega_0} \times ({}^A \mathbb{C}_{\Omega_0} \times {}^A \hat{r}_i) + {}^A \hat{v}_i']$ ③ $^A \dot{V}_0 = -(1/M) \sum_{i=0}^{l} {}^A \mathscr{F}_i$ In particular, this is the binding reverse dynamics for the universe when the angular velocity of the body is a constant and the angular acceleration of the body is 0.

In summary, the feed forward amount calculation section 26·1 truncates the degree of freedom of a wheel and calculates, when a wheel torque is adopted for a feed forward term as in [6] and the constraint that the angular velocity of the body is a constant and the angular acceleration of the body is 0 is applied, an external force based on the binding reverse dynamics for the universe when the angular velocity of the body is a constant and the angular acceleration of the body is 0 as described above.

5)-4. Description of the case wherein a wheel torque is adopted for a feed forward term and the constraint that the angular acceleration of the body is an arbitrary function of the time is applied (corresponding to [7] described hereinabove).

In this instance, since an arbitrary function of the time is applied to the angular velocity of the body as the constraint, the calculation (step Aa4) of the base acceleration and angular acceleration in the general purpose reverse dynamics for the universe is replaced by the following calculation of the base acceleration (step Ab4):

① $^A \hat{\dot{v}}_i' = {}^A A_i {}^A \hat{v}_i'$

Figure 38:
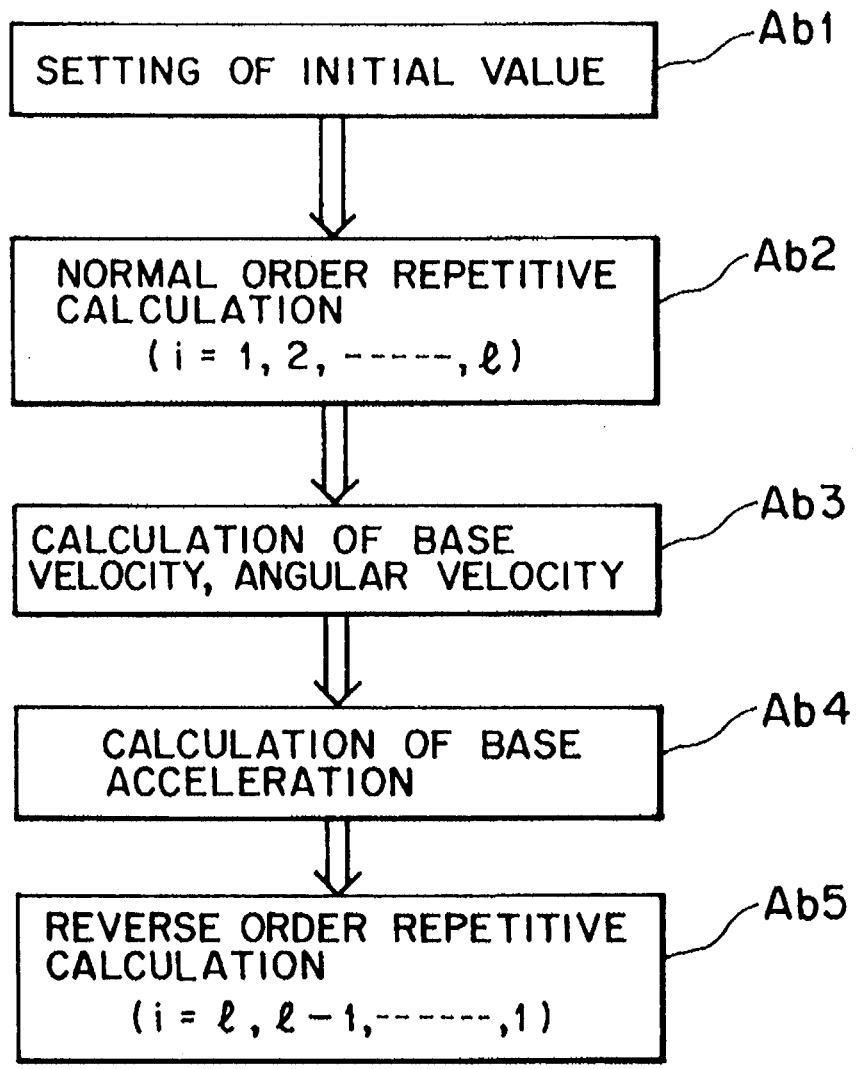
FIG. 38 is a view illustrating the binding reverse dynamics for the universe of the second embodiment of the present invention.

② $^A \mathscr{F}_i = m_i (2 {}^A \Omega_0 \times {}^A \hat{v}_i + {}^A \Omega_0 \times ({}^A \Omega_0 \times {}^A \hat{r}_i) + {}^A \hat{v}_i')$ ③ $^A \dot{V}_0 = -(1/M) \left[ \left( \sum_{i=0}^{l} m_i {}^A \hat{r}_i \right) {}^A \dot{v}(t) + \sum_{i=0}^{l} \mathscr{F}_i \right]$ As a result, such binding reverse dynamics for the universe when the angular acceleration of the body is an arbitrary function of the time as illustrated in FIG. 38 is obtained. The binding reverse dynamics for the universe is constructed from, as shown in FIG. 38, setting of an initial value (step Ab1), normal order repetitive calculation (step Ab2), calculation of the base velocity and angular velocity (step Ab3), calculation of the base acceleration (step Ab4) and reverse order repetitive calculation (step Ab5).

In short, they are those steps, as apparent also from the preceding description, of the general purpose reverse dynamics for the universe wherein the step Aa4 is replaced by the step Ab4 given above and the other steps Ab1, Ab2, Ab3 and Ab5 are similar to those of the general purpose reverse dynamics for the universe.

In summary, the feed forward amount calculation section 26·1 truncates the degree of freedom of a wheel and calculates, when a wheel torque is adopted for a feed forward term as in [7] and the constraint that the angular acceleration of the body is an arbitrary function of the time is applied, a wheel feed forward torque based on the binding reverse dynamics for the universe wherein the angular acceleration of the body described above is an arbitrary function of the time.

6)-5. Description of the case wherein a wheel torque is adopted for a feed forward term and the constraint that the angular velocity of the body and the angular acceleration of the body are both arbitrary functions of the time is applied (corresponding to [8] described above).

In this instance, since the constraint that the angular velocity of the body and the angular acceleration of the body are arbitrary functions of the time is applied, similarly to the case of 3) described above, the general purpose reverse dynamics for the universe is simplified significantly.

In particular, the velocity of the body is given by the following equation (A53) from the law of conservation of momentum:

$$\begin{aligned}V_0 &= (1/M) \left[ Q - \sum_{i=0}^{l} m_i \hat{v}_i - \left( \sum_{i=0}^{l} m_i \hat{r}_i \right) \Omega_0 \right] \\ &= (1/M) \left[ Q - \sum_{i=0}^{l} m_i \hat{v}_i - \left( \sum_{i=0}^{l} m_i \hat{r}_i \right) {}^u(t) \right]\end{aligned} \quad (A53)$$

And, the acceleration of the body is given by the following equation (A54):

$$\begin{aligned}\dot{V}_0 &= (1/M) \left[ \sum_{i=0}^{l} \mathscr{F}_i + \left( \sum_{i=0}^{l} m_i \hat{r}_i \right) \dot{\Omega}_0 \right] \\ &= (1/M) \left[ \sum_{i=0}^{l} \mathscr{F}_i + \left( \sum_{i=0}^{l} m_i \hat{r}_i \right) \dot{u}(t) \right] \\ \mathscr{F}_i &= m_i [2 \Omega_0 \times \hat{v}_i + \Omega_0 \times (\Omega_0 \times \hat{r}_i) + \hat{v}_i'] \\ &= m_i [2\, {}^u(t) \times \hat{v}_i + {}^u(t) \times ({}^u(t) \times \hat{r}_i) + \hat{v}_i']\end{aligned} \quad (A54)$$

Figure 39:
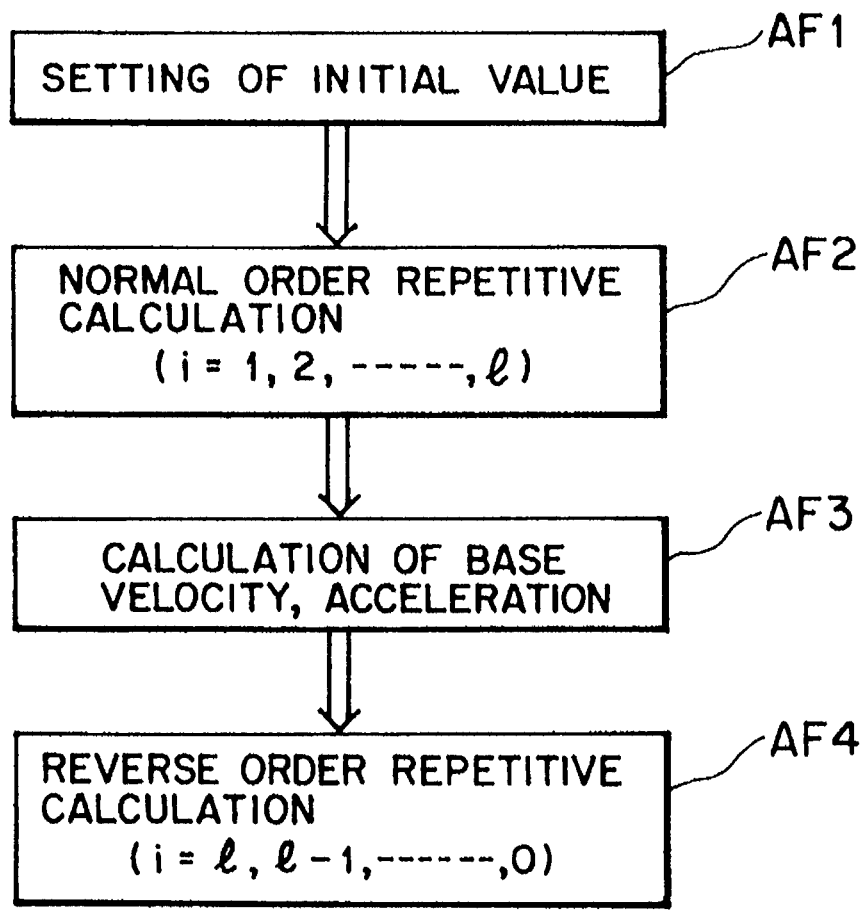
FIG. 39 is a view illustrating the binding reverse dynamics for the universe of the second embodiment of the present invention.

As a result, the algorithm for calculation of an external force (this will be hereinafter referred to as algorithm AF) is obtained by replacing the calculation (step AD3) of the base velocity and acceleration in the algorithm AD described above with the following calculation (step AF3) of the base velocity and acceleration:

① $^A V_0 = (1/M) \left[ {}^A Q - \sum_{i=0}^{l} m_i {}^A \hat{v}_i - \left( \sum_{i=0}^{l} m_i {}^A \hat{r}_i \right) {}^A {}^u(t) \right]$ ② $^A \mathscr{F}_i = m_i [2\, {}^A {}^u(t) \times {}^A \hat{v}_i + {}^A {}^u(t) \times ({}^A {}^u(t) \times {}^A \hat{r}_i) + {}^A \hat{v}_i']$ ③ $^A \dot{V}_0 = (1/M) \left[ \sum_{i=0}^{l} {}^A \mathscr{F}_i + \left( \sum_{i=0}^{l} m_i {}^A \hat{r}_i \right) {}^A \dot{u}(t) \right]$ In short, the present algorithm AF is constituted from, as illustrated in FIG. 39, initial value setting (step AF1), normal order repetitive calculation (step AF2), calculation of the base velocity and acceleration (step AF3) and reverse order repetitive calculation (step AF4).

And, as described hereinabove, the present algorithm AF is a modification to the algorithm AD described above in that the calculation of the base velocity and acceleration (step AD3) is replaced with the following calculation of the base velocity and acceleration (step AF3), and the other steps AF1, AF2 and AF4 are similar to those of the algorithm AD.

In particular, the present algorithm AF is the binding reverse dynamics for the uniform when the angular velocity of the body and the angular acceleration of the body are both arbitrary functions of the time.

In summary, the feed forward amount calculation section 26·1 truncates the degree of freedom of a wheel and calculates, when a wheel torque is adopted for a feed forward term as in [8] and the constraint that the angular velocity of the body and the angular acceleration of the body are both arbitrary functions of the time, a wheel feed forward torque based on the binding reverse dynamics for the universe wherein the angular velocity of the body and the angular acceleration of the body are both arbitrary functions of the time as described above.

The foregoing is a method of calculation of a feed forward term when the degree of freedom of a wheel is truncated in the cases of [1] to [8] by the feed forward amount calculation section 26·1.

By setting the degree of freedom of the entire system to the degree of freedom of the sum L+6 between the articulation number L of the manipulators 1 and the degree of freedom of 6 of the position and attitude of the body of the artificial satellite, that is, by truncating the degree of freedom of the momentum wheels 23·1 to 23·3, the number of calculations can be reduced remarkably, which can contribute to simplification of the construction of the apparatus and enhancement of the processing performance.

By the way, the attitude control system 24 of FIG. 21 includes the attitude control system actuator 24·1 (23, 211), the wheel control system 27 and the attitude control sensor system 24·3 and controls the attitude of the spacecraft 12 using the attitude control system actuator 24·1.

Figure 22:
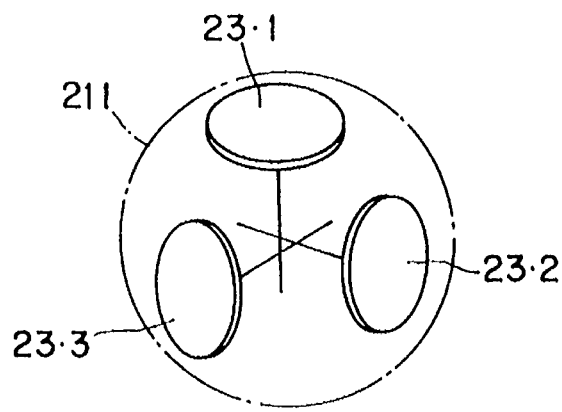
FIG. 22 is a schematic view showing the construction of three-axis momentum wheels in the second embodiment of the present invention.

The attitude control system actuator 24·1 employs a three-axis momentum wheel 211 as shown in FIG. 22, and the three-axis momentum wheel 211 is constituted from the three momentum wheels 23·1 to 23·3 disposed perpendicularly to each other around the center of gravity of the body.

In particular, the attitude control system actuator 24·1 rotates the momentum wheels 23·1 to 23·3 independently of each other in accordance with an instruction of the wheel control system 27 to directly perform attitude control of the satellite body.

Meanwhile, the attitude control sensor system 24·3 of FIG. 21 detects a variation of the attitude of the satellite, and the wheel control system 27 effects, in order to compensate for a disturbance originating from the manipulators 11, PD feedback control based on the attitude angle of the satellite body and differentiation of the attitude angle and adds the output to a feed forward output.

Or, the wheel control system 27 effects, in order to compensate for a disturbance originating from the manipulators 11, PID feedback control based on one of the attitude angle of the body of the artificial satellite, integration of the attitude angle and differentiation of the attitude angle and adds the output to a feed forward output.

To this end, the wheel control system 27 is constituted from an attitude control logic calculation section 24·4 and an adder 24·2. Here, the adder 24·2 combines, in order to compensate for a disturbance originating from the manipulators 11, a feed forward signal (an angular momentum, a wheel angular velocity or a torque, in short, feed forward control of a wheel based on [1] to [9] described above) transmitted thereto from the cooperative control system 26 and a PD or PID feedback control signal from the attitude control logic calculation section 24·4 with each other, determines the combination as an actuator control signal and converts the actuator control signal into and outputs a voltage signal.

The attitude control logic calculation section 24·4 takes the following constructions described below in accordance with individual conditions when PD feedback control based on the attitude angle of the satellite body and differentiation of the attitude angle is adopted for a feedback term of the attitude control system 24.

[10] In the following, description of the case wherein the attitude control logic calculation section 24·4 adopts PD feedback control based on the attitude angle of the satellite body and differentiation of the attitude angle for a feedback term of the attitude control system 24 in [1] to [9] described hereinabove will be described successively.

a). First, description of the cases of the PD feedback+feed forward wheel angular velocity (corresponding to [1], [2], [3] and [9]-1 described hereinabove) will be given.

Figure 24:
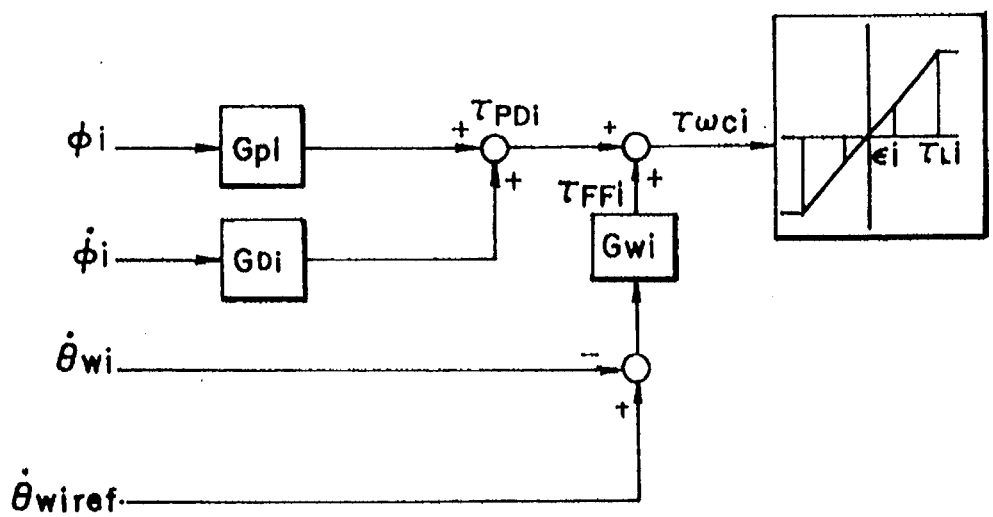
FIG. 24 is a view showing a block diagram in the second embodiment of the present invention.

In this instance, the attitude control logic calculation section 24·4 produces such a block diagram as shown in FIG. 24 for each axis. And, reference characters in FIG. 24 are such as described below:

$\phi_i$: Eulerian angle of the i axis of the body $\dot{\phi}_i$: time differentiation of the Eulerian angle of the i axis of the body $\theta_{wi}$: wheel angular velocity of around the i axis $\theta_{wi\ ref.}$: feed forward wheel angular velocity around the i axis $\tau_{PDi}$: PD feedback torque around the i axis $\tau_{FFi}$: feed forward torque around the i axis $\tau_{woi}$: control torque around the i axis $G_{Pi}$: proportional gain around the i axis $G_{Di}$: differential gain around the i axis $G_{Wi}$: wheel velocity control proportional gain around the i axis By the attitude control logic calculation section 24·4 of such construction, the Eulerian angle of the i axis of the body and the time differentiation of the Eulerian angle are processed to obtain a proportional gain and a differential gain around the i axis, respectively, and those outputs are added to each other to obtain a PD feedback torque around the i axis.

Meanwhile, an output obtained by subtracting the wheel angular velocity around the i axis from the feed forward wheel angular velocity around the i axis is used to calculate a wheel velocity control proportional gain around the i axis and outputted as a feed forward torque around the i axis.

And, the PD feedback torque and the feed forward torque around the i axis of the two outputs are added to each other, and the sum is outputted as a control torque around the i axis to the attitude,control system actuator 24·1.

b) Description of the case of the PD feedback+feed forward wheel torque (corresponding to [4], [5], [6], [7], [8] and [9]-2) to -6)).

Figure 25:
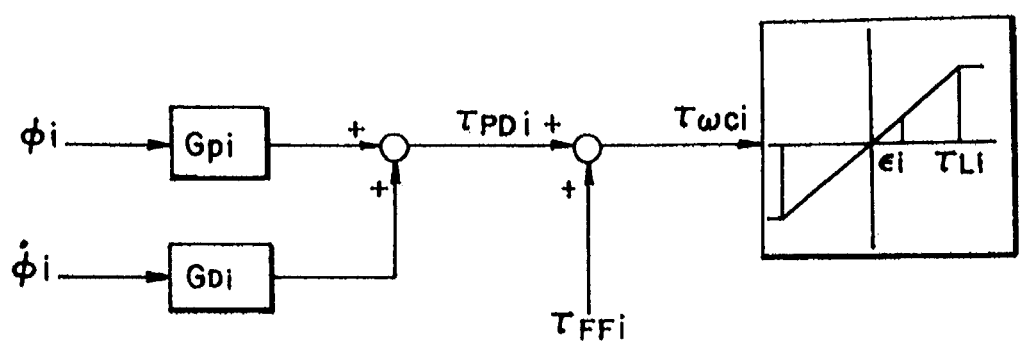
FIG. 25 is a view showing another block diagram in the second embodiment of the present invention.

In this instance, the attitude control logic calculation section 24·4 produces such a block diagram as shown in FIG. 25 for each axis. And, $\tau_{ffi}$ in FIG. 25 denotes a wheel feed forward torque around the i axis, and the other reference characters are similar to those of FIG. 24.

By the attitude control logic calculation section 24·4 of such construction, a PD feedback torque around the i axis obtained in a similar manner as in the case described hereinabove is added to a wheel feed forward torque around the i axis, and the sum is outputted as a control torque around the i axis to the attitude control system actuator 24-1.

And then, the attitude control logic calculation section 24-4 takes the construction's described below in accordance with individual conditions when PID feedback control based on the attitude angle of the satellite body, integration of the attitude angle and differentiation of the attitude angle is adopted for a feedback term of the attitude control system 24.

[11] In the following, description of the case wherein the attitude control logic calculation section 24-4 adopts PID feedback control based on the attitude angle of the satellite body, integration of the attitude angle and differentiation of the attitude angle for a feedback term of the attitude control system 24 in [1] to [9] described above will be given successively.

c) Description of the case of the PID feedback+feed forward wheel angular velocity (corresponding to [1], [2], [3] and [9]-1)).

Figure 26:
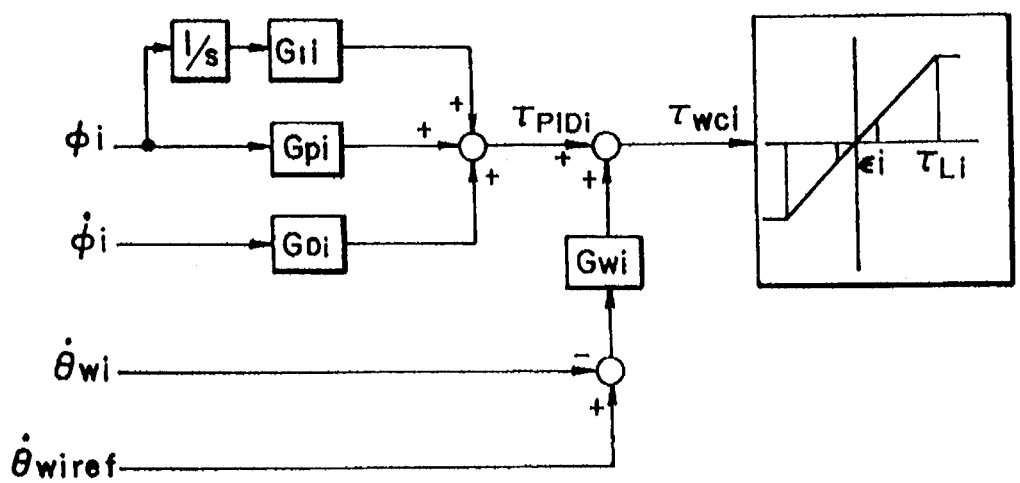
FIG. 26 is a view showing a further block diagram in the second embodiment of the present invention.

In this instance, the attitude control logic calculation section 24-4 produces such a block diagram as shown in FIG. 26 for each axis. And, $G_{ll}$ in FIG. 26 denotes an integral gain around the i axis, and the other reference characters are similar to those of FIG. 24.

By the attitude control logic calculation section 24-4 of such construction, the Eulerian angle output of the i axis of the body is transformed by Laplace transformation and used to calculate an integral gain around the i axis. Meanwhile, together with this, the Eulerian angle output of the i axis of the body is used to calculate a proportional gain around the i axis.

And, those outputs are processed to calculate differential gains around the i axis and added to the output of time differentiation of the Eulerian angle of the i axis of the body to produce a PID feedback torque around the i axis.

Meanwhile, the output obtained by subtracting the wheel angular velocity around the i axis from the feed forward wheel angular velocity around the i axis is processed to calculate a wheel velocity control proportional gain around the i axis and outputted as a feed forward torque around the i axis.

And, the PID feedback torque around the i axis and the feed forward torque around the i axis of the two outputs are added to each other, and the sum of them is outputted as a control torque around the i axis to the attitude control system actuator 24-1.

d) Description of the case of the PID feedback+feed forward wheel torque (corresponding to [4], [5], [6], [7], [8] and [9]-2) to -6)).

Figure 27:
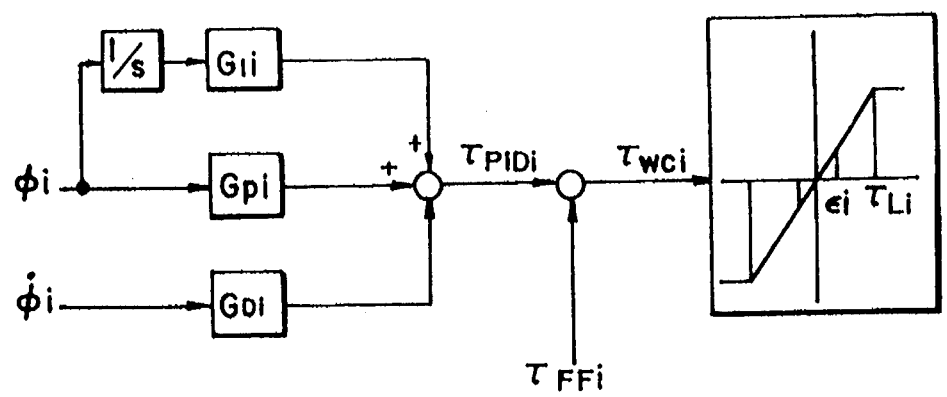
FIG. 27 is a view showing a still further block diagram in the second embodiment of the present invention.

In this instance, the attitude control logic calculation section 24-4 produces such a block diagram as shown in FIG. 27 for each axis. And, reference characters in FIG. 27 are similar to those of FIG. 26 described above.

By the attitude control logic calculation section 24-4 of such construction, a PID feedback torque around the i axis obtained in a similar manner as described above is added to a wheel feed forward torque around the i axis, and the sum of them is outputted as a control torque around the i axis to the attitude control system actuator 24-1.

The foregoing descriptions describe the processing by the attitude control logic calculation section 24-4 regarding the combinations between the feed forward term and the feedback term in the various cases.

In this manner, in order to compensate for a disturbance originating from the manipulators 11, the attitude control system 24 either can perform PD feedback control based on the attitude angle of the spacecraft 12 and differentiation of the attitude angle or perform PID feedback control based on the attitude angle of the spacecraft 12, integration of the attitude angle and differentiation of the attitude angle to drive the manipulators 11 to suppress a disturbance brought to the attitude control system 24 of the satellite body from the manipulators 11 to keep the attitude controlling performance of the spacecraft at a high level.

With the construction described above, as seen in FIG. 21, the manipulator control system 25 receives articulation angle time series data from the manipulator articulation information inputting section 1 (① in FIG. 21) and controls the manipulators 11 by servo control so that they may follow a route of the data.

In particular, the manipulator control system 25 receives articulation angle time series data at a manipulator driving logic calculation section 25-2, in which a voltage signal for driving the manipulator driving actuator 25-1 so as to follow an aimed route is produced.

As a result, the manipulator driving actuator 25-1 drives the manipulators 1 in accordance with the voltage signal. Consequently, the disturbance (② in FIG. 21) comes to the attitude of the spacecraft 12 through the root of the manipulators 11 so that the attitude is varied.

And, the attitude control system 24 detects the variation of the attitude of the spacecraft 12 by way of the attitude control sensor system 24-3 and delivers the value to the attitude control logic calculation section 24-4. The attitude control logic calculation section 24-4 receiving the value obtains a PD feedback control signal from the attitude angle of the spacecraft 12 and differentiation of the attitude angle or the attitude angle of the spacecraft 12 and integration of the attitude angle as well as differentiation of the attitude angle and delivers the PD feedback control signal to the adder 24-2.

And, the PD feedback control signal (⑥ in FIG. 21) is combined with a feed forward control signal transmitted thereto from the feed forward amount calculation section 26-1 by the adder 24-2 (③ in FIG. 21) so that it is converted into a voltage signal and then transmitted to the attitude control system actuator 24-1 (⑦ in FIG. 21).

As a result, cooperation is established between the manipulator control system 25 and the attitude control system 24, and the attitude control system actuator 24-1 operates so as to keep the attitude of the spacecraft 12 good.

Meanwhile, in the cooperative control system 26, in order to cause the manipulator control system 25 and the attitude control system 24 to cooperate with each other to keep the attitude controlling performance of the spacecraft 12 good, the feed forward amount calculation section 26-1 produces a feed forward angular velocity or a feed forward torque, to be delivered to the attitude control system actuator 24-1 based on time series information (⑤ in FIG. 21) of the manipulator articulation angle, the angular velocity and the angular acceleration (⑥ in FIG. 21).

In this manner, the spacecraft 12 having the manipulators 11 includes the attitude control system 24 and the manipulator control system 25 and further includes the cooperative control system 26 for supplying a feed forward signal to the attitude control system 24 based on information from the manipulator control system 25, and in order to compensate for a disturbance originating from the manipulators 11, the cooperative control system 26 takes, as a feed forward amount to be delivered to the wheel control system 27 of the attitude control system 24, an angular momentum or a wheel angular velocity obtained by dividing the angular momentum by the mass of the momentum wheels 23-1 to 23-3 and calculates an aimed angular momentum or an aimed angular velocity of the momentum wheels 23-1 to 23-3 from the laws of conservation of momentum/angular momentum to control the momentum wheels 23-1 to 23-3. Further, upon application of the laws of conservation of momentum/angular momentum, either the constraint that the angular velocity of the body of the spacecraft 12 is 0 is applied to the angular velocity of the body of the spacecraft 12 or the constraint that the angular velocity of the body of the spacecraft 12 is a constant is applied or else the constraint that the angular velocity of the body of the spacecraft 12 is an arbitrary function of the time. Consequently, a disturbance brought to the satellite body from the manipulators 11 upon driving of the manipulators 11 can be suppressed by cooperative control of the manipulator control system 25 and the attitude control system 24, and the attitude controlling performance of the spacecraft 12 can be maintained at a high level.

Meanwhile, in the spacecraft 12 having the manipulators 11, the cooperative control system 26 takes, as a feed forward amount to be delivered to the wheel control system 27 of the attitude control system 24, a torque and calculates the value of the torque based on the reverse dynamics for the universe to control the momentum wheels 23-1 to 23-3. Further, upon application of the reverse dynamics for the universe, either the constraint that the angular acceleration of the body of the spacecraft 12 is 0 is applied to the angular acceleration of the body of the spacecraft 12 or the constraint that the angular velocity and the angular acceleration of the body of the spacecraft 12 are both equal to 0 is applied to the angular velocity and the angular acceleration of the body of the spacecraft 12 or else the constraint that the angular velocity of the body of the spacecraft 12 is a constant and the angular acceleration of the body of the spacecraft 12 is 0 is applied to the angular velocity and the angular acceleration of the body of the spacecraft 12 or otherwise the constraint that the angular acceleration of the body of the spacecraft 12 is an arbitrary function of the time is applied to the angular acceleration of the body of the spacecraft 12 or alternatively the constraint that the angular velocity and the angular acceleration of the body of the spacecraft 12 are both arbitrary functions of the time is applied to the angular velocity and the angular acceleration of the body of the spacecraft 12. Consequently, similarly as in the case of a feed forward amount based on the angular momentum or the wheel angular velocity described above, in the case of a feed forward torque, a disturbance brought to the satellite body from the manipulators 11 upon driving of the manipulators 11 can be suppressed by cooperative control of the manipulator control system 25 and the attitude control system 24, and the attitude controlling performance of the spacecraft 12 can be maintained at a high level.

Further, the dynamics which includes an attitude control system in a satellite or space robot having a manipulator can be calculated at a high speed, that is, the three-dimensional dynamics for the entire spacecraft including the attitude control system can be calculated on the real time basis, and a result of the calculation can be outputted on the real time basis on a display.

Further, the equation of motion of the entire system can be solved at a high speed and with a high degree of accuracy, and consequently, real time calculation of the three-dimensional dynamics for the entire spacecraft can be realized readily.

Further, while, in the present embodiment, three-dimensional dynamic real time simulation for the attitude control system of the spacecraft 12 such as a space robot or an artificial satellite having the manipulators 11 and attitude control based on a wheel are performed, only attitude control based on a wheel may be performed.

In particular, in this instance, similarly as that shown in FIG. 21, if, for example, manipulator operation information from an operator is received as a manipulator driving pattern, then attitude control of the spacecraft is controlled by a wheel and the manipulator is driven.

(c) Description of the Third Embodiment

Figure 41:
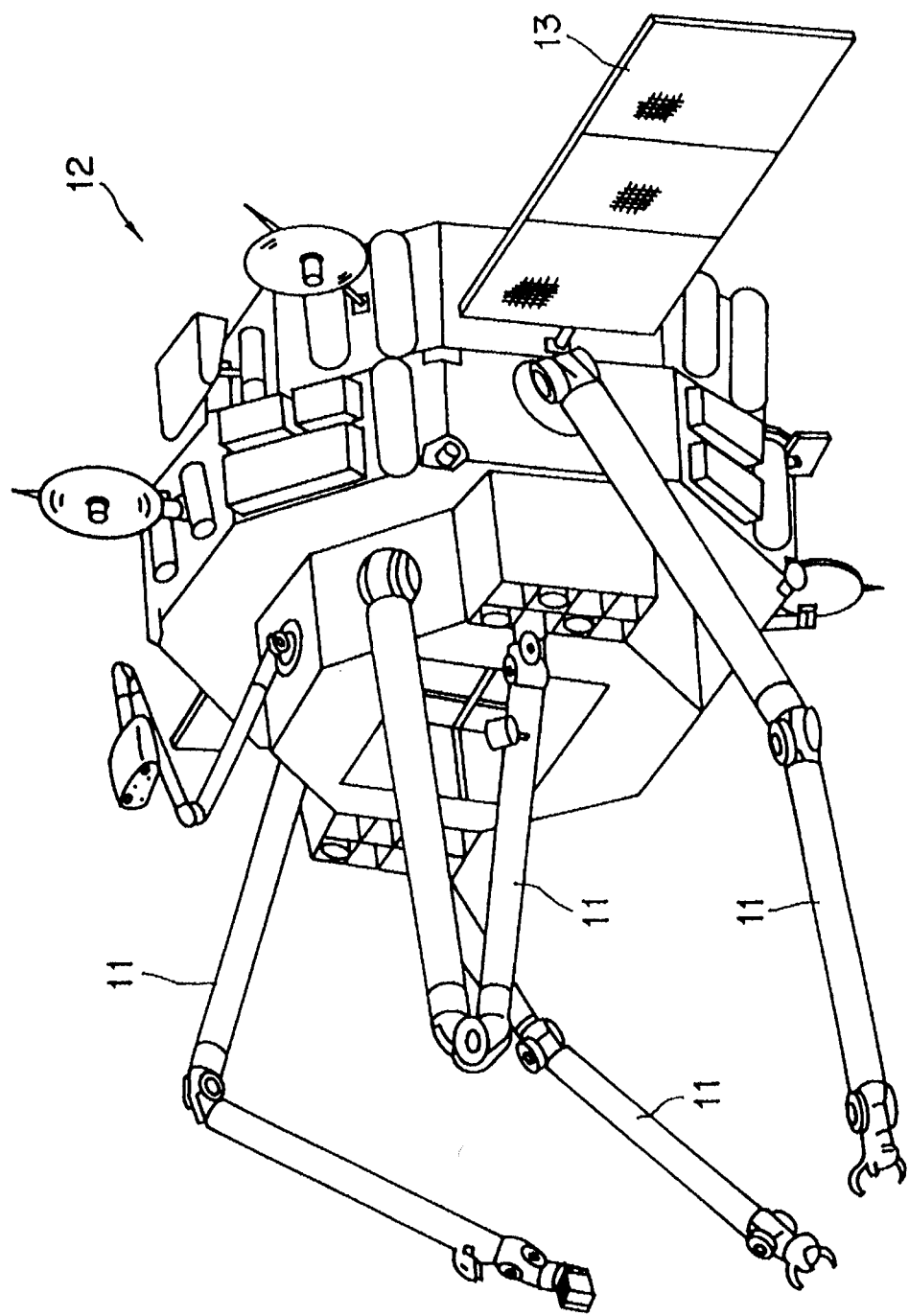
FIG. 41 is a perspective view showing a further spacecraft having a manipulator.

Subsequently, a third embodiment of the present invention will be described. The present embodiment is directed to a simulation and control apparatus for a manipulator apparatus which performs simulation to effect attitude control of such a spacecraft 12 such as an artificial satellite having manipulators 11 as shown in FIG. 41. It is to be noted that reference numeral 13 in FIG. 41 denotes a paddle.

Figure 40:
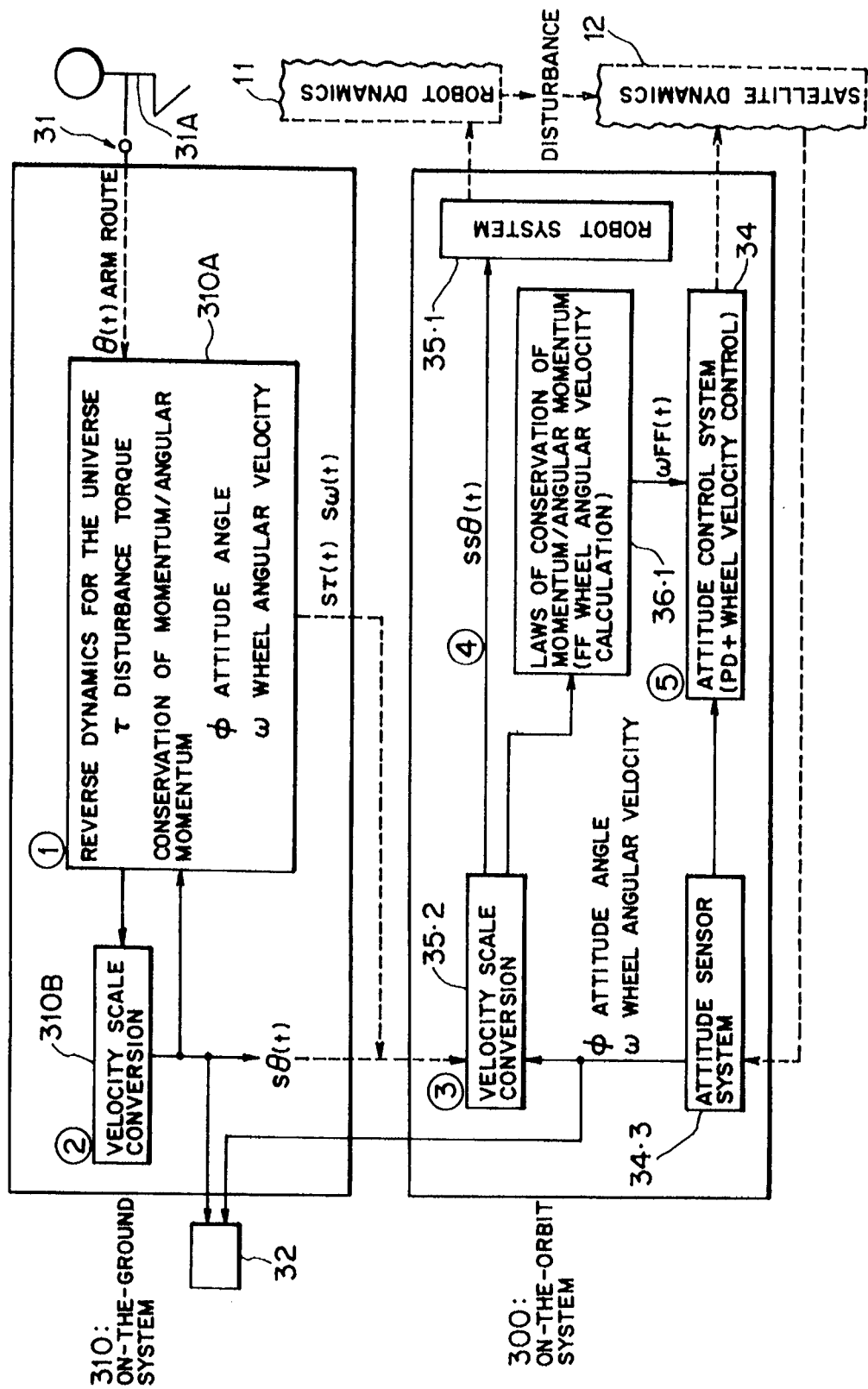
FIG. 40 is a block diagram showing a simulation and control apparatus for a manipulator apparatus as a third embodiment of the present invention.

The present simulation and control apparatus for a manipulator apparatus can be represented functionally in such a block diagram as shown in FIG. 40. In particular, the simulation and control apparatus for a manipulator apparatus is constructed from separate sections including a simulation section 310 installed at a location adjacent an operator 31A on the ground and a control section 300 installed on the spacecraft 12 on an orbit.

Here, the simulation section 310 includes a manipulator articulation information inputting section 31 serving as initial instruction value inputting means, an excessive instruction value suppressing index forecasting section (means) 310A, a scale conversion section (means) 310B, and a graphic display 32 serving as display means.

The manipulator articulation information inputting section 31 is used to input route instruction value information $\theta(t)$ of a manipulator as an initial instruction value, and the excessive instruction value suppressing index forecasting section 310A receives the initial instruction value $\theta(t)$ from the manipulator articulation information inputting section 31 and forecasts (calculates), based on a dynamic model regarding a manipulator 11, disturbance information, which is produced when the manipulator 11 operates in accordance with the initial instruction value, on the real time basis as an excessive instruction value suppressing index.

The scale conversion section 310B performs scale conversion for the initial instruction value based on the excessive instruction value suppressing index forecast by the excessive instruction value suppressing index forecasting section 310A to obtain an intermediate instruction value $s\theta(t)$, and the graphic display 32 displays motion of the manipulator 11 by simulation display based on the initial instruction value, the intermediate instruction value $s\theta(t)$ obtained from the scale conversion section 310B and a sensor value from a scale conversion section 35-2 of the control section 300 which will be hereinafter described.

Here, three methods are available to take an excessive instruction value suppressing index to be forecast by the excessive instruction value suppressing index forecasting section 310A, including [1] the method of taking an angular momentum or a momentum, [2] the method of taking a torque or a force, and [3] the method of taking a torque (force) and an angular momentum (momentum) in combination. In the following, those methods will be described.

Here, symbols used in various equations used to describe the constructions of the individual apparatus hereinbelow and coordinate systems will be described. In particular, the notations hereinbelow are taken as listed in the following table. It is to be noted that a capital letter represents a vector as viewed from an inertial coordinate system $\Sigma_A$ while a small letter represents a vector as viewed from a base fixed coordinate system $\Sigma_0$.

It is to be noted that, while d/dt and $d^2/dt^2$ are used in the text to represent differentiation of first order and differentiation of second order of time in the present embodiment, this does not apply to mathematical expressions or the drawings.

$v_i$: velocity of the origin of the coordinate system $\Sigma_i$ relative to the inertial coordinate system $\Sigma_A$ $\dot{v}_i$: acceleration of the origin of the coordinate system $\Sigma_i$ relative to the inertial coordinate system $\Sigma_A$ $\hat{v}$: velocity of the center of gravity of the link i relative to the inertial coordinate system $\Sigma_A$ $\hat{\dot{v}}$: acceleration of the center of gravity of the link i relative to the inertial coordinate system $\Sigma_A$ $\Omega_i$: angular velocity of the link i relative to the inertial coordinate system $\Sigma_A$ $\dot{\Omega}_i$: angular acceleration of the link i relative to the inertial coordinate system $\Sigma_A$ $v_i$: time differentiation of the vector $\mathbb{P}_i$ with respect to the base fixed coordinate system $\Sigma_0$ $v_i = d_0 \; \mathbb{P}_i/dt = \mathbb{P}_i'$ $v_i'$: time differentiation of the vector z,7 $_i$ with respect to the base fixed coordinate system $\Sigma_0$ $v_i' = d_0 \; v_i/dt = \mathbb{P}_i''$ $\hat{v}$: time differentiation of the vector $\hat{r}$ with respect to the base fixed coordinate system $\Sigma_0$ $\hat{v}_i = d_0 \; \hat{r}/dt = \hat{r}_i'$ $v'$: time differentiation of the vector $\hat{v}$ with respect to the base fixed coordinate system $\Sigma_0$ $\hat{v}_i' = d_0 \; \hat{v}/dt = \hat{r}_i''$ $\omega_i$: angular velocity of the link i with respect to the base fixed coordinate system $\Sigma_0$ $\omega_i'$: time differentiation of $\omega_i$ with respect to the base fixed coordinate system $\Sigma_0$ $\omega_i' = d_0 \; \omega/dt$ Note 1) The time differentiation with respect to the inertial coordinate system $\Sigma_A$ and the time differentiation with respect to the base fixed coordinate system $\Sigma_0$ are distinguished definitely from each other.

For a vector $\mathbf{x}$, time differentiation with respect to $\Sigma_A$:

$\dot{X} = dX/dt$ time differentiation with respect to $\Sigma_0$:

$X' = d_0 \; z, 12 \; /dt$

The relationship between X and X' is given by the following equation:

$\dot{X} = X' + \Omega_0 \times X$

Figure 42:
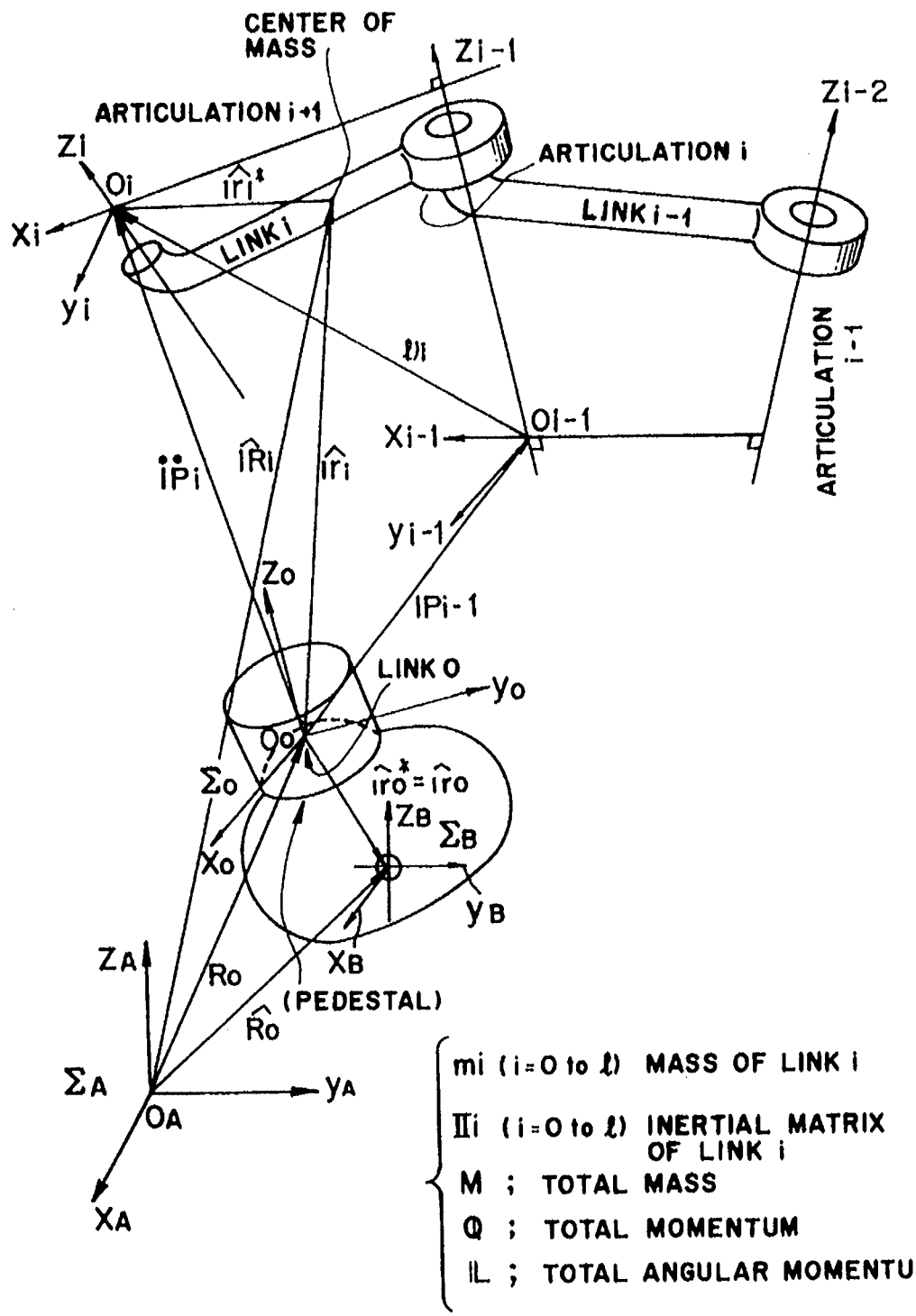
FIG. 42 is a diagrammatic view illustrating a coordinate system of the spacecraft having a manipulator.

Meanwhile, as a coordinate system for the entire system, such a Denavit-Hartenberg coordinate system as shown in FIG. 42 is adopted.

Figure 43:
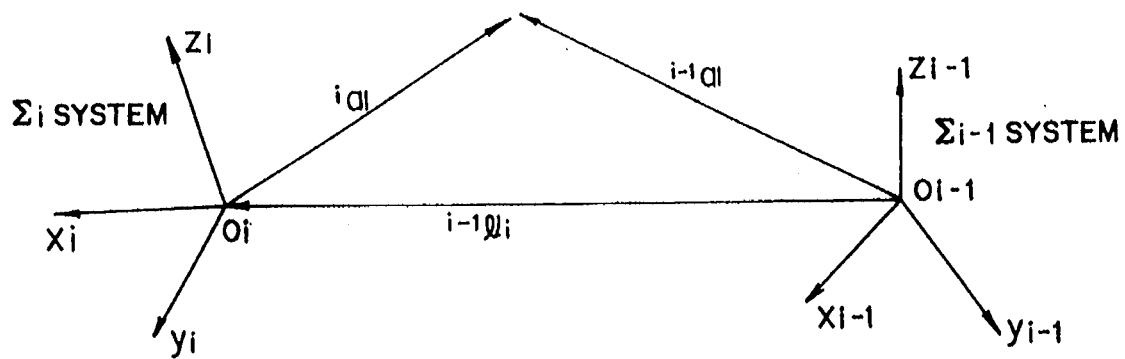
FIG. 43 is a diagrammatic view illustrating the coordinate system of the spacecraft having a manipulator.

Here, when vectors represented in the coordinate systems $\Sigma_i$ and $\Sigma_{i-1}$ of FIG. 42 are defined as $^i a$ and $^{i-1} a$ (while those $^i a$ and $^{i-1} a$ should actually be represented in vector representation, they are represented in scalar representation for the convenience of representation. While, also in the following description, a vector should be represented in vector representation in this manner, it is sometimes represented in scalar representation for the convenience of representation), respectively, $^i a$ and $^{i-1} a$ have a relationship given by the following equation (refer to FIG. 43). (The character l in a mathematical representation is sometimes represented in a writing style.)

$^{i-1}a = {^{i-1}A_i} \; {^i a} + {^{i-1}l_i}$

Here, $^{i-1}A_i$ is an orthogonal matrix representative of rotation between the coordinate systems, and $^{i-1}l_i$ (vector) is a representation of a vector from the coordinate origin $O_{i-1}$ to $O_i$ in the $\Sigma_{i-1}$ system representation.

It is to be noted that $^{i-1}A_i$ and $^{i-1}l_i$ (vectors) are represented in the following manner when standard parameters are used on the Denavit-Hartenberg coordinate system representation:

$$^{i-1}A_i = \begin{bmatrix} \cos\theta_i & -\sin\theta_i \cos\alpha_i & \sin\theta_i \sin\alpha_i \\ \sin\theta_i & \cos\theta_i \cos\alpha_i & -\cos\theta_i \sin\alpha_i \\ 0 & \sin\alpha_i & \cos\alpha_i \end{bmatrix}$$

$(i = 1 \sim l)$ $$^{i-1}l_i = \begin{bmatrix} b_i \cos\theta_i \\ b_i \sin\theta_i \\ d_i \end{bmatrix} \quad (i = 1 \sim l)$$

Figure 44:
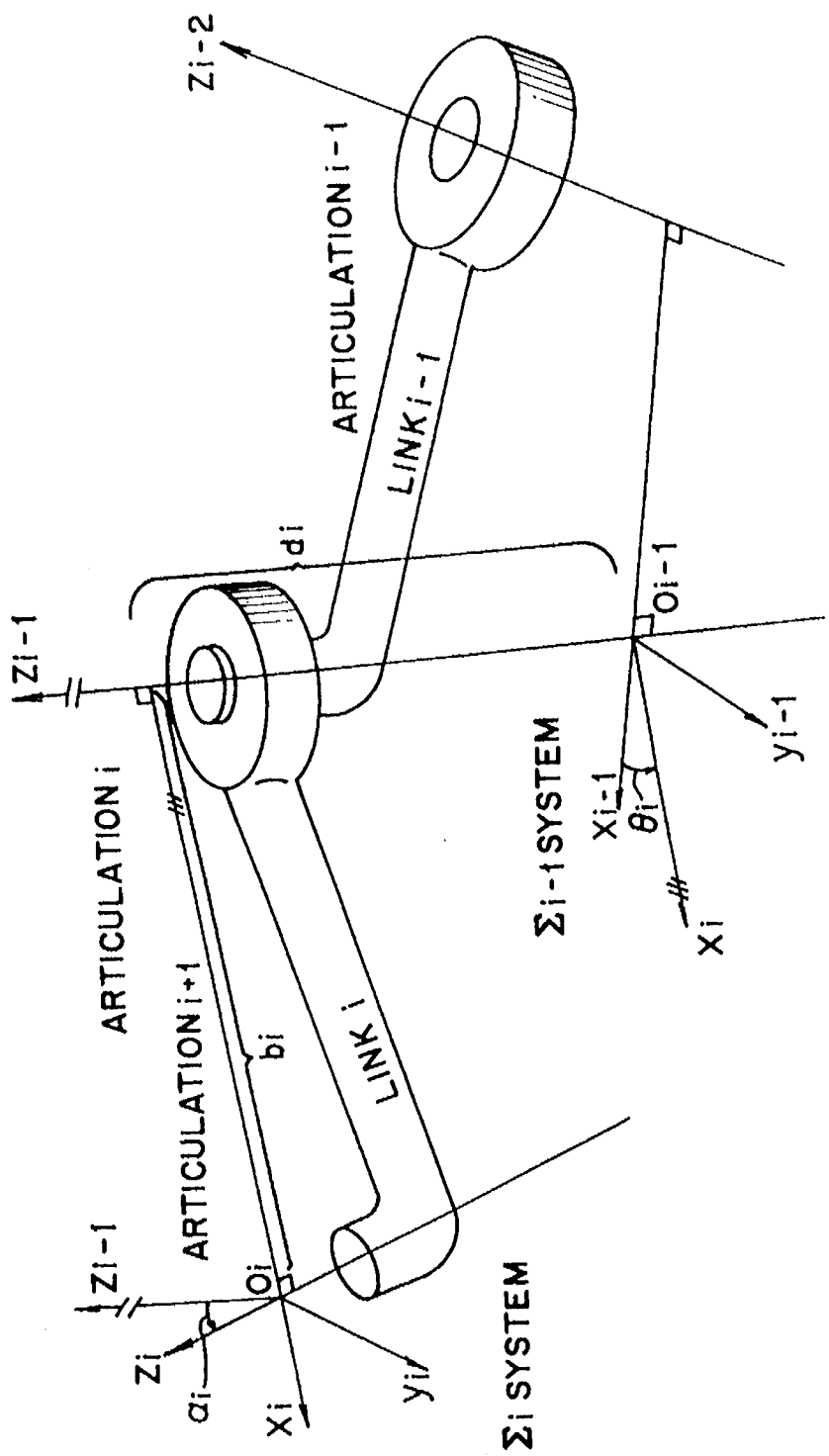
FIG. 44 is a diagrammatic view illustrating the coordinate system of the spacecraft having a manipulator.

And, the definitions of parameters on the Denavit-Hartenberg coordinate system are such as illustrated in FIG. 44, and the coordinate system is set in accordance with such standards as listed in the following table:

$z_i$ axis: axis of the articulation i+1
$x_i$ axis: common perpendicular line from $z_{i-1}$ toward $z_i$
$y_i$ axis: constructed so as to make a right-hand coordinate system
$b_i$: length of the common perpendicular line to $z_i$ and $z_{i-1}$
$d_i$: length between $x_i$ and $x_{i-1}$ ($z_{i-1}$ coordinate value)
$\alpha_i$: angle between $z_i$ and $z_{i-1}$ (the $z_{i-1}$ direction coincides with the $z_i$ direction when it is rotated by $\alpha_i$ around the $x_i$ axis)
$\theta_i$: angle between $x_i$ and $x_{i-1}$ (the $x_{i-1}$ direction coincides with the $x_i$ direction when it is rotated by $\theta_1$ around the $z_{i-1}$ axis)

Further, when i=-1 in $^i a$, $^i a$ represents an inertial system representation. Accordingly, the following equations are obtained.

$^i a|_{i=-1} = {^A a}, \; {^A A}|_{i=-1} = {^A A}$

In this instance, the prefix A at the left shoulder denotes the initial letter of Absolute coordinate, and particularly, the following equation represents a transformation matrix between the inertia system and the base reference coordinate system.

$^{i-1}A_i|_{i=0} = {^A A_0}$

[1] The case wherein an excessive instruction value suppressing index is forecast based on an angular momentum or a momentum A disturbance angular momentum/disturbance momentum acting upon an object by way of the finger of a manipulator 11 are reflected on the angular momentum/momentum acting upon the root of the manipulator 11 based on the principle of action and reaction.

Therefore, a momentum/angular momentum are calculated by calculation described below, and an excessive instruction value suppressing index is forecast based on the momentum/angular momentum.

Here, the laws of conservation of momentum/angular momentum, that is, the two equations, are given by the following expressions (A6) and (A7):

$$\sum_{i=0}^{l} m_i \hat{V}_i = Q \text{ (given constant)} \quad (A6)$$

law of conservation of momentum $$\sum_{i=0}^{l} (m_i \hat{R}_i \times \hat{V}_i + I_i \Omega_i) = L \text{ (given constant)} \quad (A7)$$

law of conservation of angular momentum

And, the following definition is set for the manipulator articulation angle and the wheel articulation angle (in the present embodiment, the number of the momentum wheels 3·1 to 3·3 is set to 3 for simplified description).

$$q = \begin{bmatrix} \Theta_m \\ \Theta_w \end{bmatrix},$$

$\Theta_m = [\theta_1, \theta_2, \ldots, \theta_l]^T$    manipulator articulation angle $\Theta_w = [\theta_{w1}, \theta_{w2}, \theta_{w3}]^T$    wheel articulation angle In this instance, the equations (A6) and (A7) can be replaced as given by the following equation (A7-1):

$$\begin{bmatrix} V_0 \\ \Omega_0 \end{bmatrix} = S^{-1} \begin{bmatrix} h_v \\ h_w \end{bmatrix}, \quad (A7\text{-}1)$$

$$\begin{cases} h_v = Q - \sum_{i=(0,w_1,w_2,w_3)}^{l} m_i \hat{v}_i \\ h_w = L - \sum_{i=(0,w_1,w_2,w_3)}^{l} (m_i \hat{R}_i \times \hat{v}_i + I_i \omega_i) \end{cases}$$

$V_0$: velocity of satellite body $\Omega_0$: angular velocity of satellite body It is to be noted that the definition of the character S (also this character S is represented in scalar representation for the convenience of representation and should be handled similarly to the character a described hereinabove) in this equation is such as given below:

$$S = \begin{bmatrix} S_{11} & S_{12} \\ S_{21} & S_{22} \end{bmatrix}$$

$$S_{11} = \begin{bmatrix} M & 0 & 0 \\ 0 & M & 0 \\ 0 & 0 & M \end{bmatrix}, M = \sum_{i=(0,w_1,w_2,w_3)}^{l} m_i \text{ (entire mass)}$$

Note) $i=(0, w_1, w_2, w_3)$ signifies that summation is performed for the satellite body and the wheel 1, the wheel 2 and the wheel 3 when $i=0$.

$$S_{12} = \sum_{i=(0,w_1,w_2,w_3)}^{l} m_i \begin{bmatrix} 0 & \hat{r}_{zi} & -\hat{r}_{yi} \\ -\hat{r}_{zi} & 0 & \hat{r}_{xi} \\ \hat{r}_{yi} & -\hat{r}_{xi} & 0 \end{bmatrix}$$

$$S_{21} = - \sum_{i=(0,w_1,w_2,w_3)}^{l} m_i \begin{bmatrix} 0 & \hat{R}_{zi} & -\hat{R}_{yi} \\ -\hat{R}_{zi} & 0 & \hat{R}_{xi} \\ \hat{R}_{yi} & -\hat{R}_{xi} & 0 \end{bmatrix}$$

$$S_{22} = \sum_{i=(0,w_1,w_2,w_3)}^{l} \left\{ I_i + m_i \begin{bmatrix} \hat{R}_{zi}\hat{r}_{zi} + \hat{R}_{yi}\hat{r}_{yi} & -\hat{R}_{yi}\hat{r}_{xi} & -\hat{R}_{zi}\hat{r}_{xi} \\ -\hat{R}_{xi}\hat{r}_{yi} & \hat{R}_{zi}\hat{r}_{zi} + \hat{R}_{xi}\hat{r}_{xi} & -\hat{R}_{zi}\hat{r}_{yi} \\ -\hat{R}_{xi}\hat{r}_{zi} & -\hat{R}_{yi}\hat{r}_{zi} & \hat{R}_{yi}\hat{r}_{yi} + \hat{R}_{xi}\hat{r}_{xi} \end{bmatrix} \right\}$$

An algorithm BA for calculating $$\begin{bmatrix} V_0 \\ \Omega_0 \end{bmatrix}$$

based on the equation (A7-1) is such as given below.

Figure 45:
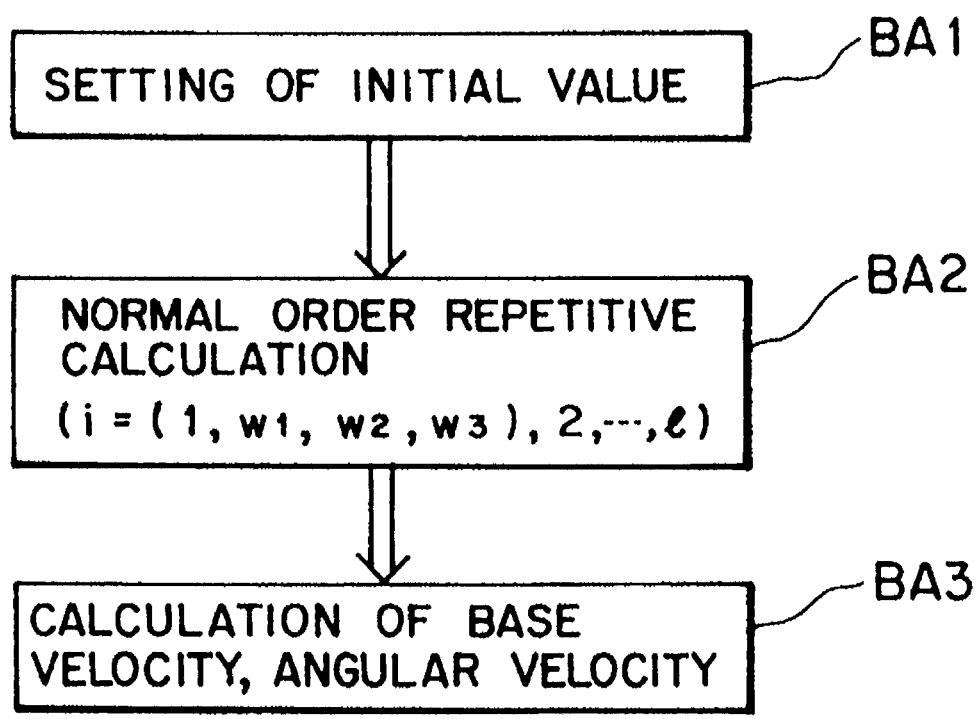
FIG. 45 is a view illustrating an algorithm BA in the third embodiment of the present invention.

Here, the calculations illustrated in FIG. 45 have such constructions as described below.

In particular, initial value setting (step BA1) is constructed from the following calculations:

$^A\hat{R}_0 \big|_{t=0}$ ; given $\theta_i \big|_{t=0}$ ; given $(i = 1 \sim l)$ $\omega_0 = \omega_0' = 0, \ \hat{v}_0 = \hat{v}_0' = 0, \ v_0 = v_0' = 0$ $^{i-1}Z_{i-1} = (0, 0, 1)^T$ $^A A_0$; given Meanwhile, normal order repetitive calculation (step BA2) is constructed from the following calculations:

$$① \ ^i\omega_i = \begin{cases} ^iA_{i-1}(^{i-1}\omega_{i-1} + \dot{\theta}_i \, ^{i-1}Z_{i-1}) & \text{for } R \\ ^iA_{i-1} \, ^{i-1}\omega_{i-1} & \text{for } T \end{cases}$$

$$② \ ^i\dot{\omega}_i = \begin{cases} ^iA_{i-1}[^{i-1}\dot{\omega}_{i-1} + \ddot{\theta}_i \, ^{i-1}Z_{i-1} + \\ \dot{\theta}_i \, ^{i-1}\omega_{i-1} \times \, ^{i-1}Z_{i-1}] & \text{for } R \\ ^iA_{i-1} \, ^{i-1}\dot{\omega}_{i-1}' & \text{for } T \end{cases}$$

-continued $$\text{③ } {}^i v_i = \begin{cases} {}^i\omega_i \times {}^i l_i + {}^i A_{i-1} {}^{i-1} v_{i-1} & \text{for } R \\ {}^i\omega_i \times {}^i l_i + {}^i A_{i-1}(\dot{d}_i {}^{i-1} Z_{i-1} + {}^{i-1} v_{i-1}) & \text{for } T \end{cases}$$

$$\text{④ } {}^i \hat{v}_i = {}^i v_i + {}^i \omega_i \times {}^i \hat{r}_i^*$$

$$\text{⑤ } {}^i \dot{v}_i = \begin{cases} {}^i\dot{\omega}_i \times {}^i l_i + {}^i \omega_i \times ({}^i \omega_i \times {}^i l_i) + {}^i A_{i-1}{}^{i-1}\dot{v}_{i-1} & \text{for } R \\ {}^i A_{i-1}(\ddot{d}_i {}^{i-1} Z_{i-1} + {}^{i-1}\dot{v}_{i-1}) + {}^i\dot{\omega}_i \times {}^i l_i + \\ 2\dot{d}_i {}^i \omega_i \times ({}^i A_{i-1}{}^{i-1} Z_{i-1}) + {}^i \omega_i \times ({}^i \omega_i \times {}^i l_i) & \text{for } T \end{cases}$$

$$\text{⑥ } {}^i \hat{\dot{v}}_i = {}^i \dot{v}_i + {}^i \dot{\omega}_i \times {}^i \hat{r}_i^* + {}^i \omega_i \times ({}^i \omega_i \times {}^i \hat{r}_i^*)$$

$$\text{⑦ } {}^i \hat{r}_i = {}^i \hat{r}_i^* + {}^i l_i - {}^i A_{i-1}{}^{i-1} \hat{r}_{i-1}^* + {}^i A_{i-1}{}^{i-1} \hat{r}_{i-1}$$

$$\text{⑧ } {}^A A_i = {}^A A_{i-1}{}^{i-1} A_i$$

$$\text{⑨ } {}^A \hat{r}_i = {}^A A_i {}^i \hat{r}_i$$

$$\text{⑩ } {}^A \hat{R}_i = {}^A \hat{r}_i - (1/M) \times \sum_{i=(l,w_1,w_2,w_3)}^{l} m_l {}^A \hat{r}_i + ({}^A Q_i + C)/M$$

Further, calculation of the base velocity and angular velocity (step BA3) is constructed from the following calculations:

① Calculation of ${}^A S_{12}$

② Calculation of ${}^A S_{21}$

③ ${}^A \mathbb{I}_i = {}^A A_i {}^i \mathbb{I}_i {}^i A_A$

④ ${}^A S_{22} = \sum_{i=(0,w_1,w_2,w_3)} \{{}^A A_i {}^i \mathbb{I}_i {}^i A_A - m_i {}^A \hat{R}_i {}^A \hat{r}_i\}$ ⑤ ${}^A h_v = {}^A Q - \sum_{i=(0,w_1,w_2,w_3)}^{l} m_i {}^A \hat{v}_i$ ⑥ ${}^A h_\omega = {}^A L - \sum_{i=(0,w_1,w_2,w_3)}^{l} (m_i {}^A \hat{R}_i \times {}^A \hat{v}_i + {}^A A_i {}^i \mathbb{I}_i {}^i \omega_i)$ $$\text{⑦ } \begin{bmatrix} {}^A V_0 \\ {}^A \Omega_0 \end{bmatrix} = \begin{bmatrix} S_{11} & {}^A S_{12} \\ {}^A S_{21} & {}^A S_{22} \end{bmatrix}^{-1} \begin{bmatrix} {}^A h_v \\ {}^A h_\omega \end{bmatrix}$$

It is to be noted that the following definitions are applied to the calculations of the present algorithm BA:

Definition of ${}^A \hat{R}_i {}^A \hat{r}_i$

Generally, vector $a \times b = ba$ $$\begin{bmatrix} a_x \\ a_y \\ a_z \end{bmatrix} \times \begin{bmatrix} b_x \\ b_y \\ b_z \end{bmatrix} = \begin{bmatrix} a_y b_z - a_z b_y \\ a_z b_x - a_x b_z \\ a_x b_y - a_y b_x \end{bmatrix}$$

$$= \begin{bmatrix} 0 & b_z & -b_y \\ -b_z & 0 & b_x \\ b_y & -b_x & 0 \end{bmatrix} \begin{bmatrix} a_x \\ a_y \\ a_z \end{bmatrix}$$

Therefore, $$b \equiv \begin{bmatrix} 0 & b_z & -b_y \\ -b_z & 0 & b_x \\ b_y & -b_x & 0 \end{bmatrix}$$

Values obtained by multiplying the mass $M_0$ and the inertia $I_0$ of the body by $$\begin{bmatrix} V_0 \\ \Omega_0 \end{bmatrix}$$

obtained based on the equation (A7-1) in this manner are a momentum and an angular momentum, respectively. In particular, $M_0 V_0$: momentum $I_0 \Omega_0$: angular momentum

[2] The case wherein an excessive instruction value suppressing index is forecast based on a force or a torque A disturbance torque/disturbance force acting upon an object by way of the finger of a manipulator 11 are reflected on the torque/force acting upon the root of the manipulator 11 based on the principle of action and reaction.

Therefore, a torque/force are calculated by calculation described below, and an excessive instruction value suppressing index is forecast based on the torque/force.

The equations which make the base are differentiation of the laws of conservation of momentum and angular momentum, that is, the equation of the sum total of the internal force and the internal torque=0.

$$\begin{cases} \sum_{i=(0,w_1,w_2,w_3)}^{l} m_i \hat{\ddot{v}}_i = 0 & (B9) \\ \sum_{i=(0,w_1,w_2,w_3)}^{l} (m_i \hat{R}_i \times \hat{\ddot{v}}_i + (d \, \mathbb{I}_i \, \Omega_i/dt)) = 0 & (B10) \end{cases}$$

The equations (B9) and (B10) can be rewritten in the following manner, respectively.

$$\begin{cases} \sum_{i=(0,w_1,w_2,w_3)}^{l} F_i = 0 & (B11) \\ \sum_{i=(0,w_1,w_2,w_3)}^{l} (R_i \times F_i + N_i) = 0 & (B12) \\ \dot{\Omega}_i = \dot{\Omega}_0 + \dot{\omega}_i = \dot{\Omega}_0 + & (B13) \\ \quad \omega_i + \Omega_0 \times \omega_i \\ \hat{\ddot{v}}_i = \dot{v}_0 + \dot{\Omega}_0 \times \hat{r}_i + & (B14) \\ 2\Omega_0 \times \hat{v}_i + \Omega_0 \times (\Omega_0 \times \hat{r}_i) + \hat{\ddot{v}}_i \end{cases}$$

If the equations (B9) and (B10) are transformed using the equations (B13) and (B14), then $$\begin{bmatrix} \dot{V}_0 \\ \dot{\Omega}_0 \end{bmatrix} = S^{-1} \begin{bmatrix} \sum_{i=(0,w1,w2,w3)}^{l} F_i \\ \sum_{i=(0,w1,w2,w3)}^{l} (R_i \times F_i + N_i) \end{bmatrix} + S^{-1} \begin{bmatrix} F_{OUT} \\ N_{OUT} \end{bmatrix}$$

(B15)

$$\begin{cases} F_i = m_i \, (2 \, \Omega_0 \times \hat{v}_i + \Omega_0 \times (\Omega_0 \times \hat{r}_i) + \hat{\ddot{v}}_i) & (B16) \\ N_i = \mathbb{I}_i \quad \omega_i + \mathbb{I}_i \, \Omega_0 \times \omega_i + \Omega_i \times (\mathbb{I}_i \, \Omega_i) & (B17) \end{cases}$$

$F_{OUT}$: sum total of the external forces,
$N_{OUT}$: sum total of the external torques
An algorithm BB for calculating $$\begin{bmatrix} \dot{V}_0 \\ \dot{\Omega}_0 \end{bmatrix}$$

based on the equation (B15) is such as given below.

The algorithm BB is constructed such that the velocity and the angular velocity of the body of the satellite are calculated from the laws of conservation of momentum/angular momentum of the algorithm BA described above and the values of them are applied to the equation (B15).

In short, the present algorithm BB is constructed such that, after initial value setting (step BB1) is performed, normal order repetitive calculation (step BB2) is performed, and then after calculation of the base velocity and angular velocity (step BB3) is performed, calculation of the base acceleration and angular acceleration (step BB4) is performed.

Figure 46:
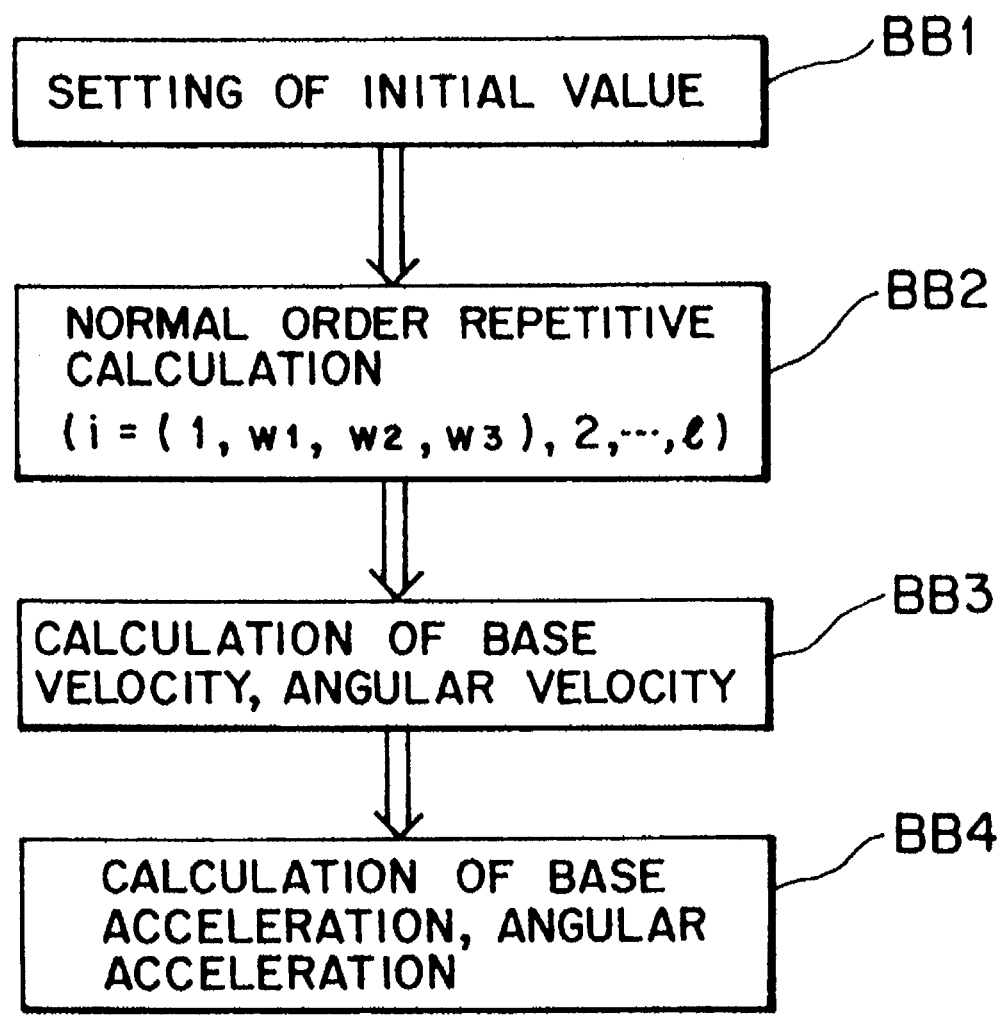
FIG. 46 is a view illustrating another algorithm BB in the third embodiment of the present invention.

Here, the calculations illustrated in FIG. 46 are constructed in the following manner.

In particular, the initial value setting (step BB1) is constructed from the following calculations:

$$^A\hat{R}_0 \mid_{t=0} \;;\; \text{given}$$

$$\theta_i \mid_{t=0} \;;\; \text{given } (i=1\sim l)$$

$$\omega_0 = \omega_0' = 0,\; \hat{v}_0 = \hat{v}_0' = 0,\; v_0 = v_0' = 0$$

$$^{i-1}Z_{i-1} = (0, 0, 1)^T$$

$$^A A_0 ; \text{given}$$

Meanwhile, the normal order repetitive calculation (step BB2) is constructed from the following calculations:

① $^i\omega_i = \begin{cases} {}^iA_{i-1}({}^{i-1}\omega_{i-1} + \dot{\theta}_i\,{}^{i-1}Z_{i-1}) & \text{for } R \\ {}^iA_{i-1}\,{}^{i-1}\omega_{i-1} & \text{for } T \end{cases}$ ② $^i\omega_i' = \begin{cases} {}^iA_{i-1}({}^{i-1}\omega_{i-1}' + \ddot{\theta}_i\,{}^{i-1}Z_{i-1} + \dot{\theta}_i\,{}^{i-1}\omega_{i-1} \times {}^{i-1}Z_{i-1}) & \text{for } R \\ {}^iA_{i-1}\,{}^{i-1}\omega_{i-1}' & \text{for } T \end{cases}$ ③ $^iv_i = \begin{cases} {}^i\omega_i \times {}^il_i + {}^iA_{i-1}\,{}^{i-1}v_{i-1} & \text{for } R \\ {}^i\omega_i \times {}^il_i + {}^iA_{i-1}(d_i\,{}^{i-1}Z_{i-1} + {}^{i-1}v_{i-1}) & \text{for } T \end{cases}$ ④ $^i\hat{v}_i = {}^iv_i + {}^i\omega_i \times {}^i\hat{r}_i^*$ ⑤ $^iv_i' = \begin{cases} {}^i\omega_i' \times {}^il_i + {}^i\omega_i \times ({}^i\omega_i \times {}^il_i) + {}^iA_{i-1}\,{}^{i-1}v_{i-1}' & \text{for } R \\ {}^iA_{i-1}(\ddot{d}_i\,{}^{i-1}Z_{i-1} + {}^{i-1}v_{i-1}') + {}^i\omega_i' \times {}^il_i + 2\dot{d}_i\,{}^i\omega_i \times ({}^iA_{i-1}\,{}^{i-1}Z_{i-1}) + {}^i\omega_i \times ({}^i\omega_i \times {}^il_i) & \text{for } T \end{cases}$ ⑥ $^i\hat{v}_i' = {}^iv_i' + {}^i\omega_i' \times {}^i\hat{r}_i^* + {}^i\omega_i \times ({}^i\omega_i \times {}^i\hat{r}_i^*)$ ⑦ $^i\hat{r}_i = {}^i\hat{r}_i^* + {}^il_i - {}^iA_{i-1}\,{}^{i-1}\hat{r}_{i-1}^* + {}^iA_{i-1}\,{}^{i-1}\hat{r}_{i-1}$ ⑧ $^AA_i = {}^AA_{i-1}\,{}^{i-1}A_i$ ⑨ $^A\hat{r}_i = {}^AA_i\,{}^i\hat{r}_i$ ⑩ $^A\hat{R}_i = {}^A\hat{r}_i - (1/M) \times \sum_{i=(1,w_1,w_2,w_3)}^{l} m_i\,{}^A\hat{r}_i + ({}^AQt + C)/M$ Further, the calculation of the base velocity and angular velocity (step BB3) is constructed from the following calculations:

① Calculation of $^AS_{12}$

② Calculation of $^AS_{21}$

—continued

③ $^AI_i = {}^AA_i\,{}^iI_i\,{}^iA_A$

④ $^AS_{22} = \sum_{i=(0,w_1,w_2,w_3)}^{l} \{{}^AA_i\,{}^iI_i\,{}^iA_A - m_i\,{}^A\hat{R}_i\,{}^A\hat{r}_i\}$ ⑤ $^Ah_v = {}^AQ - \sum_{i=(0,w_1,w_2,w_3)}^{l} m_i\,{}^Av_i$ ⑥ $^Ah_\omega = {}^AL - \sum_{i=(0,w_1,w_2,w_3)}^{l} (m_i\,{}^A\hat{R}_i \times {}^A\hat{v}_i + {}^AA_i\,{}^iI_i\,{}^i\omega_i)$ ⑦ $\begin{bmatrix} {}^AV_0 \\ {}^A\Omega_0 \end{bmatrix} = \begin{bmatrix} S_{11} & {}^AS_{12} \\ {}^AS_{21} & {}^AS_{22} \end{bmatrix}^{-1} \begin{bmatrix} {}^Ah_v \\ {}^Ah_\omega \end{bmatrix}$ And, the calculation of the base acceleration and angular acceleration (step BB4) is constructed from the following calculations:

① $^A\hat{v}_i = {}^AA_i\,{}^i\hat{v}_i'$

② $^A\mathcal{F}_i = m_i(2\,{}^A\Omega_0 \times {}^A\hat{v}_i + {}^A\Omega_0 \times ({}^A\Omega_0 \times {}^A\hat{r}_i) + {}^A\hat{v}_i')$ ③ $^i\Omega_0 = {}^iA_A\,{}^A\Omega_0$ ④ $^i\Omega_i = {}^i\Omega_0 + {}^i\omega_i$ ⑤ $^A\mathcal{N}_i = {}^AA_i\,{}^iI_i\,{}^i\omega_i' + {}^AA_i\,{}^iI_i\,{}^i\Omega_0 \times {}^i\omega_i + {}^AA_i\,{}^i\Omega_i \times ({}^iX_i\,{}^i\Omega_i)$ ⑥ $-\sum_{i=(0,w_1,w_2,w_3)}^{l} {}^A\mathcal{F}_i \equiv {}^AW_f$ ⑦ $-\sum_{i=(0,w_1,w_2,w_3)}^{l} ({}^A\hat{R}_i \times {}^A\mathcal{F}_i + {}^A\mathcal{N}_i) \equiv {}^AW_n$ ⑧ $\begin{bmatrix} {}^A\dot{V}_0 \\ {}^A\dot{\Omega}_0 \end{bmatrix} = \begin{bmatrix} S_{11} & {}^AS_{12} \\ {}^AS_{21} & {}^AS_{22} \end{bmatrix}^{-1} \begin{bmatrix} {}^AW_f \\ {}^AW_n \end{bmatrix}$

[3] The case wherein an excessive instruction value suppressing index is forecast based on a combination of an angular momentum/momentum and a torque/force.

As described hereinabove, an angular momentum/momentum and a torque/force acting upon an object by way of the finger of a manipulator 11 are reflected on the angular momentum/momentum and the torque/force acting upon the root of the manipulator 11 based on the principle of action and reaction.

Those angular momentum/momentum and torque/force are calculated by the calculation described in [1] and [2] of the foregoing description, respectively.

[4] Calculation method for a differentiation term of a manipulator articulation angle in velocity control As described in detail in [1] and [2] of the foregoing description, in order to calculate an index for scale conversion, differentiation of first order ($d\theta/dt$) and differentiation of second order ($d^2\theta/dt^2$) of an articulation angle of a manipulator 11 are required.

Since an initial instruction value of a manipulator 11 is provided in the form of an articulation angle time series $\theta_i(t)$ (i=1 to 1), it is required to calculate $d\theta/dt$ and $d^2\theta/dt^2$ from $\theta_i(t)$.

Figure 47:
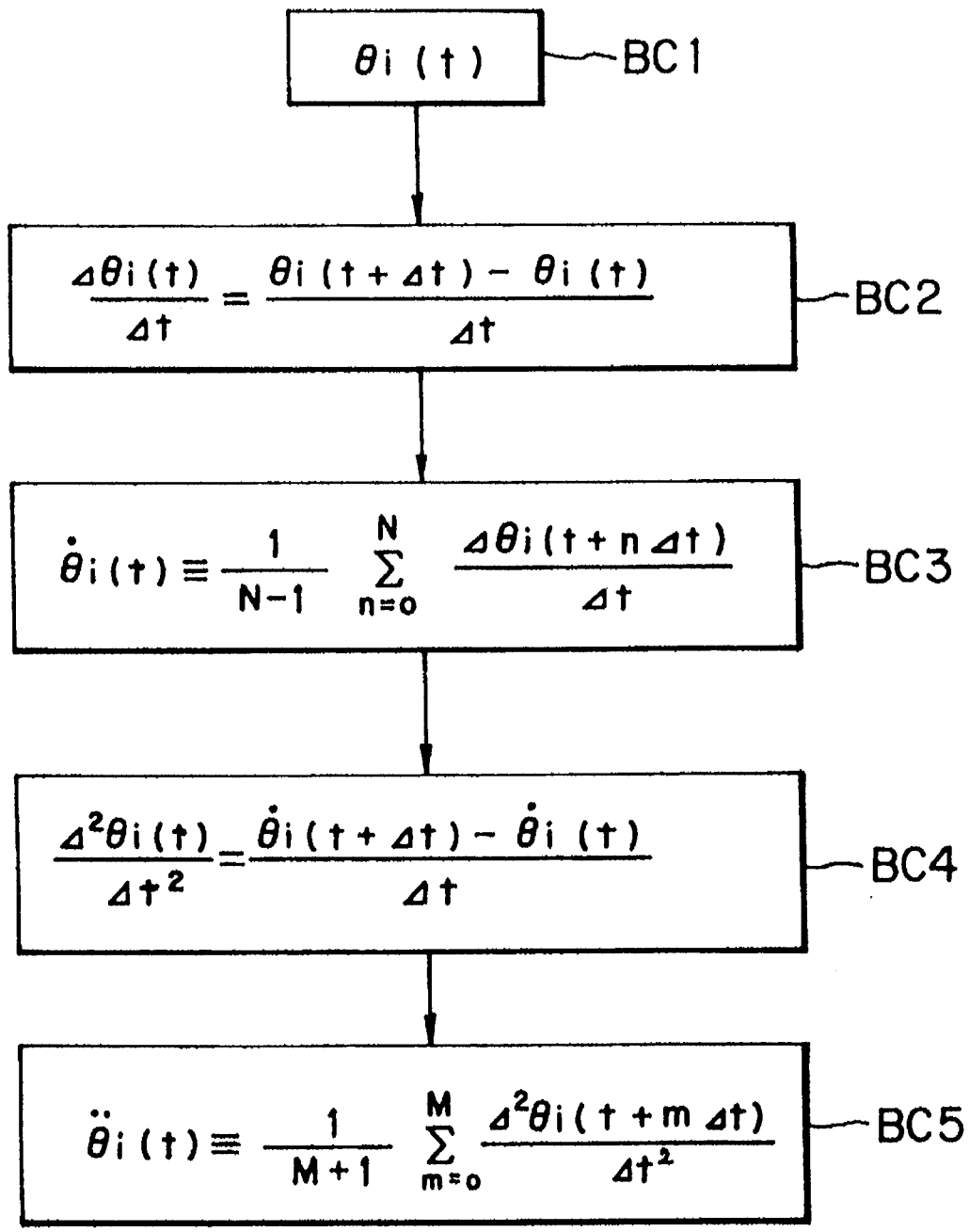
FIG. 47 is a flow chart illustrating a method of calculation of a differentiation term of a manipulator articulation angle.

To this end, $d\theta/dt$ and $d^2\theta/dt^2$ are calculated based on such calculation equations as illustrated in FIG. 47.

In particular, for $\theta_i(t)$ as an initial instruction value (step BC1), such calculation of a displacement as shown at step BC2 is performed. Then, a result of calculation of an equation shown at step BC3 is calculated as differentiation of first Order (dθ/dt) of θ(t).

Meanwhile, upon calculation of differentiation of second order, calculation of a displacement of differentiation of first order (dθ/dt) of θ(t) is performed as at step BC4, and using this, a result of calculation at step BC5 is calculated as differentiation of second order ($d^2θ/dt^2$) of θ(t).

Consequently, as differentiation information of an initial instruction value to be used to calculate an excessive instruction value suppressing index, a value obtained by processing a differential value of the initial instruction value by averaging processing is used.

Figure 48:
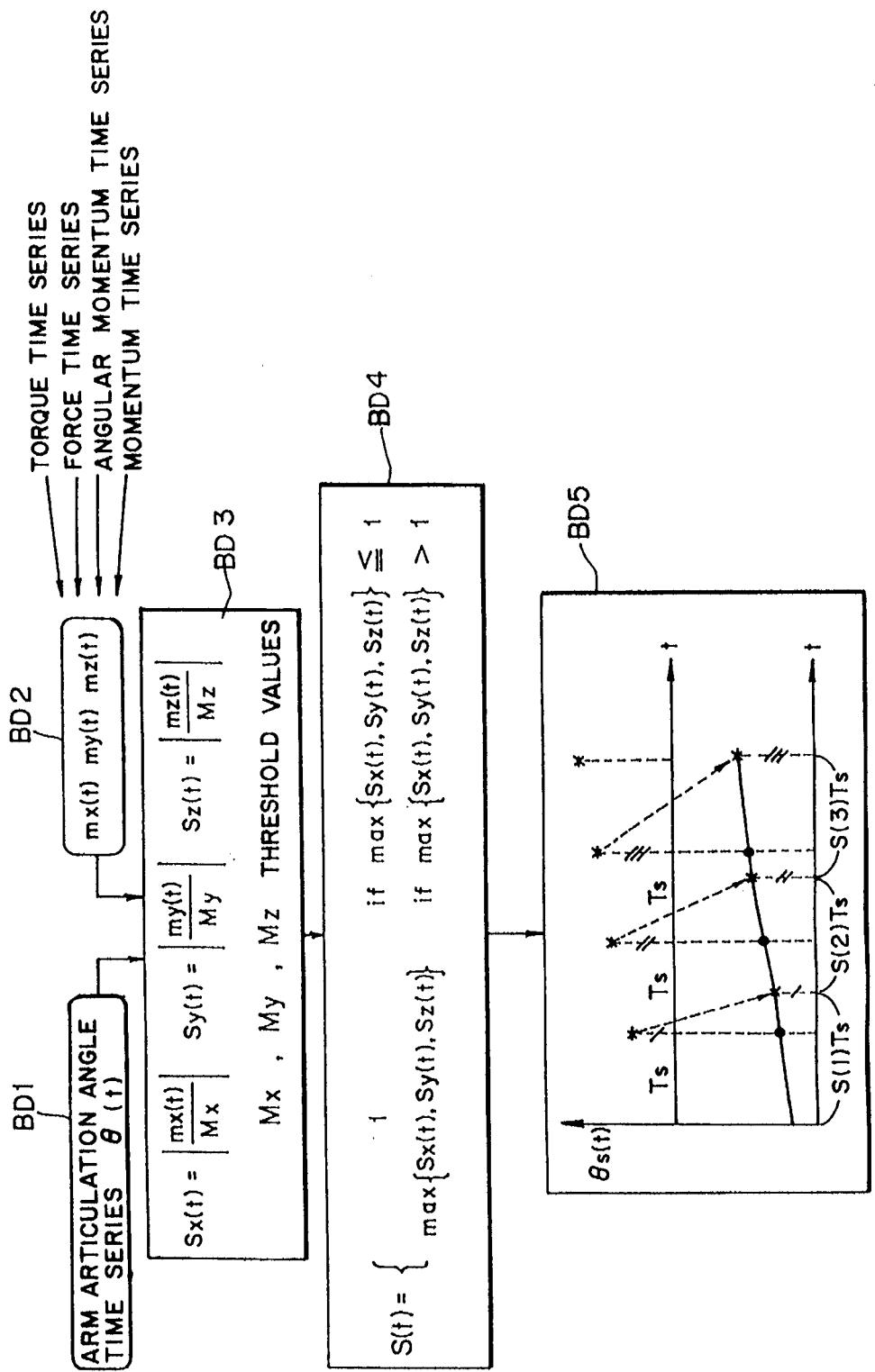
FIG. 48 is a view illustrating an example of on-the-ground system/on-the-orbit system velocity scale conversion.

By such calculation, the scale conversion section 310B converts the scale based on an excessive instruction value suppressing index forecast by the excessive instruction value suppressing index forecasting section 310A to obtain an intermediate instruction value sθ(t), and the manner of conversion of the scale is such, for example, as illustrated in FIG. 48.

In particular, arm articulation angle time series data Θ(t) as an initial instruction value (step BD1) and time series data [mx(t), my(t), mz(t)] regarding the momentum/angular momentum or the torque/force as an excessive instruction value suppressing index are inputted (step BD2).

And, as shown at step BD3, threshold value functions [Sx(t), Sy(t), Sz(t)] of mx(t), my(t), mz(t) are calculated, and such high/low discrimination as shown at step BD4 is performed based on the threshold value functions to determine S(t), and then it is determined based on this S(t) whether or not the initial instruction value is an excessive instruction value.

In particular, when the threshold value function of each of the axes are equal to or lower than 1, the initial instruction value is maintained as it is as S(t), but otherwise, the maximum value of the threshold value function is set to S(t) so that, by using this S(t), the velocity of the arm articulation angle set as the initial instruction value is controlled as shown at step BD5.

Here, $T_S$ is a sampling distance of input data as an initial instruction value.

Figure 49:
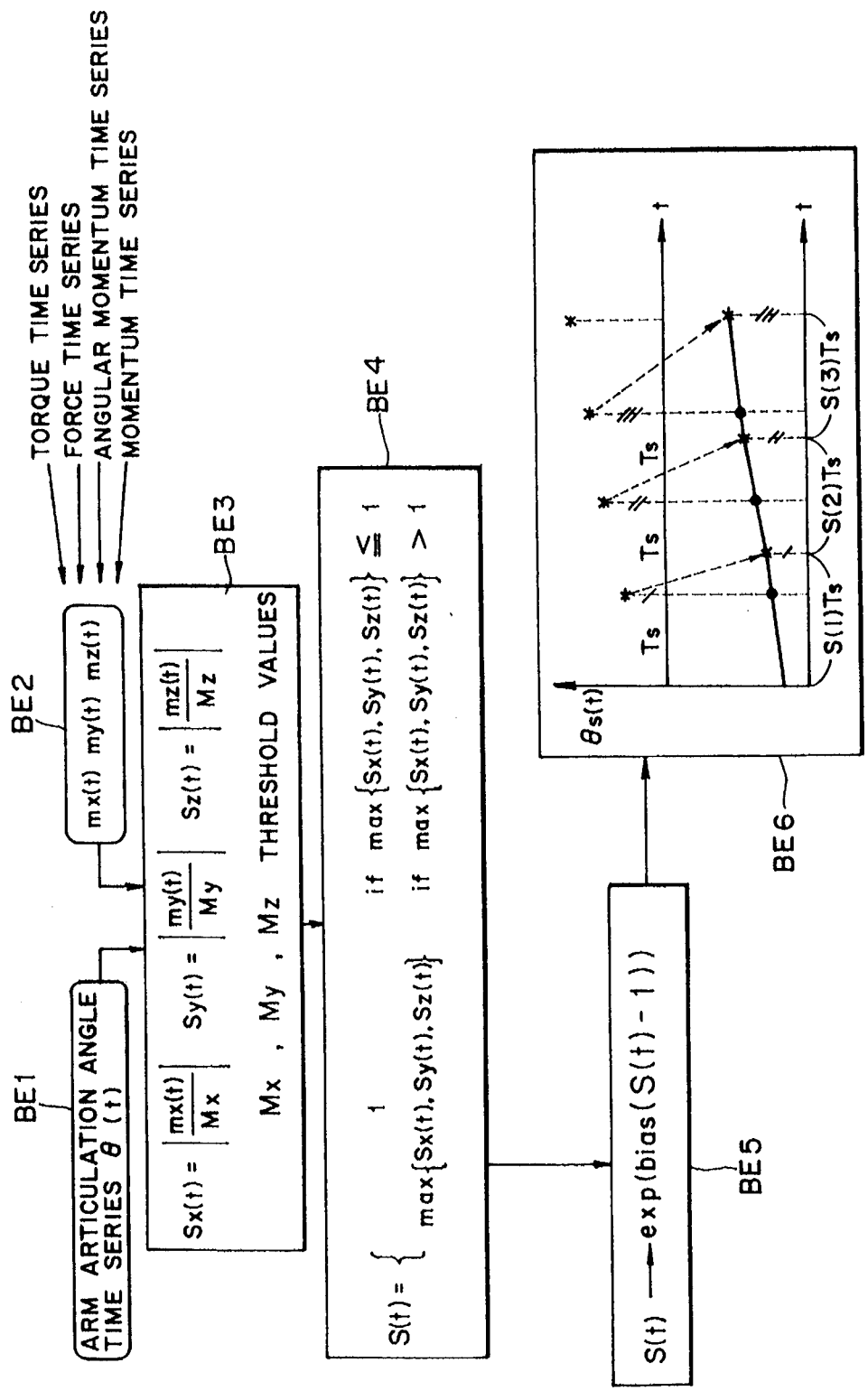
FIG. 49 is a view illustrating another example of on-the-ground system/on-the-orbit system velocity scale conversion.

It is to be noted that, as a conversion method for a scale, in addition to such a method as illustrated in FIG. 48, an exponential function can be introduced as illustrated in FIG. 49.

In particular, according to the method illustrated in this figure, at steps BE1 to BE4, similarly as at steps BD1 to BD4 of FIG. 48, arm articulation angle time series data Θ(t) as an initial instruction value and time series data [mx(t), my(t), mz(t)] regarding the momentum/angular momentum or the torque/force as an excessive instruction value suppressing index are inputted to determine S(t).

And, a function obtained by processing S(t) obtained at step BE4 described above by such exponential conversion calculation as shown at step BE5 is set as S(t), and by using this S(t), sθ(t) as an intermediate instruction value controls the velocity of the arm articulation angle set as the initial instruction value as shown at step BE6.

As described already, based on the initial instruction value θ(t), sθ(t) as an intermediate instruction value outputted in such a manner as described above and a sensor value from the scale conversion section 35·2 on the orbit, motion of the manipulator 11 is displayed by simulation display on the graphic display 32. The simulation display is performed in such a manner as shown in FIG. 52.

Figure 52:
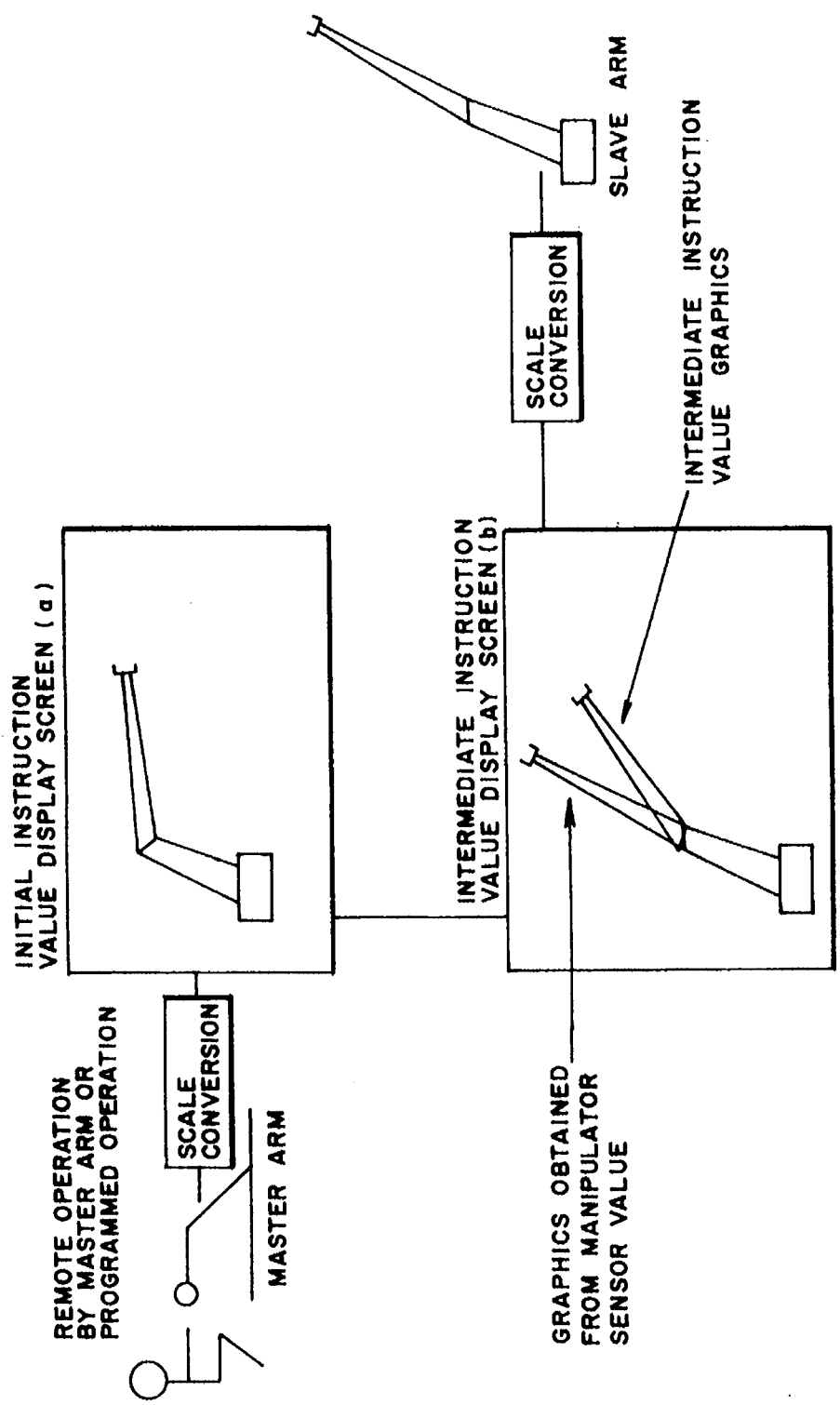
FIG. 52 is a view illustrating a displaying manner of a graphic display.
Figure 53:
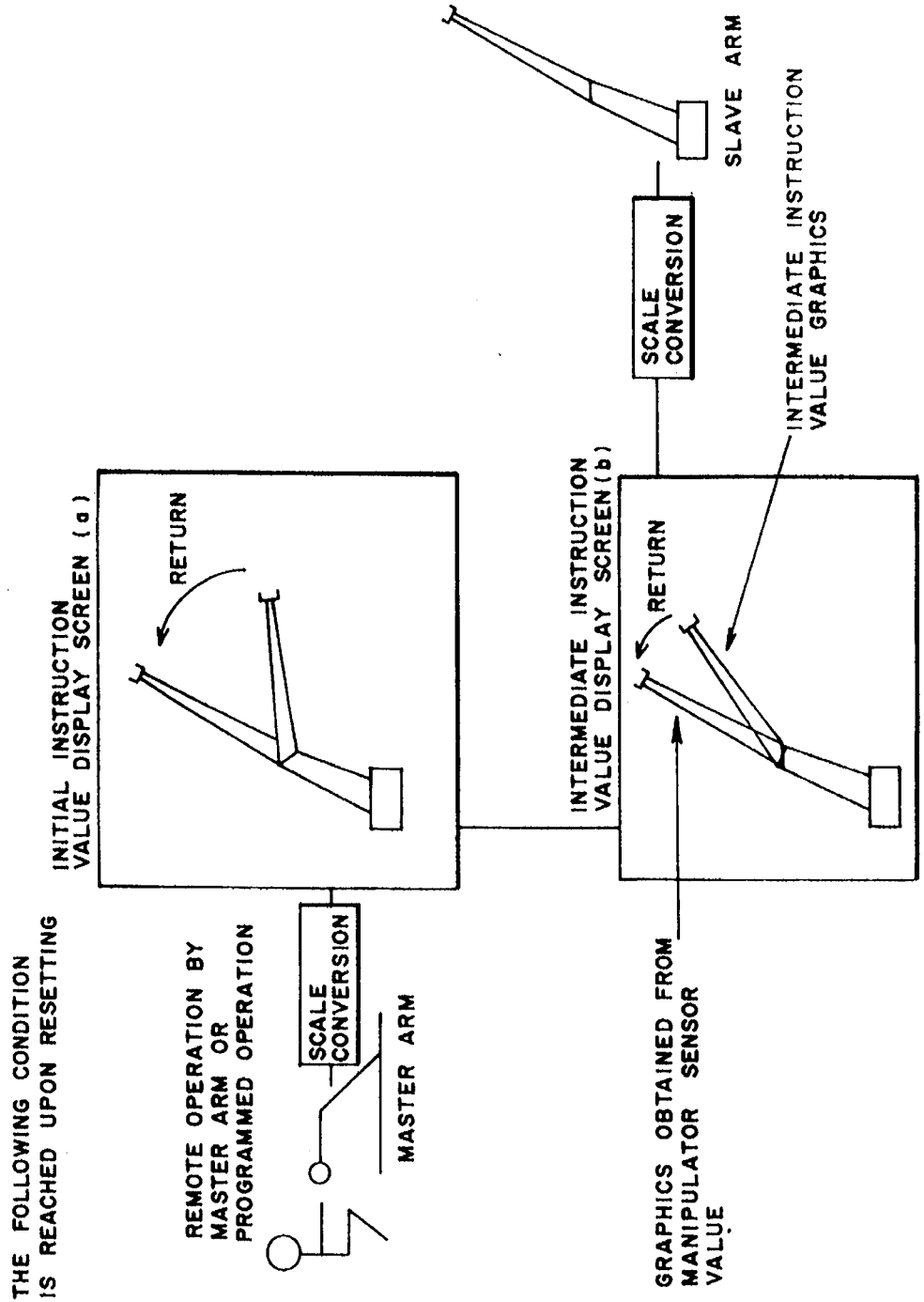
FIG. 53 is a view illustrating another displaying manner of the graphic display.

In particular, referring to FIG. 52, if an initial instruction value is inputted from an operator 31A, then, for example, such a screen as shown in (a) of FIG. 52 is constructed, and then, when an intermediate instruction value is calculated and an articulation angle of a manipulator 11 on the orbit is inputted from the altitude sensor system 34·3, such a screen as shown in (b) of FIG. 52 is constructed. The screen is overlaid suitably to support a manipulator operation of the operator 31A.

Further, upon application of the manipulator 11, when a great difference is produced among the initial instruction value θ(t) of the manipulator 11 from the operator 31A, the intermediate instruction value sθ(t) and a reached value (current articulation angle from the scale conversion section 35·2 on the orbit), the intermediate instruction values are all reset, and the initial value of the manipulator 11 is re-set to the current reached point and displayed on the graphic display 32 to resume the application.

In particular, in addition to the motion of the manipulator 11 based on the intermediate instruction value sθ(t), motion of the manipulator 11 based on the initial instruction value θ(t), and the reached value representative of the current manipulator position is displayed by simulation display, and when a deviation higher than a predetermined value is produced among the initial instruction value θ(t), the intermediate instruction value sθ(t) and the reached value, the initial instruction value θ(t) and the intermediate instruction value sθ(t) after the current manipulator reached point are reset, and the initial value of the manipulator 11 is re-set to the current reached point.

Figure 50:
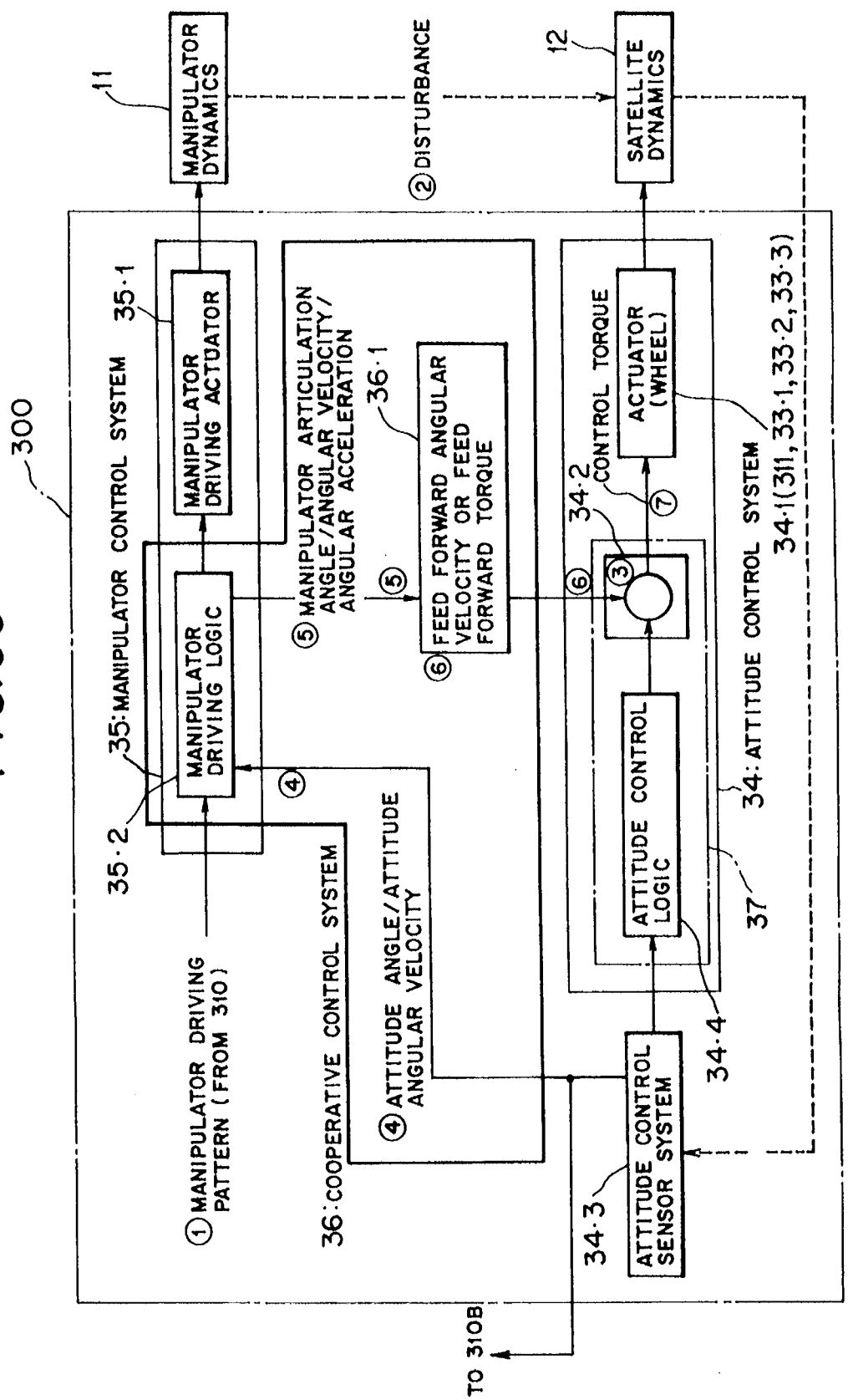
FIG. 50 is a block diagram showing several control systems of the spacecraft in the third embodiment of the present invention.

By the way, the control section 300 installed on the spacecraft 12 on the orbit is divided, as shown in FIGS. 40 and 50, into an attitude control system 34, an attitude control sensor system 34·3, a manipulator control system 35 and a cooperative control system 36·1.

Here, the manipulator control system 35 is constituted from a scale conversion section (means) 35·2 serving as a manipulator driving logic calculation section which receives an intermediate instruction value obtained by processing an initial instruction value inputted from the operator 31A to the simulation section 310 by scale conversion by the scale conversion section 310B (① in FIG. 50) and modifies the data so that the manipulator 11 may follow the route of the intermediate instruction value to control the manipulator 11 of the spacecraft 12 by servoing control, and a manipulator driving actuator (robot system) 35·1.

In particular, the scale conversion section 35·2 modifies articulation,time series data inputted from the scale conversion section 310B of the simulation section 310 based on attitude angle/wheel angular velocity detection information from the attitude control sensor system 34·3 to produce an electric signal for driving the manipulator driving actuator 35·1 to cause the manipulator 11 to follow an aimed route.

In short, in order to control a manipulator 11, a first intermediate instruction value obtained by processing an initial instruction value by scale conversion is processed by suppressing processing based on an actual disturbance of the manipulator system to obtain a second intermediate instruction value, and then the manipulator 11 is controlled in accordance with the second stage intermediate instruction value.

Further, the scale conversion section 35·2 is different from the scale conversion section 310B of the simulation section 310 on the ground in that it does not perform scale conversion based on a forecast angular momentum/momentum or torque/force or both of them but performs scale conversion based on an angular momentum/momentum detected by the attitude control sensor system 34·3 or a torque/force or both of them, and the method of the scale conversion is similar to the method by the scale conversion section 310B described hereinabove.

Accordingly, modification to articulation time series data from the simulation section 310 based on attitude angle/wheel angular velocity detection information by the scale conversion section 35-2 is performed by the method illustrated in FIG. 48 or 49 described hereinabove.

Meanwhile, the manipulator driving actuator 35-1 drives a manipulator 11 so that it may follow an aimed route (an articulation angle, an angular velocity and an angular acceleration of the manipulator) indicated by a voltage signal from the scale conversion section 35-2.

By the way, the scale conversion section 35-2 sets the period of an electric signal to be outputted to the manipulator driving actuator 35-1 shorter than the period of scale conversion so that the control period of the manipulator 11 is made short to assure smooth operation.

Here, a voltage signal from the scale conversion section 35-2 is produced by such a method as described below.

[5] Production of an aimed route of a manipulator—1

Figure 51:
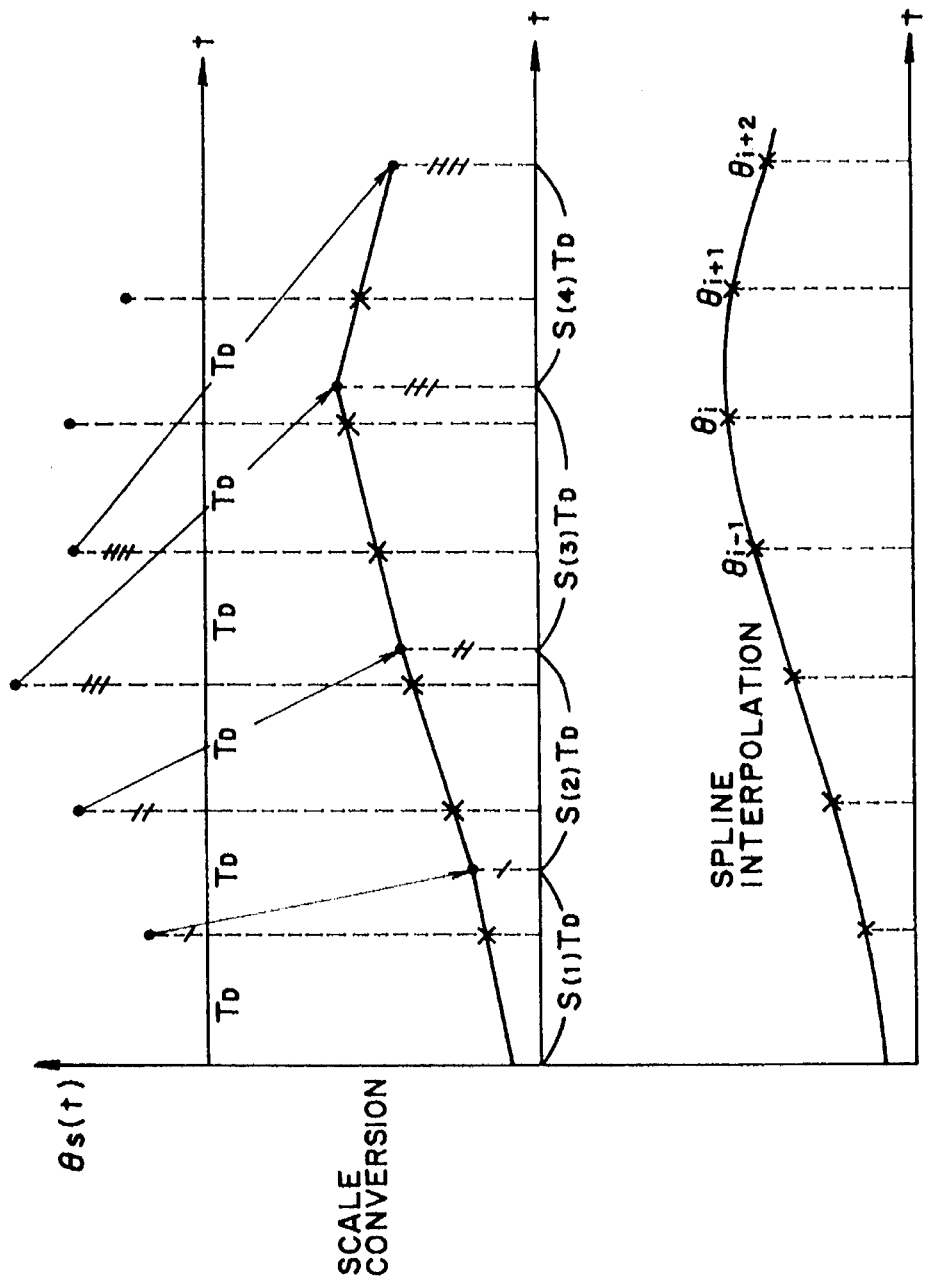
FIG. 51 is a view illustrating spline interpolation calculation.

Upon production of an aimed route of a manipulator 11, the following velocity scale conversion and spline interpolation calculation are combined with each other, and such a smooth aimed route as shown in FIG. 51 is produced by differentiation of first order of the combination.

Here, the period of dynamic calculation, that is, the period in which conversion of the velocity scale is performed, is represented by $T_D$, and the manipulator controlling period is represented by $T_{MC}$.

Spline interpolation is performed between $\theta_i$ and $\theta_{i+1}$ based on the following equation:

$$\theta_i(u) = (1/2)u^2(u-1)\theta_{i+2} + (1/2)u(1 + 4u - 3u^2)\theta_{i+1} +$$
$$(1/2)(u-1)(3u^2 - 2u - 2)\theta_i - (1/2)u^2(u-1)\theta_{i-1}$$
$$(0 \leq u \leq 1) \quad\quad (B8-1)$$

In this instance, $$\begin{cases} \theta_i(0) = \theta_i \\ \theta_i(1) = \theta_{i+1} \\ \dot{\theta}_i(0) = \frac{1}{T_D}\left.\frac{d\theta_i}{du}\right|_{u=0} = \frac{1}{2T_D}(\theta_{i+1} - \theta_{i-1}) \\ \dot{\theta}_i(1) = \frac{1}{T_D}\left.\frac{d\theta_i}{du}\right|_{u=1} = \frac{1}{2T_D}(\theta_{i+2} - \theta_i) \end{cases}$$

$$\begin{cases} \dot{\theta}_i(u) = \frac{1}{T_D^2}\frac{d\theta_i}{du} \\ \ddot{\theta}_i(u) = \frac{1}{T_D^2}\frac{d^2\theta_i}{du^2} \end{cases}$$

Accordingly, the manipulator aimed route for each $T_{MC}$ is obtained from the following equation:

$$\theta_i\left(\frac{nT_{MC}}{T_D}\right)$$

$$\left(0 \leq n \leq \frac{T_D}{nT_{MC}}, n \text{ being an integer}\right)$$

[6] Production of an aimed route of a manipulator—2

Meanwhile, the control period of a manipulator 11 can be combined with scale conversion calculation and spline interpolation calculation which is continuous up to differentiation of second order to produce such a smooth aimed route as shown in FIG. 51.

In [8], the equation (B8-1) is rewritten with the following equation:

$$\theta_i(u) = (u^3/6)\theta_{i+2} + (1/6) \times (-3u^3 + 3u^2 + 3u + 1)\theta_{i+1} +$$
$$(1/6)(3u^2 - 6u + 4)\theta_i + (1/6)(1 - u)^3\theta_{i-1}$$

In this instance, $$\begin{cases} \dot{\theta}_i(0) = \frac{1}{2T_D}(\theta_{i+1} - \theta_{i-1}) \\ \dot{\theta}_i(1) = \frac{1}{2T_D}(\theta_{i+2} - \theta_i) \\ \ddot{\theta}_i(0) = \frac{1}{T_D^2}(\theta_{i+1} - 2\theta_i + \theta_{i-1}) \\ \ddot{\theta}_i(1) = \frac{1}{T_D^2}(\theta_{i+2} - 2\theta_{i+1} + \theta_i) \end{cases}$$

$$\begin{cases} \dot{\theta}_i(u) = \frac{1}{T_D}\frac{d\theta_i}{du} \\ \ddot{\theta}_i(u) = \frac{1}{T_D^2}\frac{d^2\theta_i}{du^2} \end{cases}$$

It is to be noted that the attitude control system 34 is constituted from an attitude control system actuator 34-1 and a wheel control system 37 having functions similar to those of the attitude control system 24 of the second embodiment described above, and controls the attitude of the spacecraft 12 using the attitude control system actuator 34-1. It is to be noted that reference numerals 311, 33-1 to 33-3 denote a three-axis momentum wheel and momentum wheels having similar functions to those of the second embodiment, respectively.

Meanwhile, the attitude control sensor system 34-3 detects a variation of the attitude of the spacecraft 12 and has a function similar to that of the attitude control system 24 of the second embodiment described hereinabove.

And, the cooperative control system 36 causes the manipulator control system 35 and the attitude control system 34 to cooperate with each other to keep the attitude controlling performance of the satellite good and is constructed such that it has the scale conversion section 35-2 described above commonly with the manipulator control system 35 and includes a feed forward amount calculation section 36-1 having a function similar to that of the second embodiment.

With the construction described above, according to the present embodiment, if articulation angle time series data as an initial instruction value are inputted from the operator 31A on the ground as shown in FIG. 40, then an excessive instruction value suppressing index is forecast by calculation by the excessive instruction value suppressing index forecasting section 310A (①).

Then, the scale conversion section 310B performs conversion of the velocity scale of the articulation angle time series data θ(t) as an initial instruction value based on the forecast excessive instruction value suppressing index (②) to obtain an intermediate instruction value sθ(t) and outputs the intermediate instruction value sθ(t) to the control section 300 on the orbit and the graphic display 32.

And, the scale conversion section 35-2 of the control section 300 on the orbit performs velocity scale conversion based on a sensor value from the attitude sensor system 34-3 (④) and outputs the data obtained by the conversion as an electric signal to the manipulator driving actuator 35-1 to control the actuator 11.

Meanwhile, the feed forward amount calculation section 36-1 calculates the feed forward wheel angular velocity $\omega_{FF}(t)$ from the electric signal from the scale conversion section 35-2 and outputs it to the attitude control system 34 to control the attitude of the spacecraft 12.

Further, an image of the state of the spacecraft 12 is outputted from the scale conversion section 310B to the graphic display 32 on the ground based on the initial instruction value, the intermediate instruction value, and the sensor value from the attitude sensor system 34-3 regarding the actual articulation angle of the actuator.

Accordingly, there is an advantage in that, when a manipulator which is spaced dynamically from an operator thereof is operated by programmed operation or remote control, a work by the manipulator can be performed efficiently with safety.

Figure 54:
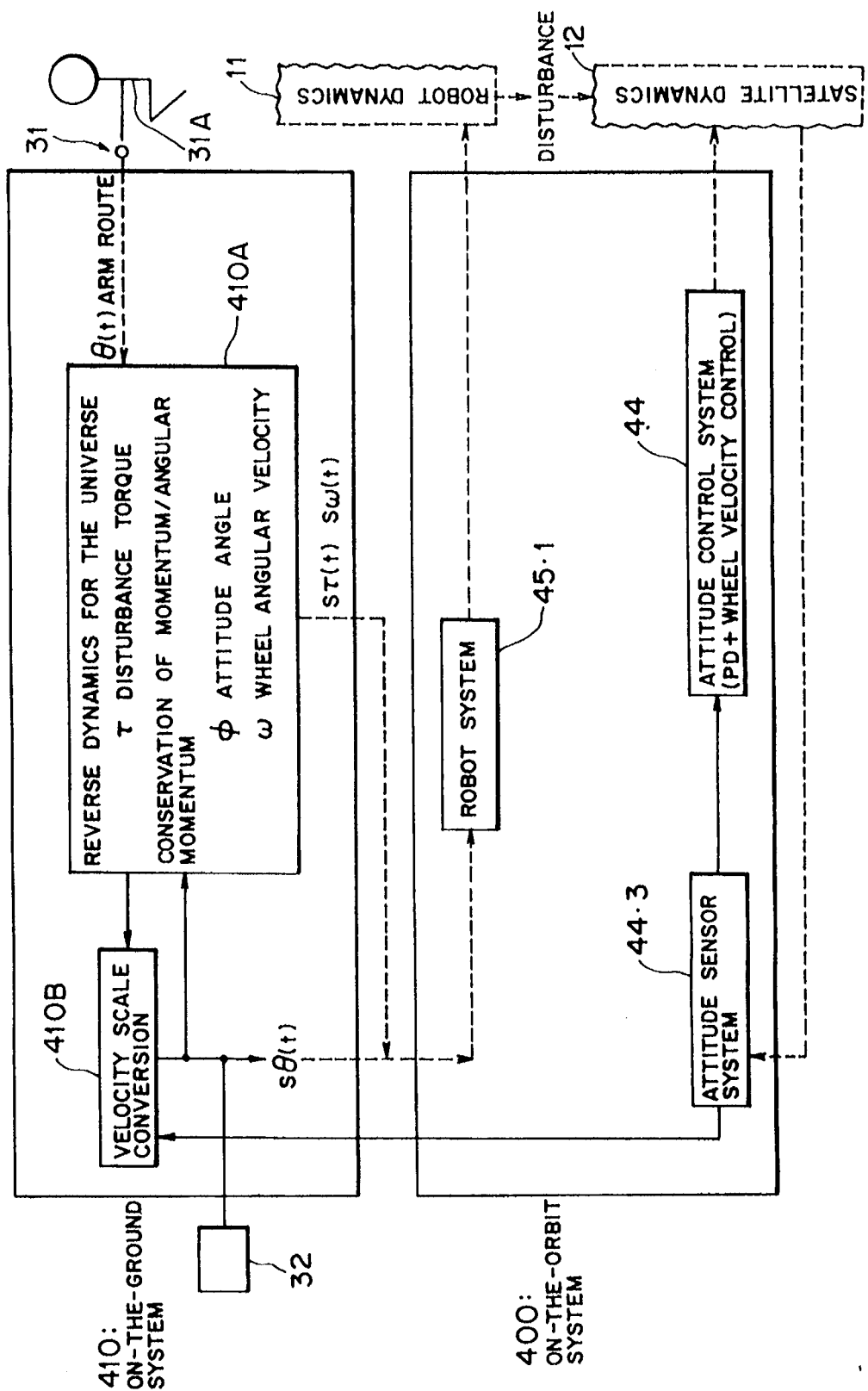
FIG. 54 is a block diagram showing a simulation and control apparatus for a manipulator apparatus as a fourth embodiment of the present invention.

It is to be noted that, while, in the present embodiment, the scale conversion section 35-2 and the feed forward amount calculation section 36-1 are provided on the control section 300 on the orbit and an intermediate instruction, for which scale conversion has been performed by the scale conversion section 310B, is received to modify data so that the manipulator may follow the route of the intermediate instruction value to control the manipulator 11 provided on the spacecraft 12 by servoing control while the attitude control system 34 performs attitude control based on information from the feed forward amount calculation section 36-1 and the attitude sensor system 34-3, in the present invention, a control section 400 on the orbit need not include the scale conversion section 35-2 or the feed forward amount calculation section 36-1 as shown in FIG. 54.

In this instance, a scale conversion section 410B of a simulation apparatus 410 on the ground functionally includes a combination of the scale conversion section 310B of the simulation section 310 of the third embodiment described above and the scale conversion section 35-2 of the control section 300 on the orbit, and consequently, it is constructed so as to receive an initial instruction value, an excessive instruction value forecast index forecast by an excessive instruction value suppressing index forecasting section 410A and a sensor value from an attitude sensor system 44-3 and calculate an intermediate instruction value.

Meanwhile, a manipulator driving actuator 45-1 of the control section 400 inputs an intermediate instruction value obtained by scale conversion by the scale conversion section 410B of the simulation apparatus 410 on the ground and an excessive instruction value suppressing index forecast by the excessive instruction value suppressing index forecasting section 410A to control a manipulator 11 while the attitude control of the spacecraft 12 is performed based only on the attitude sensor system 44-3.

In the meantime, the graphic display 32 displays an image of motion of the manipulator 11 based on an initial instruction value from the operator 31A, an intermediate instruction value obtained by scale conversion by the simulation apparatus 410 and actual articulation angle information from the attitude sensor system 34-3.

Figure 55:
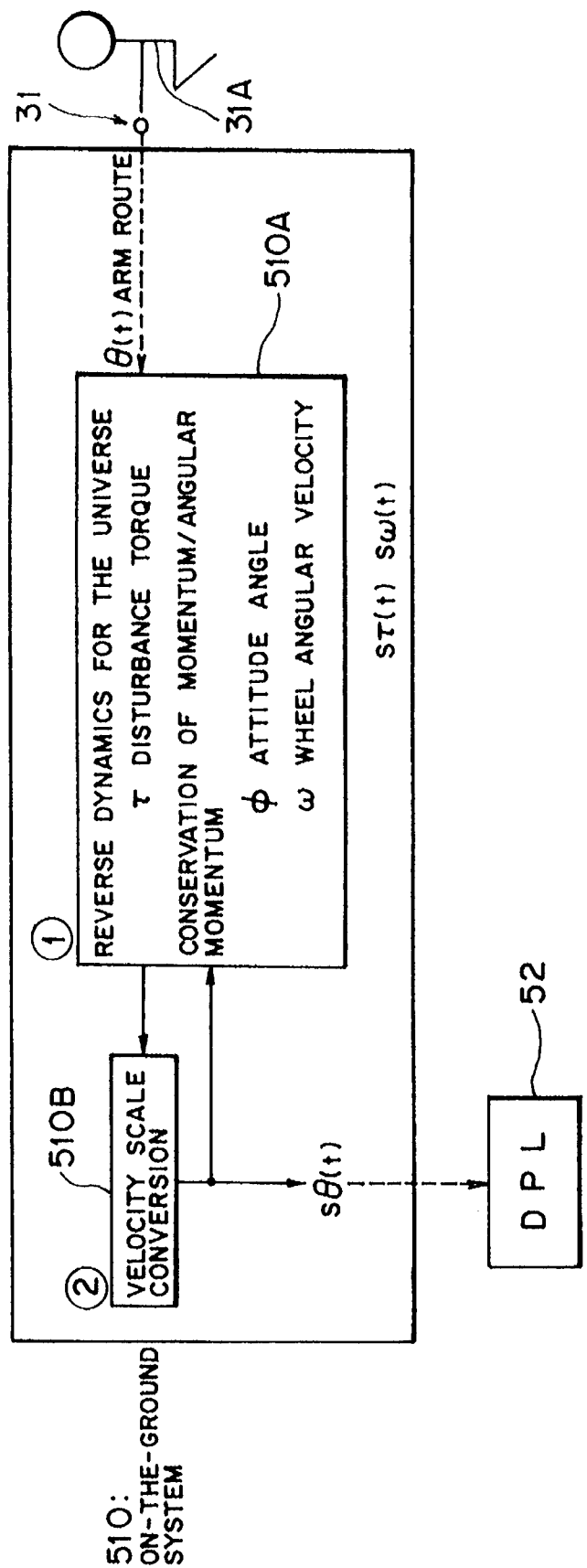
FIG. 55 is a block diagram showing a simulation apparatus for a manipulator apparatus as a fifth embodiment of the present invention.
Figure 56:
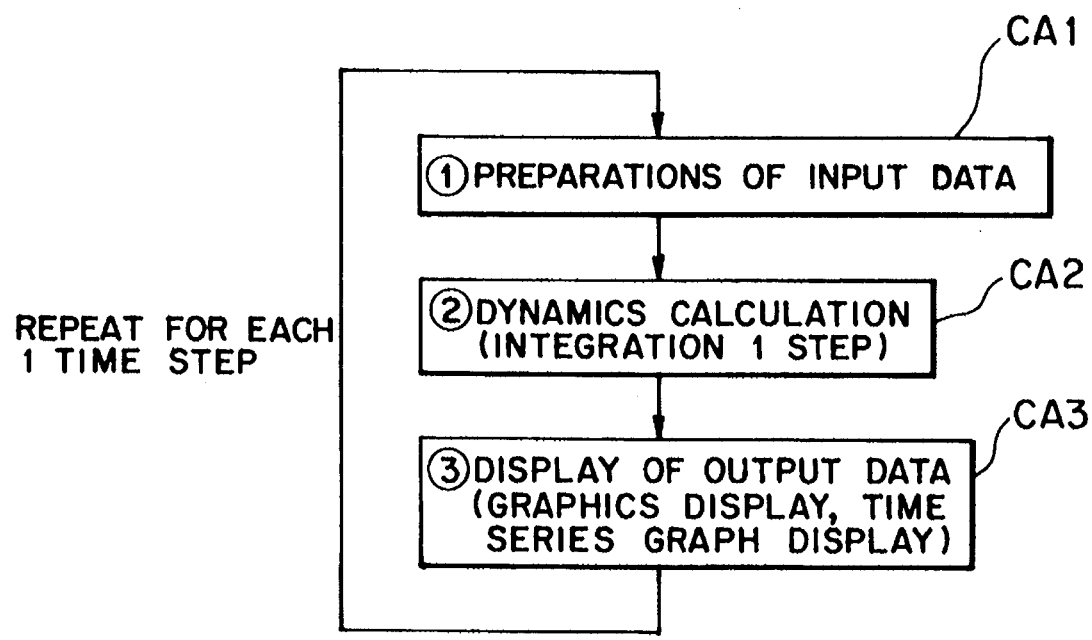
FIG. 56 is a flow chart illustrating a processing procedure of a conventional off-line simulator.

Further, as shown in FIG. 55, construction only from a simulation apparatus only of a ground system is possible.

In this instance, if an initial instruction value from the operator 31A is inputted, then an excessive instruction value suppressing index forecasting section 510A forecasts an excessive instruction value suppressing index based on the initial instruction value, and a scale conversion section 510B converts the initial instruction value by scale conversion based on the thus forecast excessive instruction value suppressing index and outputs a resulted value as an intermediate instruction value to a graphic display 52. The graphic display 52 displays an image of motion of the manipulator 11 based on the initial instruction value and the intermediate instruction value.

It is to be noted that, while, in the present embodiment, the present system is constituted separately from the simulation section 310 installed adjacent the operator 31A on the ground and the control section 300 installed on the spacecraft 12 on the orbit, according to the present invention, it is also possible to install the simulation section 310 on the spacecraft 12 on the orbit.

In this instance, the control section installed on the spacecraft 12 on the orbit is constituted from initial instruction value inputting means for inputting route instruction value information of a manipulator as an initial instruction value, excessive instruction value suppressing index forecasting means for receiving the initial instruction value from the initial instruction value inputting means and forecasting information of a disturbance, which is produced when the manipulator operates in accordance with the initial instruction value, on the real time basis as an excessive instruction value suppressing index based on a dynamic model regarding the manipulator 11, scale conversion means for performing scale conversion for the route instruction value information based on the excessive instruction value suppressing index forecast by the excessive instruction value suppressing index forecasting means to obtain an intermediate instruction value, and control means for controlling the manipulator in accordance with the intermediate instruction value obtained by the conversion of the scale conversion means. The route instruction value information of the manipulator 11 is inputted as an initial instruction value, and based on the dynamic model regarding the manipulator 11, information of a disturbance which is produced when the manipulator operates in accordance with the initial instruction value is forecast on the real time basis as an excessive instruction value suppressing index, and then scale conversion is performed for the initial instruction value based on the excessive instruction value suppressing index to obtain an intermediate instruction value, whereafter the manipulator 11 is controlled in accordance with the intermediate instruction value obtained by the scale conversion.

INDUSTRIAL APPLICABILITY OF THE INVENTION

The present system can be applied as an emulation apparatus in the procedure of development of onboard software (OBS) or an operator supporting apparatus in the procedure of application of a spacecraft when, in order to perform various operations on an orbit, which are forecast in construction and application of a space infrastructure such as a space station or a platform, efficiently with safety, various outside operations to be performed by an astronaut are performed by a spacecraft (a space robot, an artificial satellite or the like) having a manipulator for the astronaut or when a manipulator which is spaced dynamically from an operator therefor such as on the bottom of the sea or in an underground passage or a tunnel is operated by programmed operation or remote control.

We claim:

1. A simulation method for a manipulator apparatus which includes a manipulator and a manipulator body for supporting said manipulator thereon and whose attitude can be controlled by rotation of wheels in a wheel system, comprising the steps of inputting information of an articulation angle, an articulation angular velocity and an articulation angular acceleration of said manipulator, and calculating three-dimensional dynamics of said entire manipulator apparatus including an attitude control system on a real time basis based on said information, by performing dynamics calculations without a correction term based on the laws of conservation of linear and angular momentum and time differentiation of the laws using the laws of conservation of linear and angular momentum of the entire system, reverse dynamics or normal dynamics of the wheel system; and displaying motion of said manipulator apparatus by simulation display on a display.

2. A simulation apparatus for a manipulator apparatus which includes a manipulator and a manipulator body for supporting said manipulator thereon and whose attitude can be controlled by rotation of wheels in a wheel system, comprising:

a manipulator articulation information inputting section for inputting information of an articulation angle, an articulation angular velocity and an articulation angular acceleration of said manipulator;

a display for displaying motion of said manipulator apparatus by simulation display thereon;

a three-dimensional dynamics real time simulation section for receiving information from said manipulator articulation information inputting section and for calculating three-dimensional dynamics of said entire manipulator apparatus including an attitude control system on a real time basis by performing dynamics calculation without a correction term based on the laws of conservation of linear and annular momentum and time differentiation of the law using the laws of conservation of linear and angular momentum of the entire system, reverse dynamics or normal dynamics of the wheel system, said simulation section causing said display to display motion of said manipulator apparatus by simulation display.

3. A simulation apparatus for a manipulator apparatus as set forth in claim 2, wherein said three-dimensional dynamics real time simulation section (10) includes a manipulator apparatus velocity and angular velocity calculation section (4) for inputting position attitude information and wheel angular velocity information of said manipulator apparatus (12) and manipulator articulation angle and articulation angular velocity information from said manipulator articulation information inputting section (1) and calculating velocity and angular velocity information of said manipulator apparatus (12) using the laws of conservation of linear and angular momentum of the entire system, a manipulator apparatus position information calculation section (5) for inputting the position information of said manipulator apparatus (12) and velocity and angular velocity information obtained by said manipulator apparatus velocity and angular velocity calculation section (4) at two certain points of time, performing integration of first order for the input information to obtain position information of said manipulator apparatus (12) at a next point of time and outputting the position information to said display, a wheel feedback control torque calculation section (6) for receiving the manipulator apparatus position information from said manipulator apparatus position information calculation section (5) and calculating a wheel feedback control torque.

an internal torque and wheel system inertial information calculation section (7) for inputting the manipulator articulation angle and articulation angular velocity information and calculating an internal torque and wheel system inertia information using the normal dynamics of the wheel system, a wheel feed forward torque calculation section (8) for inputting the manipulator articulation angle and articulation angular velocity information and calculating a wheel feed forward torque using binding reverse dynamics, and a wheel dynamics integration section (9) for inputting the wheel rotational angles, wheel angular velocity information, feedback control torque information, internal torque information, wheel system inertia information and feed forward torque information at two points of time and outputting wheel rotational angle and wheel angular velocity information at a next point of time.

4. A simulation apparatus for a manipulator apparatus as set forth in claim 3, wherein said wheel dynamics integration section (9) is constructed as a first order integration section such that, when it is to numerically solve an equation of motion of the entire system, it performs only numerical integration of first order for said wheels from the rotational symmetry of said wheels while it does not require rotational angle information of said wheels.

5. A simulation apparatus for a manipulator apparatus as set forth in claim 3, wherein said wheel dynamics integration section (9) is constructed as a second order integration section such that wheel angular velocity information is obtained by calculation of integration of first order and then wheel rotational angle information is obtained by calculation of integration of second order.

6. A simulation apparatus for a manipulator apparatus as set forth in claim 5, wherein when an equation of motion of the entire system is to be solved numerically, from the rotational symmetry of said wheels, the step sizes in numerical integration of first order and numerical integration of second order of said wheels are made different from each other such that the numerical integration of second order is processed by rougher calculation than the numerical integration of first order.

7. A simulation apparatus for a manipulator apparatus as set forth in claim 5, wherein when an equation of motion of the entire system is to be solved numerically, from the rotational symmetry of said wheels, the integration degree numbers in numerical integration of first order and numerical integration of second order of said wheels are made different from each other such that the numerical integration of second order is processed by rougher calculation than the numerical integration of first order.

8. A simulation apparatus for a manipulator apparatus as set forth in claim 5, wherein when an equation of motion of the entire system is to be solved numerically, from the rotational symmetry of said wheels, the step sizes and the integration degree numbers in numerical integration of first order and numerical integration of second order of said wheels are made different from each other such that the numerical integration of second order is processed by rougher calculation than the numerical integration of first order.

9. A simulation apparatus for a manipulator apparatus as set forth in claim 3, wherein in order to calculate a rotational angle of said wheels at a high speed with a high degree of accuracy, inertial moments of all of said wheels are proportionally multiplied.

10. A simulation apparatus for a manipulator apparatus as set forth in claim 3, wherein when rotation of said wheels is to be displayed on said display, an angular velocity of said wheels is displayed in the form wherein it is proportionally multiplied immediately before it is displayed.

11. A simulation and control method for a manipulator apparatus, said apparatus including:

a manipulator, a manipulator body for supporting said manipulator thereon, and an attitude control system by which attitude can be controlled by rotation of wheels in a wheel system, a manipulator control system for inputting information of an articulation angle, an articulation angular velocity and an articulation angular acceleration of said manipulator and for controlling said manipulator, and a cooperative control system having means for calculating a disturbance originating from said manipulator based on information from said manipulator control system using a required algorithm and for supplying the disturbance as a feed forward signal to said attitude control system, and said cooperative control system having means for taking, in order to compensate for the disturbance originating from said manipulator, an angular momentum or a wheel angular velocity obtained by dividing the angular momentum by a mass of each of said wheels or a torque as a feed forward amount to be delivered to said wheel control system of said attitude control system and for calculating an aimed angular momentum or an aimed angular velocity of said wheels from the laws of conservation of linear and angular momentum or reverse dynamics for the universe to control said wheels, comprising the steps of inputting information of an articulation angle, an articulation angular velocity and an articulation angular acceleration of said manipulator, calculating three-dimensional dynamics of said entire manipulator apparatus on a real time basis based on the information using the laws of conservation of linear and angular momentum of the entire system, reverse dynamics or normal dynamics of the wheel system, and displaying motion of said manipulator apparatus by simulation display on a display.

12. A simulation and control method for a manipulator apparatus as set forth in claim 11, wherein upon application of the laws of conservation of linear and angular momentum, a constraint that the angular velocity of a manipulator body is 0 is applied to the angular velocity of said manipulator body.

13. A simulation and control method for a manipulator apparatus as set forth in claim 11, wherein upon application of the laws of conservation of linear and angular momentum, a constraint that the angular velocity of a manipulator body is a constant is applied to the angular velocity of said manipulator body.

14. A simulation and control method for a manipulator apparatus as set forth in claim 11, wherein upon application of the laws of conservation of linear and angular momentum, a constraint that the angular velocity of a manipulator body is an arbitrary function of the time is applied to the angular velocity of said manipulator body.

15. A simulation and control method for a manipulator apparatus as set forth in claim 11, wherein upon application of the reverse dynamics for the universe, a constraint that the angular acceleration of a manipulator body is 0 is applied to the angular acceleration of said manipulator body.

16. A simulation and control method for a manipulator apparatus as set forth in claim 11, wherein upon application of the reverse dynamics for the universe, a constraint that the angular velocity and the angular acceleration of a manipulator body are both 0 is applied to the angular velocity and the angular acceleration of said manipulator body.

17. A simulation and control method for a manipulator apparatus as set forth in claim 11, wherein upon application of the reverse dynamics for the universe, a constraint that the angular velocity of a manipulator body is a constant and the angular acceleration of said manipulator body is 0 is applied to the angular velocity and the angular acceleration of said manipulator body.

18. A simulation and control method for a manipulator apparatus as set forth in claim 11, wherein upon application of the reverse dynamics for the universe, a constraint that the angular acceleration of a manipulator body is an arbitrary function of the time is applied to the angular acceleration of said manipulator body.

19. A simulation and control method for a manipulator apparatus as set forth in claim 11, wherein upon application of the reverse dynamics for the universe, a constraint that the angular velocity and the angular acceleration of a manipulator body are both arbitrary functions of the time is applied to the angular velocity and the angular acceleration of said manipulator body.

20. A simulation and control method for a manipulator apparatus as set forth in claim 11, wherein the degree of freedom of the entire system is set to a sum L+6 of the number L of articulations of said manipulator and the degree of freedom of 6 of the position and attitude of said manipulator body.

21. A simulation and control method for a manipulator apparatus as set forth in claim 11, wherein said attitude control system performs PD feedback control based on an attitude angle of said manipulator apparatus and differentiation of the attitude angle in order to compensate for a disturbance originating from said manipulator.

22. A simulation and control method for a manipulator apparatus as set forth in claim 11, wherein said attitude control system performs PID feedback control based on an attitude angle of said manipulator apparatus, integration of the attitude angle and differentiation of the attitude angle in order to compensate for a disturbance originating from said manipulator.

23. A simulation and control apparatus for a manipulator apparatus which includes a manipulator and a manipulator body for supporting said manipulator thereon and whose attitude can be controlled by rotation of wheels, comprising:

a manipulator articulation information inputting section for inputting information of an articulation angle, an articulation angular velocity and an articulation angular acceleration of said manipulator, a display for displaying motion of said manipulator apparatus by simulation display thereon, and a three-dimensional dynamics real time simulation section for receiving information from said manipulator articulation information inputting section and calculating three-dimensional dynamics of said entire manipulator apparatus including an attitude control system on a real time basis using the laws of conservation of linear and angular momentum of the entire system, reverse dynamics or normal dynamics of the wheel system to cause said display to display motion of said manipulator apparatus by simulation display, an attitude control system for controlling an attitude of said manipulator apparatus using said wheels, a manipulator control system for inputting information of an articulation angle, an articulation angular velocity and an articulation angular acceleration of said manipulator and controlling said manipulator, and a cooperative control system for calculating a disturbance originating from said manipulator based on the information from said manipulator control system using a required algorithm and supplying the disturbance as a feed forward signal to said attitude control system, and said cooperative control system takes, in order to compensate for the disturbance originating from said manipulator, an angular momentum or a wheel angular velocity obtained by dividing the angular momentum by a mass of each of said wheels or a torque as a feed forward amount to be delivered to said wheel control system of said attitude control system and calculates an aimed angular momentum or an aimed angular velocity of said wheels from the laws of conservation of momentum or reverse dynamics for the universe to control said wheels.

24. A simulation and control apparatus for a manipulator apparatus as set forth in claim 23, wherein said three-dimensional dynamics real time simulation section includes a manipulator apparatus velocity and angular velocity calculation section for inputting position attitude information and wheel angular velocity information of said manipulator apparatus and manipulator articulation angle and articulation angular velocity information from said manipulator articulation information inputting section and calculating velocity and angular velocity information of said manipulator apparatus using the laws of conservation of momentum of the entire system, a manipulator apparatus position information calculation section for inputting the position information of said manipulator apparatus and velocity and angular velocity information obtained by said manipulator apparatus velocity and angular velocity calculation section at two certain points of time, performing integration of first order for the input information to obtain position information of said manipulator apparatus at a next point of time and outputting the position information to said display, a wheel feedback control torque calculation section for receiving the manipulator apparatus position information from said manipulator apparatus position information calculation section and calculating a wheel feedback control torque, an internal torque and wheel system inertial information calculation section for inputting the manipulator articulation angle and articulation angular velocity information and calculating an internal torque and wheel system inertia information using the normal dynamics of the wheel system, a wheel feed forward torque calculation section for inputting the manipulator articulation angle and articulation angular velocity information and calculating a wheel feed forward torque using binding reverse dynamics for the universe, and a wheel dynamics integration section for inputting the wheel rotational angles, wheel angular velocity information, feedback control torque information, internal torque information, wheel system inertia information and feed forward torque information at two points of time and outputting wheel rotational angle and wheel angular velocity information at a next point of time.

25. A control method for a manipulator apparatus, said apparatus including a manipulator and a manipulator body for supporting said manipulator thereon, an attitude control system for controlling an attitude of said manipulator apparatus by using rotation of wheels, a manipulator control system for controlling said manipulator, and a cooperative control system, said method comprising the steps:

calculating in said cooperative control system a disturbance originating from said manipulator based on information from said manipulator control system using a required algorithm and supplying the disturbance as a feed forward signal to said attitude control system, and taking by said cooperative control system, in order to compensate for the disturbance originating from said manipulator, an angular momentum or a wheel angular velocity obtained by dividing the angular momentum by a mass of each of said wheels as a feed forward amount and delivering said amount to a wheel control system of said attitude control system and calculating an aimed angular momentum or an aimed angular velocity of said wheels from the laws of conservation of linear and angular momentum to control said wheels.

26. A control method for a manipulator apparatus, said apparatus including a manipulator and a manipulator body for supporting said manipulator thereon, an attitude control system for controlling an attitude of said manipulator apparatus by using rotation of wheels, a manipulator control system for controlling said manipulator, and a cooperative control system, said method comprising the steps:

calculating in said cooperative control system a disturbance originating from said manipulator based on information from said manipulator control system using a required algorithm and supplying the disturbance as a feed forward signal to said attitude control system, and taking by said cooperative control system, in order to compensate for the disturbance originating from said manipulator, a torque as a feed forward amount and delivering said amount to a wheel control system of said attitude control system and calculating a value of the torque from reverse dynamics to control said wheels.

27. A control method for a manipulator apparatus, said apparatus including a manipulator and a manipulator body for supporting said manipulator thereon, an attitude control system for controlling an attitude of said manipulator apparatus by using rotation of wheels, a manipulator control system for controlling said manipulator, and a cooperative control system, said method comprising the steps:

calculating in said cooperative control system a disturbance originating from said manipulator based on information from said manipulator control system using a required algorithm and supplying the disturbance as a feed forward signal to said attitude control system, and taking by said cooperative control system, in order to compensate for the disturbance originating from said manipulator, one of an angular momentum, a wheel angular velocity obtained by dividing the angular momentum by a mass of each of said wheels and a torque as a feed forward amount and delivering said amount to a wheel control system of said attitude control system and calculating respectively one of an aimed angular momentum and an aimed angular velocity of said wheels from the laws of conservation of momentum and reverse dynamics to control said wheels.

28. A simulation method for a manipulator apparatus which includes a manipulator and a manipulator body for supporting said manipulator thereon, comprising the steps of inputting route instruction value information of said manipulator as an initial instruction value and forecasting information of a disturbance which is produced when said manipulator operates in accordance with the initial instruction value on a real time basis as an excessive instruction value control index based on a dynamic model regarding said manipulator, and performing scale conversion for the initial instruction value based on the excessive instruction value control index to obtain an intermediate instruction value, and thereafter displaying motion of said manipulator by simulation display in accordance with the intermediate instruction value obtained by the scale conversion.

29. A simulation method for a manipulator apparatus as set forth in claim 28, wherein linear and angular momentum are forecast on a real time basis as the excessive instruction value control index using the laws of conservation of momentum.

30. A simulation method for a manipulator apparatus as set forth in claim 28, wherein torque/force are forecast on the real time basis as the excessive instruction value control index using reverse dynamics.

31. A simulation method for a manipulator apparatus as set forth in claim 28, wherein angular momentum and a torque/force are forecast on the real time basis as the excessive instruction value control indices using the laws of conservation of momentum and reverse dynamics.

32. A simulation method for a manipulator apparatus as set forth in claim 28, characterized in that, as differentiation information of the initial instruction value which is to be used upon calculation of the excessive instruction value control index, a differential value of the initial instruction value is used after it is processed by averaging processing.

33. A simulation method for a manipulator apparatus as set forth in claim 28, characterized in that exponential conversion calculation is performed when the scale conversion is to be performed.

34. A simulation method for a manipulator apparatus as set forth in claim 28, characterized in that the scale conversion processing and spline interpolation calculation processing are combined with each other to produce an aimed route for said manipulator.

35. A simulation method for a manipulator apparatus as set forth in claim 34, characterized in that spline interpolation calculation processing continuous to differentiation of first order is used as the spline interpolation calculation processing.

36. A simulation method for a manipulator apparatus as set forth in claim 34, characterized in that spline interpolation calculation processing continuous to differentiation of second order is used as the spline interpolation calculation processing.

37. A simulation apparatus for a manipulator apparatus which includes a manipulator and a manipulator body for supporting said manipulator thereon, comprising:

initial instruction value inputting means for inputting route instruction value information of said manipulator as an initial instruction value, excessive instruction value control index forecasting means for receiving the initial instruction value from said initial instruction value inputting means and forecasting information of a disturbance, which is produced when said manipulator operates in accordance with the initial instruction value, on a real time basis as an excessive instruction value control index based on a dynamic model regarding said manipulator, scale conversion means for performing scale conversion for the initial instruction value based on the excessive instruction value control index forecast by said excessive instruction value control index forecasting means to obtain an intermediate instruction value, and display means for displaying motion of said manipulator by simulation display in accordance with the intermediate instruction value obtained by the conversion of said scale conversion means.

38. A simulation and control method for a manipulator apparatus which includes a manipulator and a manipulator body for supporting said manipulator thereon, wherein route instruction value information of said manipulator is inputted as an initial instruction value and information of a disturbance, which is produced when said manipulator operates in accordance with the initial instruction value, is forecast on a real time basis as an excessive instruction value control index based on a dynamic model regarding said manipulator, and scale conversion is performed for the initial instruction value based on the excessive instruction value control index to obtain an intermediate instruction value, and then motion of said manipulator is displayed by simulation display and said manipulator is controlled in accordance with the intermediate instruction value obtained by the scale conversion.

39. A simulation and control method for a manipulator apparatus as set forth in claim 38, characterized in that, in order to control said manipulator, controlling processing is performed for a first intermediate instruction value obtained by the scale conversion of the initial instruction value based on an actual disturbance of the manipulator system to obtain a second intermediate instruction value, and then said manipulator is controlled in accordance with the second stage intermediate instruction value.

40. A simulation and control method for a manipulator apparatus as set forth in claim 38, wherein characterized in that, in addition to motion of said manipulator based on the intermediate instruction value, motion of said manipulator based on the initial instruction value and a reached value representative of a current position of said manipulator is displayed by simulation display.

41. A simulation and control method for a manipulator apparatus as set forth in claim 40, characterized in that, if a difference greater than a predetermined value is produced among the initial instruction value, the intermediate instruction value and the reached value, the initial instruction value and the intermediate instruction values later than the current reached point of said manipulator are reset and the initial instruction value of said manipulator is re-set to the current reached point.

42. A simulation and control apparatus for a manipulator apparatus which includes a manipulator and a manipulator body for supporting said manipulator thereon, comprising:

initial instruction value inputting means for inputting route instruction value information of said manipulator as an initial instruction value, excessive instruction value control index forecasting means for receiving the initial instruction value from said initial instruction value inputting means and forecasting information of a disturbance, which is produced when said manipulator operates in accordance with the initial instruction value, on a real time basis as an excessive instruction value control index based on a dynamic model regarding said manipulator, scale conversion means for performing scale conversion for the route instruction value information based on the excessive instruction value control index forecast by said excessive instruction value control index forecasting means to obtain an intermediate instruction value, display means for displaying motion of said manipulator by simulation display in accordance with the intermediate instruction value obtained by the conversion of said scale conversion means, and control means for controlling said manipulator in accordance with the intermediate instruction value obtained by the conversion of said scale conversion means.

43. A control method for a manipulator apparatus which includes a manipulator and a manipulator body for supporting said manipulator thereon, characterized in that route instruction value information of said manipulator is inputted as an initial instruction value and information of a disturbance, which is produced when said manipulator operates in accordance with the initial instruction value, is forecast on the real time basis as an excessive instruction value control index based on a dynamic model regarding said manipulator, and scale conversion is performed for the initial instruction value based on the excessive instruction value control index to obtain an intermediate instruction value, and then said manipulator is controlled in accordance with the intermediate instruction value obtained by the scale conversion.

44. A control apparatus for a manipulator apparatus (12) which includes a manipulator and a manipulator body for supporting said manipulator thereon, characterized in that it comprises initial instruction value inputting means for inputting route instruction value information of said manipulator as an initial instruction value, excessive instruction value control index forecasting means for receiving the initial instruction value from said initial instruction value inputting means and forecasting information of a disturbance, which is produced when said manipulator operates in accordance with the initial instruction value, on the real time basis as an excessive instruction value control index based on a dynamic model regarding said manipulator, scale conversion means for performing scale conversion for the route instruction value information based on the excessive instruction value control index forecast by said excessive instruction value control index forecasting means to obtain an intermediate instruction value, and control means for controlling said manipulator in accordance with the intermediate instruction value obtained by the conversion of said scale conversion means.

* * * * *